United States Patent
Gladwin et al.

(10) Patent No.: US 12,259,886 B2
(45) Date of Patent: *Mar. 25, 2025

(54) UTILIZING QUERY APPROVAL DATA DETERMINED BASED ON QUERY COST DATA FOR A QUERY REQUEST

(71) Applicant: Ocient Holdings LLC, Chicago, IL (US)

(72) Inventors: S. Christopher Gladwin, Chicago, IL (US); Andrew D. Baptist, Mt. Pleasant, WI (US); George Kondiles, Chicago, IL (US); Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,294

(22) Filed: Dec. 7, 2023

(65) Prior Publication Data

US 2024/0134857 A1 Apr. 25, 2024

Related U.S. Application Data

(63) Continuation of application No. 18/165,029, filed on Feb. 6, 2023, now Pat. No. 11,874,837, which is a continuation of application No. 17/150,415, filed on Jan. 15, 2021, now Pat. No. 11,599,542, which is a continuation of application No. 16/665,571, filed on Oct. 28, 2019, now Pat. No. 11,093,500.

(51) Int. Cl.
*G06F 16/245* (2019.01)
*G06F 16/2453* (2019.01)

(52) U.S. Cl.
CPC .............. *G06F 16/24545* (2019.01)

(58) Field of Classification Search
CPC .................................. G06F 16/24545
See application file for complete search history.

(56) References Cited

U.S. PATENT DOCUMENTS 5,548,770 A 8/1996 Bridges
5,778,354 A 7/1998 Leslie
(Continued)

FOREIGN PATENT DOCUMENTS

JP 2012155358 A 8/2012

OTHER PUBLICATIONS

A new high performance fabric for HPC, Michael Feldman, May 2016, Intersect360 Research.
(Continued)

*Primary Examiner* — Baoquoc N To
(74) *Attorney, Agent, or Firm* — Garlick & Markison; Katherine C. Stuckman; Bruce E. Stuckman

(57) ABSTRACT

A user device is operable to determine a query request based on first user input to a graphical user interface displayed by the user device. Query cost data is determined based on the query request. A prompt is displayed via the graphical user interface that indicates the query cost data. Query approval data is determined based on second user input to the graphical user interface in response to the prompt. The query request is transmitted to an analytics system for execution against a database system when the query approval data indicates approval to transmit the query request.

19 Claims, 47 Drawing Sheets

(56) References Cited

U.S. PATENT DOCUMENTS

| | | | |
|---|---|---|---|
| 6,230,200 | B1 | 5/2001 | Forecast |
| 6,633,772 | B2 | 10/2003 | Ford |
| 7,499,907 | B2 | 3/2009 | Brown |
| 7,908,242 | B1 | 3/2011 | Achanta |
| 8,903,803 | B1 | 12/2014 | Aly |
| 8,977,558 | B2 * | 3/2015 | Nielsen ................ G06Q 10/103 705/7.42 |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2011/0295833 | A1 | 12/2011 | Narasayya |
| 2012/0065944 | A1 * | 3/2012 | Nielsen .................. G06Q 50/06 703/1 |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0246336 | A1 | 9/2013 | Ahuja et al. |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2017/0353395 | A1 | 12/2017 | Richardson et al. |
| 2018/0018727 | A1 | 1/2018 | Abuelsaad et al. |
| 2018/0157711 | A1 | 6/2018 | Lee |
| 2018/0336639 | A1 | 11/2018 | Dziabiak et al. |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . . com/blog/amazon-dynamodb-ten-thing.

An Inside Look at Google BigQuery, by Kazunori Sato, Solutions Architect, Cloud Solutions team, Google Inc., 2012.

Anonymous; Database; Wikipedia; Sep. 22, 2019; 21 pgs [Retrieved from the Internet: https://en.wikipedia.org/w/index.php?title=Databases&oldid=917129682; retrieved on Jul. 14, 2023].

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

European Patent Office; extended EP Search Report; Application No. 20881989.6; Jul. 27, 2023; 10 pgs.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

International Searching Authority; International Search Report and Written Opinion; International Application No. PCT/US2020/056315; Feb. 9, 2021; 11 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

European Patent Office; Communication pursuant to Article 94(3) EPC; Application No. 20881989.6; Sep. 6, 2024; 8 pgs.

* cited by examiner

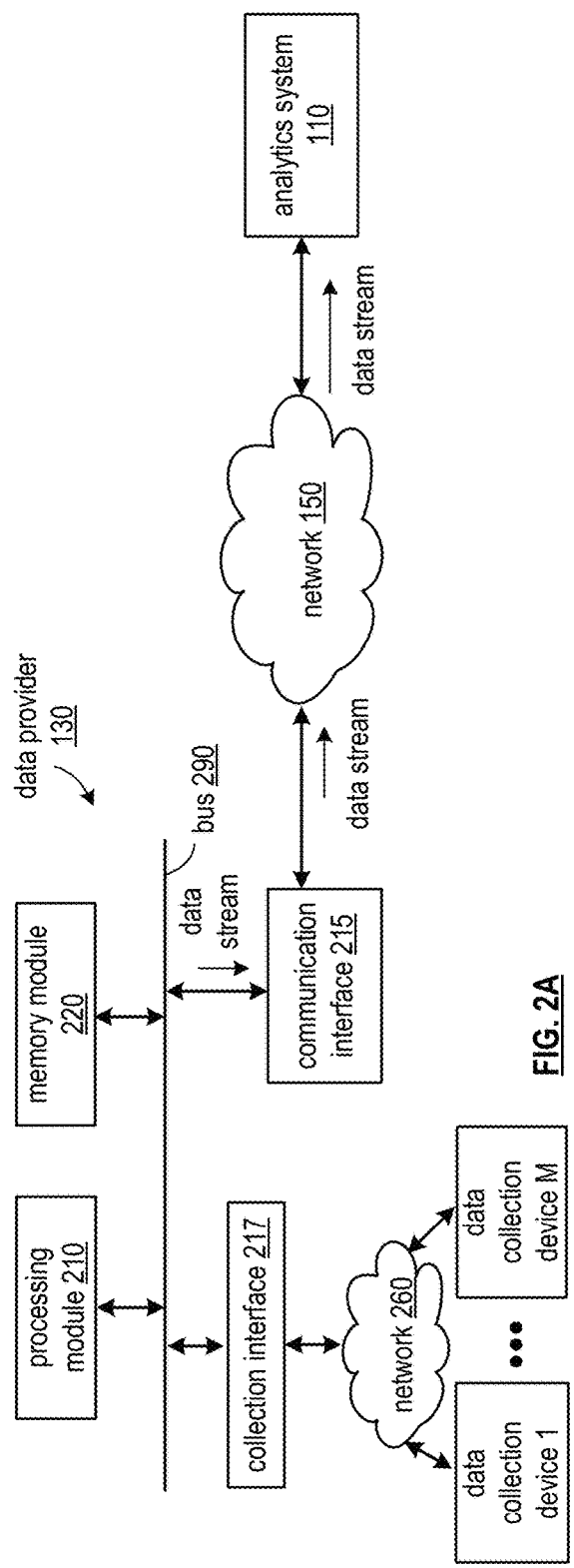
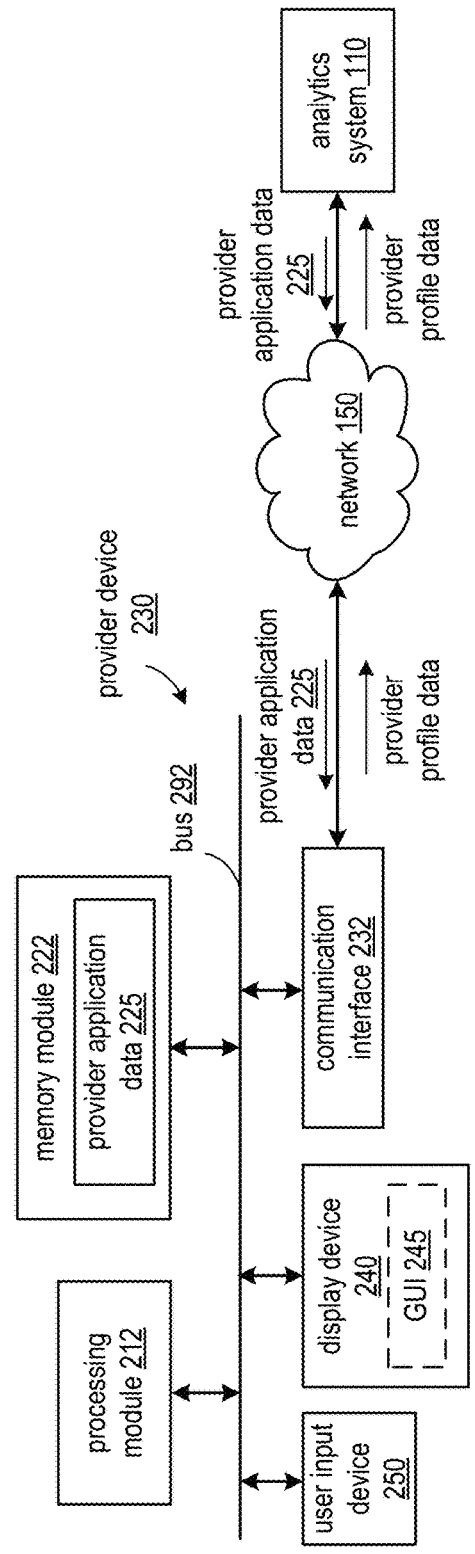

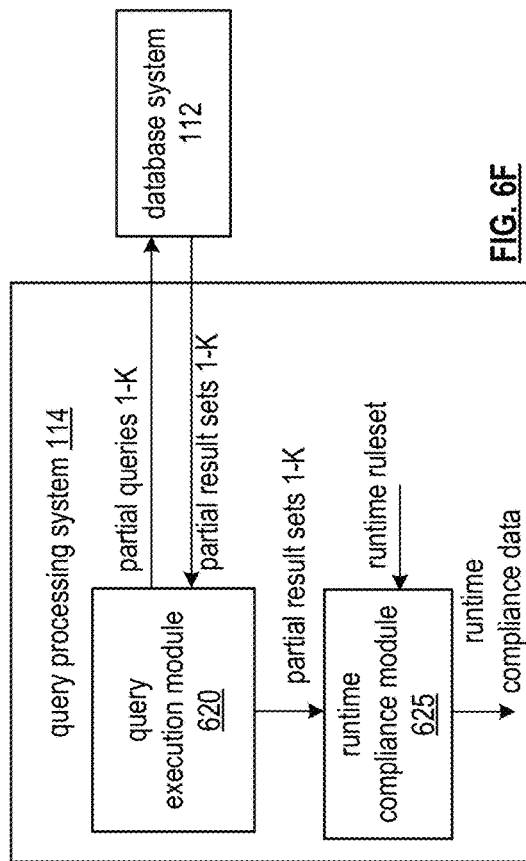
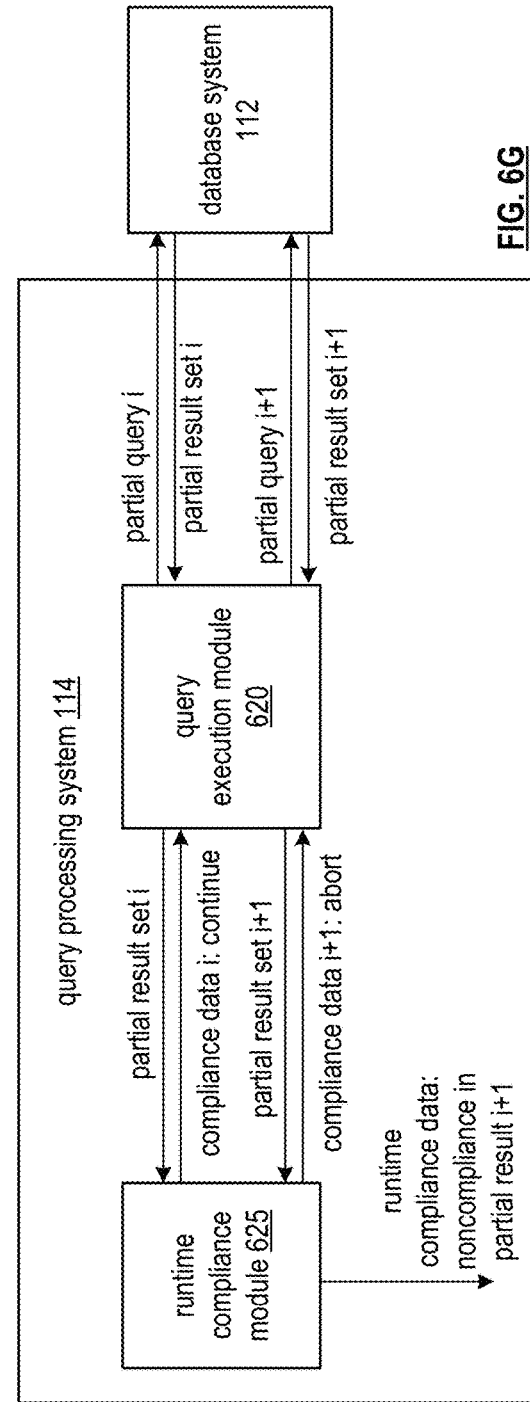

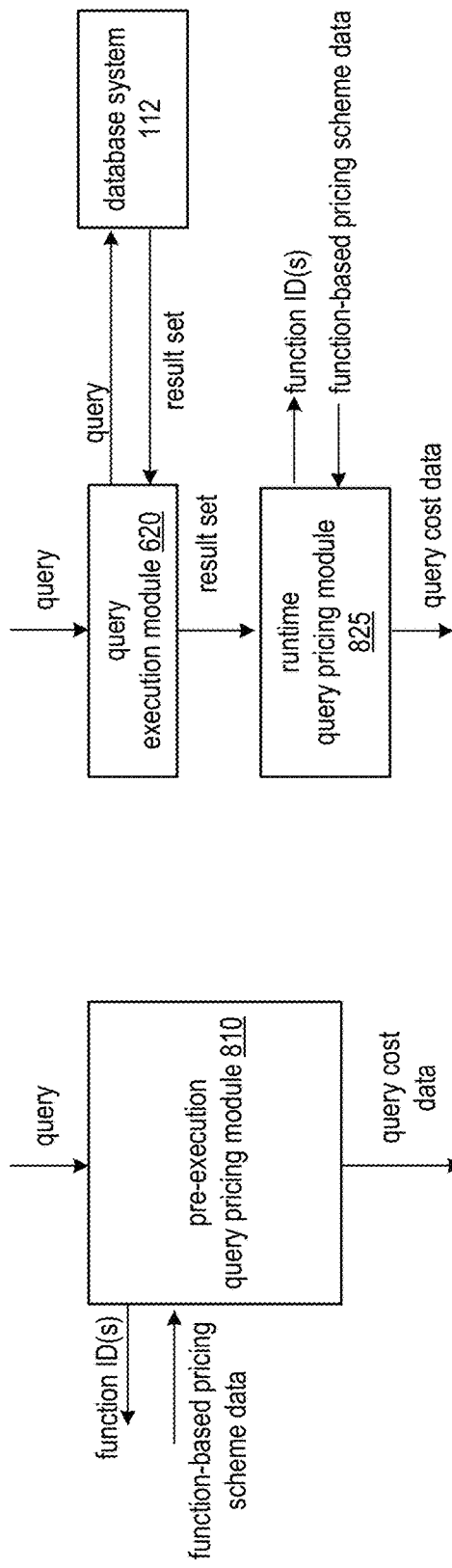
FIG. 9A
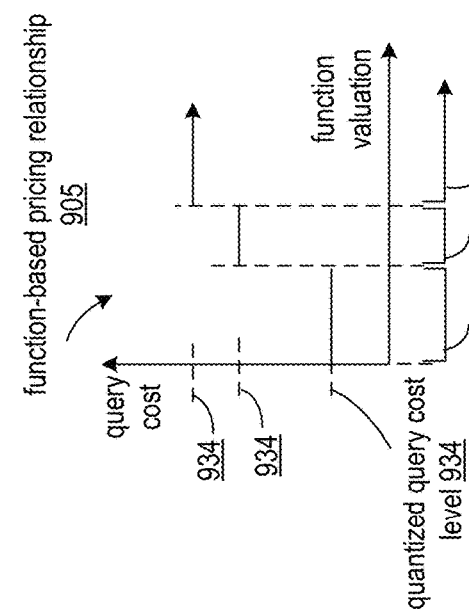
FIG. 9B
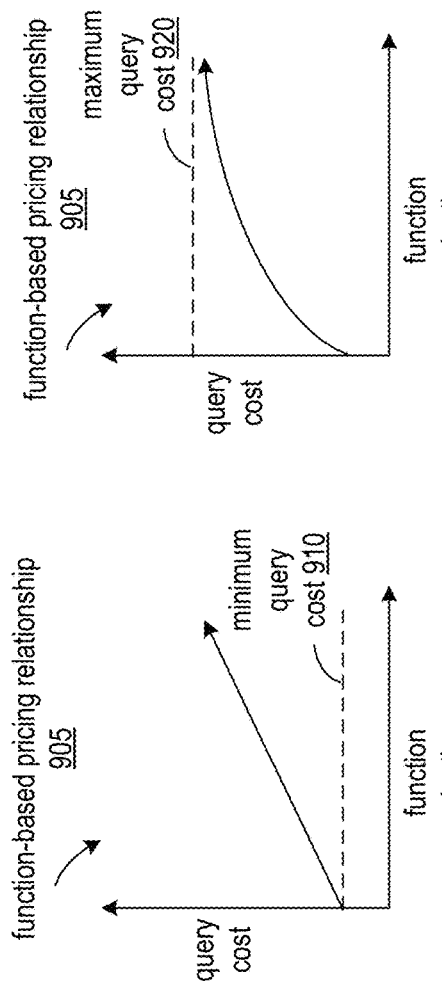
FIG. 9C
FIG. 9D
FIG. 9E

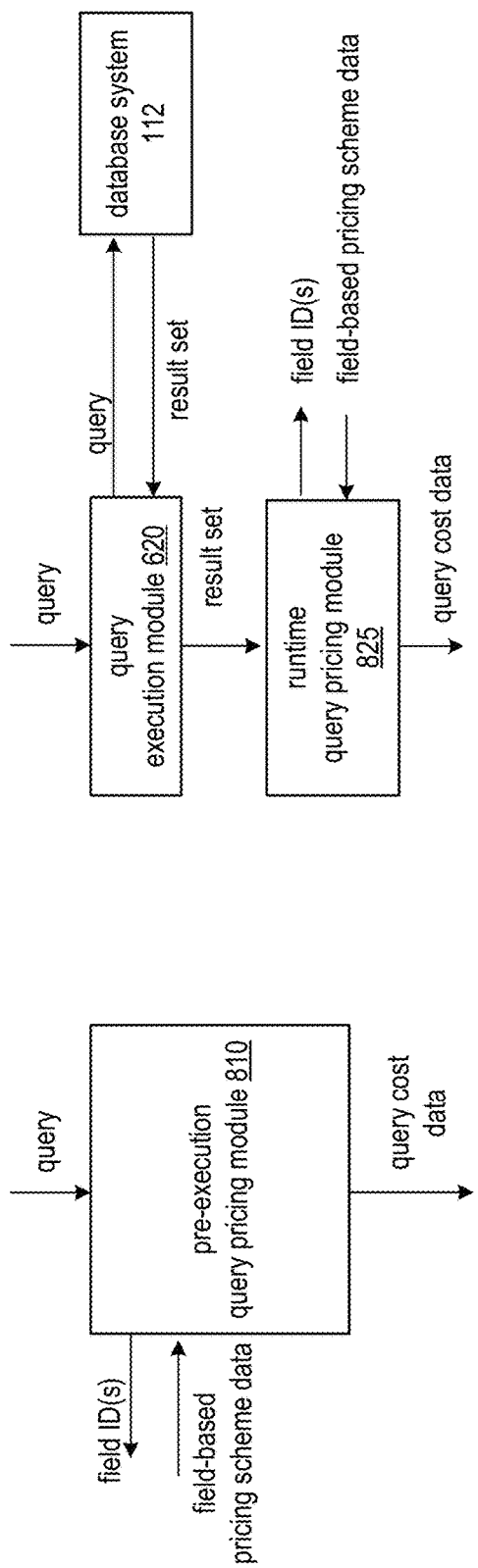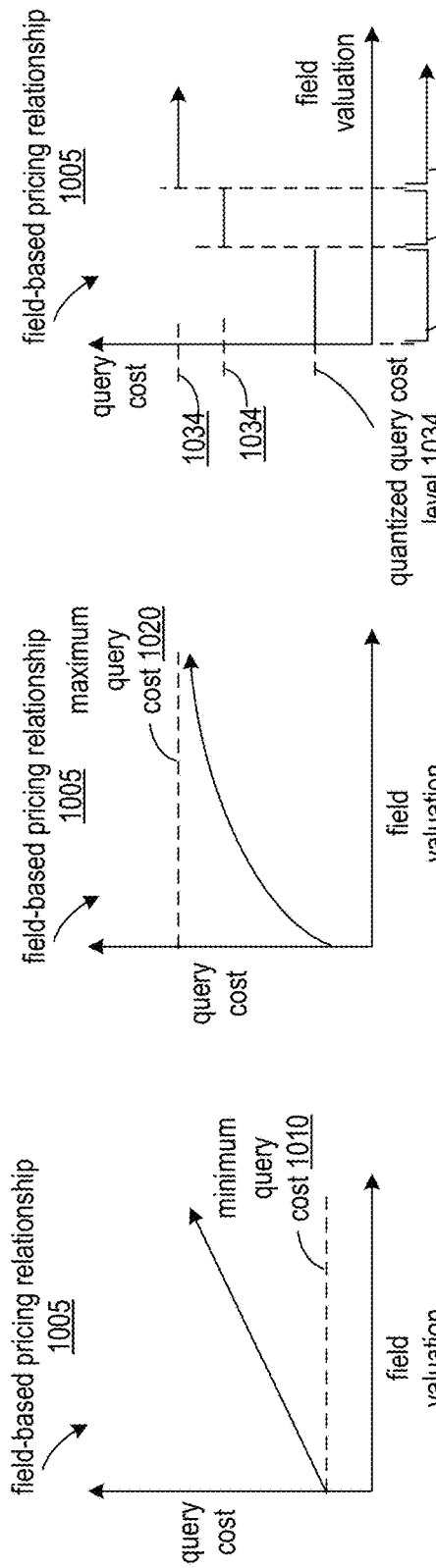

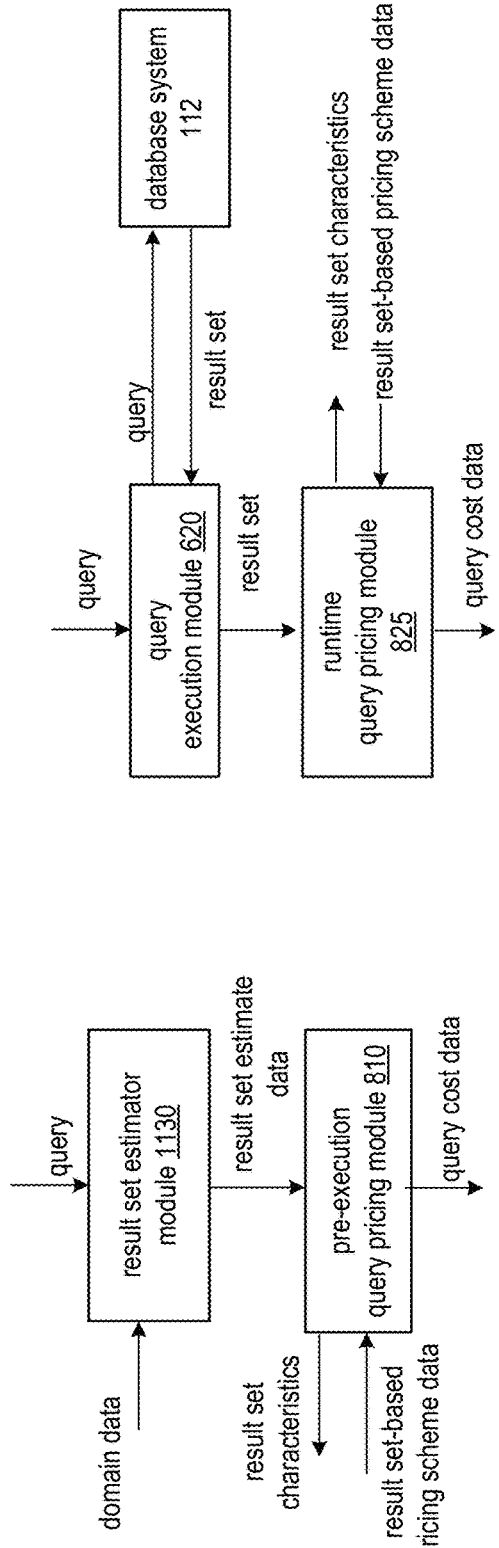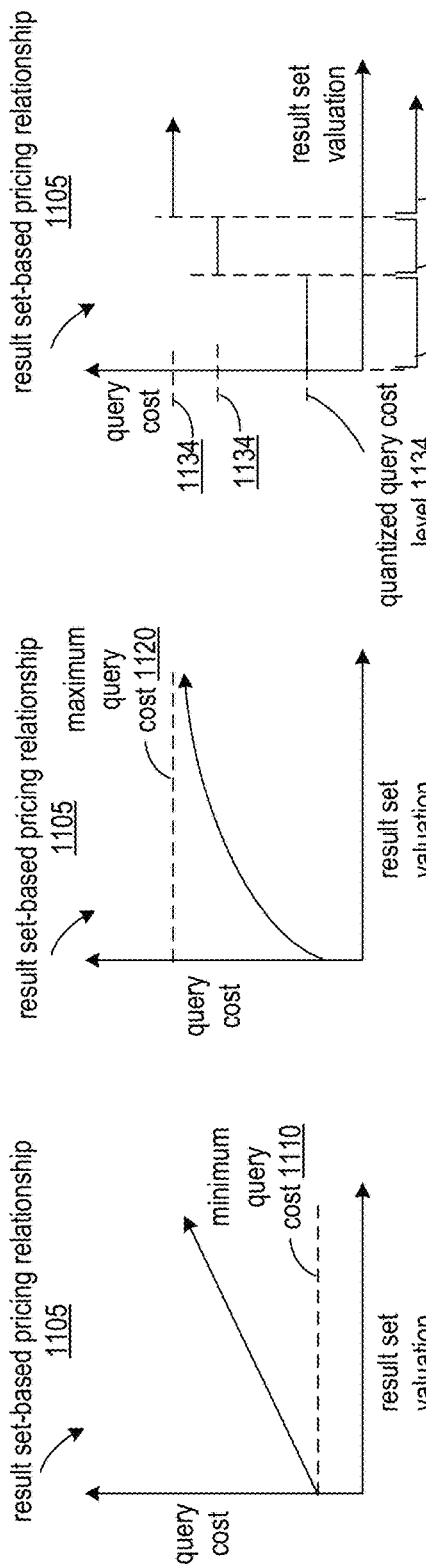

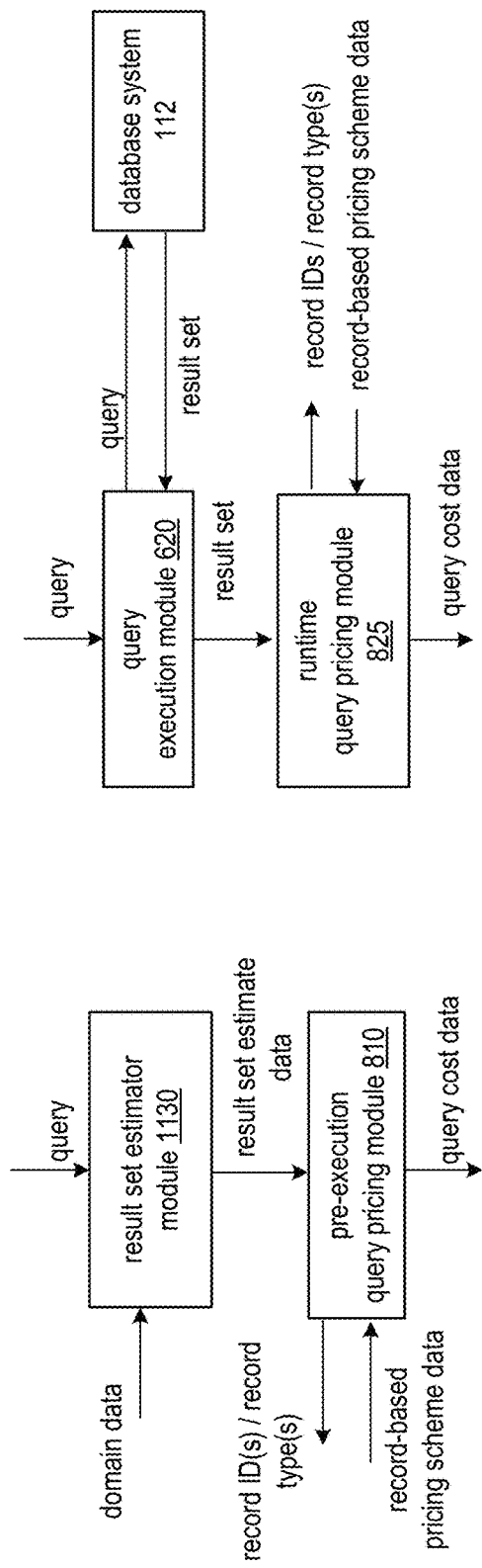
FIG. 12A
FIG. 12B
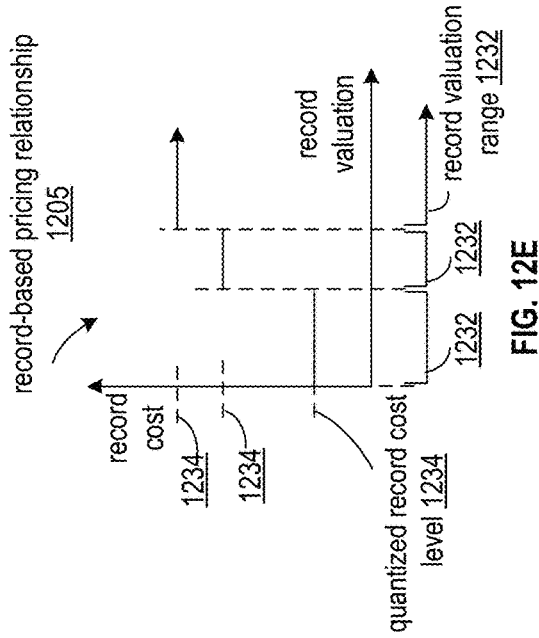
FIG. 12E
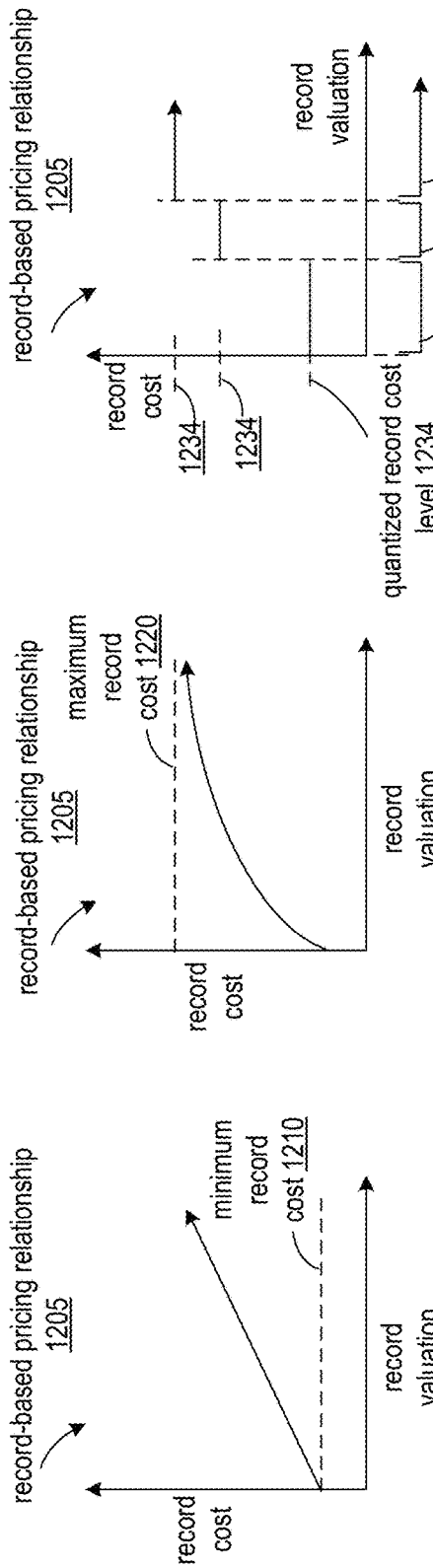
FIG. 12C
FIG. 12D

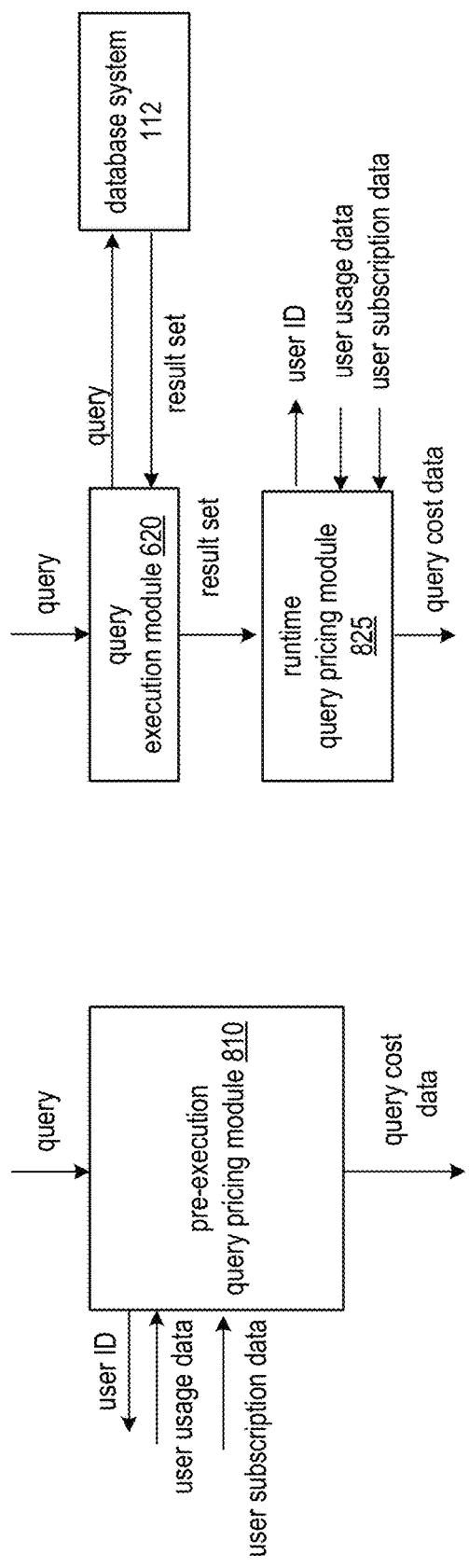
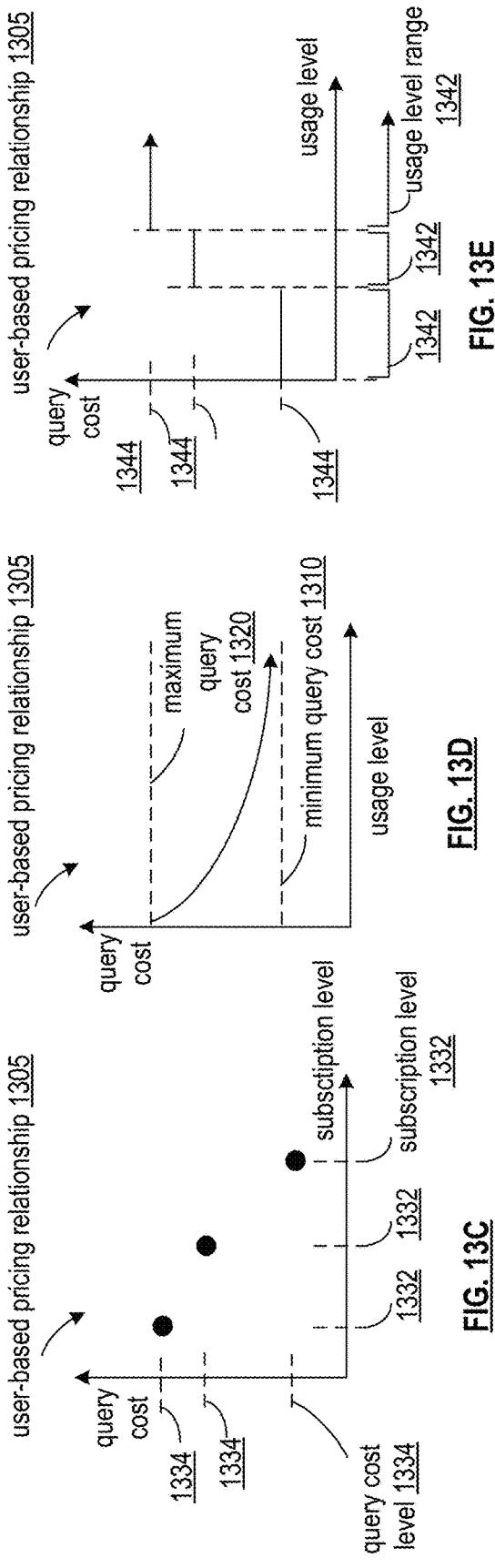
FIG. 13A
FIG. 13B
FIG. 13C
FIG. 13D
FIG. 13E

GUI 345

Actual Query Cost: $41 USD
Estimated Remaining Query Costs: $59 USD
Estimated Total Query Cost: $100 USD
Maximum Total Query Cost: $154 USD
Minimum Total Query Cost: $84 USD

Cost to Data Provider X:

Estimated Total: $80 USD
Max Total: $110 USD
Min Total: $75 USD

Function-based subtotal:
Function Valuation: 7.8 out of 10
Cost: $30 USD (Actual)

Field-based subtotal:
Field Valuation: 4.2 out of 10
Cost: $10 USD (Actual)

Result set-based subtotal:
Result Set Valuation: 6.8 out of 10
Cost: $40 USD (Estimated)
Cost Range: $35 – $70 USD

Cost to Data Provider Y:

Estimated Total: $5 USD
Max Total: $7 USD
Min Total: $5 USD

Function-based subtotal:
Function Valuation: 6 out of 10
Cost: $1 USD (Actual)

Result set-based subtotal:
Result Set Valuation: 5.5 out of 10
Cost: $4 USD (Estimated)
Cost Range: $4 – $6 USD

Cost to Analytics System:

Estimated Total: $15 USD
Max Total: $37 USD
Min Total: $4 USD

Function-based subtotal:
Function Valuation: 4 out of 10
Cost: $8 USD (Estimated)
Cost Range: $2 – $30 USD Result set-based subtotal:
Result Set Valuation: 7.7 out of 10
Cost: $7 USD (Estimated)
Cost Range: $2 – $7 USD Proceed with proposed query at these costs?

[Yes]  [No]

FIG. 14C

GUI 345

Your query returns values of 10 fields of records in the result set. The "marital status" field contributes to 30% of the total query cost. Would you like to remove the "marital status" field from records returned by this query?

Yes, amend my query to exclude the "marital status" field

No, I would like values of the "marital status" field to be included in the result set

FIG. 14E

GUI 345

It would cost approximately $700 to run this proposed query against data supplied by 9 data providers. Provider X charges 50% of the total query cost, while the other 8 providers each charge 20% or less of the total query cost. Would you like to filter the data supplied by provider X from your query to reduce the estimated price to $350?

Yes, amend my query to exclude data supplied by data provider X

No, I would like to execute my query against the data supplied by data provider X

FIG. 14D

UTILIZING QUERY APPROVAL DATA DETERMINED BASED ON QUERY COST DATA FOR A QUERY REQUEST

CROSS-REFERENCE TO RELATED APPLICATIONS

The present U.S. Utility Patent Application claims priority pursuant to 35 U.S.C. § 120 as a continuation of U.S. Utility application Ser. No. 18/165,029, entitled "GENERATING QUERY COST DATA BASED ON AT LEAST ONE QUERY FUNCTION OF A QUERY REQUEST", filed Feb. 6, 2023, which is a continuation of U.S. Utility application Ser. No. 17/150,415, entitled "END USER CONFIGURATION OF COST THRESHOLDS IN A DATABASE SYSTEM AND METHODS FOR USE THEREWITH", filed Jan. 15, 2021, issued as U.S. Pat. No. 11,599,542 on Mar. 7, 2023, which is a continuation of U.S. Utility application Ser. No. 16/665,571, entitled "ENFORCEMENT OF MINIMUM QUERY COST RULES REQUIRED FOR ACCESS TO A DATABASE SYSTEM", filed Oct. 28, 2019, issued as U.S. Pat. No. 11,093,500 on Aug. 17, 2021, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to database systems.

BRIEF DESCRIPTION OF THE SEVERAL VIEWS OF THE DRAWING(S)

FIG. 2A is a schematic block diagram of an embodiment of a data provider in accordance with various embodiments of the present invention;

FIG. 2B is a schematic block diagram of an embodiment of a provider device in accordance with various embodiments of the present invention;

FIG. 6F is a schematic block diagram of an embodiment of a query processing system that utilizes a runtime compliance module in accordance with various embodiments of the present invention;

FIG. 6G is a schematic block diagram of an embodiment of a query processing system that utilizes a runtime compliance module in accordance with various embodiments of the present invention;

FIG. 9A is a schematic block diagram of a pre-execution query pricing module in accordance with various embodiments of the present invention;

FIG. 9B is a schematic block diagram of a runtime query pricing module in accordance with various embodiments of the present invention;

FIGS. 9C-9E are graphical diagrams illustrating example embodiments of function-based pricing relationships in accordance with various embodiments of the present invention;

FIG. 10A is a schematic block diagram of a pre-execution query pricing module in accordance with various embodiments of the present invention;

FIG. 10B is a schematic block diagram of a runtime query pricing module in accordance with various embodiments of the present invention;

FIGS. 10C-10E are graphical diagrams illustrating example embodiments of field-based pricing relationships in accordance with various embodiments of the present invention;

FIG. 11A is a schematic block diagram of a pre-execution query pricing module in accordance with various embodiments of the present invention;

FIG. 11B is a schematic block diagram of a runtime query pricing module in accordance with various embodiments of the present invention;

FIGS. 11C-11E are graphical diagrams illustrating example embodiments of result set-based pricing relationships in accordance with various embodiments of the present invention;

FIG. 12A is a schematic block diagram of a pre-execution query pricing module in accordance with various embodiments of the present invention;

FIG. 12B is a schematic block diagram of a runtime query pricing module in accordance with various embodiments of the present invention;

FIGS. 12C-12E are graphical diagrams illustrating example embodiments of record-based pricing relationships in accordance with various embodiments of the present invention;

FIG. 13A is a schematic block diagram of a pre-execution query pricing module in accordance with various embodiments of the present invention;

FIG. 13B is a schematic block diagram of a runtime query pricing module in accordance with various embodiments of the present invention;

FIGS. 13C-13E are graphical diagrams illustrating example embodiments of user-based pricing relationships in accordance with various embodiments of the present invention;

FIGS. 14C-14E are graphical illustrations of examples of a graphical user interface displayed by a user device in accordance with various embodiments of the present invention;

DETAILED DESCRIPTION OF THE INVENTION

Figure 1:
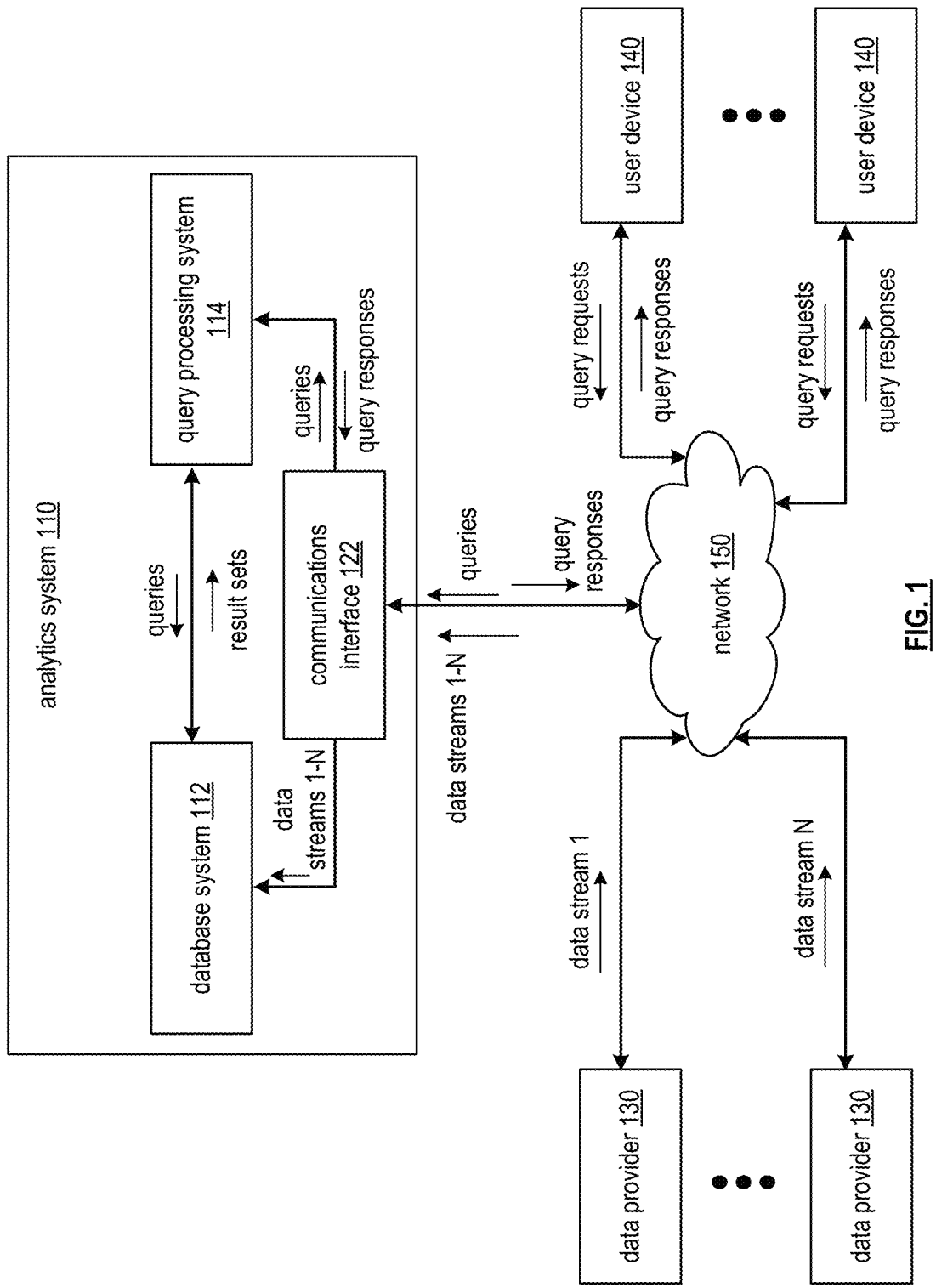
FIG. 1 is a schematic block diagram of an embodiment of an analytics system in accordance with various embodiments of the present invention.

FIG. 1 illustrates an embodiment of an analytics system 110. The analytics system 110 can be operable to store data received from multiple data providers 130 in at least one database system 112. The data can be received as data streams from each data provider, and can correspond to raw or processed data collected by the data provider, such as a stream of time-series data. One or more communication interfaces 122 of the analytics system 110 can be operable to receive the data streams via a network 150. The received data streams 1-N can be optionally cleaned and/or standardized by the analytics system 110 to generate multiple entries that populate the database system 112.

This data can be utilized by one or more end users via one or more user devices 140 corresponding to various end users of the analytics system 110. Each user device can transmit query requests to the analytics system 110 via the same or different network 150. The same or different communication interface 122 can receive these query requests, and the analytics system 110 can utilize a query processing module to execute queries of the query requests against the database system 112. The result sets generated in executing these queries can be utilized to generate a query response for transmission back to the corresponding user device 140. This enables end users to perform various analytics on data collected from multiple data providers via queries to the database system.

FIG. 2A illustrates an embodiment of a data provider 130. Data provider 130 can be implemented utilizing at least one processing module 210 at least one memory module 220, at least one communication interface 215, and/or at least one collection interface 217, all connected via bus 290. The bus 290 can be implemented via a wired and/or wireless connection, where the processing module 210, at least one memory module 220, and/or at least one communication interface 215 are coupled to a single device via short range connections and/or are dispersed across multiple devices within a same system via a wired and/or wireless network. The memory module 220 can store operational instructions that, when executed by the processing module 210, cause the processing module 210 to execute the functionality of a data provider 130 as discussed herein.

The data provider 130 utilize collection interface 217 to collect one or more types of data via a single data collection device and/or a plurality of data collection devices 1-M as illustrated in FIG. 2A. Collection interface 217 can be implemented utilizing one or more communication interfaces operable to receive data from one or more data collection devices via the same or different communication medium and/or communication protocol. The data provider 130 can process the collected data to generate one or more data streams, which can include a stream of time-series data collected via data collection devices 1-M and/or can otherwise include data for transmission the analytics system for entry in database system 112. The communication interface 215 can enable communication via the network 150. For example, as illustrated in FIG. 2A, communication interface 215 can be utilized to transmit one or more data streams to the analytics system 110 via network 150.

A data provider 130 can be implemented via a server system, data collection system, database system, and/or other memory operable to receive, store, and/or process data from a plurality of data collection devices 1-M. In such embodiments, the plurality of data collection devices 1-M can include such as a plurality of personal computers, mobile devices, cellular devices, wearable devices, vehicles, sensor devices, client devices, and/or computing devices. In such embodiments, the collected data is received from the data collection devices 1-M via a network 260. The collection interface 217 can be operable to receive data via a connection with network 260. The network 260 can be the same and/or different from network 150. For example, the network 150 can be utilized to facilitate collection of data from data collection devices 1-M, for example, via the same or different communication interface 215.

Alternatively or in addition, data provider 130 can correspond to a device, such as a personal computer, mobile device, wearable device, vehicle, sensor device, and/or client device. In such embodiments, the data collection devices 1-M can include sensor devices such as geolocation devices, cameras, microphones, and/or other user input devices or sensor devices coupled to the device and/or communicating with the device. For example, these data collection devices 1-M can be coupled to the device via bus 290, can communicate with the device via collection interface 217, and/or can communicate via another wired and/or wireless connection. In some cases, some or all such data providers 130 can be implemented by utilizing the provider device 230 of FIG. 2B and/or the user device 140 of FIG. 3.

Each data provider 130 can be affiliated with a particular data provider entity, such as a company that facilitates, manages, and/or controls collection of the data from the data collection devices 1-M. In some cases, the data provider entity manufactures one or more corresponding data providers 130, and/or manufactures one or more data collection devices 1-M that communicate with one or more corresponding data providers 130. Alternatively or in addition, a data provider entity can be affiliated with the network 260, where the data provider entity maintains and/or manages network 260. Alternatively or in addition, the data provider entity services and/or manages a mobile application, browser application, and/or website that collects data from data collection devices 1-M and/or data providers 130 implemented as client devices operated by users accessing the mobile application, browser application, and/or website, for example, via the Internet.

For example, a data provider 130 can be affiliated with a telecommunications company, where the plurality of data collection devices 1-M are a plurality of cellular devices communicating via a cellular network associated with the telecommunications company. For example, network 260 can be implemented utilizing the cellular network of the telecommunications company. In such cases, the data provider 130 can be implemented via a server system or other memory of the telecommunications company, where the data stream includes data collected via sensors of the plurality of cellular devices 1-M and/or data collected by the plurality of cellular devices 1-M via their own connection to the cellular network, the Internet, or a different network.

Alternatively or in addition, a set of data providers 130 can be implemented by this plurality of cellular devices themselves, where each cellular device in the set is affiliated with the telecommunications company, but is responsible to transmission of its collected data directly to the analytics system in its own data stream. Sim Here, the analytics system receives the data collected from the plurality of cellular devices as a plurality of individual data streams received from the cellular devices directly, rather than receiving this data in a single data stream. In either case, the analytics system can populate the database system with database entries indicating data collected by the plurality of cellular devices of the telecommunications company.

As another example, a data providing entity corresponding to a mobile device manufacturing company that manufactured a plurality of mobile devices can configure these mobile devices to send their collected data to their own server system, where the mobile devices are implemented as data collection devices 1-M and/or where the server system is implemented as a data provider 130.

As another example, a data provider 130 can be affiliated with a particular automobile company. The plurality of data collection devices 1-M can correspond to a plurality of cars or other automobiles manufactured by the automobile company that send their geolocation sensor data or other vehicle sensor data to a server system or other memory of the automobile company. Alternatively, a plurality of data providers 130 can each be implemented utilizing an individual car manufactured by the automobile company, where each car sends its sensor data directly to the analytics system. In either case, the analytics system can populate the database system with database entries indicating data collected by the plurality of cars of the automobile company.

FIG. 2B illustrates an example of a provider device 230. The provider device 230 can correspond to a personal computer, mobile device, computing device, and/or other device that includes at least one processing module 212, at least one memory module 222, and/or at least one communication interface 232, all connected via bus 292. The bus 292 can be implemented via a wired and/or wireless connection, where the processing module 212, at least one memory module 222, and/or at least one communication interface 232 communicate via short range connections and/or by utilizing a wired and/or wireless network. The memory module 222 can store operational instructions that, when executed by the processing module 212, cause the processing module 212 to execute the functionality of a provider device 230 as discussed herein. In particular, the provider device 230 can be utilized to enable one or more users and/or administrators associated with a corresponding data provider 130 and/or corresponding affiliated data providing entity to view and/or customize a corresponding account managing the streaming and/or usage of data provided by the data provider. Alternatively or in addition, the provider device 230 can be utilized by an administrator of the analytics system 110 to enable an administrator to configure settings for one or more different providers and/or to configure settings for usage of the analytics system 110 as a whole.

To enable this user interaction by data provider entities, the provider device 230 can further include at least one display device 240 and/or at least one user input device 250. In particular, the user input device 250 can include a keyboard, microphone, mouse, touchscreen of display device 240, and/or mechanism configured to enable a user of the provider device to provide user input in response to prompts displayed by a graphical user interface (GUI) 245 displayed on display device 240. The GUI 245 can be displayed in accordance with the execution, via the processing module 212, of provider application data 225. The provider application data 225 can be received from the analytics system 110, and/or stored in memory module 222. For example, the provider application data 225 can correspond to a browser application accessible via network 150 and/or an application installed by the provider device. User interaction with the GUI can enable the user to provide provider profile data, which can be transmitted to the analytics system 110 for usage by the analytics system 110 as discussed in further detail herein.

In some embodiments, a provider device 230 can utilized to implement a corresponding data provider 130, where a device and/or set of devices 230 are utilized to collect and/or transmit of data streams for a data providing entity, and where this device and/or set of devices 230 are also utilized to collect and transmit provider profile data and/or to execute the provider application data for the same data provider entity. Alternatively, a first set of one or more devices such as a server system can be utilized to collect and/or transmit of data streams for a data providing entity, while a distinct, second set of one or more devices such as a personal computer and/or mobile device are utilized to collect and transmit provider profile data and/or to execute the provider application data for the same data provider entity.

Figure 3:
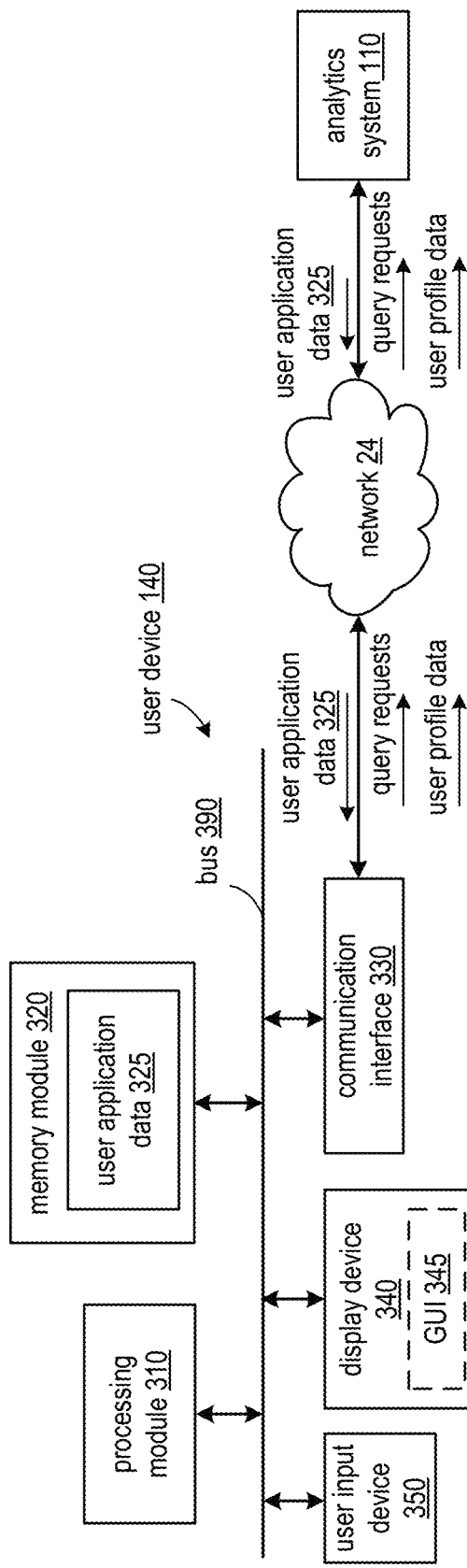
FIG. 3 is a schematic block diagram of an embodiment of a user device in accordance with various embodiments of the present invention.

FIG. 3 illustrates an example embodiment of a user device 140. The user device 140 can correspond to a personal computer, mobile device, and/or other device that includes at least one processing module 310, at least one memory module 320, and/or at least one communication interface 330, all connected via bus 292. The bus 390 can be implemented via a wired and/or wireless connection, where the processing module 310, at least one memory module 320, and/or at least one communication interface 330 communicate via short range connections and/or by utilizing a wired and/or wireless network. The memory module 320 can store operational instructions that, when executed by the processing module 310, cause the processing module 310 to execute the functionality of a user device 140 as discussed herein. In particular, the user device 140 can be utilized to enable one or more end users of the analytics system 110 to view, perform analysis upon, and/or otherwise query data stored in database system 112.

To enable this user interaction by end users of the analytics system 110, the user device 140 can further include at least one display device 340 and/or at least one user input device 350. In particular, the user input device 350 can include a keyboard, microphone, mouse, touchscreen of display device 340, and/or other mechanism configured to enable a user of the user device to provide user input in response to prompts displayed by a GUI 345 displayed on display device 340. The GUI 345 can be displayed in accordance with the execution, via the processing module 212, of user application data 325. User application data 325 can be received from the analytics system 110 and/or stored in memory module 320. For example, the user application data 325 can correspond to a browser application accessible via network 150 and/or an application installed by the user device. User interaction with the GUI can enable the user to enter queries and/or other data analytics commands, which can be transmitted to the analytics system as query requests for execution against the database system 112. Alternatively or in addition, the GUI can enable the user to enter user profile data, which can be transmitted to the analytics system 110 for usage by the analytics system 110 as discussed in further detail herein.

Network 150 can be implemented utilizing one or more communication mediums that enable the analytics system 110 to bidirectionally communicate with data providers 130, provider devices 230, and/or user devices 140. Network 150 can be implemented utilizing one or more wireless and/or wire lined communication systems; one or more non-public intranet systems and/or public internet systems; one or more satellite communication systems; one or more fiber optic communication systems; and/or one or more local area networks (LAN) and/or wide area networks (WAN). Network 150 can be utilized via any communication network operable to enable data providers 130 to upload and/or continuously stream data for storage by the analytics system in database system 112. The network 150 can further facilitate other communication between the analytics system 110 and data providers 130 as discussed herein. The network 150 can further be operable to enable user devices 140 to send query requests to and/or receive query responses from the analytics system 110. The network 150 can further facilitate other communication between the analytics system 110 and user devices 140 as discussed herein. The network 150 can further be operable to enable provider devices 230 to send provider profile data to and/or receive audit logs from the analytics system 110. The network 150 can further facilitate other communication between the analytics system 110 and provider devices 230 as discussed herein.

Figure 4B:
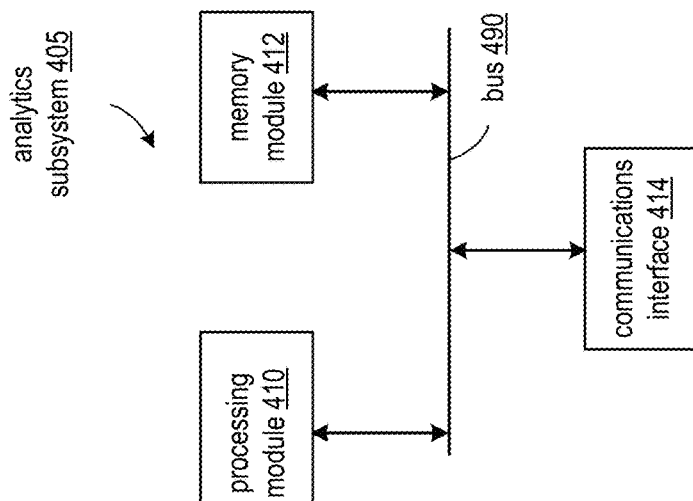
FIG. 4B is a schematic block diagram of an embodiment of an analytics subsystem in accordance with various embodiments of the present invention.
Figure 4A:
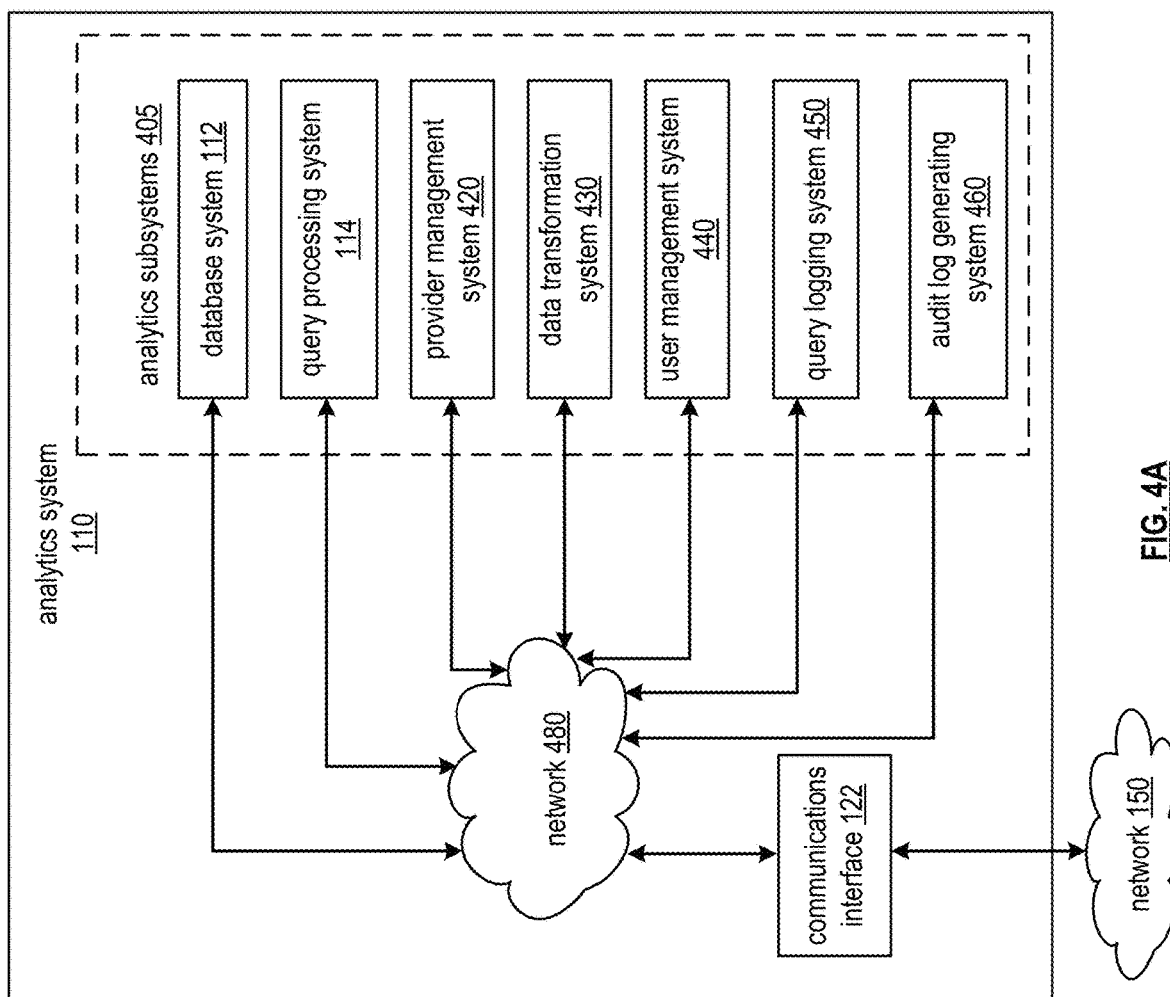
FIG. 4A is a schematic block diagram of an embodiment of an analytics system in accordance with various embodiments of the present invention.

FIGS. 4A-4I include various embodiments of the analytics system 110, illustrating various functionality of the analytics system 110. This various functionality can be implemented utilizing one or more analytics subsystems 405 of the analytics system 110. As illustrated in FIG. 4A, the analytics subsystems 405 can include the database system 112 of FIG. 1, the query processing system 114 of FIG. 1, a provider management system 420, a data transformation system 430, a user management system 440, a query logging system 450, and/or an audit log generating system 460.

FIG. 4B illustrates an example of an individual analytics subsystem 405. Each of the analytics subsystems 405 can be implemented by utilizing its own processing module 410, memory module 412, and/or communications interface 414, connected via a bus 490. Bus 490 can facilitate communication between the processing module 410, memory module 412, and/or communications interface 414 via a short-range connection and/or via a wired and/or wireless network. The memory module 412 for a particular analytics subsystem 405 can store executable instructions that, when executed by the processing module 410, cause the processing module 410 to execute the functionality of the particular analytics subsystem 405 as discussed herein.

The independent analytics subsystems 405 can communicate with each other via a wired and/or wireless network 480 of the analytics system 110. Each independent analytics subsystem 405 can include a communication interface 414 that enables the analytics subsystem to communicate bidirectionally with network 480. As illustrated in FIG. 4A, this communication can enable the transfer of data between various subsystems 405 via network 480, between subsystems 405 and the database system 112 via network 480, and/or between the subsystems 405 and communication interface 122 via network 480.

The network 480 can implemented utilizing the network 150, and/or can be distinct from network 150. For example, network 480 can be implemented by an internal network of the analytics system 110 that is separate from the network 150. Network 480 can be implemented utilizing one or more communication mediums that enable the analytics subsystems 405 to bidirectionally communicate with each other and/or with network 150 via communications interface 122. Network 480 can be implemented utilizing one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

As illustrated in FIG. 4A, each analytics subsystem 405 can be distinct with its own processing module 410 and/or memory module 412. For example, each analytics subsystem can be implemented utilizing its own set of devices and/or set of servers. Alternatively, the same processing module 410, memory module 412, and/or communication interface 414 can be utilized to implement multiple analytics subsystems 405 in other embodiments. In particular, one or more analytics subsystems 405 can be coupled, can be implemented utilizing a same device or set of devices, can be implemented utilizing a set of shared servers, can share data stored in the same memory, and/or can implement their corresponding functionality in tandem. Alternatively or in addition, multiple processing modules 410, memory modules 412, and/or communication interfaces 414 on the same or different device in the same or different location can communicate via network 480 and can be utilized to implement a single analytics subsystems 405. In some embodiments, one or more analytics subsystems 405 can be implemented utilizing the provider device 230 and/or the user device 140, for example, in conjunction with execution of the provider application data and/or the user application data.

Figure 4C:
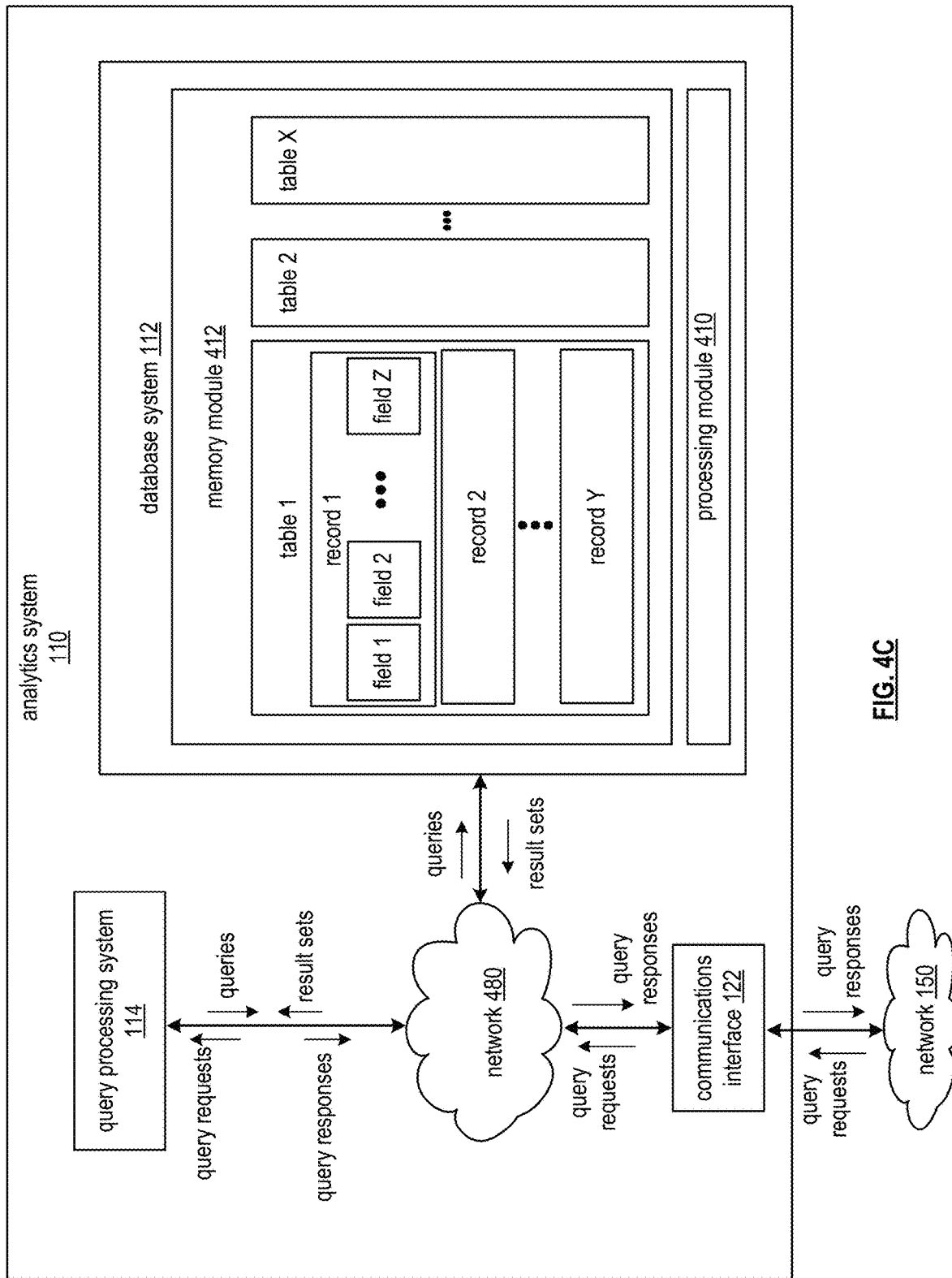
FIG. 4C is a schematic block diagram of an embodiment of an analytics system that utilizes a query processing system in accordance with various embodiments of the present invention.

FIG. 4C illustrates an embodiment of database system 112. The memory module 412 of database system 112 can store one or more databases as a plurality of tables 1-X, for example, in accordance with a relational database system. Each table can store a set of records 1-Y. Each table can have a designated set of fields 1-Z, where data for each record 1-Y includes values populating at least one of the set of fields 1-Z. Each table 1-X can store the same or different number of records utilizing the same or different number of fields. While a relational database system is illustrated in FIG. 4C and discussed herein, the database system 112 can store records in accordance with at least one non-relational structure. In such embodiments, fields and records of a non-relational database structure can similarly be utilized as discussed herein.

The processing module 410 can be utilized to parse raw and/or pre-processed data streams received from the data providers and/or to load record entries into the tables 1-X. For example, a data stream of time-series records received from a data provider can be written to one or more tables by the processing module 410. In such embodiments, one or more tables can include a timestamp field indicting a time and/or temporal period the corresponding data was originally collected by the data provider 130, indicating a time and/or temporal period the data was received by the analytics system 110, and/or indicating a time and/or temporal period that the corresponding record was added to the database system 112.

A record can include other information populating other fields of one or more tables, such as: a device identifier or other device data fields indicating and/or describing a data collection device that collected the record or is otherwise associated with the record; location data for one or more location fields indicating and/or describing a location from which the data corresponding to the record was collected by the corresponding data collection device and/or a location that is otherwise associated with the record; other user input and/or sensor data collected by the data collection device associated with the record and/or collected within the temporal period indicated by the timestamp of the record; a person identifier or other demographic data fields indicating and/or describing a person associated with the data collection device and/or otherwise associated with the record; a provider identifier or other provider data fields indicating and/or describing a data provider entity associated with the data provider 130 that collected the record and/or transmitted the data stream that indicated the record to the analytics system; and/or other data pertinent to collection of user input and/or sensor data populating one or more fields of the record.

The values populating the various fields of a single record of a table can be extracted from a single record and/or other data segment received in a data stream from a data provider. The extracted fields of a single record can be utilized to populate a record of a single table and/or a record of multiple tables. For example, values for fields of a same record can be dispersed across multiple tables. These corresponding entries across the multiple tables can be keyed by a same record identifier, a same timestamp, a same person identifier, a same device identifier, a same provider identifier, and/or a set of other key and/or unique fields of the multiple tables. As used herein, a record can designate an entry to a single table and/or a set of entries to multiple tables that correspond to a same data segment received from a data provider.

Some or all tables 1-X can be designated for data provided by a particular data provider, where all records of these tables are derived from data streams received from a same, single data provider. Alternatively or in addition, some or all tables 1-X can include records for data provided by multiple data providers. In such embodiments, these tables can include records for data provided by multiple data providers corresponding to a same type of data provider entity and/or otherwise corresponding to a same type of data, albeit collected via different data provider entities. For example, one or more tables can include records indicating cellular data received from multiple telecommunications companies. As another example, one or more tables can include transportation data received from multiple car companies. As yet another example, one or more tables can include geolocation data populated by data supplied by one or more telecommunications companies based on geolocation data collected by cellular devices, as well as data supplied by one or more car companies based on geolocation data collected by cars. In such embodiments, a provider identifier can be indicated in the record and/or can be otherwise mapped to the record to distinguish which data provider and/or data provider entity supplied the corresponding entry.

As a particular example, a first table can include records for geolocation data received from one or more telecommunications companies based on geolocation data collected by cellular devices, as well as data supplied by one or more car companies based on geolocation data collected by cars. These records can include fields populated by the supplied data, which can include: GPS data, coordinate data, or other location data indicated by the geolocation data; a device identifier identifying a particular car, cellular device, or other device that collected the geolocation data; a timestamp indicating when the geolocation data was collected by the corresponding device; and/or a provider identifier indicating which car company, telecommunications company, or other data provider entity supplied this data used to populate the entry. One or more other tables can indicate details regarding each device that collects geolocation data, for example, keyed by the device identifier. These other tables can include model number of the device, age of the device, venue that sold the device, a person identifier or other demographic information for a person that owns the device, etc. Another one or more tables can indicate details regarding different physical addresses or bounded geographic regions that can be indicated by the coordinate data and/or that the coordinate data can fall within, for example, indicating coordinates for boundaries of the bounded geographic region, identifying one or more particular establishments, venues and/or retailer that are located in the bounded geographic region, describing sales and/or other various aspects of the one or more particular establishments, venues and/or retailer, etc.

In some embodiments, these tables describing establishments at various locations can include data supplied by entirely different data providers, yet this data can be used in tandem with the geolocation data supplied by the car companies and/or telecommunications companies, for example, to generate analytics data indicating the patterns of establishments different types of people visit, the amount of time different types of people visit various types of establishments, etc. As a further example, another one or more tables can indicate credit card data supplied by one or more credit card companies, which can indicate transactional data for different people, indicated by person identifiers, at various establishments. This can be further utilized in tandem with the other data to generate analytics data that further indicates patterns in the amount of money and/or types of products purchased by different types of people at various establishments; correlations between purchase behavior across different establishments for certain types of people; how far different types of people are willing pay at one or more establishments as a function of how far these people drove from their home to the one or more establishments; and/or other analytically derived information utilizing data across these multiple tables.

This analytics data can be generated based on queries performed against the database system 112 by the query processing system 114, for example, in response to query requests received from user devices 140 based on user input by end users to GUI 345. The processing module 410 of the database system 112 can be utilized to execute such queries against the database system and/or to otherwise generate result sets and/or query output for received queries based on the tables 1-X. These resulting patterns or raw data of records generated based on execution of requested queries be delivered to these requesting end users devices and/or to different end users as query responses, for example, for display via GUI 345.

Figure 4D:
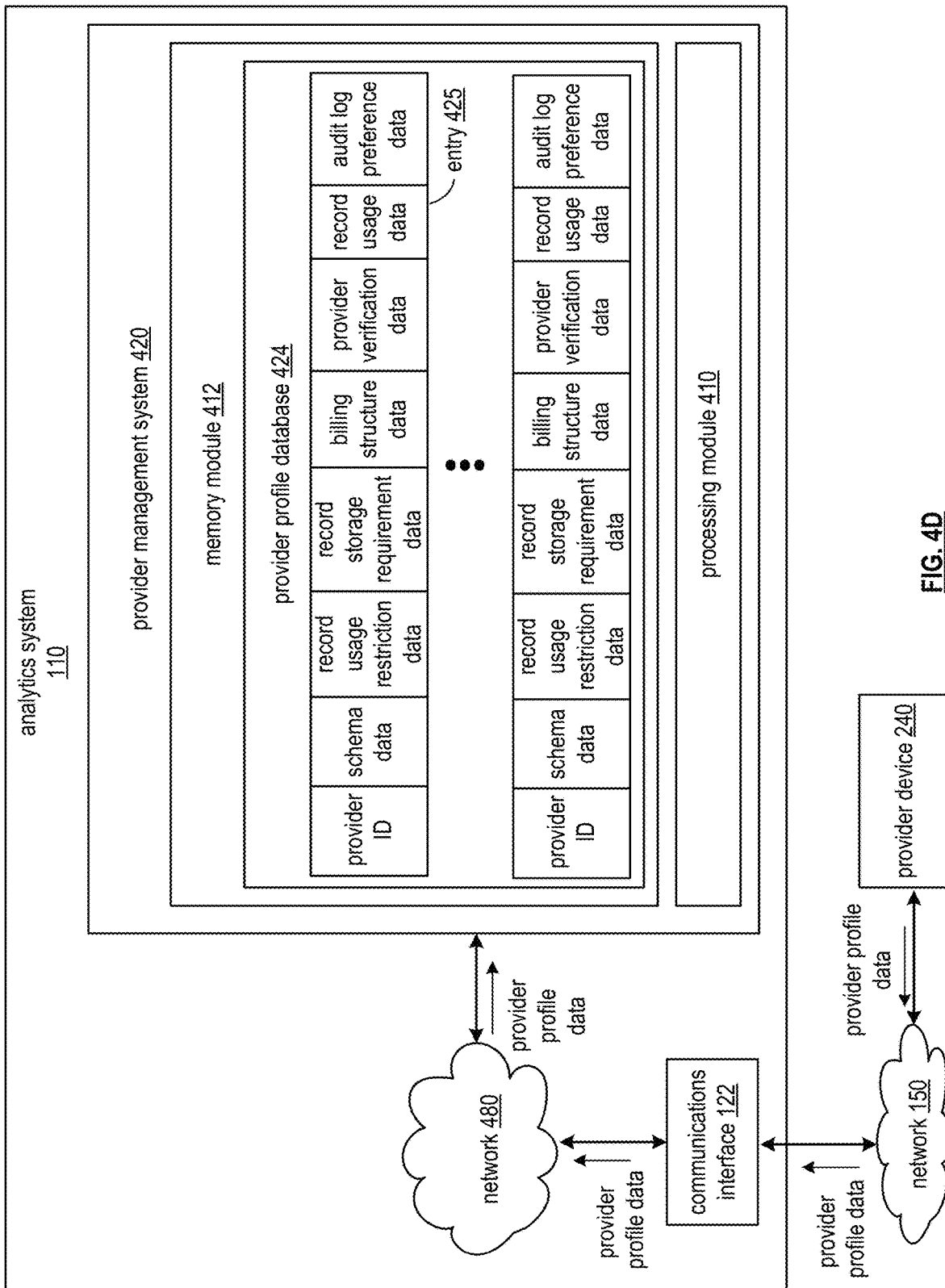
FIG. 4D is a schematic block diagram of an embodiment of an analytics system that utilizes a provider management system in accordance with various embodiments of the present invention.

FIG. 4D illustrates an example embodiment of provider management system 420. The provider management system 420 can store a provider profile database 424 that stores various provider profile data for one or more data providers. Each entry 425 to the provider profile database 424 can indicate information for a corresponding data provider entity, data provider 130, one or more data collection devices 1-M, and/or provider device 230, for example, keyed by a corresponding provider ID.

Some or all of the fields of an entry 425 can be populated based on provider profile data received from a provider device 230, for example, based on user input by a user associated with the corresponding data provider entity to GUI 245. Alternatively or in addition, some or all of the fields of an entry 425 can be populated by data generated automatically by the analytics system 110. While one embodiment of an entry 425 is shown, different embodiments may not include all of the fields illustrated in FIG. 4D and/or can include additional fields in entries 425 to provide additional information corresponding to the data provider entity.

Some or all of this provider profile data can be stored as a relational database. In some embodiments, the database system 112 is implemented to store the provider profile database 424 in at least one of the tables 1-X, and/or the provider ID can be mapped to records of the database system 112 whose data is supplied by the corresponding data provider.

An entry 425 for a particular provider can include schema data, which can indicate a data format of records included in one or more data streams transmitted by the corresponding data provider 130. This schema data can be utilized by the analytics system 110 to segment a data stream into data segments corresponding to individual records, to determine the types and/or formatting of one or more fields included in the data stream for each individual record, and/or to extract the values utilized populate fields of a record from corresponding data segments of a data stream.

An entry 425 for a particular provider can include record usage restriction data. Unrestricted access of the database system 112 by end users can lead to privacy concerns and licensing concerns for data providers. Furthermore, data providers may be required to adhere to data privacy requirements set by regulatory entities. To resolve these concerns, data providers can select and/or customize record usage restriction data, which can indicate a particular set of rules or other restrictions on the usage of their data by end users. As discussed in further detail herein, the record usage restriction data can be utilized by the query processing system 114 to ensure that data that was supplied by the data provider is queried and accessed in adherence with the of rules administered by the data provider.

An entry 425 for a particular provider can include record storage requirement data. The encryption of data and/or geographic location of stored data can be of concern to data providers, especially if the data is particularly sensitive, is particularly valuable, and/or if the data providers are required to adhere to data privacy requirements set by regulatory entities. Data providers can select and/or customize record storage requirement data, which can indicate how and/or where different types of records and/or different types of fields supplied by the data provider are stored by the database system 112. The record storage requirement data can be utilized to write records supplied by the data provider to the database system, for example, by dictating how these records are encrypted and/or where these records are physically located.

An entry 425 for a particular provider can include billing structure data. Data providers can be incentivized to share their collected data with the analytics system via payments for usage of the data by particular end users and/or by the analytics system 110 as a whole. Data providers can select and/or customize a billing structure for the usage of their data. In particular, the billing structure data can indicate costs to end users and/or the analytics system for different numbers and/or types of queries performed on different types and/or numbers of fields for different types and/or numbers of records. For example, cost of a query can be a function of the number of records used in an aggregation and/or returned in a result set; can be a function of whether or not raw and/or aggregated data is returned; can be a function of the fields and/or combination of fields used and/or returned. The billing structure data can dictate costs and/or requirements for various subscription levels for end users, for example, where end users are granted greater access and/or querying capabilities on data supplied by the data provider if they have a higher level and/or higher cost subscription plan. Some or all of this billing structure data can be indicated in the set of rules indicated in the record usage restriction data, indicating the restriction of data usage as a function of cost and/or subscription level. The billing structure data can be utilized by the analytics system 110 to facilitate payments to the data provider entity, to charge end users based on their subscription level and/or usage of the data supplied by different providers, and/or to ensure that data that was supplied by the data provider is queried, accessed, and billed for in adherence with the billing structure and corresponding usage restrictions configured by the data provider.

An entry 425 for a particular provider can include provider verification data. The provider verification data can indicate provider account credentials, encryption key data, and/or verification requirements set by the provider in the provider profile data and/or generated by the analytics system as a requirement of the analytics system to verify providers. In particular, the provider verification data can be utilized by the analytics system 110 to verify that data streams were indeed collected by the corresponding data provider entity; that these data streams were not corrupted in their transmission from the data provider 130 and/or in transmission from their original data collection device; and/or that data streams were not fabricated and/or by a faux providing entity seeking payment from end users for falsified data and/or maliciously obtained data from a true providing entity. This can increase the integrity of the data stored in database system 112, helping to ensure that end users are accessing authentic data that was actually supplied by a verified data provider, and further helping to ensure that only verified data providers are allowed to benefit from supplying their own data.

An entry 425 for a particular provider can include record usage data. This can indicate various metrics indicating amount and/or type of usage of various records provided by the data provider over time and/or within a current timeframe. This can further indicate and/or be generated based on particular records accessed by particular users over time. This can be utilized to determine billing by particular end users and/or by the analytics system 110 as a function of amount and/or type of queries performed on data, for example, in each of a series of billing periods.

An entry 425 for a particular provider can include audit log preference data. This can indicate customized preferences regarding generation of audit logs for the provider, as discussed in conjunction with FIG. 4I and/or FIG. 9C. The audit log preference data can indicate frequency of generation and/or transmission of audit logs; filtering parameters indicating which types of usage log entries should be included in audit logs; device identifiers and/or account identifiers for particular recipients for the audit logs; summary metric preferences indicating one or more aggregating functions to be performed on usage log entries to generate the audit logs; and/or other formatting, layout, and/or viewing preferences for audit logs.

Figure 4E:
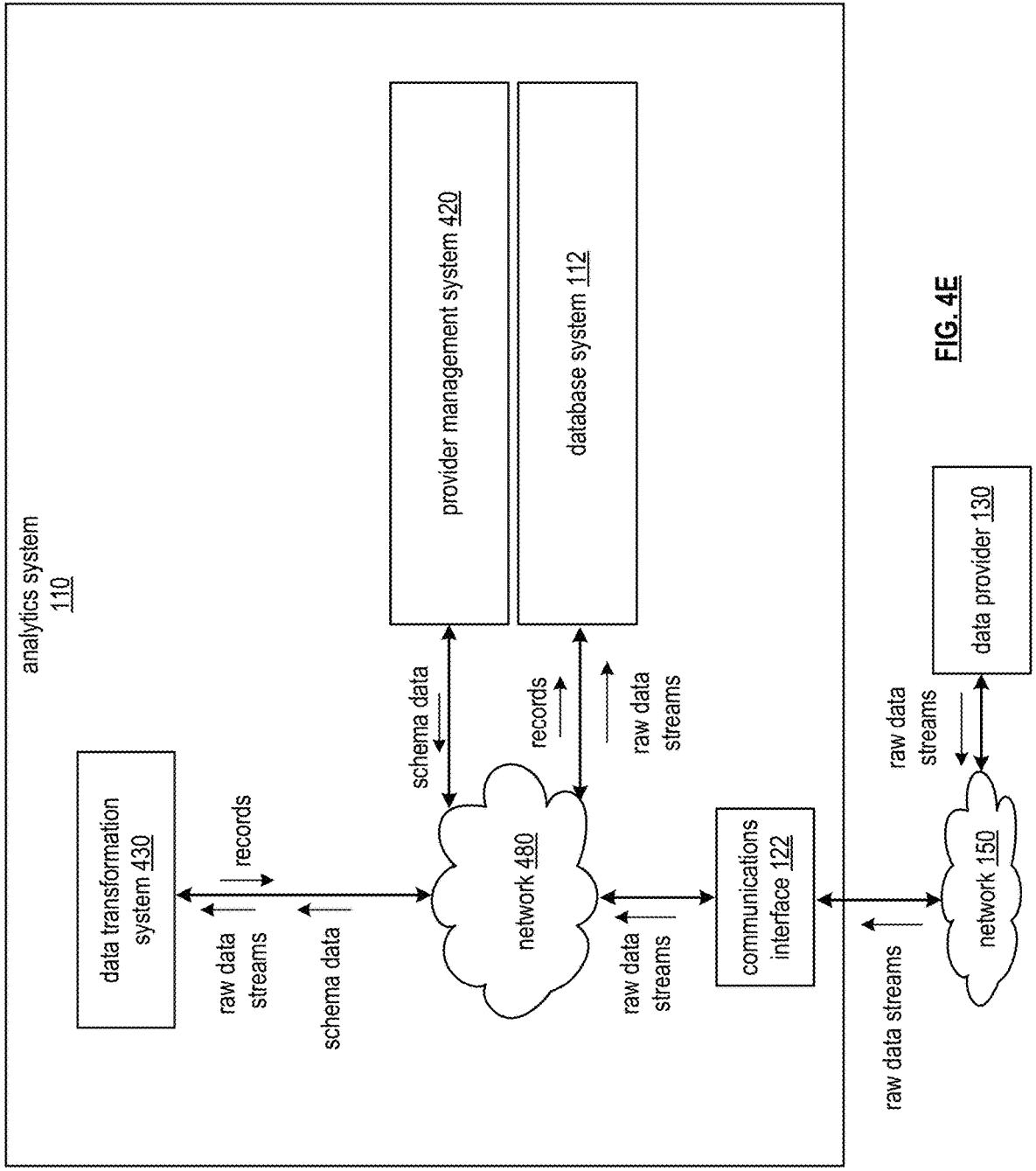
FIG. 4E is a schematic block diagram of an embodiment of an analytics system that utilizes a data transformation system in accordance with various embodiments of the present invention.

FIG. 4E illustrates an embodiment of data transformation system 430. Data transformation system 430 can be utilized by the analytics system to process raw data received from data providers 130. In particular the data transformation system 430 can parse, clean, normalize, aggregate, and/or standardize some or all incoming data streams from some or all data providers to generate some or all of the records stored in the database system 112. In some embodiments, schema data utilized by the data providers is known to the data transformation system and/or accessed from provider profiled data stored in the provider management system 420. The data transformation system can utilize the schema data to process the data streams into records accordingly.

In some embodiments, the schema data for multiple providers providing data for records in the same set of tables is consolidated by the data transformation system to generated standard schema data, for example, to most broadly capture the type and granularity of fields collected across multiple data providers for the same type of data and/or to optimize storage of the data. In some embodiments, record usage history can be utilized by the data transformation system to optimize a storage scheme for the data across multiple tables based on optimizing access of the records in the future.

In some embodiments, multiple distinct records derived from the same data are generated by the data transformation system to populate the database system 112. In such embodiments, a cleaned and/or otherwise derived record generated from a raw record by the data transformation system can augment a raw record in the database system 112, where both the cleaned record and the raw record are stored. Alternatively, a cleaned record can be stored instead of a raw record. In some embodiments, a cleaned record can be generated as a function of multiple raw records, representing summary data and/or an aggregation of data supplied in multiple records.

In some embodiments, the data transformation system is implemented by some or all data providers 130. In such embodiments, standard schema data can be transmitted to the data providers 130 to dictate how the data streams should be formatted by the data provider 130.

Figure 4F:
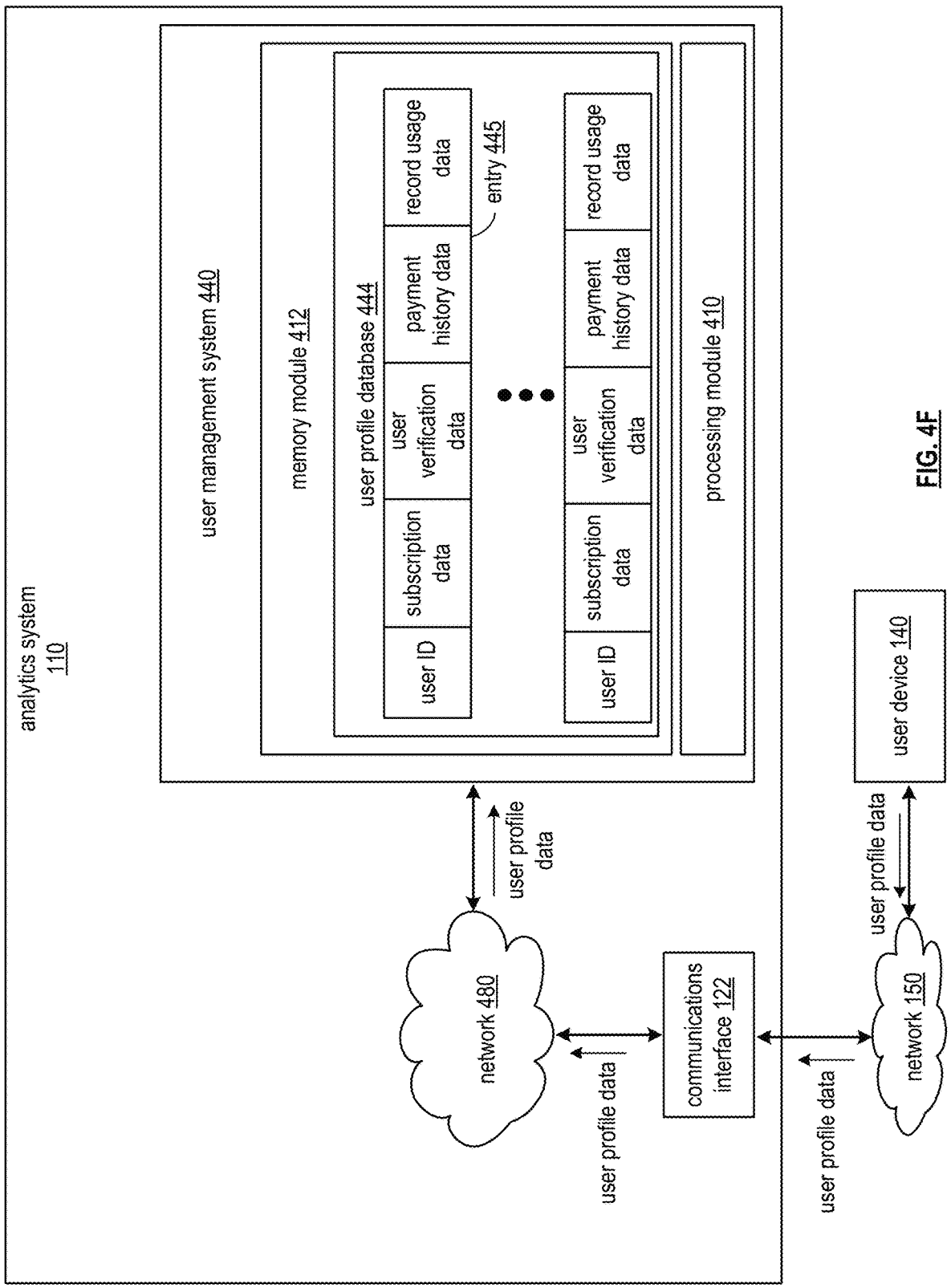
FIG. 4F is a schematic block diagram of an embodiment of an analytics system that utilizes a user management system in accordance with various embodiments of the present invention.

FIG. 4F illustrates an example embodiment of a user management system 440. The user management system 440 can store a user profile database 444 that stores various user profile data for one or more end users of the analytics system 110. As used herein, an end user can correspond to a single person and/or single account holder that uses and/or owns one or more corresponding user devices 140. An end user can alternatively or additionally correspond to an entity, such as a company that accesses the data of database system 112. In such embodiments, one or more individual users of one or more user devices 140 can query the database system 112 and/or otherwise interact with the analytics system 110 via GUI 345 as discussed herein on behalf of the entity. An entry to the user profile database 444 can thus detail profile data for an end user corresponding to an individual person and/or an entity as a whole.

Each entry 445 to the user profile database 444 can indicate information for a corresponding end user, for example, keyed by a user ID. Some or all of the fields of an entry 445 can be populated based on user profile data received from a user device 140, for example, based on user input by an end user to GUI 345. Alternatively or in addition, some or all of the fields of an entry 425 can be populated by data generated automatically by the analytics system 110. While one embodiment of an entry 445 is shown, different embodiments may not include all of the fields illustrated in FIG. 4F and/or can include additional fields in entries 445 to provide additional information corresponding to the end user.

Some or all of this user profile data can be stored as a relational database. In some embodiments, the database system 112 is implemented to store the user profile database 444 in at least one of the tables 1-X, and/or the user ID can be mapped to records of the database system 112 accessed by the end user and/or associated with the end user.

An entry 445 for a particular end user can include subscription data. This can indicate which subscription level the user is subscribed to for one or more different data provider entities and/or which subscription level for which the user has met billing requirements for one or more different data provider entities. In such embodiments, the end user can select and/or provide payment for their desired subscription level, which can be the same or different for different data providers. Alternatively or in addition, the subscription data can be automatically populated to indicate which subscription level has been reached by the user, determined automatically by the analytics system 110 based on the end user's usage of data in a most recent billing period and/or over time. This can require that the end user provide payment in response to reaching the corresponding subscription level in a given billing period.

An entry 445 for a particular end user can include user verification data. The user verification data can indicate provider account credentials and/or encryption key data utilized by the analytics system 110 to verify that user devices transmitting query requests were indeed sent by a verified end user that is authorized to and/or has sufficient subscription level to receive the resulting result set in a query response. This can further be utilized to track which queries were performed for each of a plurality of end users.

An entry 445 for a particular end user can include payment history data. This can indicate payments the user has made in a billing period or across multiple billing periods to the analytics system and/or for designation to individual data provider entities. This can be utilized by the analytics system 110 to automatically determine which subscription level the user has paid for, and thus can set the subscription level of the subscription data of the entry 445 automatically for one or more data providers and/or for the analytics system as a whole. This can further be utilized to track payment by the user in accordance costs of performing individual queries set by the billing structure data of one or more data providers.

An entry 445 for a particular end user can include record usage data. This can indicate various metrics indicating amount and/or type of usage by the end user of various records, provided by one or more particular data providers, over time and/or within a current timeframe. This can be utilized to determine billing and/or subscription level of the end users and/or by the analytics system 110 as a function of amount and/or type of queries performed on data, for example, in each of a series of billing periods. This can further be utilized in determining whether any threshold maximum usage set by particular providing entities in their record usage restriction data has been reached by the user within a current timeframe and/or over time.

Figure 4G:
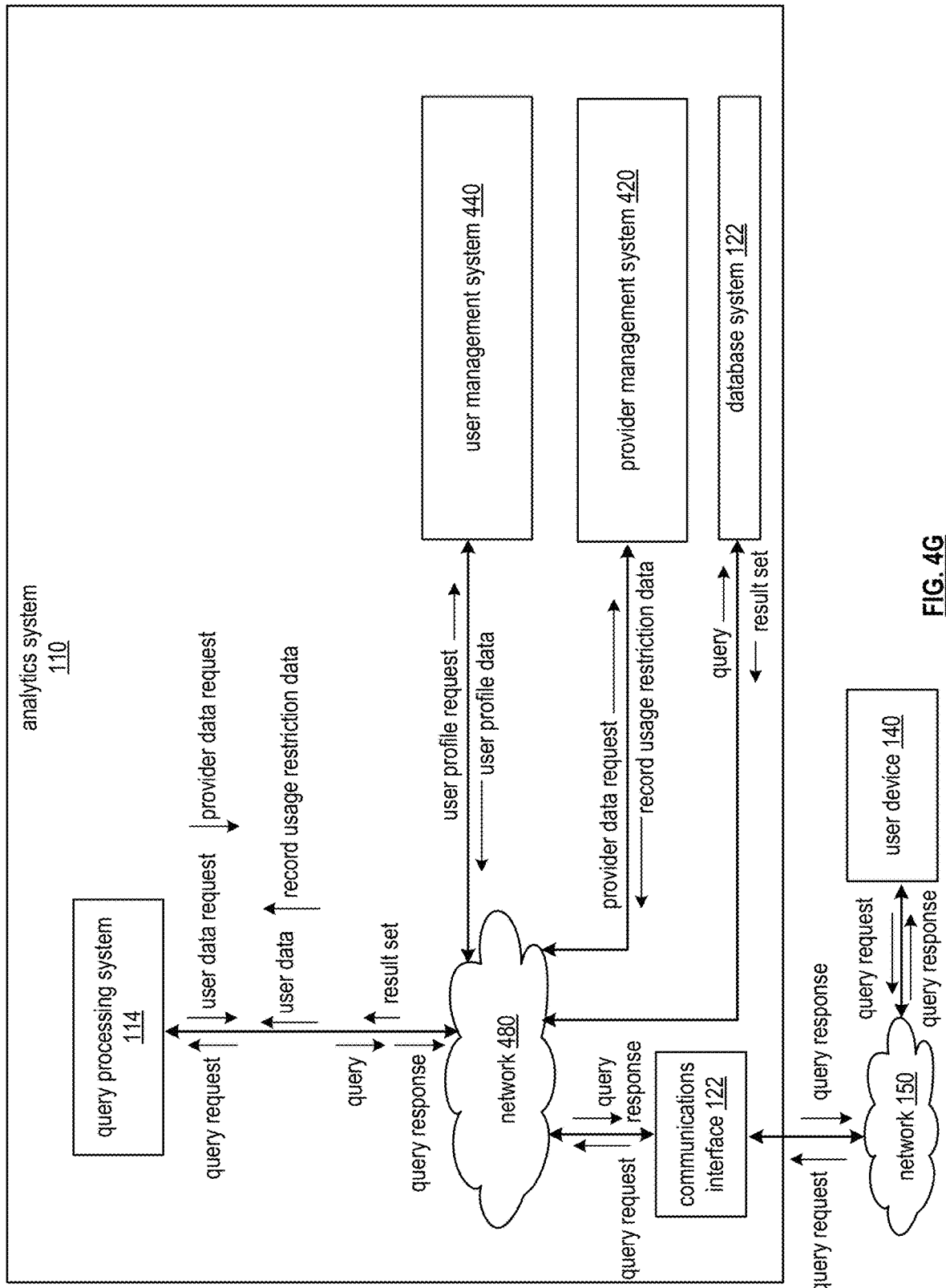
FIG. 4G is a schematic block diagram of an embodiment of an analytics system that utilizes a query processing system that communicates with a user management system and/or a provider management system in accordance with various embodiments of the present invention.

FIG. 4G illustrates an example embodiment of a query processing system 114 that utilizes user profile data from the user management system 440 and/or provider profile data from the provider management system 420 to evaluate queries and/or result sets. As will be discussed in further detail herein, the query processing system can evaluate whether or not to execute a query against the database system 112 based on processing of this information, and/or can evaluate whether or not to return a resulting result set to an end user based on processing of this information.

The query processing system 114 can retrieve provider data such as rules indicated in record usage restriction data from the provider management system 420. This can include sending a provider data request to the provider management system 420 and receiving record usage restriction data or other provider profile data for one or more data providers in response. This can further include indicating a particular provider identifier in the provider data request in response to receiving a query request that involves usage of data supplied by a data provider associated with the provider identifier and/or in response receiving a result set that includes and/or is derived from data supplied by a data provider associated with the provider identifier. In response, the provider management system 420 can send record usage restriction data for the identified data provider entity to the query processing system 114. The query processing system can utilize the record usage subscription data for a particular provider to evaluate the query of this query request and/or this corresponding result set generated by executing the query against the database system 112. Alternatively or in addition, record usage restriction data for multiple data providers can be retrieved and stored locally for usage by the query processing system in evaluating future queries and/or result sets. For example, record usage restriction data can be sent to the query processing system in response to being updated in provider profile data by the data provider entity.

The query processing system 114 can retrieve user data such as a subscription data and/or record usage data from the user management system 440. This can include sending a user data request to the user management system 440 and receiving subscription data, record usage data, or other user profile data for one or more end users in response. This can further include indicating a particular user identifier in the user data request in response to receiving a query request from a corresponding end user. In response, the user management system 440 can send subscription data and/or record usage data for the identified end user to the query processing system 114. Furthermore, a particular provider identifier can be indicated in response to the query request involving usage of data supplied by a data provider associated with the provider identifier and/or in response receiving a result set that includes and/or is derived from data supplied by a data provider associated with the provider identifier. In response, the user management system 440 can send record usage data for identified end user, specific to data supplied by the data provider, to the query processing system 114. Similarly, the user management system 440 can subscription data for the identified end user, specific to their subscription with the specified data provider, to the query processing system 114. The query processing system can utilize the subscription data and/or record usage data for a particular end user to evaluate the query of the query request received from the end user and/or the corresponding result set generated by executing the query against the database system 112.

Alternatively or in addition, subscription data and/or record usage data for multiple users can be retrieved and stored locally for usage by the query processing system in evaluating future queries and/or result sets. For example, subscription data can be automatically sent to the query processing system by the user management system 440 in response to being updated in user profile data by the end user and/or by an automatic determination. As another example, record usage data can be sent to the query processing system by the user management system 440 in response to being updated in user profile data based recent usage of records of the database system 112.

Figure 4H:
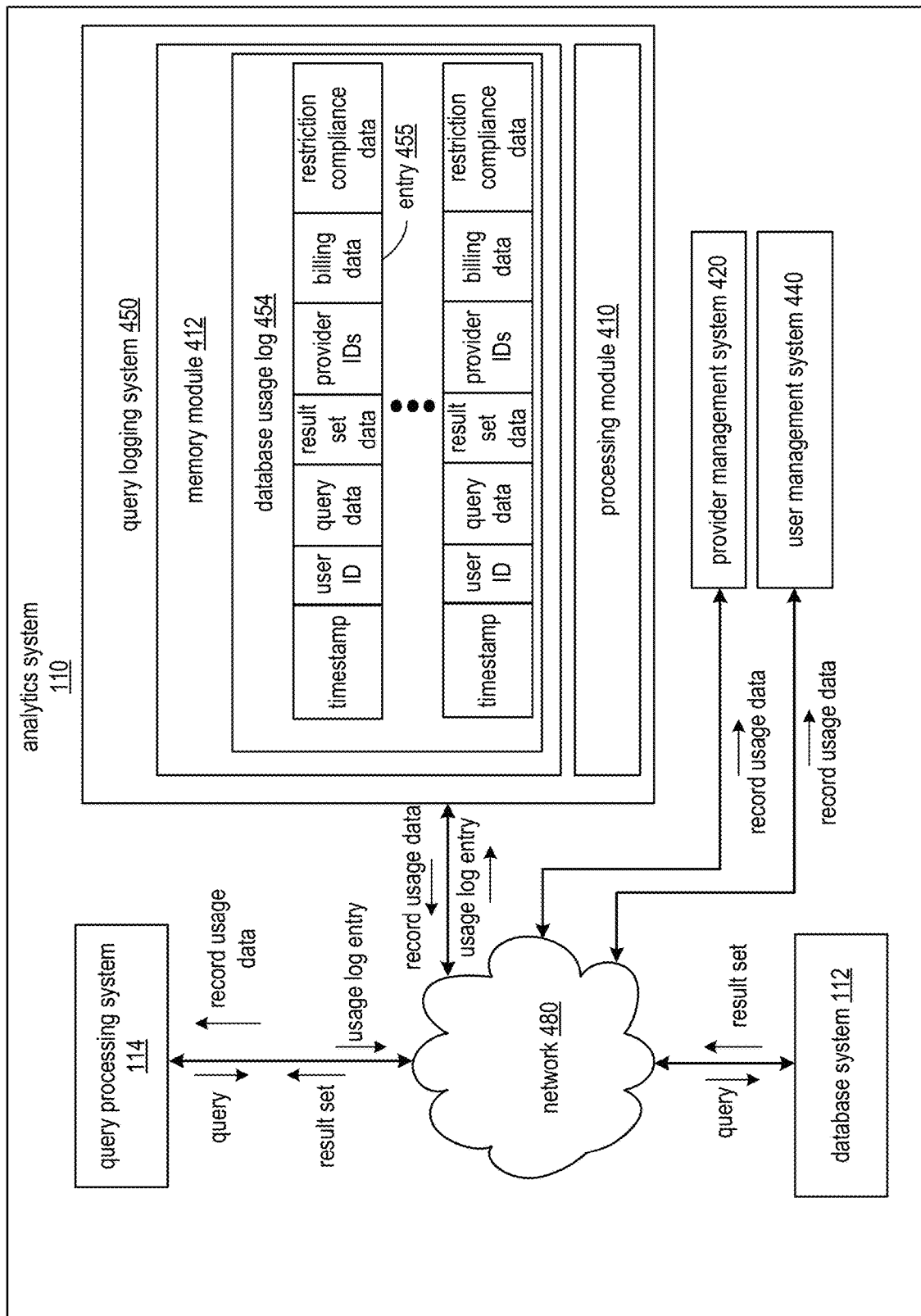
FIG. 4H is a schematic block diagram of an embodiment of an analytics system that utilizes a query logging system in accordance with various embodiments of the present invention.

FIG. 4H illustrates an example embodiment of a query logging system 450. The query logging system 450 can store a database usage log 454 that stores a plurality entries 455 logging some or all queries to the database system 112 over time. As used herein, a query with a corresponding entry 455 can correspond to a query that executed against the database system, where a result of the query was transmitted to the requesting end user. In some cases, a query with a corresponding entry 455 can correspond to a query that was partially and/or fully executed against the database system where the result of the query was determined not to be transmitted to the requesting end user. In some cases, a query with a corresponding entry 455 can correspond to a query that was received in a query request, but was determined not to be executed against the database system. As used herein, a query can correspond to a single query and/or can correspond to a plurality of queries in a same transaction, for example, where the transaction including the multiple queries was received from a same user device 140 in a single query request or in a series of query requests.

An entry 455 for a particular query can include a timestamp, indicating a time and/or temporal period at which the query was received by the analytics system 110, a time and/or temporal period at which the execution of the query against the database system 112 commenced, and/or a time and/or temporal period at which the execution of the query against the database system 112 was completed. Alternatively or in addition, the entry 455 can include a unique query identifier and/or an identifier indicating an ordering at which the query was executed relative to other queries logged in the database usage log.

An entry 455 for a particular query can include a user ID, indicating an identifier of a particular end user that generated and/or transmitted the query request that included the query. This user ID can thus map to a corresponding entry 445 in the user management system 440.

An entry 455 for a particular query can include query data, indicating information about the query itself. This can include some or all of the original query request and/or some or all of the query executed against the database system 112. This can include identifiers indicating one or more query functions included in the query and/or can include domain data indicating one or more tables, fields, and or records involved in the query.

An entry 455 for a particular query can include result set data. This can include the output that resulting from execution of the query against the database system 112 at the time of the query. This can include intermediate values and/or intermediate result sets generated in executing the query. This can indicate a number of records included in the result set and/or record identifiers for records included in the result set. This can indicate a number of records utilized in an aggregation and/or other query function utilized to produce the result set. This can indicate whether or not the result set included raw values of one or more fields. This can indicate a number of fields included in the result set as raw or derived values and/or identifiers for a set of fields included in the result set as raw or derived values.

An entry 455 can include one or more provider IDs. This can include provider IDs responsible for providing the data for any records that were utilized in executing the query.

This can include provider IDs for any records included in the result set. In some cases, each provider ID can each be mapped to corresponding records indicated in the result set data of the entry.

An entry 455 can include billing data. The billing data can indicate line item and/or total costs for execution of the query. The billing data can indicate multiple costs corresponding to multiple subscription levels and or can indicate the costs for a particular subscription level for the end user that sent the query request. The billing data can subdivide costs for each of a plurality of data provider entities associated with the request, for example, denoted by their corresponding provider IDs. The billing data can be generated automatically by the query logging system and/or can be generated and received from another subsystem 405, such as the query processing system 114.

An entry 455 can include restriction compliance data. This can include information regarding whether or not the query and/or result set met one or more requirements of the record usage restriction data for one or more corresponding providers. This can further include an indication of whether or not the query was executed and/or whether or not the result set was transmitted back to the end user. This can further include indications of one or more reasons that the corresponding query was not executed. For example, one or more particular rules of the record usage restriction data that were not adhered to in the query can be indicated and/or one or more portions of the query that did not adhere to one or more corresponding rules of the record usage restriction data can be indicated. Similarly, one or more particular rules of the record usage restriction data that were not adhered to in the final result set and/or in intermediate results can be indicated and/or one or more portions of the final result set and/or in intermediate results that did not adhere to one or more corresponding rules of the record usage restriction data can be indicated. This can further indicate which providers, such as a single provider or proper subset of providers involved in the query, had rules that were adhered to and/or had rules that were not adhered to in the query and/or result set.

Some or all of this query usage information can be stored as a relational database. In some cases, the database system 112 can store the database usage log 454 in at least one of the tables 1-X. An entry for a query of the database usage log 454 can be otherwise mapped to record identifiers in the database system 112 for records involved in the corresponding query; can be otherwise mapped to a user identifier in the user management system 440 for an end user that requested the corresponding query; and/or can be otherwise mapped to one or more provider identifiers in the provider management system 420 for providers that supplied records utilized in the corresponding query. While one embodiment of an entry 455 is shown, different embodiments may not include all of the fields illustrated in FIG. 4H and/or can include additional fields in entries 455 to provide additional information corresponding a query.

The entries 455 of the query logging system 450 can be accessed and/or processed, for example, by the query processing system 114, to determine and/or summarize previous usage of records in the database system by various end users. This can be utilized to determine previous usage data for individual end users. This can further be utilized to determine the value and/or demand of various records and/or fields, based on determining which particular records, which types of records, and/or which fields individually and/or in tandem are most frequently accessed by particular types of end users and/or across all end users. This can be utilized to track rates of compliance with various rules indicated in the record usage restriction data, for particular end users or across all end users, based on the restriction compliance data for queries logged over time.

As illustrated in FIG. 4H, the usage log entries 455 can be generated automatically by the analytics system 110, for example, by the query processing system 114. In particular, the query processing system 114 can determine values and/or other information for some or all of the fields of an entry 455, for example, in response to receiving a query request from a user device 140, in response to initiating execution of a query against the database system 112, and/or in response to receiving a result set in response to execution of a query. Information regarding the query request, query, and/or result set can be utilized to generate the corresponding usage log entry, and the usage log entry can be sent to the query logging system 450 for storage. Alternatively or in addition, other subsystems 405 can automatically determine when query requests have been received and/or when queries have been executed, and some or all of the information of a usage log entries 455 can be generated automatically by these other subsystems 405.

Information regarding usage log entries can also be sent to the provider management system 420 and/or the user management system 440 as record usage data. Some or all record usage data can be sent automatically, for example in response to being received for storage in the database usage log 454; in predefined intervals; in response to receipt of a corresponding request from the provider management system 420 and/or the user management system 440. For example, the provider management system 420 can request record usage data derived from usage log entries 455 indicating one or more particular data providers, denoted by their corresponding provider IDs. Similarly, the user management system 440 can request record usage data derived from usage log entries 455 indicating one or more particular end users, denoted by their corresponding user IDs.

The record usage data sent by query logging system can include values of one or more fields of one or more usage log entries. Alternatively or in addition, the record usage data sent by query logging system can include log identifiers that identify particular entries 455 of the database usage log 454. Alternatively or in addition, the query logging system can aggregate one or more usage log entries, for example, within a particular time period for one or more particular end users and/or for one or more particular providers. For example, the provider management system 420 and/or user management system 440 can send a query to the query logging system 450, and can receive raw and/or aggregated usage log entries based on the query logging system executing the query against the database usage log 454. The received record usage data can be stored by the provider management system 420 in corresponding entries 425 and/or can be stored by the by the user management system 440 in corresponding entries 445, respectively.

Figure 4I:
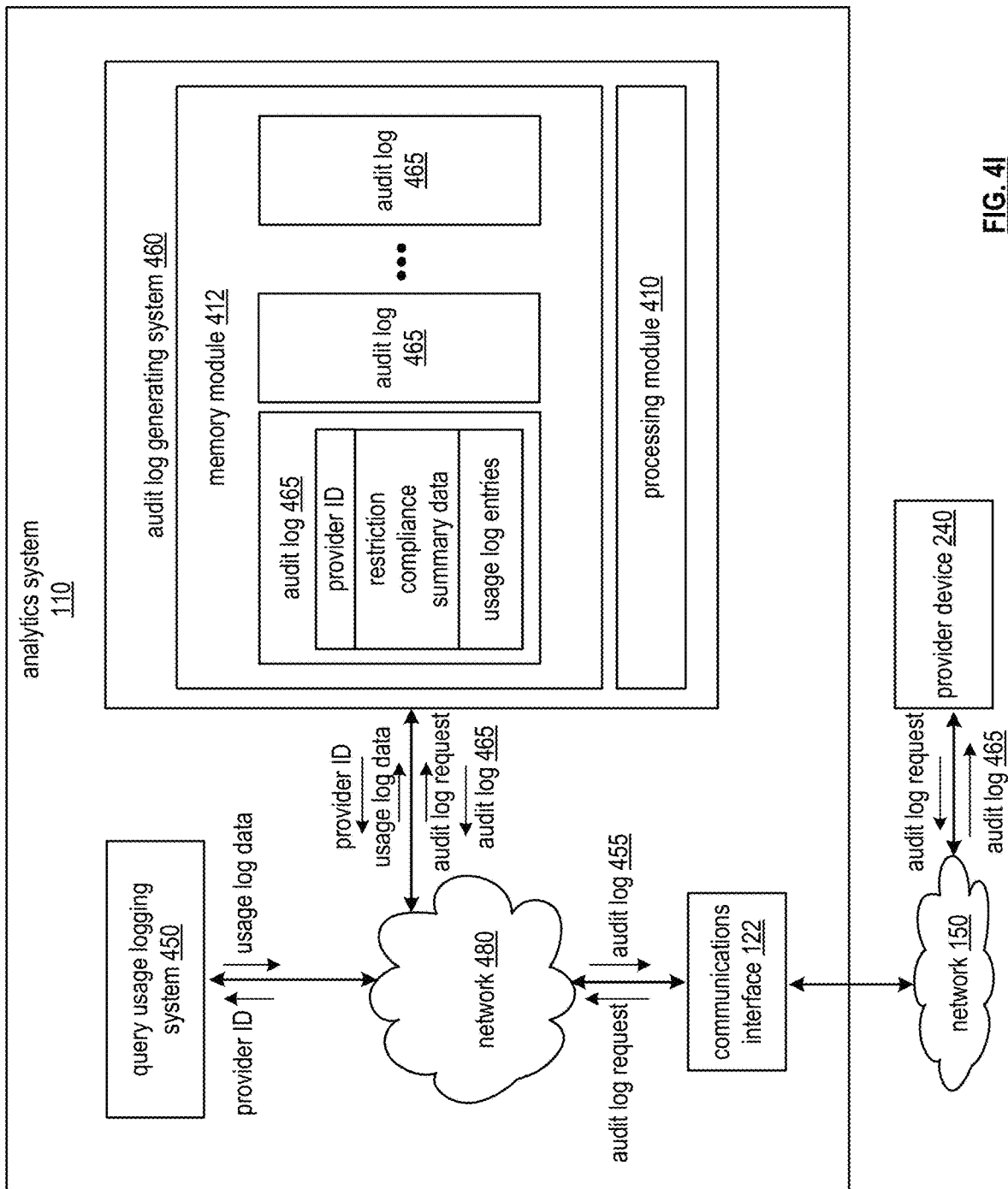
FIG. 4I is a schematic block diagram of an embodiment of an analytics system that utilizes an audit log generating system in accordance with various embodiments of the present invention.

FIG. 4I illustrates an example embodiment of an audit log generating system 460. The audit log generating system 460 can generate audit logs 465 based on usage log entries received from the query logging system 450 and/or based on record usage data received from the provider management system 420 and/or the user management system 440. These audit logs can indicate individual and/or aggregate restriction compliance data of a plurality of usage log entries 455, for example, for a particular provider within a particular timeframe. These audit logs 465 can be automatically generated by the audit log generating system, for example, in predefined intervals; in response to at least a threshold number of new queries for a particular provider and/or overall being logged in the query logging system; based on audit log preference data of an entry 425 of the provider management system, and/or in response to receiving an audit log request requesting an audit log, for example, from a provider device 230. The resulting audit log 465 can be transmitted to a corresponding provider device 230, for example, for display by via GUI 245. Audit logs can be requested by and/or transmitted to particular data providers, overarching regulatory entities, and/or administrators of the analytics system 110.

As illustrated in FIG. 4I, an audit log 465 can indicate a provider ID for which the audit log pertains. An audit log 465 can further include regulatory compliance summary data, which can include aggregated and/or other summary information derived from the restriction compliance data of one or more usage log entries 455. For example, the audit log can indicate a number and/or percentage of queries and/or result sets determined to comply with each of a set of rules of the record usage restriction data, for example, from a proper subset of all queries that invoked the each of the set of rules. Alternatively or in addition, the audit log 465 can include raw and/or line item restriction compliance data for a plurality of individual usage log entries.

In some embodiments, an audit log request can indicate a particular provider, one or more particular users, a particular timeframe; a particular subset of rules of record usage restriction data; an indication of whether to include queries that passed and/or queries that failed; aggregation functions to be performed on usage log entries 455 to generating the audit log 465; and/or other information regarding which information should be included in the audit log and/or how the information should be processed to generate the audit log. In some cases, the audit log request can indicate a query to be performed by the audit log generating system 460 against the database usage log 454, user management system 440, and/or provider management system 420 to generate the audit log 465. The audit log generating system 460 can extract the requirements specified in the audit log request for usage in generating a corresponding audit log 465 accordingly.

For example, an audit log request can indicate that only usage log entries 455 for provider X that were processed within the last month and that failed to adhere to a particular rule invoked by the restriction usage restriction data of provider X. Alternatively or in addition, the audit log generating system can automatically determine the query to be performed against the database usage log 454, user management system 440, and/or provider management system 420, for example, based on the audit log preference data included in an entry 425 of a corresponding provider in the provider profile database 424, based on other predefined audit log configurations, and/or based on another determination made by the audit log generating system 460. For example, the audit log generating system 460 can receive the audit log preference data for one or more providers from the provider management system 420, and can generate the audit logs for each provider in accordance with their audit log preference data.

In some embodiments, audit logs can be requested from and/or transmitted to other entities, such as client devices associated with regulatory entities that oversee usage of data by data provider entities and/or the analytics system 110. In such embodiments, an audit log can contain information pertaining to multiple providers, such as all of the providers that supply data to the database system 112.

These analytics subsystems 405 of FIGS. 4A-4I enable the analytics system 110 to perform various requested queries on data received from multiple data providers, while ensuring that individual data usage requirements set by different data providers are adhered to in each query. Furthermore, each data provider can be assured that their individual data usage requirements are enforced by the analytics system 110 via the automatic generation of customizable audit logs detailing how the analytics system has accepted and/or rejected various queries based on whether they adhere to the requirements set by each provider.

At least these features present improvements over existing systems by: enabling individual data providers to customize their own set of rules restricting usage of their data; enabling enforcement of different sets of rules for queries upon data supplied by different data providers; logging this enforcement of usage restrictions for each query over time; and/or aggregating the logged enforcement of usage restrictions as customizable audit logs for transmission back to data providers and/or regulatory entities. These improvements are advantageous because they can: increase data privacy in analytics systems; enhance a data providers' ability to license various usage of their data at different costs and/or at differing subscription levels; enable differentiation in stringency of usage restrictions for differing query functions performed upon data of differing volume and/or sensitivities, supplied by differing providers, by users at differing subscription levels; and/or increase opacity of enforcement of usage restrictions via the generation and transmission of audit logs.

Figure 5A:
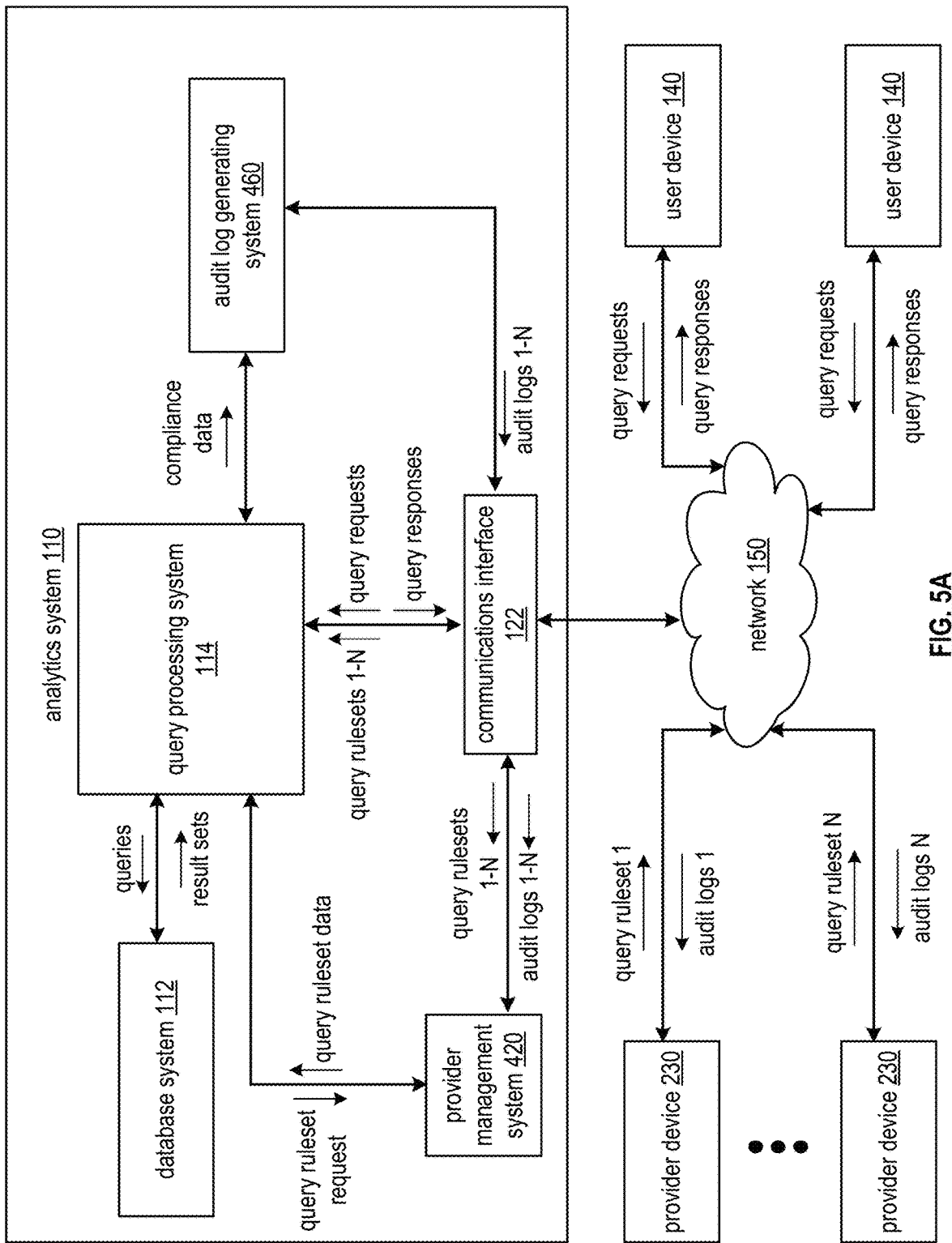
FIG. 5A is a schematic block diagram of an embodiment of an analytics system in accordance with various embodiments of the present invention.

FIG. 5A illustrates an example embodiment of an analytics system 110 operable to function with this enhanced functionality. A plurality of provider devices 230 associated with a plurality of data provider entities 1-N can each generate, via GUI 245, record usage restriction data that includes a query ruleset. These query rulesets 1-N can be transmitted to the analytics system 110 for storage by the provider management system 420 and/or for usage by query processing system 114. A plurality of user devices 140 can send query requests to the analytics system 110, and the query processing system can process each query request in conjunction with the query rulesets 1-N in querying the database system 112 and processing the corresponding result set to generate a query response, which can include the result set or can indicate that the query did not comply with at least one rule of the query rulesets 1-N. The query response can be sent back to the corresponding user device 140. Furthermore, compliance data generated in comparing the query and/or result set to some or all of the query rulesets 1-N can be sent to the audit log generating system 460 directly, and/or can be sent to the audit log generating system 460 as restriction compliance data retrieved from a usage log entry for the query in database usage log 454. The audit log generating system 460 can utilize compliance data generated across multiple queries sent by multiple users to generate an audit log for each of the data provider entities 1-N. These audit logs 1-N can be transmitted to the corresponding provider devices 230 for display via GUI 245 and/or can be stored by the provider management system 420 in corresponding provider profile entries for subsequent access by the corresponding data provider entity.

Figure 5B:
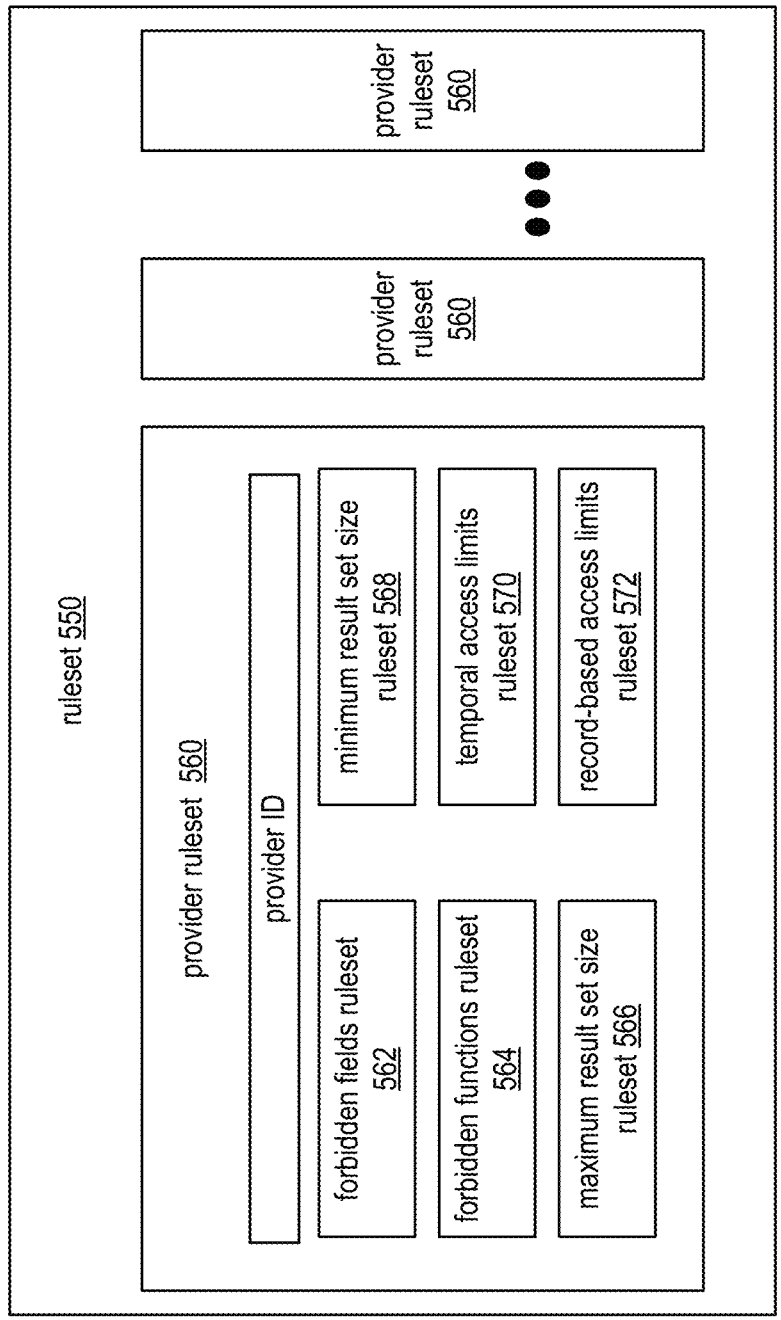
FIG. 5B illustrates an example embodiment of a ruleset in accordance with various embodiments of the present invention.

FIG. 5B illustrates an embodiment of a ruleset 550 that can be stored by the analytics system 110 for utilization by the query processing system 114. The ruleset 550 can include a plurality of provider rulesets 560, for example, where each of the query rulesets 1-N of FIG. 5A are implemented utilizing provider ruleset 560 and/or where the record usage restriction data of an entry 425 of provider profile database 424 indicates and/or maps to the provider ruleset 560 for the corresponding provider. A provider ruleset 560 can indicate and/or be mapped to a provider ID of the data provider that generated the rules and/or for which the provider ruleset 560 otherwise applies.

A provider ruleset 560 can include a plurality of different types of rulesets. A provider ruleset 560 can include a forbidden fields ruleset 562; a forbidden functions ruleset 564; a maximum result set size ruleset 566; a minimum result set size ruleset 568; a temporal access limits ruleset 570; a record-based access limits ruleset 572; and/or additional rulesets that indicate requirements for usage of their data by end users. Each of these rulesets can include one or more rules for the particular provider.

While not depicted in FIG. 5B, the ruleset 550 can indicate a forbidden fields ruleset 562; a forbidden functions ruleset 564; a maximum result set size ruleset 566; a minimum result set size ruleset 568; a temporal access limits ruleset 570; a record-based access limits ruleset 572, where each of these rulesets includes corresponding provider rules provided across some or all providers. As used herein, the forbidden fields ruleset 562; a forbidden functions ruleset 564; a maximum result set size ruleset 566; a minimum result set size ruleset 568; a temporal access limits ruleset 570; a record-based access limits ruleset 572 can each include rules corresponding to a particular provider, and/or can include rules for multiple providers.

Figure 5C:
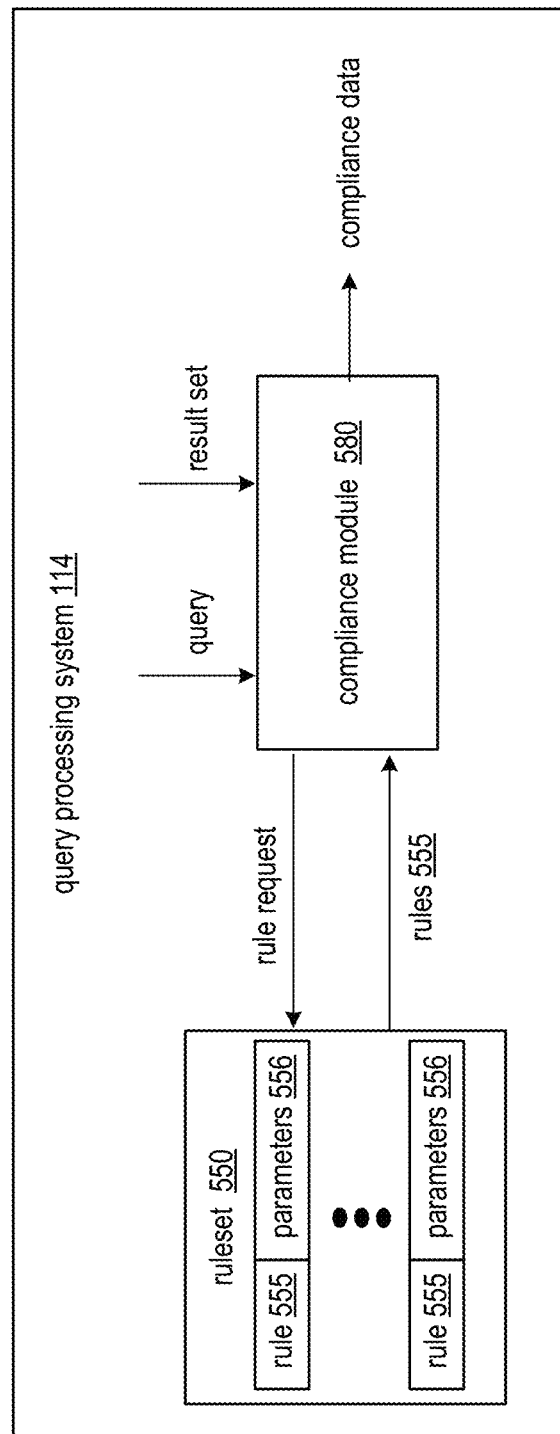
FIG. 5C is a schematic block diagram of an embodiment of a query processing system in accordance with various embodiments of the present invention.

FIG. 5C illustrates an example embodiment of query processing system 114 that utilizes a compliance module 580 to evaluate queries and/or result sets based on the ruleset 550. The compliance module 580 can utilize processing module 410 or a different processing module to execute operational instructions stored by memory module 412 or a different memory module to implement the functionality of the compliance module 580 discussed herein.

In response to receiving a given query and/or result set, the compliance module 580 can access ruleset 550 in local storage and/or via network 480. For example, the compliance module 580 can request all rules 555 of the ruleset 550, can request rules 555 for a particular provider as a provider ruleset 560, and/or can request only rules 555 that meet particular criteria determined by the compliance module 580 based on corresponding features of the query and/or the result set. In particular, the compliance module 580 can request only a proper subset of rules 555 in the ruleset 550 that are deemed by the compliance module 580 as relevant to the given query and/or given result set.

In such embodiments, some or all rules 555 in the ruleset 550 can have one or more corresponding parameters 556 indicating conditions in which the rule 555 is applicable to a given query and/or result set. For example, a parameter 556 can indicate a particular provider's data to which the rule applies and/or a particular field to which the rule applies. These parameters 556 can be sent to the compliance module 580 in conjunction with the requested rules. Alternatively or in addition, the request for rules can indicate parameters determined by the compliance module 580 that are indicative of features for the given query and/or result set, and only rules 555 with parameters 556 that match and/or otherwise compare favorably to all of the parameters sent in the rules request are returned to the compliance module for application to the given query and/or result set. For example, the compliance module 580 can determine which one or more provider's records are involved in the query and/or included in the result set, and can indicate one or more corresponding provider IDs in the rules request to retrieve only rules 555 for these one or more providers whose data is involved in the query and/or included in the result set. Alternatively, the compliance module 580 can compare every query and/or result set to a same, entire set of rules 555 in ruleset 550, for example, by performing a same compliance function on every query and/or on every result set.

The compliance module 580 can compare the retrieved rules 555 to a query received in a query request that has yet to be executed and/or a result set resulting from execution of the query. The compliance module can generate compliance data indicating whether or not the query and/or result data adhered to each applicable rule 555 individually, and/or indicating whether or not the query and/or result set adhered to every rule 555. In some cases, the compliance data can indicate which individual rules were adhered to and/or which individual rules were not adhered to.

In some cases, the compliance data can be further generated to indicate a query and/or result set complied with a subset of rules 555 in ruleset 550 that were to be non-applicable, based on the query and/or result set comparing unfavorably to the corresponding parameters 556. Alternatively or in addition, the compliance data can be generated to indicate a subset of rules 555 deemed non-applicable based on the parameters 556. For example, the compliance data can indicate a first subset of rules 555 in the ruleset 550 that were adhered to, a second first subset of rules 555 in the ruleset 550 that were not adhered to, and/or a third subset of rules 555 in the ruleset 550 that were not applicable, where the first subset, second subset, and third subset are mutually exclusive and collectively exhaustive with respect to the ruleset 550. Alternatively, the third subset of rules 555 are instead included in the first subset of rules 555, as these non-applicable rules can be considered adhered to as a result of being non-applicable.

Figure 6A:
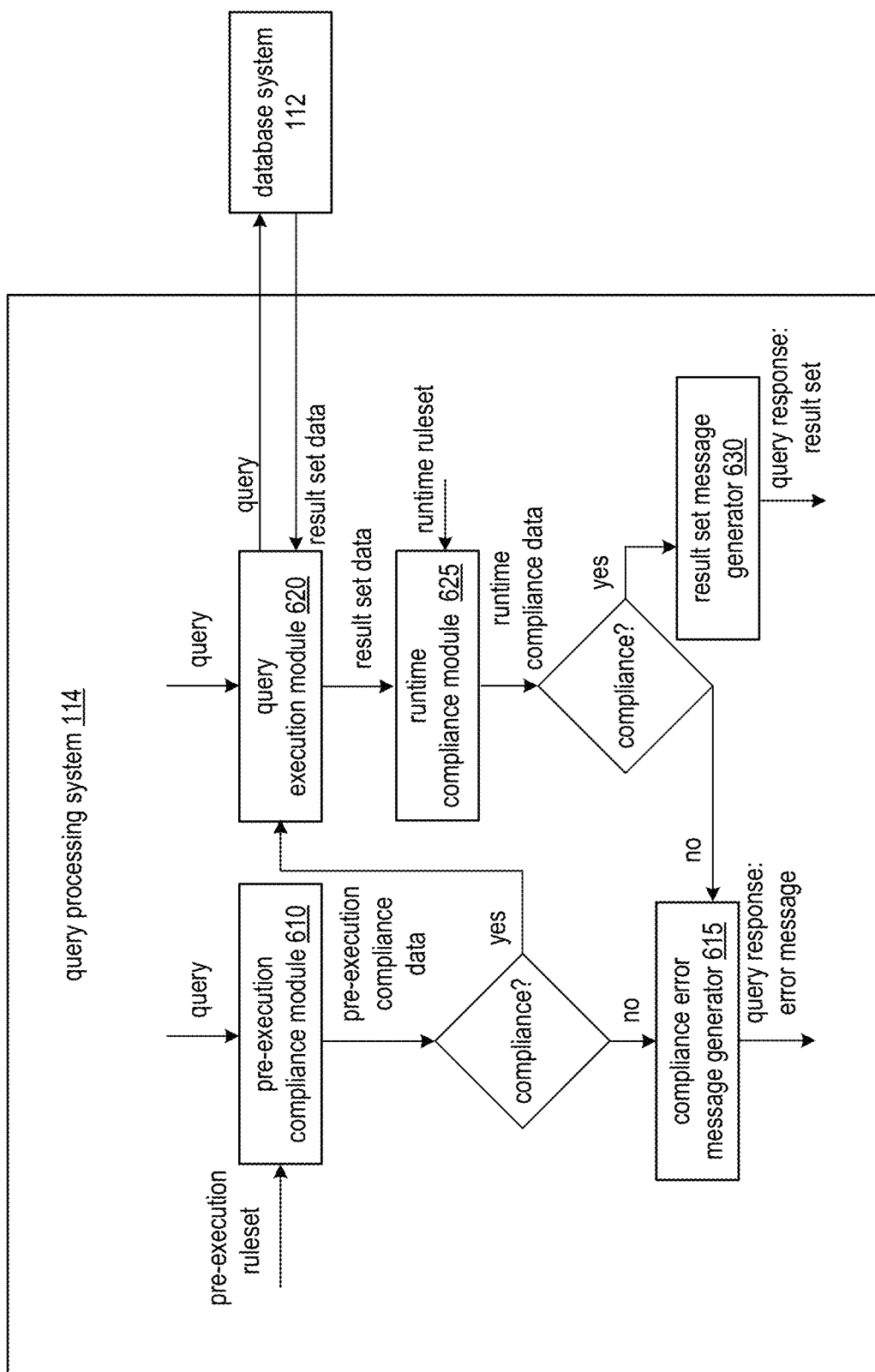
FIG. 6A is a flow diagram illustrating an embodiment of a query processing system that utilizes a pre-execution compliance module and/or a runtime compliance module in accordance with various embodiments of the present invention.

FIG. 6A illustrates an example embodiment of a query processing system 114 that separately evaluates a query prior to its execution and a result set after a queries execution. The query processing system 114 can be operable to implement a pre-execution compliance module 610, a compliance error message generator 615, a query execution module 620, a runtime compliance module 625 and/or a result set message generator 630, for example, by utilizing the processing module 410 to execute operational instructions stored by the memory module 412 that causes the processing module 410 to execute the functionality of the pre-execution compliance module 610, the compliance error message generator 615, the query execution module 620, the runtime compliance module 625 and/or the result set message generator 630. In some embodiments, the pre-execution compliance module 610 and/or the runtime compliance module 625 are utilized to implement the compliance module 580 of FIG. 5C.

A subset of the ruleset 550 can correspond to a pre-execution ruleset that can be applied to a query itself prior to execution. For example, the pre-execution ruleset can include restrictions relating to operations allowed to be performed on particular fields, can include restrictions relating to whether or not records and/or fields indicated in the query can be returned as raw values, and/or can include other rules that can be checked based on the query itself, prior to any execution. The pre-execution compliance module 610 can compare the query to the pre-execution ruleset to generate pre-execution compliance data indicating whether or not each rule in the pre-execution ruleset was adhered to.

The query processing system 114 can then determine whether or not the pre-execution compliance data indicates compliance with all of the rules in the pre-execution ruleset. If not, the compliance error message generator 615 can be utilized to generate an error message, for example, as the query response transmitted back to the user device that generated the query request. The error message can indicate that the query did not comply with the ruleset, can specify which one or more rules of the pre-execution ruleset with which the query failed to comply, and/or can indicate which portions of the query failed to comply with one or more rules of the pre-execution ruleset. For example, the error message can be displayed via GUI 345 to indicate that the query was not executed and/or to indicate why the query did not comply with the ruleset 550 and was thus not executed. In this case, the query processing system 114 can forego execution of the query as a result of the query not complying with the pre-execution ruleset.

If the query processing system 114 determine that the pre-execution compliance data indicates the query complies with every rule in the pre-execution ruleset, the query can be executed by utilizing query execution module 620. In particular, the query can be parsed, formatted into one or more coded query commands readable by the database system 112, and/or can otherwise be sent to the database system 112 for execution. The database system 112 can send to the query processing system result set data generated by executing some or all of the query functions indicated in the query. This result set data can include a final result set or records and/or a final value alone. This result set data can include one or more intermediate result sets and/or intermediate values generated via partial execution of the query.

A second subset of rules can correspond to a runtime ruleset that can be applied to a final result set, final value, intermediate result sets, and/or intermediate values of the result set data after execution of the query. The runtime ruleset can include rules where adherence cannot be determined based on the query alone, and can only be evaluated after execution of the query has commenced and/or once execution of the query has completed. For example, the runtime ruleset can include rules relating to whether or not particular records can be utilized and/or included in an intermediate and/or final result set, and/or can indicate a maximum and/or minimum number of particular records can be utilized and/or included in an intermediate and/or final result set. The runtime compliance module 625 can compare the result set to the runtime ruleset to generate runtime compliance data indicating whether or not each rule in the runtime ruleset was adhered to.

The query processing system 114 can be operable to determine whether or not runtime execution compliance data generated by the runtime compliance module 625 indicates compliance with all of the rules in the runtime ruleset. If not, the compliance error message generator 615 can be utilized to generate an error message, for example, as the query response transmitted back to the user device that generated the query request. The error message can indicate that the result set data did not comply with the ruleset, and/or can specify which one or more rules of the runtime ruleset with which the result set data failed to comply. For example, the error message can be displayed via GUI 345 to indicate that the result set of the query did not comply with the ruleset and/or to indicate why the result set did not comply with the ruleset. In this case, the query processing system 114 can forego transmission of the result set to the end user as a result of the result set data not complying with the pre-execution ruleset.

In some embodiments, the pre-execution compliance module 610 is utilized by query processing system 114, but the runtime compliance module 625 is not. In such embodiments, if the pre-execution compliance data indicates compliance with the pre-execution ruleset, the query can be executed, and the result set can be transmitted as the query response without any evaluation of the result set and/or intermediate results. In other embodiments, the runtime compliance module 625 is utilized by query processing system 114, but the pre-execution compliance module 610 is not. In such embodiments, the query and/or result set data is utilized to determine if compliance is achieved after a query has commenced and/or completed execution, where queries are executed upon receipt without any prior evaluation of the queries themselves.

Figure 6C:
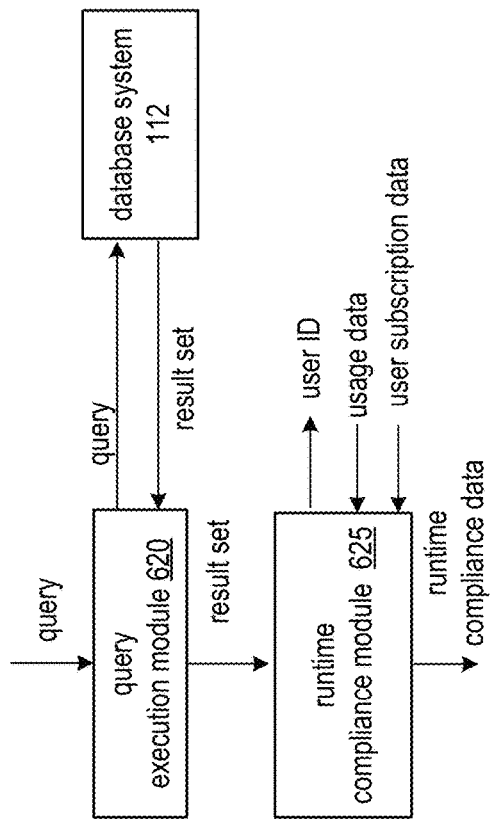
FIG. 6C is a schematic block diagram of an embodiment of a runtime compliance module in accordance with various embodiments of the present invention.
Figure 6E:
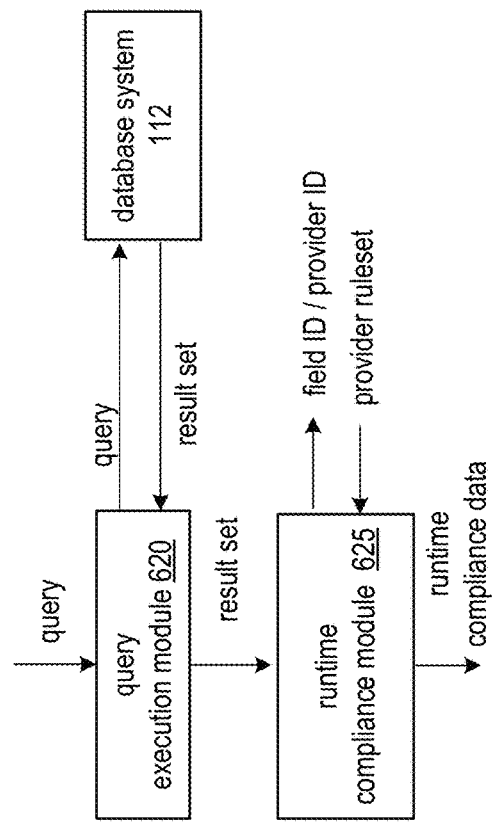
FIG. 6E is a schematic block diagram of an embodiment of a runtime compliance module in accordance with various embodiments of the present invention.
Figure 6B:
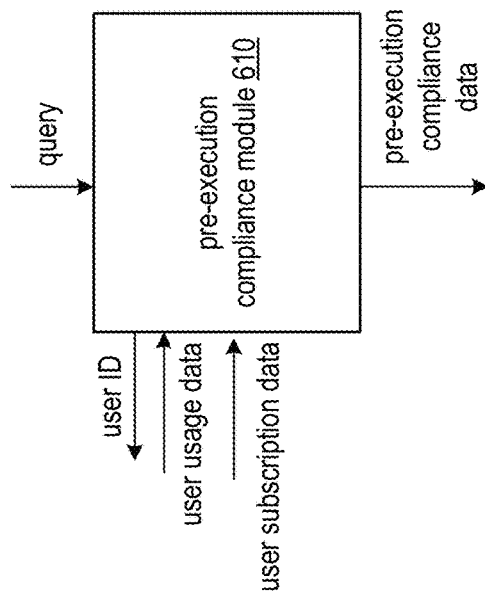
FIG. 6B is a schematic block diagram of an embodiment of a pre-execution compliance module in accordance with various embodiments of the present invention.

As illustrated in FIGS. 6B-6C, the pre-execution compliance module 610 and/or the runtime compliance module 625 can utilize additional data to determine whether a query complies with the pre-execution ruleset, and/or to determine whether result set data complies with the runtime ruleset, respectively. As illustrated in FIG. 6B, user usage data and/or user subscription data can be received for usage by the pre-execution compliance module 610. For example, the pre-execution compliance module 610 can generate a request for transmission to the user management system 440 indicating a user ID corresponding to the end user that generated and/or transmitted the query to be evaluated, and record usage data and/or subscription data for that particular end user can be transmitted by the user management system for use by the pre-execution compliance module 610 in response. Alternatively or in addition, the pre-execution compliance module 610 can generate a request for transmission to the query logging system 450 indicating the user ID and/or one or more provider IDs associated with the query, and/or a temporal period indicated by one or more pre-execution rules, where the usage logging system send the usage data for the user, within the temporal period and/or for usage of records supplied by the indicated provider, as data from one or more usage log entries. Alternatively or in addition, the pre-execution compliance module 610 can receive user usage data and/or user subscription data automatically; can access previously received usage data and/or subscription data for the user; and/or can access locally stored user usage data and/or user subscription data for the user.

The pre-execution compliance module 610 can utilize the received user subscription data to determine if a subscription level of the user for one or more providers meets subscription level requirements for pre-execution rules applicable to the query. The pre-execution compliance module 610 can utilize the received user usage data to determine if historical and/or recent record usage by user meets usage restrictions for pre-execution rules applicable to the query. In some cases, this information is compared to parameters 556 relating to user subscription level and/or user usage data to determine a proper subset of a set of pre-execution rules that are applicable to query.

As illustrated in FIG. 6C, the runtime compliance module 625 can similarly utilize user usage data and/or user subscription data to determine whether result set data complies with the pre-execution ruleset. The runtime compliance module 625 can similarly generate a request for transmission to the user management system 440 and/or usage logging indicating a user ID corresponding to the end user that generated and/or transmitted the query to be evaluated, and record usage data and/or subscription data for that particular end user can be transmitted by the user management system for use by the runtime compliance module 625 in response. Alternatively or in addition, the runtime compliance module 625 can generate a request for transmission to the query logging system 450 indicating the user ID, one or more provider IDs that supplied records included in the result set data, and/or a temporal period indicated by one or more runtime rules, where the usage logging system send the usage data for the user as data from one or more usage log entries, for usage of data within the temporal period and/or for usage of records supplied by the one or more indicated providers. Alternatively or in addition, the runtime compliance module 625 can receive user usage data and/or user subscription data automatically; can access previously received usage data and/or subscription data for the user; and/or can access locally stored user usage data and/or user subscription data for the user.

The runtime compliance module 625 can utilize the received user subscription data to determine if a subscription level of the user for one or more providers meets subscription level requirements for runtime rules applicable to the result set. The runtime compliance module 625 can utilize the received user usage data to determine if historical and/or recent record usage by user meets usage history requirements for runtime rules applicable to the result set. In some cases, this information is compared to parameters 556 relating to user subscription level and/or user usage data to determine a proper subset of a set of rules that are applicable to result set.

Figure 6D:
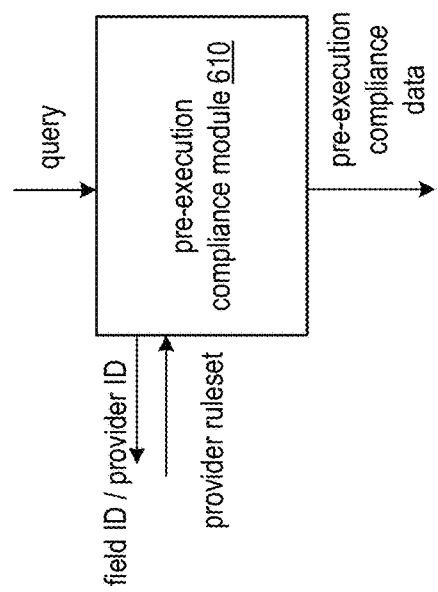
FIG. 6D is a schematic block diagram of an embodiment of a pre-execution compliance module in accordance with various embodiments of the present invention.

As illustrated in FIGS. 6D-6E, the pre-execution compliance module 610 and/or the runtime compliance module 625 can filter the rulesets that are applied to utilize only rulesets set by for applicable providers and/or fields to determine whether a query complies with the pre-execution ruleset, and/or to determine whether result set data complies with the runtime ruleset, respectively.

As illustrated in FIG. 6D, one or more field IDs and/or provider IDs can be utilized to determine pre-execution rulesets for a particular provider and/or pertaining to particular fields. For example, the pre-execution compliance module 610 can determine a subset of providers that supplied the data involved in the query, and/or can determine a subset of fields and/or tables that are involved in the query. The pre-execution compliance module 610 can generate a request for transmission to the provider management system 420 and/or ruleset 550 that indicates this subset of provider IDs, subset of tables, and/or subset of fields. Rules for the particular provider and/or relating to the particular field can be transmitted in response for use by the pre-execution compliance module 610. For example, rules with parameters 556 that match and/or include one or more of the subset of provider IDs, subset of tables, and/or subset of fields indicated in the request sent by the pre-execution compliance module 610 are retrieved. Alternatively or in addition, the pre-execution compliance module 610 can receive provider rulesets; can access previously received rulesets for the provider and/or one or more fields; and/or can access locally stored user provider rulesets. In such embodiments, the query processing system 114 can reduce utilization of resources by retrieving, and/or utilizing in the comparison, only the rulesets set by the provider IDs that supplies records to one or more fields involved in a particular query being evaluated, and/or only the rules that pertain to particular fields involved in the particular query being evaluated.

As illustrated in FIG. 6E, one or more field IDs and/or provider IDs can be utilized to determine runtime rulesets for a particular provider and/or pertaining to particular fields. For example, the runtime compliance module 625 can determine a subset of providers that supplied the data included in the result set data, and/or can determine a subset of fields and/or tables included in the result set data. The runtime compliance module 625 can generate a request for transmission to the provider management system 420 and/or ruleset 550 that indicates this subset of provider IDs, subset of tables, and/or subset of fields. Rules for the particular provider and/or relating to the particular field can be transmitted in response for use by the runtime compliance module 625. For example, rules with parameters 556 that match and/or include one or more of the subset of provider IDs, subset of tables, and/or subset of fields indicated in the request sent by the runtime compliance module 625 are retrieved. Alternatively or in addition, the runtime compliance module 625 can receive provider rulesets; can access previously received rulesets for the provider and/or one or more fields; and/or can access locally stored user provider rulesets. In such embodiments, the query processing system 114 can reduce utilization of resources by retrieving, and/or utilizing in the comparison, only the rulesets set by the provider IDs that supplies records in a particular result set being evaluated, and/or only the rules that pertain to particular fields involved in the particular result set being evaluated.

FIGS. 6F-6G illustrate embodiments where the query processing module utilizes intermediate results and/or values generated in executing a query to determine whether compliance is achieved. In particular, one or more rules of the runtime ruleset can pertain to rules specific to intermediate result sets and/or values, which may not be derivable from a final result of the query. For example, a runtime rule can require that an aggregation, such as an average, must be performed upon at least a threshold minimum number of records. The number of records utilized to generate the resulting average cannot be derived from the value of the average itself. Thus, an intermediate result, corresponding to the set of records utilized to generate the average, must be evaluated to determine if the number of records in this set meets or exceeds the threshold minimum number of records.

As illustrated in FIG. 6F, the runtime compliance module 625 can receive a plurality of partial result sets 1-K, which can each correspond to a set of records or a value generated in sequence and/or in parallel by the database system to ultimately arrive at the final result set and/or final value. In some embodiments, the query execution module 620 can parse the query itself into a plurality of partial queries 1-K, where the partial results 1-K are received in response. In some embodiments, the partial queries 1-K are generated and transmitted one at a time in sequence, where each partial query is generated in response to receiving a response to a previous query. In some embodiments, some of the partial queries are performed by the query execution module 620 locally. For example, the query execution module 620 can query the database system for particular fields of records that meet particular criteria as a partial request of the averaging query discussed above, and the partial result set received in response includes the requested fields of the records that meet the requested criteria. The query execution module 620 can then locally perform the averaging function over one or more particular fields of the records included in this partial result set to generate the next partial result. The query execution module can also evaluate the received partial result set itself to determine if the partial result set complies with the runtime ruleset.

As illustrated in FIG. 6G, the runtime compliance module 625 can evaluate each partial result generated by the database system 112 and/or generated locally by the query execution module 620, prior to performing a next partial query. While each partial result set complies with the runtime ruleset, subsequent partial queries are executed. However, once any of the partial results do not comply with the applicable rules in the runtime ruleset, the query execution module can forego execution of the remaining ones of the partial queries.

For example, as illustrated in FIG. 6G, the query execution module facilitates execution of partial query i to determine partial result set i, for example, as a result of partial queries 1 to (i−1) having already been performed and their corresponding partial results sets 1 to (i−1) having already been determined to comply with the runtime rules. The runtime compliance module evaluates partial result set i to generate compliance data i. In this case, the compliance data indicates the runtime rules are adhered to, and thus the query execution module is instructed to continue processing the query. In response, the query execution module can facilitate execution of partial query i to determine partial result set (i+1). The runtime compliance module evaluates partial result set (i+1) to generate compliance data (i+1). In this case, the compliance data indicates at least one runtime rule was not adhered to, and thus the query execution module is instructed to abort further processing of the query. The runtime compliance data can indicate that the compliance failed with partial result (i+1).

The error message returned to the user can include the partial query (i+1) itself or can include other information regarding the particular partial query (i+1) that caused the noncompliance via partial result (i+1). The error message can alternatively or additionally include information indicating which rule of the runtime ruleset failed. However, the error message can be generated to omit the partial query result set (i+1), as this partial query result set (i+1) may be too private and/or may not be assessable by the user given their subscription level, as indicated in the failure of the partial query result set (i+1) to comply with the runtime ruleset. In some embodiments, partial queries 1-i and/or information regarding their corresponding result sets 1-i can be returned to the user in the error message, as these result sets did comply with the runtime ruleset.

Because compliance can be separately evaluated prior to execution and once execution has commenced as discussed in conjunction with FIGS. 6A-6G, queries can be evaluated for adherence with pre-execution rules before they are transmitted to the query processing module. In some embodiments, user devices 140 can be operable to perform some or all of the functionality of the pre-execution compliance module 610 discussed herein for proposed queries generated by end users via GUI 345. For example, the pre-execution compliance module 610 can be implemented as a complier running on user device 140, enabling a user to generate proposed queries for evaluation, where only queries that are deemed to comply with the pre-execution ruleset are transmitted to the query processing module for execution.

Figure 7A:
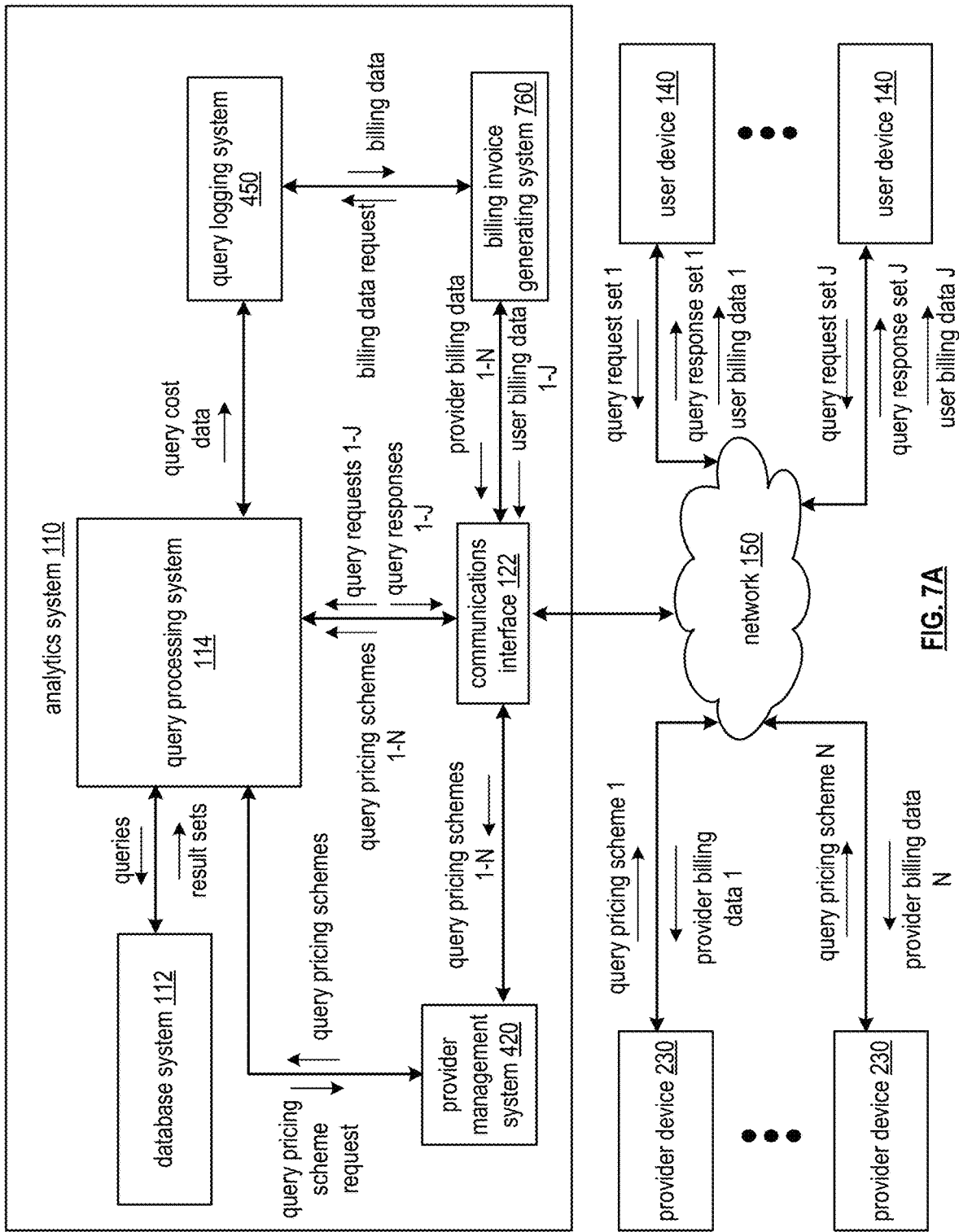
FIG. 7A is a schematic block diagram of an embodiment of an analytics system in accordance with various embodiments of the present invention.
Figure 7B:
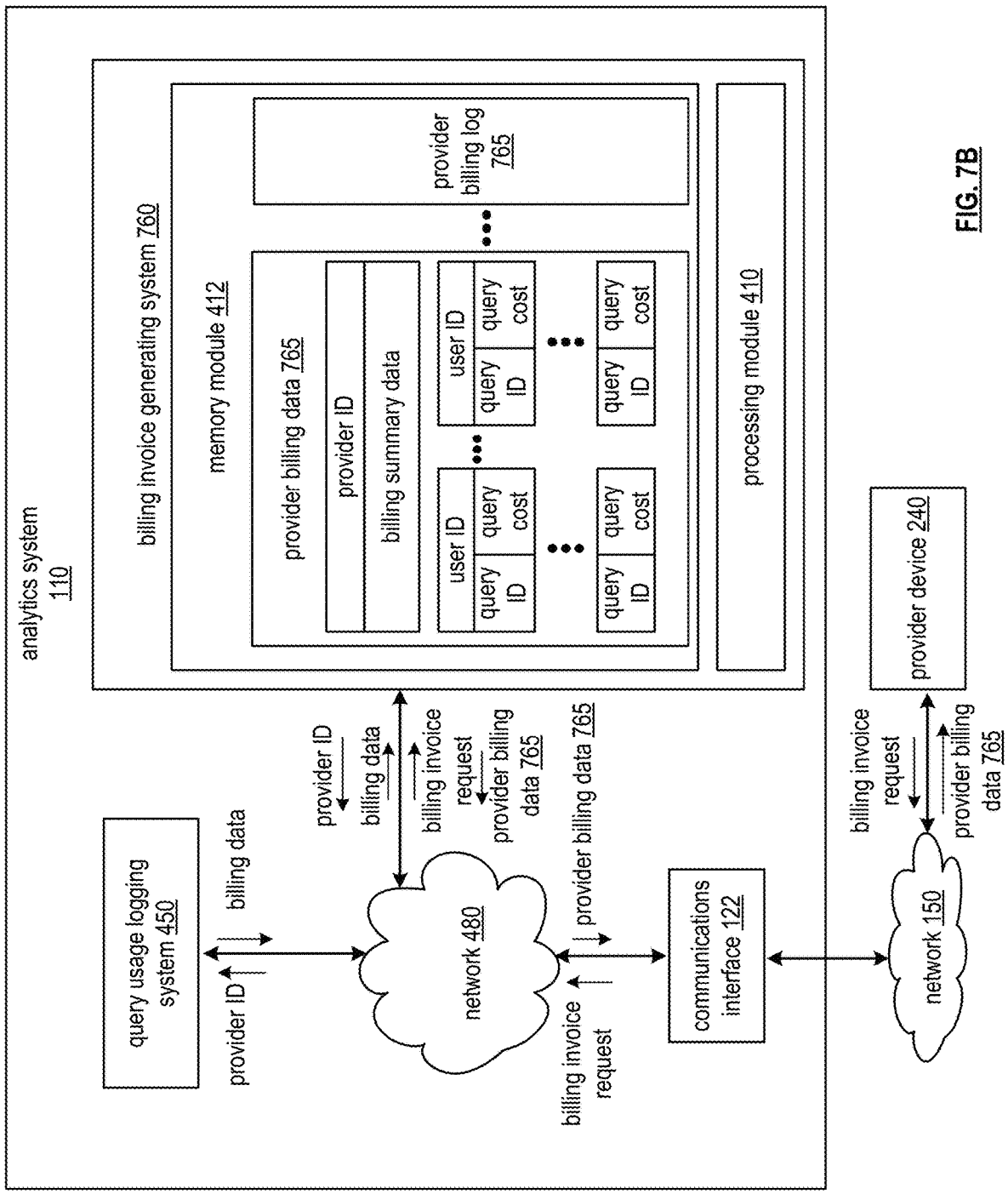
FIG. 7B is a schematic block diagram of an embodiment of an analytics system that includes a billing invoice generating system in accordance with various embodiments of the present invention.
Figure 7C:
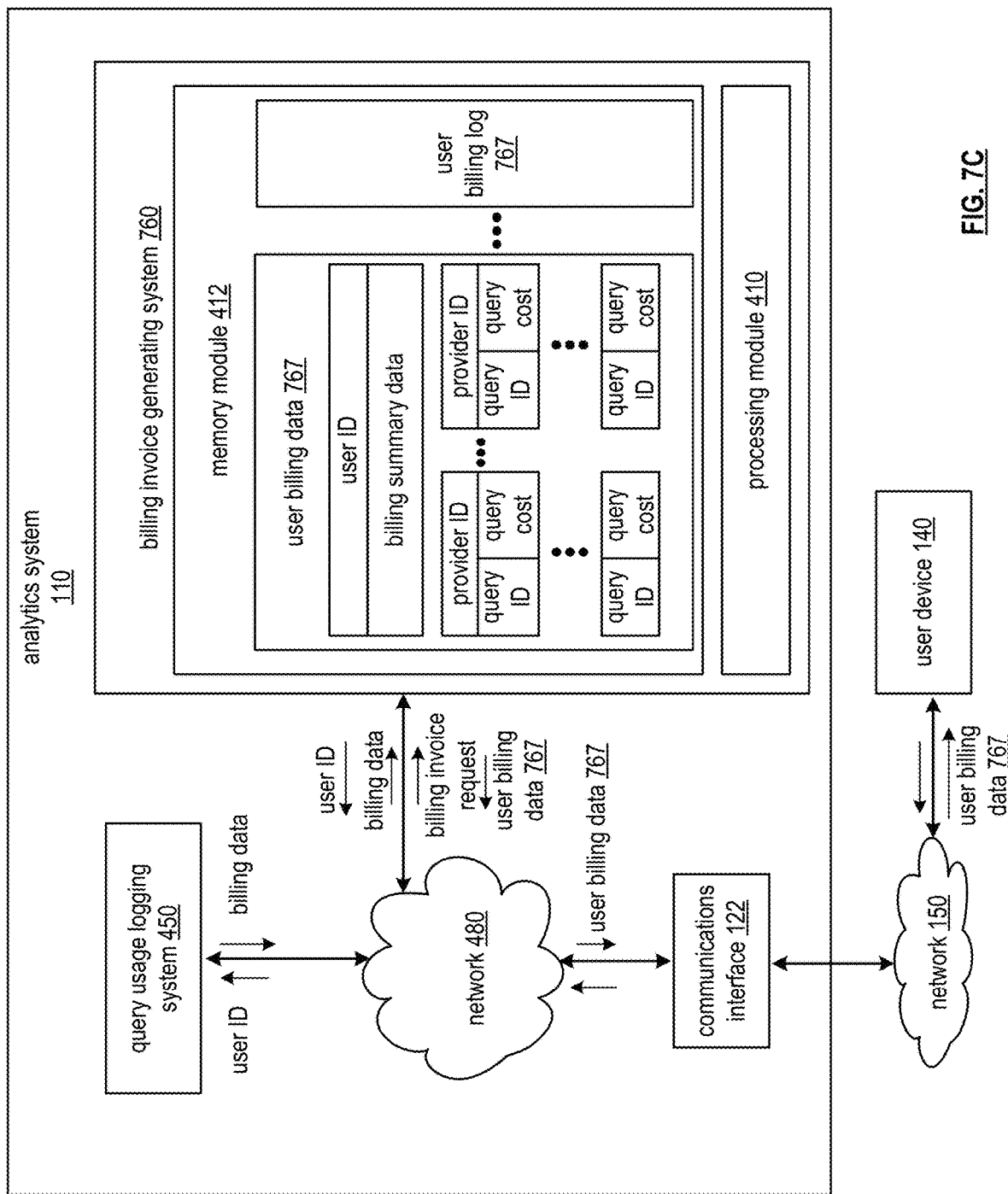
FIG. 7C is a schematic block diagram of an embodiment of an analytics system that includes a billing invoice generating system in accordance with various embodiments of the present invention.

FIGS. 7A-7C illustrate embodiments of an analytics system 110 that utilizes at least one query pricing scheme to generate billing data for queries executed for end users. Alternatively or in addition to generating compliance data to determine whether queries comply with configured rulesets, the analytics system 110 can be operable to determine pricing rates for queries that are performed over time. In some cases, all types of queries can be priced at a same rate, across all users, and/or for data provided by all providers. However, a dynamic pricing scheme can be advantageous, as differing types of queries can have differing valuations, and/or as differing providers may wish to configure their own pricing schemes.

As illustrated in FIG. 7A, the analytics system 110 can receive query pricing scheme data from a plurality of provider devices 1-N. For example, some or all query pricing schemes can be generated by the corresponding provider device 230 based on user input to GUI 245 in response to one or more prompts displayed by the GUI 245. In particular, the execution of the provider application data by provider device 230 can enable the provider device to display prompts to enter user input corresponding to one or more entries and/or selections by the user corresponding to configuration of their query pricing scheme. In some embodiments, a query pricing scheme can be configured by a corresponding data provider in conjunction with the configuration of their query ruleset via GUI 245, and/or the query pricing schemes can be sent in conjunction with the query rulesets. Each query pricing scheme can indicate dynamic pricing functions and/or relationships for use of records stored by the analytics system 110 that are supplied by the corresponding data provider associated with the provider device that generated the query pricing scheme.

In some cases, only one query pricing scheme is received, for example, from an administrator and/or regulatory entity, and this query pricing scheme data applies to queries that involve data supplied by all providers. In some cases, this can be utilized as a superseding query pricing schemes, for example, setting query pricing maximums, minimums, and/or other query pricing rules that must be adhered to by the query pricing schemes corresponding to data providers.

The analytics system 110 can store the query pricing schemes 1-N in the provider management system 420, for example, as billing structure data in entries for the corresponding data providers in provider profile database 424 and/or otherwise mapped to the provider ID for the corresponding data provider entity. One or more query pricing schemes can be accessed by the query processing system 114, for example, where particular query pricing schemes for one or more particular data providers are retrieved by the query processing system 114 in response to receiving a query request that involves access to data supplied by the particular one or more data providers and/or returns data supplied by the particular one or more data providers. Alternatively or in addition, these query pricing schemes 1-N can be sent directly to the query processing system 114 for local storage, enabling the query processing system to utilize the locally stored query pricing schemes in conjunction with processing queries.

The query processing system 114 can receive sets of queries in one or more transmissions over time from each of a set of user devices 1-J. Alternatively or in addition to generating compliance data and executing queries only when they comply with all applicable rules 555, the query processing system 114 is operable to generate query cost data for every incoming query and/or for only the incoming queries with compliance data indicating their corresponding query results can be returned to the requesting user device 140. The query cost data can be sent to the query logging system 450 in conjunction with each received query, each executed query, and/or each query that complied with the ruleset 550. For example, the query cost data for a query can be stored as billing data of the corresponding entry 455 of the database usage log 454.

The query cost data for a particular query can indicate a single monetary value associated with the cost of the query, for example, in accordance with a particular currency configured in accordance with one or more corresponding query pricing schemes utilized to generate the query cost data. The query cost data can indicate and/or be generated in accordance with a plurality of subtotals, for example, each with a corresponding monetary value, corresponding to multiple costs induced by the query. For example, a single cost total can be indicated as a summation of the plurality of subtotals. Some or all of the plurality of subtotals can correspond to individual costs for each of a plurality of query functions performed in execution of the query. Some or all of the plurality of subtotals can correspond to individual costs for each of a plurality of records accessed in execution of the query.

Some or all of the plurality of subtotals can correspond to individual costs for each of a plurality of data providers that supplied data involved in the query. In such cases, a subset of the plurality of subtotals can correspond to costs charged by the analytics system 110 itself, while at least one other subset of the plurality of subtotals can correspond to costs charged by at least one corresponding data provider for the use of their data.

For example, at least a portion of the query total charged to the end user is owed to the analytics system and/or is ultimately paid to the analytics system, where a plurality of subtotals of the query total are each generated based on query pricing schemes configured by and/or otherwise associated with a plurality of entities, where the plurality of entities includes the entity associated with the analytics system 110 and further includes some or all of a set of data provider entities that supplied data involved in the query.

As another example, the query cost determined to be owed to the entity associated with the analytics system 110 based on the query pricing scheme of the entity associated with the analytics system 110 can be charged to data providers rather than being charged as an additional cost to the end user. For example, this query cost owed to the entity associated with the analytics system 110 can be subdivided into one or more analytics system query cost subtotals, where each of the one or more analytics system query cost subtotals are subtracted from a corresponding query cost determined to be owed to a corresponding data provider. These analytics system query cost subtotals can be different for different data providers, for example, where the ratios between a set of analytics system query cost subtotals can be directly proportional to the corresponding ratios between the set of query cost totals for the corresponding set of data providers.

For example, a first data provider and a second data provider involved in a query are determined to be owed a first query cost and a second query cost from the end user, where the first query cost is higher than the second query cost. The analytics system is determined to be owed a third query cost, which is charged to the first data provider and the second data provider. The third query cost is subdivided into a first subportion and a second subportion, where the first subportion is subtracted from the first query cost owed to the first data provider and where the second subportion is subtracted from the second query cost owed to the second data provider. Alternatively the first data provider is charged the cost of the first subportion for payment to the entity associated with the analytics system, and the second data provider is charged the cost of the second subportion for payment to the entity associated with the analytics system. The first subportion is greater than the second subportion based on the first query cost being higher than the second query cost.

As another example, the analytics system 110 can charge a fixed and/or dynamic percentage of the cost of the query induced by query pricing schemes set by one or more individual data providers, where this additional charge is added to the cost of the query induced by the query pricing schemes of the one or more individual data providers. Alternatively, individual data providers can each charge a fixed and/or dynamic percentage of the cost of the cost of the query induced by query pricing schemes set by an administrator of the analytics system 110 when the query involves use of their data, where this additional charge is added to the cost of the query induced by the query pricing scheme set by the administrator of the analytics system 110.

Alternatively or in addition, the query cost data can indicate a required user subscription level to perform the query. In such cases, execution of the query and/or transmission of the query results to the end user can optionally be foregone when the end user that requested the query is not subscribed to a subscription plan for at least the required subscription level. For example, the query cost data can indicate compliance data and/or be generated in conjunction with determining compliance data for query rules with a required user subscription level. In other cases, the query can be executed, and the query cost data can indicate the advancement of the user to the corresponding required subscription level and/or can indicate the monetary cost associated with the advancement of the user to the corresponding required subscription level. In some cases, the user can be provided the option to receive the query results, given they choose to provide payment to advance to the required subscription level for the current temporal subscription period, where they will not receive the query results if they choose not to advance to the required subscription level for the current temporal subscription period.

Alternatively or in addition, the query cost data can indicate a billing period the cost of the query falls within, can indicate a payment deadline for payment of the cost of the query by the end user, and/or can indicate other temporal information associated with the cost of the query. This can include interest rate data and/or other information indicating a rate of increase in cost owed as a function of the amount of time from the execution of the query and/or transmission of query results to the user.

The query logging system 450 can send this billing data to a billing invoice generating system 760, for example, in predetermined intervals, in time periods corresponding to subscription time frames and/or recurring subscription payments, in response to a request received by the billing invoice generating system, based on a request received from a user device 140 and/or provider device 230, based on configurations of generation of billing data stored by the provider management system for particular providers, and/or based on another determination. In particular, the query logging system 450 can send raw query cost data and/or aggregated query cost data for entries corresponding to one or more particular users and/or one or more particular providers within a given timeframe. For example, a request from the billing invoice generating system 760 can indicate the timeframe, particular provider ID, particular user ID, and/or whether the raw query cost data should be received or a particular type of aggregation upon the raw query cost data should performed. For example, the billing invoice generating system can request a summation of query costs for all queries performed by a particular user that involved data supplied by a particular provider, within a particular timeframe corresponding to a billing period. In some cases, the request can indicate a SQL query or other query to the query logging system 450 for such requested information.

The billing invoice generating system 760 can be implemented as an additional analytics subsystem 405, for example, operable to perform its functionality via a processing module 410 and memory module 412, communicating with other subsystems 405 such as the query logging system 450 via the network 480. Alternatively, the billing invoice generating system 760 can be a separate entity from the analytics system 110, where query cost data is communicated to the billing invoice generating system 760 via transmissions sent by communications interface 122 via network 150 and/or another communication channel.

For example, the billing invoice generating system 760 can be implemented in conjunction with a billing service such as a payment platform, banking service, credit card service, and/or other billing service. In particular, such a billing service can be responsible for facilitating the charging of end users for costs accrued for performance of their queries over time, for example, within each billing period. The billing service can alternatively or additionally be responsible for receiving payments, for example, as virtual payment transactions, from the end users based on the charges sent to the end users. The billing service can alternatively or additionally be responsible for determining whether payment by each user for some or all charges in conjunction with the query costs for their queries was posted by the end user and/or received by the billing service, by the analytics system 110, and/or corresponding data providing entity. The billing service can alternatively or additionally be responsible for facilitating payments for query costs to an entity associated with the analytics system 110 itself and/or to corresponding data providing entities, for example, in response to these query costs being received and/or otherwise paid by the corresponding end users. The billing service can alternatively or additionally be responsible for determining whether some or all necessary payments by end users to the corresponding data provider entities, as indicated by the query cost data generated in a billing period and/or over time, have been facilitated, received, and/or completed. Some or all of this functionality for such a billing service can be implemented via an additional subsystem 405 of the analytics system that is responsible for facilitating, managing, and/or tracking payments. Alternatively or in addition, some or all of this functionality for such a billing service can be implemented via an external payment platform that receives billing data, query cost data, and/or otherwise communicates with the analytics system 110 via network 150.

The billing invoice generating system 760 can utilize the received billing data to generate invoices and/or otherwise aggregate and/or provide line-item billing data for each particular provider 1-N as provider billing data. For example, each provider can receive information indicating line-item and/or total query costs charged to some or all users within the billing period for use of their data. In some cases, the billing data received by a data provider entity can be utilized by the data provider entity to charge one or more end users for one or more queries, as indicated in the billing data, where the data provider entity manages, tracks, and facilitates its own receipt of payment for queries from the end users via its own billing service.

In some cases, the billing data 1-N can be generated and/or transmitted in conjunction with the audit logs 1-N, where the timeframe utilized to generate an audit log for a provider can be the same as the timeframe utilized to generate the billing data for the corresponding provider. In such embodiments, the billing invoice generating system 760 can be implemented by utilizing the audit log generating system 460. In such cases, each audit log 465 can be generated to further include the query cost data for each query, alternatively or in addition to the compliance data or other usage log entry data for each query in the audit log. Each audit log 465 can be generated to further include summations of costs charged to particular users, for particular types of queries, and/or other summary information alternatively and/or in addition to the restriction compliance summary data.

The billing invoice generating system 760 can utilize the received billing data to generate invoices and/or otherwise aggregate and/or provide line-item billing data for each particular user 1-J as user billing data. For example, each end user can receive information indicating line-item and/or total query costs owed to the analytics system 110. Alternatively, billing data can be sent for each query, for example, in conjunction with transmission of the corresponding query response. In some cases, the query response is not available to the end user and/or is not transmitted to the end user until the analytics system 110 detects that the cost for the query response, as indicated in the query cost data, has been paid by the end user. The analytics system 110 and/or a billing service can process, track, and/or manage payments received from end users, and can optionally subdivide these payments by data provider into a plurality of sub-payments. The analytics system 110 and/or a billing service can facilitate delivery of a plurality of such payments and/or sub-payments to the appropriate data providing entity and/or to an entity associated with the analytics system 110 itself.

FIG. 7B illustrates an example of a billing invoice generating system 760 that generates provider billing data 765 for one or more providers. Provider billing data 765 can correspond to billing data specific to a particular provider, indicating query costs that have accrued for data supplied by the provider and/or are owed to the provider by one or more end users. This provider billing data 765 can be transmitted to a corresponding provider device 230, for example, for display via a GUI 245. The provider billing data 765 can alternatively or additionally be transmitting to a billing service and/or payment platform responsible for collecting payment from end users and/or delivering payment to one or more data providers.

The billing invoice generating system 760 can generate provider billing data 765 in response to receiving a billing invoice request from the provider device 230 and/or can be in response to configuration data indicating times and/or formats by which billing data should be generated and transmitted by the billing invoice generating system 760. Alternatively, the provider billing data 765 for some or all providers is generated automatically based on determining a predetermined time period has elapsed and/or based on determining the end of a billing period has been reached.

The billing invoice generating system 760 can retrieve query cost data and/or other information from corresponding entries 455 of the database usage log 454 from the query logging system 450, for example, by transmitting a query and/or other request for this information for entries with billing data indicating non-zero query costs for the particular provider, denoted by their provider ID, and/or for entries of queries involving usage of data supplied by the particular provider. The query cost data of such entries can be received in response, for example, mapped to their corresponding user ID, query data, and/or result set data utilized to generate the provider billing data.

The provider billing data 765 can include billing summary data, such as: a total cost of queries in the billing period; an average cost per query in the billing period; an average cost and/or total cost per queries of a certain type; an total cost yielded for and/or level of demand determined for certain records, certain types of records, certain fields, and/or particular combinations of fields within the billing period; and/or other summary information regarding data usage of the provider's data and/or costs of queries involving the providers data within the billing period. For example, queries to the database usage log 454 and/or analytics performed upon query data and/or result set data of retrieved entries 455 can be utilized to generate some or all of this summary data.

Alternatively or in addition, the provider billing data 765 can be broken down by user, for example, where line-item query costs and/or summations of query costs over multiple queries are indicated for each end user separately. The end users can be grouped and/or sorted by level of usage, by total query cost, and/or by subscription level. Summary data regarding queries and/or data usage by particular users can further be indicated. This information can be utilized by a data provider entity and/or billing service to determine how much is owed to the data provider entity by each end user individually.

In some cases, aggregated provider billing data is generated to indicate the provider billing data 765 of multiple and/or all providers. This information can be utilized by a central billing service to facilitate payments and/or can be sent to a provider device 230 corresponding to an administrator and/or regulating entity of the analytics system 110.

FIG. 7C illustrates an example of a billing invoice generating system 760 that generates user billing data 767 for one or more end users. User billing data 767 can correspond to billing data specific to a particular end user, indicating query costs that have accrued for queries requested by the end user and/or for query results generated for and/or transmitted to the end user, and/or indicated query costs are owed by the end user by one or more data provider entities and/or to an entity associated with the analytics system 110. This user billing data 767 can be transmitted to a corresponding user device 140, for example, for display via a GUI 345. The user billing data 767 can alternatively or additionally be transmitting to a billing service and/or payment platform responsible for collecting payment from end users and/or delivering payment to one or more data providers.

The billing invoice generating system 760 can generate user billing data 767 in response to the analytics system 110 processing one or more queries for the corresponding end user, in response to a request, in response to receiving billing invoice request from one or more provider devices 230, and/or in response to configuration data indicating times and/or formats by which billing data should be generated and transmitted by the billing invoice generating system 760. Alternatively, the user billing data 767 for some or all end users is generated automatically based on determining a query result has been transmitted to the corresponding end user, a predetermined time period has elapsed, and/or the end of a billing period has been reached.

The billing invoice generating system 760 can retrieve query cost data and/or other information from corresponding entries 455 of the database usage log 454 from the query logging system 450, for example, by transmitting a query and/or other request for this information for entries indicating the end user requested the corresponding query, denoted by their user ID, and/or for entries for the user ID with billing data indicating non-zero costs. The query cost data of such entries can be received in response, for example, mapped to their corresponding one or more provider IDs, query data, and/or result set data utilized to generate the user billing data. Alternatively or in addition, the billing invoice generating system 760 can utilize the subdivided billing data generated for individual users for some or all data providers in conjunction with the generation of provider billing data 765 of FIG. 7B. For example, for each same end user, denoted by user ID, provider billing data 765 for some or all data providers can be aggregated to generate determine query costs for each end user across the multiple providers.

The user billing data 767 can include billing summary data, such as: a total cost of queries in the billing period; an average cost per query in the billing period; an average cost and/or total cost per queries of a certain type; an total cost yielded for and/or level of demand determined for certain records, certain types of records, certain fields, and/or particular combinations of fields within the billing period; and/or other summary information regarding data usage by the end user and/or costs of queries by the end user within the billing period. For example, queries to the database usage log 454 and/or analytics performed upon query data and/or result set data of retrieved entries 455 can be utilized to generate some or all of this summary data.

Alternatively or in addition, the user billing data 767 can be broken down by data provider, for example, where line-item query costs and/or summations of query costs over multiple queries are indicated for each data provider user separately. This can alternatively or additionally include line-item query costs and/or summations of query costs owed to the analytics system 110. The data providers can be grouped and/or sorted by number of queries and/or by total query cost Summary data regarding queries and/or data usage involving each individual data provider can further be indicated. This information can be utilized by the end user and/or billing service to determine the separate costs owed by the end user to each data providing entity.

Figure 8A:
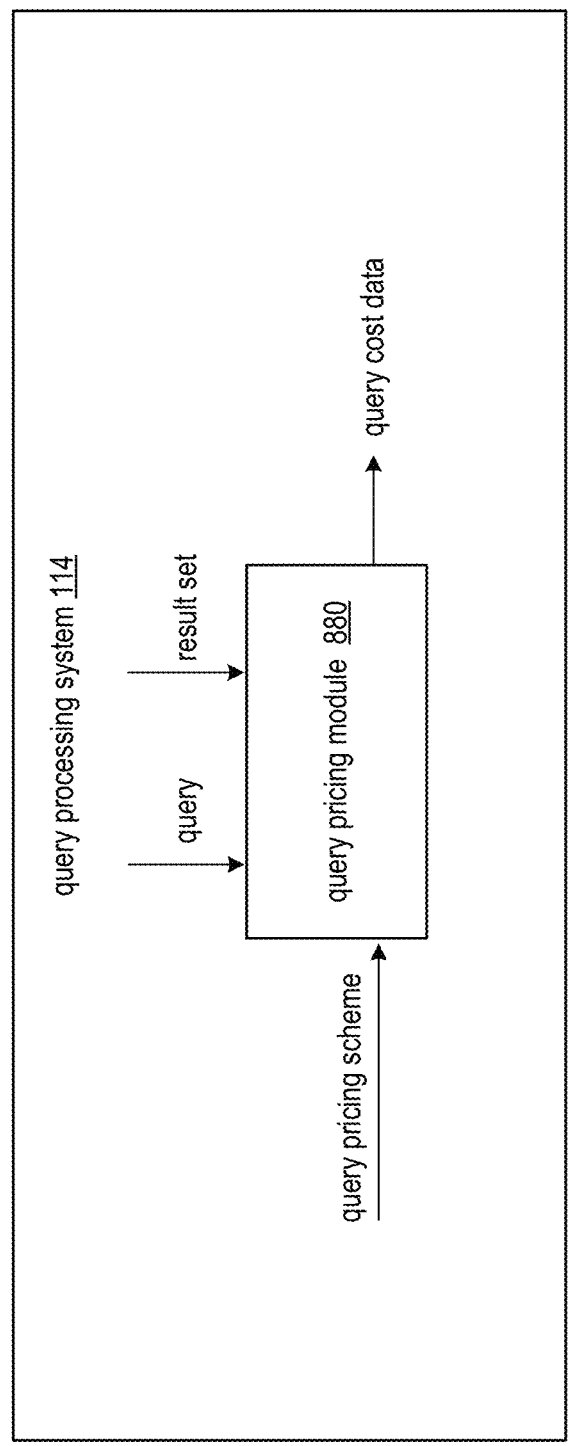
FIG. 8A is a schematic block diagram of an embodiment of an analytics system that implements a query pricing module in accordance with various embodiments of the present invention.

FIGS. 8A-8F illustrate example embodiments of a query processing system 114 configured to generate query cost data based on one or more query pricing schemes set by one or more data providers. As illustrated in FIG. 8A, a query processing system 114 can be operable to implement a query pricing module 880. The query pricing module 880 can access one or more query pricing schemes from local memory of the query processing module, from the provider management system, and/or from other memory of the analytics system 110. The query pricing module 880 can utilize a given query and/or a result set data of the given query to generate query cost data. This result set data can include a final value, final result set, partial value, and/or partial result set generated based on facilitation of full and/or partial execution by the query, for example, by utilizing the query execution module 620 of the query processing system 114 and/or by otherwise generating final and/or partial query results based on sending query commands of the query to the database system 112 for execution against the database system 112. In particular, the query cost data can indicate a query cost total, and/or one or more query cost subtotals, generated as a function of the query and/or the result set, as dictated by the query pricing scheme.

The query pricing module 880 can be implemented in conjunction with the compliance module 580, where query cost data is generated in conjunction with the compliance data for example, to generate a query entry 455 with regulatory compliance data and billing data. In such embodiments, the query processing system 114 can be operable to only generate query cost data with a non-zero cost when the compliance data for the query indicates compliance. For example, this can be favorable in ensuring that end users are not charged for queries whose query results were not received by these end users due to non-compliance with one or more rules. In other embodiments, the query processing system 114 can be operable to generate query cost data with a non-zero cost based on any execution costs of the query, such as costs associated with performance of particular functions in full or partial execution of the query by the query execution module 620 in conjunction with generating runtime compliance data, even when the query is determined to be non-compliant. For example, this can be favorable in ensuring that end users are charged for usage of time and resources of the analytics system 110 even if the results of the query are ultimately not delivered to the end user due to non-compliance. In such cases, the query costs of a non-compliant query can include only costs to an entity associated with the analytics system 110 based on resources utilized to execute partial queries and/or the entire query, where query costs to data providers are zero and/or not included in the query cost data as a result of the end user not being provided with a query result, even if this query result included and/or was derived from data supplied by these data providers, and/or even if this query result would otherwise induce a non-zero query cost if it were to be delivered to the end user.

Figure 8C:
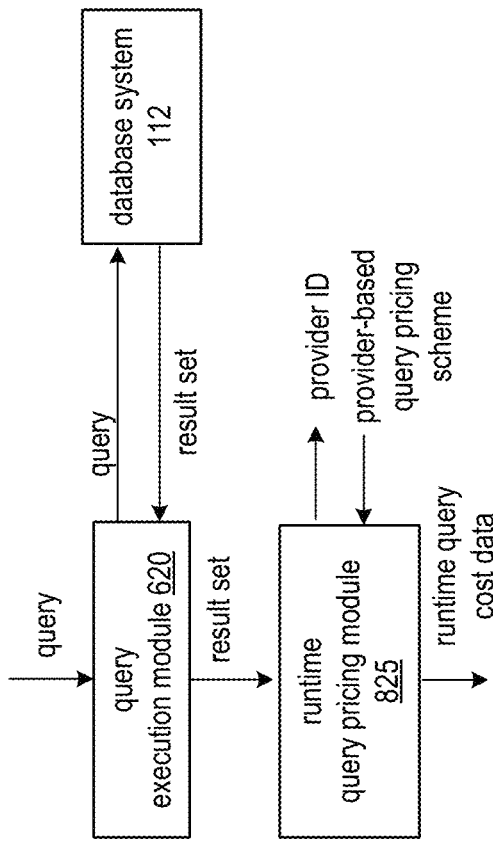
FIG. 8C is a schematic block diagram of a runtime query pricing module in accordance with various embodiments of the present invention.
Figure 8B:
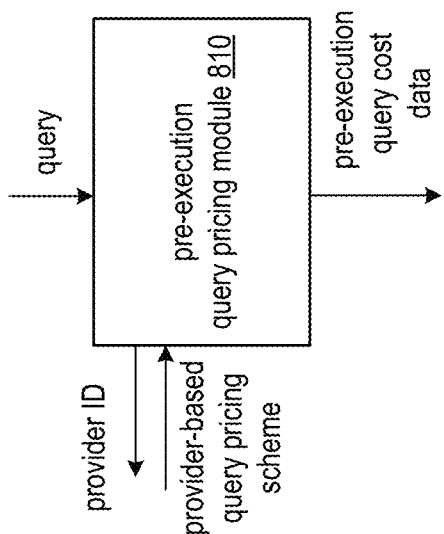
FIG. 8B is a schematic block diagram of a pre-execution query pricing module in accordance with various embodiments of the present invention.

FIG. 8B illustrates an example embodiment of a pre-execution query pricing module 810, which can be implemented by utilizing the query pricing module 880 to generate some or all of the query cost data. The pre-execution query pricing module 810 can be utilized to generate query pricing data based on the query alone, without utilizing any result set data for the query and/or before any execution of the query is commenced. The pre-execution query pricing module 810 can be implemented in conjunction with the pre-execution compliance module 610, for example, where the query pricing data is generated based on some or all of the same information extracted from the query utilized to generate the pre-execution compliance data. In particular, the query functions and/or fields involved in the query can be utilized to generate query pricing data without necessitating execution of the query.

In some embodiments of the pre-execution query pricing module 810, the query cost data is generated based on one or more provider-based query pricing schemes, such as a single provider pricing scheme and/or subset of provider pricing schemes 1-N received from the provider devices 230. In particular, the query cost data can be generated in conjunction with query pricing schemes dictated by one or more particular providers whose data is accessed in the query. In such embodiments, the appropriate query pricing schemes can be retrieved and/or accessed based on determining a corresponding provider ID. For example, particular table IDs and/or field IDs indicated in the query and/or extracted from the query can be utilized to determine the one or more providers that supplied the data accessed in the query, and the corresponding provider ID can be utilized to retrieve and/or otherwise access the corresponding provider pricing scheme. This can be accomplished in a similar fashion as performed by the pre-execution compliance module 610 of FIG. 6D. The pre-execution query pricing data can be generated as a function of the query alone, based on the applicable one or more query pricing schemes. Alternatively, a query pricing scheme configured for the analytics system 110 as a whole can be accessed and utilized to generate the query pricing data based on the query.

FIG. 8C illustrates an example embodiment of a runtime query pricing module 825, which can be implemented by utilizing the query pricing module 880 to generate some or all of the query cost data. The runtime query pricing module 825 can be utilized to generate query pricing data based on one or more partial results, such as one or more result sets generated in conjunction with execution of the query, and/or based on the final result returned to the end user. For example, this result set data can be generated by utilizing the query execution module 620 to execute the query against the database system 112. The runtime query pricing module 825 can be implemented in conjunction with the runtime compliance module 625, for example, where the query pricing data is generated based on some or all of the same information extracted from the result set utilized to generate the runtime compliance data. In particular, the result set size, particular records included in the result set and/or resource consumption information determined based on execution of the query can be utilized to generate query pricing data once execution of the query has commenced and/or once execution of the query has completed.

In some embodiments of the runtime query pricing module 825, the query cost data is generated based on one or more provider-based query pricing schemes, such as a single provider pricing scheme and/or subset of provider pricing schemes 1-N received from the provider devices 230. In particular, the query cost data can be generated in conjunction with query pricing schemes dictated by one or more particular providers whose data is accessed in the query. In such embodiments, the appropriate query pricing schemes can be retrieved and/or accessed based on determining a corresponding provider ID. For example, one or more provider IDs can be extracted from one or more particular records included in the final result set and/or partial result set to determine the one or more providers that supplied the data included in result sets of the query. The corresponding provider ID can be utilized to retrieve and/or otherwise access the corresponding provider pricing scheme. This can be accomplished in a similar fashion as performed by the runtime compliance module 625 of FIG. 6E. The runtime query pricing data can be generated as a function of the result set, based on the applicable one or more query pricing schemes. In Alternatively, a query pricing scheme configured for the analytics system 110 as a whole can be accessed and utilized to generate the query pricing data based on the result set.

In some embodiments, the query pricing module 880 is implemented by utilizing only the pre-execution query pricing module 810, where the pre-execution query cost data reflects the entirety of the query cost data. Alternatively, the query pricing module 880 is implemented by utilizing only the runtime query pricing module 825, where the runtime query cost data reflects the entirety of the query cost data. This embodiment can be preferred, as the most information is available to generate a most-comprehensive query cost based on the most criteria. In such cases, the runtime query pricing module can utilize only the result set, or can utilize both the query and the result set, to generate the query cost data.

Figure 8D:
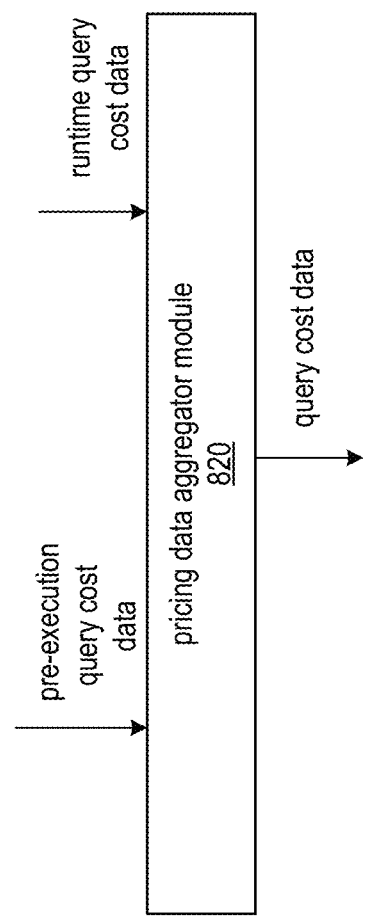
FIG. 8D is a schematic block diagram of a pricing data aggregator module in accordance with various embodiments of the present invention.

FIG. 8D illustrates an embodiment where the query pricing module 880 is implemented by utilizing both a pre-execution query pricing module 810 and a runtime query pricing module 825. The pre-execution query cost data and runtime query cost data can be combined via a pricing data aggregator module 820 implemented by the query pricing module 880 to generate the final query cost data.

In some embodiments, the pre-execution query pricing module 810 and a runtime query pricing module 825 are implemented separately on the query and result set, respectively. In such cases, the pre-execution query pricing module 810 and a runtime query pricing module 825 can each be responsible for determining distinct subtotals of the query cost data based on distinct criteria. For example, the pre-execution query pricing module 810 can generate its subtotal based on fields utilized in the query and/or functions utilized in the query, while the runtime query pricing module 825 can generate its subtotal based on the type and/or number of records included in the result set. In such cases, the pricing data aggregator module 820 can simply sum the subtotals generated by the pre-execution query pricing module 810 and runtime query pricing module 825. In such embodiments, the pre-execution query pricing module 810 can process the query to generate its subtotal at any time, even if execution of the query has already commenced and/or been completed.

In some embodiments of utilizing both a pre-execution query pricing module 810 and a runtime query pricing module 825, pre-execution query data is generated based on a query request to generate a pricing estimate and/or a base price quote for transmission and/or display via GUI 345 to end users prior to execution of the query. In such embodiments, the end users can determine whether they wish to proceed with the query given the pricing estimate and/or a base price quote. For example, the query is only executed by the query execution module 620 when the end user indicates they wish to proceed with execution of the query. This can be based on the end user further indicating they agree to pay the final cost of the query, given their analysis of the pricing estimate and/or a base price quote, where the query is only executed when the end user indicates they agree to pay for the final cost of the query. Such embodiments are discussed in further detail in conjunction with FIGS. 14A-14E.

In such cases, the runtime query pricing module can be utilized to determine an actual price and/or to generate any remaining costs that could not be determined from the query alone. In such embodiments, the runtime query price data can dictate the final query cost and/or can be summed with some or all of the pre-execution query costs that correspond to final, actual subtotals as a function of the query. In such cases, the pricing data aggregator module 820 can sum only the distinct subtotals generated by the pre-execution query pricing module 810 and runtime query pricing module 825, for example, where pricing estimates provided by the pre-execution query pricing module 810 are not utilized to generate the final query cost data and only serve to provide estimate quotes to end users.

Figures 8E, 8F:
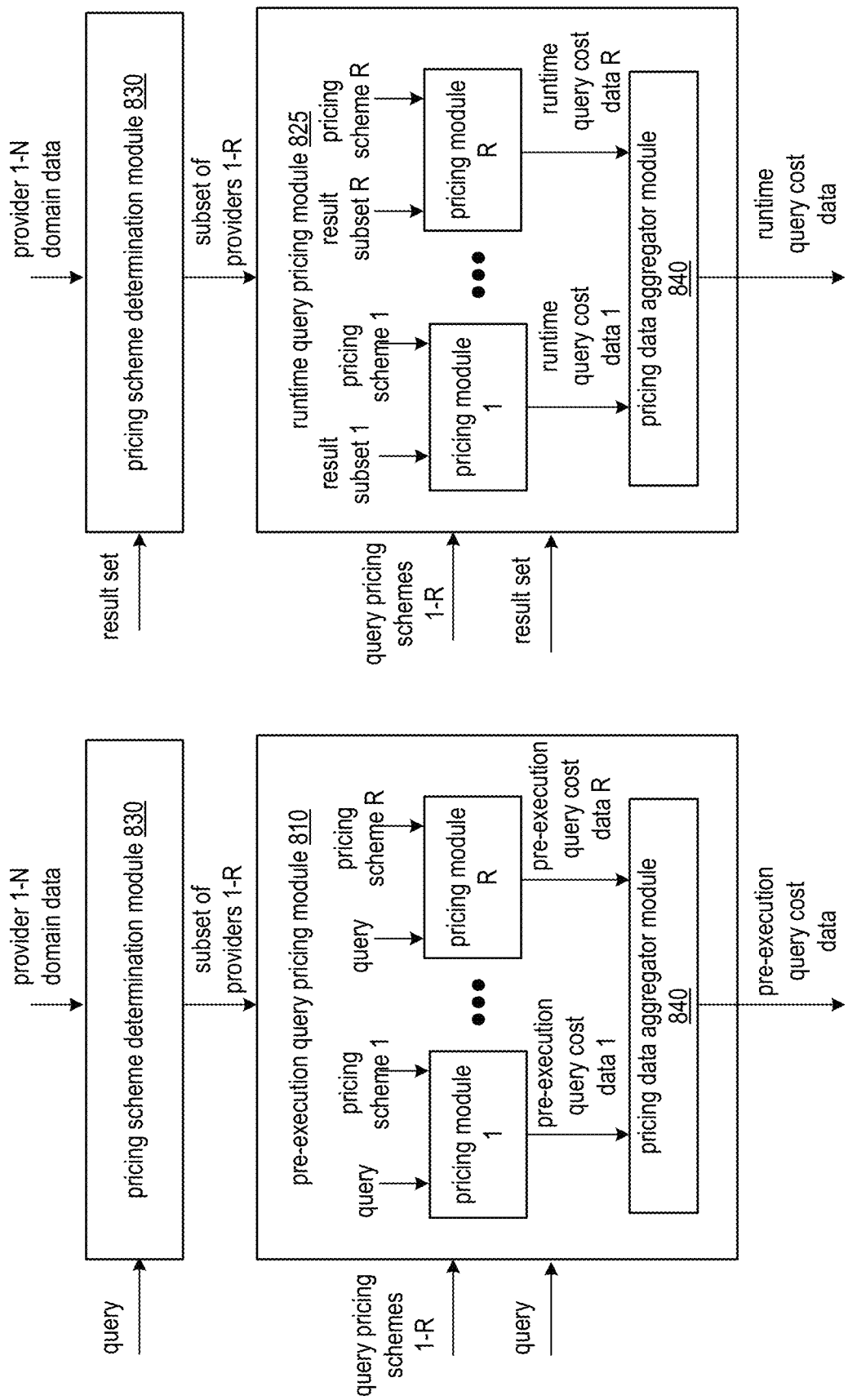
FIG. 8E is a schematic block diagram of a pre-execution query pricing module in accordance with various embodiments of the present invention.
FIG. 8F is a schematic block diagram of a runtime query pricing module in accordance with various embodiments of the present invention.

FIGS. 8E and 8F illustrate embodiments of a pre-execution query pricing module 810 and a runtime query pricing module 825, respectively, that generate separate query pricing data for multiple providers involved in the query. In some embodiments, these providers correspond only to providers whose records are included in a final result set returned in the execution of the query. In some embodiments, these providers include providers whose records are included result sets that are aggregated upon to ultimately generate a final result of the query. In some embodiments, these providers include providers whose records are utilized to filter result set, for example, accessed in executing a WHERE clause of a SQL query. In some embodiments, these providers correspond to any providers whose records are accessed, utilized, and/or otherwise involved in the execution of the query.

In such embodiments, a pricing scheme determination module 830 can be implemented by the query pricing module 880 to determine a subset of data providers whose respective query pricing schemes should be applied to the query to generate the total query cost. For example, domain data for each provider 1-N can be utilized to determine whether the given query utilizes data supplied by each data provider and/or whether the given result set includes records and/or is derived from records supplied from each data providers. The pricing scheme determination module 830 can output a subset 1-R of the plurality of data providers 1-N, for example, denoted by their respective provider IDs. The subset of data providers 1-R can include a single data provider, can include a proper subset of the plurality of data providers 1-N, and/or can include the entirety of the data providers 1-N.

Alternatively, the pricing scheme determination module 830 is not utilized, and query cost data is generated for every data provider 1-N. In such cases, the query cost data generated for some data providers can indicate zero cost to these data providers when these data providers did not supply data returned in or utilized by the query.

The pre-execution query pricing module 810 and runtime query pricing module 825 can utilize the subset of data providers 1-R determined to be involved in the query to access and/or retrieve the corresponding query pricing schemes 1-R for this subset of data providers. A plurality of pricing modules 1-R can be implemented based on the query and/or result set to generate query cost data for the corresponding data provider. Each pricing module 1-R can be implemented as its own pre-execution query pricing module 810 or runtime query pricing module 825 that is specifically designated to utilize the query pricing scheme for the corresponding data provider to generate query cost data for the corresponding data provider. In some embodiments, a particular pricing module of a runtime query pricing module 825 only receives a subset of the result set. In particular, the result set can be segregated into R distinct subsets, where each subset contains only the records of the result set supplied by the corresponding provider. Thus, the runtime query cost data for a particular provider can be based on only the portion of the result set that was supplied by the particular provider. In some cases, the query can similarly be segregated into different portions, for example, based on different fields and/or query functions that correspond to distinct ones of the subset of providers 1-R.

The subset of data providers 1-R can include an entity associated with the analytics system 110 itself, where a corresponding pricing module generates query cost data owed to the analytics system 110 based on the query pricing scheme configured for the analytics system 110. In such cases, the entirety of the result set and/or query can be utilized to generate this query cost data.

A pricing aggregator module 840 can consolidate the query cost data 1-R generated by the pricing modules 1-R of the pre-execution query pricing module 810 and runtime query pricing module 825. This can include summing the query cost data 1-R to generate a total cost of the query. Each of the query cost data 1-R can be indicated in the query cost data to distinguish the subtotals of the total cost of the query that are owed to each provider.

FIGS. 9A-9E illustrate embodiments of a query pricing module 880 that determines query cost data based on one or more particular query functions used in the query. In some cases, a query pricing scheme of one or more providers includes and/or utilizes a function-based query pricing scheme, where the total cost and/or subtotal of the total cost of the query is a function of the determined function valuation of the query. In some cases, the function-based query pricing scheme data can be specific to one or more particular functions, and the query pricing module 880 can retrieve the function-based query pricing scheme data for one or more particular functions indicated in the query based on function identifiers, function types, or other information regarding the functions utilized in the query.

As illustrated in FIG. 9A, function-based query pricing scheme data for one or more data providers can be retrieved by the pre-execution query pricing module 810, for example, based on one or more functions extracted from the query and/or determined based on the query. The function-based query pricing scheme data can be utilized to generate the query cost data as a function of one or more query functions determined to be included in the query. Similarly as illustrated in FIG. 9B, function-based query pricing scheme data for one or more data providers can be retrieved by the runtime query pricing module 825, for example, based on one or more functions determined to have been utilized to generate the result set and/or based on characteristics one or more partial result sets utilized as input to one or more query functions. The function-based query pricing scheme data can indicate, given a particular function or set of functions in the query, the total query cost, and/or a subtotal of the query cost induced by the function, charged by the corresponding data provider and/or charged by the analytics system.

In particular, differing functions can have differing valuations, and these differing valuations can dictate differing costs of queries that utilize different functions. Alternatively or in addition, particular ordered and/or unordered groupings of multiple functions can have differing valuations, and these differing valuations can dictate differing costs of queries that utilize differing groupings of multiple functions. Alternatively or in addition, the same type of function that utilizes different input and/or different parameters can differ in valuation based on the different input and/or different parameters. The differing function valuations can correspond to differing query costs, which introduce improvements to database systems and/or analytics systems by optimizing and/or otherwise improving the efficiency of the database system and/or analytics system by inducing prices to end users that are determined to automatically limit incoming queries and/or automatically limit database usage to a level that utilizes predetermined and/or achievable levels of recourse consumption and/or processing time of the database system and/or analytics system.

Function valuations of particular functions and/or types of functions can be configured in the query pricing scheme, for example, where a user of a provider device 230 dictates the relative and/or absolute valuations of different functions via user input to GUI 245. For example, the user can determine their own perceived valuation of various functions and/or generate the function valuations. Alternatively or in addition, the analytics system 110 can automatically generate function valuations for particular functions. As used herein, a query can include multiple functions that each have their own function valuation, where a function valuation can correspond to the valuation of each individual query function included in a query, such as a single query function within a query that includes a transaction of multiple function. Alternatively, the function valuation can correspond to the overall function valuation of the query as a whole, where a query has a single function valuation based on some or all functions performed in the query. Such a function valuation can be determined as a holistic evaluation of the query, for example, based on how data is being processed and/or what type of values and/or result set are returned in the query result. Alternatively, the function valuation for the query as a whole can be determined based on a summation of the plurality of individual function valuations for each of a plurality of individual query functions included in the query.

Function valuations can be a function of an analytics intensity value and/or can otherwise be a function of a determined level of the rigor of analytics and/or level of insight the particular function and/or group of functions provides. In such cases, the function valuation of a query as a whole can be an increasing function of a determined level of analytic rigor enabled by performance of one or more functions included in the query. A first query determined to utilize a higher level of analytical rigor can have a higher function valuation than a second query determined to utilize a lower level of analytical rigor.

For example, the analytics system 110 can be configured to train machine learning models and/or statistical models based on records in the database system and/or perform machine learning functions and/or statistical functions upon records in the database system. A query request from end users can request use of a previously trained machine learning model and/or can request that a new machine learning model be trained. Query functions that correspond to training of a machine learning model and/or usage of previously trained machine learning models that are a higher level of sophistication can have a higher function valuation than query functions that correspond to training of a machine learning model and/or usage of previously trained machine learning models that are at a lower level of sophistication. For example, query functions that corresponds to utilization of linear regression or naïve Bayes can have lower function valuations than other query functions that correspond to utilization of Support Vector Machines and/or neural networks. As another example, query functions that involve training a new machine learning model and/or generating inference data utilizing a custom machine learning model trained based of configurations by the end user can have higher valuations that query functions that involve generating inference data by utilizing a previously trained model and/or a machine learning model with default parameters. As another example, a query function grouping that includes a plurality of individual functions can have a higher function valuation an individual function.

Function valuations can be a function of a result set opacity value determined for the result set and/or can otherwise be a function of a determined level of opacity of the query result. For example, the function valuation of a query can be based on the level of aggregation and/or obfuscation that data undergoes in the query to arrive at the query result. In particular, the function valuation of a query can be a decreasing function of a determined level of aggregation that one or more functions of the query cause and/or can be a decreasing function of a determined level of obfuscation in the query result relative to the original raw values utilized to arrive at the query result. For example, a query that returns raw data of at least one field of at least one record can have a higher function valuation than a query that returns no raw data of any fields of any records. Furthermore, the function valuation can be a function of the number of records returned in the result set as raw data and/or the number of fields returned in these records returned as raw data, where the function valuation increases with the number of records and/or the number of fields.

In some cases, the function valuation of a first query that returns raw data for a set of records can have a first function valuation, a second query that performs a small number of aggregations on the same or different set of records where no raw data is returned can have a second function valuation, and a third query that performs a larger number of aggregations and/or more sophisticated analytics than the second query on the same or different set of records can have a third function valuation. The second function valuation can be lower than the first function valuation based on the second query not returning raw data like the first query. The second function valuation can also be lower than the third function valuation based on the second query performing less aggregations and/or less sophisticated analytics upon the records.

In some cases, the first query has a higher function valuation than the third query based on a determination that the returning of the raw data of a set of records is more valuable to the end user than the returning of analytic insights generated by the high level of aggregation and/or sophisticated analytics for the set of records. Alternatively, the first query can have a lower function valuation than the third query based on a determination that the returning of the raw data of a set of records is less valuable to the end user than the returning of the analytic insights for this set of records. For example, the user of provider device 230 and/or an administrator of the analytics system 110 can configure whether usage of records is deemed more valuable when returned as raw data or when utilized to generate rich analytic conclusions.

Function valuations can be a function of the resource consumption required to perform the query function and/or to perform all functions in the query. In particular, the function valuation for a query function can be an increasing function of time required to execute the query function and/or can be an increasing function of the amount of processing resources required to execute the query function. Alternatively or in addition, the function valuation for a query can be an increasing function of time required to execute the query function and/or can be an increasing function of the amount of processing resources required to execute the query function.

For example, aggregations performed on larger data sets can have a higher query valuation than the same or different types of aggregations performed on smaller data sets based on the aggregations requiring more time and/or resources to be performed on larger data sets. In such cases, the query valuation for a query function can be an increasing function of the size of a partial result set utilized as input to the query function.

As another example, a first type of query function can have a higher valuation than a second type of query function based on the first type of query function being determined to require more processing resources and/more time to execute than the second type of query function. This determination can be based on known characteristics of the first type of query function and the second type of query function, for example, where the determination is possible based on the query alone via the pre-execution query pricing module 810.

This determination can alternatively or additionally be made based on historical tracking of resource consumption and/or processing time for entire queries and/or particular query functions, for example, where processing time and/or resource consumption for one or more query functions of a particular query is logged in the entry 455 for the query, and where the analytics system utilizes this information for previous queries over time and/or for previous queries that are at least as recent as a predefined recency threshold to determine average and/or expected resource consumption and/or processing time for different types of query functions.

In such cases where such historical data is utilized to determine function valuations for functions in the query, the determination is again possible based on the query alone, prior to execution of the query, via the pre-execution query pricing module 810.

This determination can alternatively or additionally be made at runtime, based on determining the time and/or resource consumption that was actually required to execute the query. For example, this information can be measured while and/or after the query is executed. In such cases, the runtime query pricing module 825 can determine the function valuation as an increasing function of the measured the time and/or measured resource consumption in execution of the query.

The function valuation for one or more query functions of a particular query can be automatically determined based on a calculation performed by the query pricing module 880, given an analytic rigor of the function as determined by the query pricing module 880; given an opacity of the results induced by the query functions as determined by the query pricing module 880; given the amount of time and/or resources required to perform the query function of the query; and/or given other characteristics of the function. Such calculations can be configured and/or indicated in the function-based query pricing scheme of one or more data providers. Alternatively or in addition, a mapping of function identifier to function valuation can be configured and/or indicated in the function-based query pricing scheme of one or more data providers.

The function-based query pricing scheme can indicate a function-based pricing relationship 905 between the determined function valuation and the total query cost and/or subtotal of the query cost induced by the function and/or the data provider. Alternatively, this function-based pricing relationship 905 can be a function or mapping of other characteristics of query functions discussed herein to query cost and/or of function identifier to query cost.

In the example of the function-based pricing relationship 905 illustrated in FIG. 9C, the function-based pricing relationship 905 dictates that the total query cost and/or subtotal of the query cost induced by query functions of the query is a direct function of function valuation. In other embodiments, the query cost can be any monotonically increasing function, and/or can otherwise be any increasing function of function valuation, where queries with higher function valuations have a higher total query cost and/or higher subtotal of the query cost induced by query functions than queries with lower function valuations. In some cases, a non-zero minimum query cost 910 is induced for functions with the lowest possible function valuations and/or otherwise least favorable function valuations, where every query is charged at least the minimum query cost 910. For example, all queries with function valuations that are less than or equal to a first threshold function valuation are assigned the minimum query cost for their query cost total and/or for the subtotal of the query cost induced by query functions of the query.

The total query cost and/or subtotal of the query cost induced by query functions of the query can also be capped at a maximum query cost 920. In the example of the function-based pricing relationship 905 illustrated in FIG. 9D, the query cost asymptotically approaches the maximum query cost as function valuation increases, where the maximum query cost is never reached and/or where the total query cost and/or subtotal of the query cost induced by query functions is otherwise strictly below this maximum query cost 920. Alternatively, the total query cost and/or the subtotal of the query cost induced by query functions of the query can be set equal to the maximum query cost 920 for any queries with function valuations that are greater than or equal to a second threshold function valuation.

FIGS. 9C and 9D depict query cost as a continuous value, where query cost is a continuous function of function valuation. In other embodiments, the total query cost and/or the subtotal of the query cost induced by query functions of the query can be discretized into a plurality of quantized query cost levels. For example, the plurality of quantized query cost levels can be associated with each of a plurality of subscription levels. An example of such an embodiment of the function-based pricing relationship 905 is illustrated in FIG. 9E, where the total query cost and/or the subtotal of the query cost induced by query functions of the query is assigned as one of a plurality of quantized query cost levels 934, dictated based on a corresponding one of a plurality of function valuation ranges 932 that the function valuation determined for the query falls within. In some cases, the function valuation is also one of a plurality of discrete values. In such cases, each quantized query cost level 934 can correspond to a single one of the plurality of discrete function valuations and/or to a function valuation range 932 that includes multiple, sequential discrete function valuations.

In some cases, the function valuations dictated by resource consumption and/or processing time are dictated by a function-based query pricing scheme configured by an administrator of the analytics system 110 and/or that otherwise dictates costs owed to an entity associated with the analytics system 110 based on resource consumption and/or processing time induced by execution of queries. For example, an entity that manages storage and/or resources utilized by the analytics system 110 can charge end users dynamically for queries based on the resource consumption and/or processing time of the queries. In such cases, such an entity may only be concerned with charging for resource consumption and processing time, while this entity is not concerned with charging for queries based on analytical insights and/or data opacity provided in the results.

In such cases, separate function valuations can be dictated by the analytic insight of the results achieved by utilizing the one or more query functions and/or level of obfuscation of the results achieved by utilizing the one or more query functions as discussed above, where these separate function valuations are configured by a user associated with a corresponding data provider entity and/or where the function-based query pricing schemes set by the corresponding data provider entity otherwise dictates costs owed to the data provider entity based on level of analytic insight and/or level of obfuscation. In such cases, such an entity may only be concerned with charging end users for the level of insights and/or data opacity delivered based on usage of their supplied data in accordance of their data licensing scheme, and may not be concerned with how this data usage affects resources of the analytics system itself.

In such cases, a first function valuation can be generated for the entity associated with the analytics system 110 based on their function-based query pricing scheme, where the first function valuation is generated as a function of resource consumption and/or processing time. One or more second function valuations can be separately generated for each of one or more data provider whose data is accessed and/or returned by execution of the functions based on one or more corresponding function-based query pricing schemes, each second function valuation is generated as a function of data opacity and/or analytic insights enabled by the query functions' usage of the data supplied by the corresponding data provider. A first query subtotal can be generated as a function of the first function valuation, and one or more second query subtotals can be generated as a function of a corresponding second function valuation in the one or more second function valuations. The query cost data can indicate the total query cost, and/or a subtotal of the total query cost induced by the query functions of the query, as the sum of the first query subtotal and/or the one or more second query subtotals. The query cost data can indicate the first query subtotal is owed to the entity associated with the analytics system 110 and that each second query subtotal is owed to the corresponding data provider. For example, the first query subtotal is owed to the entity associated with the analytics system 110 by the end user in payment of the total query cost. As another example, the first query subtotal subdivided into a plurality of subportions that are subtracted from each second query cost and/or are owed to the entity associated with the analytics system 110 by each corresponding data provider entity.

FIGS. 10A-10E illustrate embodiments of a query pricing module 880 that determines query cost data based on particular fields whose values in one or more records are accessed in the execution of the query, aggregated upon to generate the result of the query, and/or returned in the result set of the query. In some cases, a query pricing scheme of one or more providers includes and/or utilizes a field-based query pricing scheme, where the total cost and/or subtotal of the total cost of the query is a function of the determined field valuation of the query. In some cases, the field-based query pricing scheme data can be specific to one or more particular fields, and the query pricing module 880 can retrieve the field-based query pricing scheme data for one or more particular fields indicated in the query based on field identifiers, field types, or other information regarding the field utilized in the query.

As illustrated in FIG. 10A, field-based query pricing scheme data for one or more data providers can be retrieved by the pre-execution query pricing module 810, for example, based on one or more fields whose values of records supplied by the one or more data providers are determined to be accessed in the query and/or whose values are determined to be returned by the query. The field-based query pricing scheme data can be utilized to generate the query cost data as a function of one or more fields determined to be involved and/or returned in the query. Similarly as illustrated in FIG. 10B, field-based query pricing scheme data for one or more data providers can be retrieved by the runtime query pricing module 825, for example, based on one or more fields whose values of records supplied by the one or more data providers are included in the final result set, in a partial result set, and/or are determined to have been utilized to generate a result set. The field-based query pricing scheme data can indicate, given a particular field or set of fields in the query, the total query cost, and/or a subtotal of the query cost induced by the field, charged by the corresponding data provider and/or charged by the analytics system.

In particular, differing fields can have differing valuations, and these differing valuations can dictate differing costs of queries that utilize different fields. Alternatively or in addition, particular groupings of multiple fields can have differing valuations, and these differing valuations can dictate differing costs of queries that utilize values in different particular field groupings accessed by the query. The differing field valuations can correspond to differing query costs, which introduce improvements to database systems and/or analytics systems by optimizing and/or otherwise improving the efficiency of the database system and/or analytics system by inducing prices to end users that are determined to automatically limit incoming queries and/or automatically limit database usage to a level that utilizes predetermined and/or achievable levels of recourse consumption and/or processing time of the database system and/or analytics system.

As used herein, a field grouping can correspond to a single field and/or multiple distinct fields of a record, where a field grouping is only determined to be utilized in a query when values of at least every one of the fields in the field grouping is accessed and/or returned in the access and/or return of corresponding records. In some cases, the field grouping is only determined to be utilized when the values for every one of the one of the fields in the field grouping is accessed and/or returned for at least one same record. As used herein, a field valuation can correspond to the valuation of a single field and/or the valuation of a field grouping that includes multiple fields, such as a proper subset of the entire set of fields that can be populated for a particular type of record. As used herein, a field valuation for a particular field and/or field grouping can be the same for records that include the field and/or field grouping regardless of provider, or can alternatively be different for records supplied by different providers.

Field valuations can be configured in the query pricing scheme, for example, where a user of a provider device 230 dictates the relative and/or absolute valuations of different field groupings fields via user input to GUI 245. For example, the user can determine their own perceived valuation of various fields and/or field groupings to generate the field valuations. Alternatively or in addition, the analytics system 110 can automatically generate field valuations for particular field groupings.

Field valuation can be a function of demand of the field grouping, which can be dictated based on previous usage of the field grouping in previous queries. In particular, the query logging system 450 can be utilized to determine usage of different field groupings in queries, utilizing records provided by a particular provider and/or in records provided across all providers. This can include utilizing entries 455 within a particular time frame corresponding to queries that are at least as recent as a predetermined recency threshold, and/or some or all entries 455 over time. In some cases, the total number of queries within the time window and/or over time that returned and/or utilized a particular field grouping can be determined. The field valuation for each field grouping can be an increasing function of the corresponding total number of queries that utilized the field grouping and/or can otherwise be an increasing function of another metric dictating amount of usage of each field grouping over time. For example, a first field valuation for a first field grouping can indicate a higher valuation that a second field valuation for a second field grouping based on the first field grouping being utilized in a higher number of queries than the second field grouping within a recent time window.

Field valuation can be a function of the data type and/or data size of the data stored in the corresponding field and/or field grouping. For example, fields that store multimedia data, richer data, data that requires a greater number of bytes, and/or data that otherwise requires more storage space can have higher valuations than fields that store data as primitive data types, less rich data, data that requires a fewer number of bytes, and/or data that otherwise requires less storage space. For example, a first field valuation for a first field can indicate a higher valuation that a second field valuation for a second field based on the datatypes for the first field requiring more storage space than datatypes for the second field.

Field valuation can be a function of the data represented in the corresponding field and/or field grouping. For example, fields and/or field groupings that can be utilized to generate stronger analytics conclusions, that correspond to rarer data fields, and/or that correspond to more private and/or sensitive data can have higher valuations than fields and/or field groupings that are utilized to generate weaker analytic conclusions, that correspond to less rare data fields, and/or that correspond to less sensitive data.

Field valuation can be a function of the number of fields in the field grouping. For example, a field grouping that includes all of the fields in a record can have a higher field valuation than a field grouping with a single field in the record. In some cases, the field valuation of a particular field grouping can be strictly greater than the summation of field valuations of each individual field in the field grouping as a result of the fields being more valuable in tandem than individually.

The field valuation for a field grouping returned by and/or utilized in a particular query can be automatically determined based on a calculation performed by the query pricing module 880, given a level of demand determined for the field grouping as determined by the query pricing module 880; given a data type and/or data size of the of the fields in the field grouping as determined by the query pricing module 880; given a level of rarity of the data included in the field grouping as determined by the query pricing module 880; given a level of sensitivity of the of the fields in the field grouping as determined by the query pricing module 880; given a level of analytic conclusion strength determined to be induced by return of and/or usage of the field grouping as determined by the query pricing module 880; and/or given the number of fields in the field grouping as determined by the query pricing module 880. Such calculations can be configured and/or indicated in the field-based query pricing scheme of one or more data providers. Alternatively or in addition, a mapping of field identifier to field valuation can be configured and/or indicated in the field-based query pricing scheme of one or more data providers. Alternatively or in addition, a mapping of a grouping of field identifiers to field valuation for the field grouping can be configured and/or indicated in the field-based query pricing scheme of one or more data providers.

The field-based query pricing scheme can indicate a field-based pricing relationship 1005 between the determined field valuation and the total query cost and/or subtotal of the query cost induced by the field grouping and/or the data provider. Alternatively, this field-based pricing relationship 1005 can be a function or mapping of other characteristics of field groupings discussed herein to query cost, and/or can be a function or mapping of field identifier and/or field grouping to query cost.

In the example of the field-based pricing relationship 1005 illustrated in FIG. 10C, the field-based pricing relationship 1005 dictates that the total query cost and/or subtotal of the query cost induced by field groupings of the query is a direct function of field valuation. In other embodiments, the query cost can be any monotonically increasing function, and/or can otherwise be any increasing function of field valuation, where queries with higher field valuations have a higher total query cost and/or higher subtotal of the query cost induced by field groupings than queries with lower field valuations. In some cases, a non-zero minimum query cost 1010 is induced for field groupings with the lowest possible field valuations and/or otherwise least favorable field valuations, where every query is charged at least the minimum query cost 1010. For example, all queries with field valuations that are less than or equal to a first threshold field valuation are assigned the minimum query cost for their query cost total and/or for the subtotal of the query cost induced by field groupings of the query. The minimum query cost 1010 for subtotals of the query cost induced by field groupings of the query can be the same or different from the minimum query cost 910.

The total query cost and/or subtotal of the query cost induced by field groupings of the query can also be capped at a maximum query cost 1020, which can be the same or different from the maximum query cost 920. In the example of the field-based pricing relationship 1005 illustrated in FIG. 10D, the query cost asymptotically approaches the maximum query cost as field valuation increases, where the maximum query cost is never reached and/or where the total query cost and/or subtotal of the query cost induced by field groupings is otherwise strictly below this maximum query cost 1020. Alternatively, the total query cost and/or the subtotal of the query cost induced by field groupings of the query can be set equal to the maximum query cost 1020 for any queries with field valuations that are greater than or equal to a second threshold field valuation.

FIGS. 10C and 10D depict query cost as a continuous value, where query cost is a continuous function of field valuation. In other embodiments, the total query cost and/or the subtotal of the query cost induced by field groupings of the query can be discretized into a plurality of quantized query cost levels. For example, the plurality of quantized query cost levels can be associated with each of a plurality of subscription levels. An example of such an embodiment of the field-based pricing relationship 1005 is illustrated in FIG. 10E, where the total query cost and/or the subtotal of the query cost induced by field groupings of the query is assigned as one of a plurality of quantized query cost levels 1034, dictated based on a corresponding one of a plurality of field valuation ranges 1032 that the field valuation determined for the query falls within. The query cost of some or all quantized query cost levels 1034 can be the same or different from the query cost levels 934. In some cases, the field valuation is also one of a plurality of discrete values. In such cases, each quantized query cost level 1034 can correspond to a single one of the plurality of discrete field valuations and/or to a field valuation range 1032 that includes multiple, sequential discrete field valuations.

FIGS. 11A-11E illustrate embodiments of a query pricing module 880 that determines query cost data based on the final result set returned by the query and/or one or more partial result sets generated in processing the query. For example a partial result set can correspond to a result set determined in executing the query that is utilized as input to an aggregation function performed in the query. In some cases, a query pricing scheme of one or more providers includes and/or utilizes a result set-based query pricing scheme, where the total cost and/or subtotal of the total cost of the query is a function of the determined result set valuation of the query. In some cases, the result set-based query pricing scheme data can be specific to a particular type of result sets, and the query pricing module 880 can retrieve the result set-based query pricing scheme data for a particular type of the result set of the query based on result set characteristics determined by the query pricing module 880 for the result set of the query.

As illustrated in FIG. 11A, result set-based query pricing scheme data for one or more data providers can be retrieved by the pre-execution query pricing module 810, for example, based on result set characteristics determined for the result set. The result set-based query pricing scheme data can be utilized to generate the query cost data as a function of determined characteristics of the result set, such as size of the result set. As illustrated in FIG. 11B, result set-based query pricing scheme data for one or more data providers can be retrieved by the runtime query pricing module 825, for example, based on result set characteristics of one or more partial result sets and/or the final result set generated in execution of the query. The result set-based query pricing scheme data can indicate, given characteristics of the result set, the total query cost, and/or a subtotal of the query cost induced by the result set, charged by the corresponding data provider and/or charged by the analytics system.

In particular, result sets with differing characteristics can have differing valuations, and these differing valuations can dictate differing costs of queries that return result sets with differing characteristics, that utilize result sets with differing characteristics as input to aggregation functions, and/or that otherwise generate partial result sets with different characteristics in execution of the query. The differing result set valuations can correspond to differing query costs, which introduce improvements to database systems and/or analytics systems by optimizing and/or otherwise improving the efficiency of the database system and/or analytics systems by inducing prices to end users that are determined to automatically limit incoming queries and/or automatically limit database usage to a level that utilizes predetermined and/or achievable levels of recourse consumption and/or processing time of the database system and/or analytics system.

Result set valuations can be configured in the query pricing scheme, for example, where a user of a provider device 230 dictates the relative and/or absolute valuations of different types of result sets with differing characteristics via user input to GUI 245. For example, the user can determine their own perceived valuation of various characteristics of result sets to generate the result set valuations for result sets with different characteristics. Alternatively or in addition, the analytics system 110 can automatically generate result set valuations for result sets with particular characteristics as a function of these characteristics. A plurality result sets of a same query, such as a final result set and/or at least one partial result set, can each be assigned its own result set valuation, where the result set valuation for the query as a whole is an average, maximum, summation, or other function of this plurality of result set valuations for the plurality of result sets. In some embodiments, only the final result set returned to the end user as a result of the query is processed, where the result set valuation of the query corresponds valuation determined for the final result set.

Result set valuation can be a function of the size of the result set. For example, a first result set that includes a first number of records can have a higher valuation than a second result set that includes a second number of records based on the first number of records being larger than the second number of records. In some cases, this relationship is further a function of the usage of the result set. For example, the first result set that includes the first number of records can have the higher valuation than the second result set that includes the second number of records based on the first number of records being larger than the second number of records, and further based on the raw data of the records of the result set being returned to the end user as a result of the query. In particular, end user access to more raw data can be deemed more valuable than an end user's access to less raw data. As another example, the first result set that includes the first number of records can have the higher valuation than the second result set that includes the second number of records based on the first number of records being larger than the second number of records, and further based on the result set being utilized to train a statistical model and/or machine learning model that is utilized in the same query and/or will be utilized by the same end user in subsequent queries to produce inference data. In particular, access to statistical models and/or machine learning models that are trained on more records can be deemed more valuable than statistical models and/or machine learning models trained on less records.

However, the first result set that includes the first number of records can instead have a lower valuation than the second result set that includes the second number of records based on the first number of records being smaller than the second number of records, and further based on result set being utilized as input to at least one aggregation function, where the output of the aggregation function is returned to the end user as a result of the query. In such cases, the first result set can have the lower valuation than the second result set in response to a determination that outputs of aggregations provide a greater level of opacity and/or more insight into the original raw data when performed on a smaller number of records, and/or that outputs of aggregations performed on a number of records that is less than a predefined result size threshold provide a greater level of opacity and/or more insight into the original raw data than outputs of aggregations performed on result sets with a number of records that is more than the predefined result size threshold.

In some cases, this result set size and/or other result set characteristics of the result set can be utilized in conjunction with the function-based query pricing scheme to generate query cost data as a function of result set and further as a function of the type of query function performed on the result set, as a particular result set characteristic such as a large size may be favorable when utilized as input some functions but may be unfavorable when utilized as input to other functions. In such cases, the query pricing module 880 can jointly evaluate the result set characteristics of a result set and the type of function that is performed on this result set to generate query cost data, for example, where query functions and corresponding result sets utilized as input are jointly processed to generate a valuation for the query function in combination with the characteristics of its input result set.

In some cases, other characteristics of the result set can be evaluated in conjunction with the size of the result set in conjunction with and/or instead of the size of the result set. For example, size of the result set can jointly contribute to the cost of the result set in conjunction with one or more of these other properties. As a particular example, a first result set valuation can be determined based on the size of the result set, for example, where the first result set valuation is an increasing function of the size of the result set. One or more second result set valuations can be determined based on one or more other characteristics of the result set. The first result set valuation can dictate a magnitude of a multiplier applied to the second result set valuation to generate a final result set valuation for the result set. Alternatively, the first result set valuation and the one or more second result set valuations can be summed to generate the final result set valuation. The first result set valuation and second result set valuation can otherwise be jointly processed to produce the final result set valuation, for example, where larger result sets with particular other characteristics yield a greater final result set valuation than smaller result sets with these other characteristics.

These other characteristics of the result set can include properties of the records included in the result set themselves. In some cases, properties across all the records in the result set are holistically evaluated to determine the result set valuation. For example, the result set valuation can be generated based on statistical properties of the set of records in the result set. The result set valuation can be a function of statistical properties inhibited in the set of records included within the result set itself. A level of variance, level of correlation, and/or other statistical measurements can be calculated and/or determined by the query pricing module 880 based on processing values of one or more fields of some or all records in the result set. For example, result sets with records with higher levels of statistical variance in one or more fields can have a higher valuation than result sets with records with lower levels of variance in one or more fields. As another example, result sets with higher levels of measured correlation between one or more particular pairs of fields for records in the result set can have a higher valuation than result sets with records with lower levels of correlation in the one or more particular pairs of fields and/or in every pairs of fields. As another example, result sets with one or more statistical measurements indicating a greater level of statistical significance can have a higher valuation than result sets with statistical measurements indicating a lower level of statistical significance.

In some cases, the result set valuation is further a function of the one or more particular fields with the corresponding variance, correlation, and/or statistical significance. In particular, a result sets with a high level of variance in a first field, with a high level of correlation in a pair of fields that includes the first field, and/or a high level of statistical significance in values of the first field can have a higher valuation than result sets with a high level of variance in a second field, with a high level of correlation in a pair of fields that includes the second field, and/or a high level of statistical significance in values of the second field based on the field valuation of the first field and/or the pair of fields that includes the first field being higher than the field valuation of the second field and/or the pair of fields that includes the second field. In particular, favorable statistical measurements can have a higher valuation when they are detected in fields with high valuations as a result of being fields of particular interest to end users and/or being fields yielding more valuable insights, while statistical insights detected in less highly valued fields yields a lower valuation of the corresponding result set.

The other characteristics of the result set can alternatively or additionally include record age-based properties of the result set. Result set valuation can be a function of the ages of the records included in the result set. For example, the timestamps of the records in the database system 112 can indicate the age of the records, where the timestamps of the correspond to a time and/or temporal period in which the record was collected by its data collection device, and/or can correspond to a time and/or temporal period in which the record was added to the database system 112.

In particular, the result set valuation can be a function of the age of records included in the result set, which can be determined by calculating an average over timestamps in the result set and/or can be determined as a maximum age and/or minimum age in the result set. In some cases, the age can be a function of the timestamp as well as the current time, such as the difference between the timestamp and the current time. The current time can be determined by the query pricing module 880 based on the time the query was received by the analytics system 110 and/or the time the query commenced and/or completed its execution.

In some embodiments, a first result set with a first average age has a higher valuation than a second result set with a second average age based on the first average age being older than the second average age. In such embodiments, result sets with older, historical data can be deemed more valuable than result sets with more recent data. For example, the valuation of a result set can be an increasing function of the average record age, the maximum record age, and/or the minimum record age. In some embodiments, only particularly old records are of interest, for example, where the first result set with a first average age has the higher valuation than the second result set with a second average age based on the first average age being older than the second average age, and further based on the first average age being older than a historical age threshold. This can optionally be further based on the second average age being younger than the historical age threshold.

In some embodiments, a first result set with a first average age has a higher valuation than a second result set with a second average age based on the first average age being more recent than the second average age. In such embodiments, result sets with more recent data can be deemed more valuable than result sets with less recent data. For example, the valuation of a result set can be a decreasing function of the average record age, the maximum record age, and/or the minimum record age. In some embodiments, only particularly recent records are of interest, for example, where the first result set with a first average age has the higher valuation than the second result set with a second average age based on the first average age being more recent than the second average age, and further based on the first average age being more recent than a recency age threshold. This can optionally be further based on the second average age being older than the recency age threshold.

In some cases, the result set-based query pricing scheme can be configured to indicate whether particularly old records or particularly young records are of interest, based on the known and/or perceived difference in valuation of very recent records or particularly historical record. Different data providers can configure the age-based valuation of their result sets differently.

Result set valuation can be a function of the span of ages of records included in the result set. This age span can be indicated as a variance measurement of the timestamps in the result set and/or can be indicated as a temporal period between the oldest aged record and the youngest aged record. The result set valuation can be an increasing function of the age span determined for the result set. In such embodiments, result sets that include records spanning a greater timeframe can be valued more highly than result sets that include records spanning a smaller timeframe. For example, a first result set with a first age span can have a higher result set valuation than a second result set with a second age span based on the first age span being greater than the second age span.

Result set valuation can be a function of the frequency of timestamps of records included in the result set. This frequency of timestamps can be determined based on an average length of time between neighboring timestamps in an ordering of the timestamps by age. For example, the inverse of this average length of time can be calculated to determine an average frequency of the timestamps for records in the result set. Alternatively or in addition, the frequency of timestamps can be determined based on a known and/or determined collection frequency of one or more types of records included in the result set, such as a known and/or determined collection frequency of one or more data collection devices that collected the data indicated in the record and/or determined transmission frequency of one or more data providers that supplied the data indicated in the record. The result set valuation can be an increasing function of the timestamp frequency determined for the result set. In such embodiments, access to records for data collected at a higher frequency, such as once per day, can be deemed more valuable than access to records for data collected at a lower frequency, such as once per week. For example, a first result set with a first timestamp frequency can have a higher result set valuation than a second result set with a second timestamp frequency based on the first timestamp frequency being higher than the timestamp frequency.

In some embodiments, the result set valuation can be generated based on the span and/or distribution of storage locations of records in the result set and/or a measured efficiency of retrieval of the result set from storage. For example, the number of different storage locations the records in the result set are stored upon can influence the valuation of the result set, such as the number of different files, different storage devices, different geographic storage sites, and/or other distinct storage locations. In some cases, the number of different storage location is determined based on a measured amount of difference in virtual locations and/or storage configurations in storage. In some cases, the number of different storage locations is based on determining storage locations with at least a threshold minimum physical and/or virtual distance between them. In some cases, the number of different decoding and/or decryption schemes utilized to retrieve and/or access records in the result set is utilized to measure and/or augment this number of storage locations. In some cases, the measured number of different storage locations is based on number of storage sites with different regulatory storage and/or access requirements, such a number of different corporate entities with storage devices responsible for storing the data and/or a number of different countries within which the data is stored.

As another example, the amount of time and/or processing resources required to retrieve and/or access all of the records in the result set can influence the valuation of the result set. A result set valuation can be an increasing function of number of different storage location its records are stored upon and/or can be an increasing function of the total and/or average amount of time and/or processing resources required to retrieve or access records in the result set.

Such determinations of result set retrieval efficiency can be based on known storage locations of the records in the result set prior to their retrieval and/or access in execution of the query. This determination can alternatively or additionally be made at runtime, based on determining the time and/or resource utilization that was actually required to retrieve and/or access the result set, and/or based on determining how many different storage locations were accessed in retrieving the result set. For example, this information can be determined while and/or after the query is executed.

In some embodiments, such efficiency of result set retrieval utilized in result set-based query pricing schemes can be implemented as part of the function-based query pricing schemes, where this result set retrieval efficiency contributes to the resource consumption and/or processing time determined for execution of the query. Alternatively or in addition, result set-based query pricing schemes based on this efficiency of result set retrieval can be configured by an administrator of the analytics system and/or can correspond to cost owed to the analytics system 110, and/or one or more entities that own the determined storage locations of the result set and/or maintain the storage of records of the result set in the respective storage locations.

As the actual result set is not determinable until at least a portion of the query is executed, some embodiments do not utilize pre-execution query pricing module 810 to generate query cost data as a function of determined characteristics of the result set, where only the runtime query pricing module 825 is utilized to generate the query total query cost, and/or a subtotal of the query cost induced by the result set. However, as illustrated in FIG. 11A, the pre-execution query pricing module 810 can be implemented to generate an estimate for the query total query cost, and/or an estimate subtotal of the query cost induced by the result set a result set. This can be achieved by utilizing a result set estimator module 1130. The result set estimator module 1130 can be implemented by the query processing system 114 and/or another subsystem 405 of the analytics system 110. The result set estimator module 1130 can be operable to generate result set estimate data indicating estimated characteristics of the result set based on the query, without executing the query against the database system.

The result set estimator module 1130 can receive domain data, for example, based on the query. The domain data can indicate a current and/or recent size of a table that is indicated in the query to generate the result set of interest, and/or a current and/or recently determined total number or records supplied by a provider indicated in the query to generate the result set of interest. Alternatively or in addition, the domain data can indicate an estimate for record identifiers in a set of records that would be returned in the result set, and/or a number of records that would be returned in the result set, based on recent queries filtered on the same or similar criteria to generate result sets that were cached by the analytics system 110, and/or based on a known and/or estimated number and/or fraction of records that meet filtering criteria indicated in the query to generate the result set. This can be utilized by the result set estimator module 1130, in conjunction with filtering criteria included in the given query, to generate result set estimate data such as an estimated result set size, an estimated set of records that will be included in the result set, and/or other information regarding an estimated and/or maximum possible result set of requested in the query.

In some embodiments, the result sets and/or information regarding the results of some or all queries performed in response to query requests received by user devices, and/or otherwise being occasionally called in predetermined time intervals to produce result set size data that can be utilized by the result size estimator module, can be cached locally by the query processing system and/or can be stored result set data included in entries 455 of the database usage log 454 as discussed previously. In such cases, result set data can be queried from query logging system 450 by the result set estimator module 1130. In particular, entries 455 with query data compares favorably to the given query can be determined to have result set data over a same or similar domain as the given query. The query data can be determined to compare favorably if it invoked the same or similar filtering parameters to generate a final result set or intermediate result set indicated in its result set data, if it invoked the same or similar WHERE clause of a SQL query to generate a final result set or intermediate result set indicated in its result set data, and/or if it otherwise is determined to have requested a set of records from a same table, applying the same or similar filtering criteria as the given query. Furthermore, to ensure that this information for prior queries is still relevant, as the database may be constantly changing as new entries are received in data streams from providers, a single entry or subset of applicable entries 455 can be selected if they corresponding to a most recent entry and/or an entry that is no older than a predefined threshold amount can be utilized to generate the estimated result set data. For example, the result set estimator module 1130 can query the query logging system 450 for result set data of entries 455 with corresponding timestamps that are more recent than a predetermined recency threshold and/or that have query data indicating access to a same table as the given query utilizing the same and/or similar filtering parameters. The sizes of result sets in the received result set data can then be utilized to generate the estimated result set size. The record identifiers indicated in the received result set data can be utilized to determine an estimate set of records that are estimated to be included in the result set.

In some cases, a ceiling estimated result set size can be determined based on the result set sizes of other queries with less stringent filtering parameters. For example, suppose filtering parameters of a given query are known to produce a result set that is a proper subset of another result set due to being filtered by a proper subset of the filtering parameters of the given query and/or otherwise filtered less stringently than the given query. In particular, if the given query applies a set of five filtering parameters, a previous query that applied exactly four of those filtering parameters can be expected to have produced a result set that was larger than if all five filtering parameters were applied, given the size of the database did not grow too drastically in between.

Similarly, a floor estimated result set size can be determined in the opposite fashion, where floor result set sizes are determined based on result sets for previous queries with more stringent filtering parameters. For example, another previous query that applied all five filtering parameters of the given query, and further applied a sixth filtering parameter can be expected to have produced a result set that was smaller than if only the 5 filtering parameters were applied, given the size of the database did not shrink too drastically in between. While such ceiling and floor estimates should be used by the result set size estimator module 1130 with caution, they can be useful in bounding the estimated result set size, where the result set size estimate data indicates a range instead of or in addition to a particular estimated value.

In some cases, such a range can determined for a given estimate that is determined based on results of a previous query, based on an expected amount of growth of the database since the time the previous query was performed. In particular a confidence interval and/or amount of padding applied to the given estimate to generate such bound can be a direct function of the amount of time since this previous query was performed. In some cases, the estimate can be bounded from above and below by such an amount, where the estimate lies in the middle of this determined range. Alternatively, as the database may only grow with time if entries are not removed and/or do not expire from usage with time, the estimate may only be bounded from above as a direct function of this amount of time, and/or this calculated amount of padding can be added to the estimated value itself to shift the value of the estimate upwards based on the amount of newly added data.

In some cases, when filtering parameters of the given query are determined to be more stringent than filtering parameters of at least one previous query, the filtering parameters of the given query can be applied to the result set of a previous query to filter the result set of the previous query in accordance with the more stringent filtering parameters of the given query. This can be utilized to generate a result set size estimate and/or to estimate the actual records that will be included in the result set of the given query.

This result set estimate data can be inputted to the pre-execution query pricing module 810, and can be processed in a similar fashion as discussed in accordance with processing of the actual result set data inputted and processed by the runtime query pricing module 825 of FIG. 11B. The resulting query cost data indicating a total query cost and/or subtotal of the query cost induced by characteristics of the result set can correspond to estimated query cost data, for example, where the final query cost is determined by the runtime query pricing module 825 based on characteristics determined for the actual result set. In some cases, the estimated query cost data can indicate an estimated minimum query cost and/or an estimated maximum query cost, for example, based on the ceiling and/or floor result set size estimates in embodiments where the query cost is a function of result set size.

The result set-based query pricing scheme can indicate a result set-based pricing relationship 1105 between the determined result set valuation and the total query cost and/or subtotal of the query cost induced by the result set and/or the data provider. Alternatively, this result set-based pricing relationship 1105 can be a function or mapping of other characteristics of the result set discussed herein to query cost, and/or can be a function or mapping of result set characteristics and/or the particular set of records included in the result set to query cost.

In the example of the result set-based pricing relationship 1105 illustrated in FIG. 11C, the result set-based pricing relationship 1105 dictates that the total query cost and/or subtotal of the query cost induced by a result set of the query is a direct function of result set valuation. In other embodiments, the query cost can be any monotonically increasing function, and/or can otherwise be any increasing function of result set valuation, where queries with higher result set valuations have a higher total query cost and/or higher subtotal of the query cost induced by result sets than queries with lower result set valuations. In some cases, a non-zero minimum query cost 1110 is induced for result sets with the lowest possible result set valuations and/or otherwise least favorable result set valuations, where every query is charged at least the minimum query cost 1110. For example, all queries with result set valuations that are less than or equal to a first threshold result set valuation are assigned the minimum query cost for their query cost total and/or for the subtotal of the query cost induced by result sets of the query. The minimum query cost 1110 for subtotals of the query cost induced by result sets of the query can be the same or different from the minimum query cost 910 and/or the minimum query cost 1010.

The total query cost and/or subtotal of the query cost induced by result sets of the query can also be capped at a maximum query cost 1120, which can be the same or different from the maximum query cost 920 and/or the maximum query cost 1020. In the example of the result set-based pricing relationship 1105 illustrated in FIG. 11D, the query cost asymptotically approaches the maximum query cost as result set valuation increases, where the maximum query cost is never reached and/or where the total query cost and/or subtotal of the query cost induced by a result set is otherwise strictly below this maximum query cost 1120. Alternatively, the total query cost and/or the subtotal of the query cost induced by result sets of the query can be set equal to the maximum query cost 1120 for any queries with result set valuations that are greater than or equal to a second threshold result set valuation.

FIGS. 11C and 11D depict query cost as a continuous value, where query cost is a continuous function of result set valuation. In other embodiments, the total query cost and/or the subtotal of the query cost induced by result sets of the query can be discretized into a plurality of quantized query cost levels. For example, the plurality of quantized query cost levels can be associated with each of a plurality of subscription levels. An example of such an embodiment of the result set-based pricing relationship 1105 is illustrated in FIG. 11E, where the total query cost and/or the subtotal of the query cost induced by result sets of the query is assigned as one of a plurality of quantized query cost levels 1134, dictated based on a corresponding one of a plurality of result set valuation ranges 1132 that the result set valuation determined for the query falls within. The query cost of some or all quantized query cost levels 1134 can be the same or different from the query cost levels 934 and/or query cost levels 1034. In some cases, the result set valuation is also one of a plurality of discrete values. In such cases, each quantized query cost level 1134 can correspond to a single one of the plurality of discrete result set valuations and/or to a result set valuation range 1132 that includes multiple, sequential discrete result set valuations.

In embodiments discussed in conjunction with FIGS. 11A-11E with regards to result set valuations determined by the query pricing module 880, result sets valuations can be generated based on statistical and/or other holistic processing of characteristics of the set of records in the result set. In some cases, some or all of the individual records can be processed by the query pricing module 880 to determine record valuations for individual records in result sets and/or individual records that are accessed in execution of the query. In such cases, a record-based query pricing scheme can be implemented to generate query cost data such as a total query cost for the query and/or a subtotal of query cost induced by returning of and/or accessing of a particular record.

FIGS. 12A-12E illustrate example embodiments of a query pricing module that utilizes a record-based query pricing scheme to generate costs based on characteristics of individual records included in a result set of the query and/or accessed by the query. In some cases, a query pricing scheme of one or more providers includes and/or utilizes a record-based query pricing scheme, where the total cost and/or subtotal of the total cost of the query is a function of one or more determined record valuations of records involved in the query. In some cases, the record-based query pricing scheme data can be specific to a particular type of record, and the query pricing module 880 can retrieve the record-based query pricing scheme data for a particular type of record based on a record identifier, a record type, and/or other record characteristics determined by the query pricing module 880 for the record.

In some embodiments, a plurality of record valuations is generated based on a plurality of individual records in a result set. The plurality of record valuations is determined by the query pricing module 880, where each of the plurality of record valuations corresponds to one of a plurality of records in a result set of a query based on the record-based query pricing scheme. In such cases, a summation, average, maximum, or other processing of this plurality of record valuations can be performed to determine the query cost total and/or a subtotal of the query cost induced by the corresponding records based on a record-based pricing scheme. Alternatively or in addition, a plurality of record costs can be generated based on the corresponding plurality of record valuations, where these record costs in the plurality of record costs are summed to generate a query cost total and/or a subtotal of the query cost induced by the corresponding records, such as subtotal of the query cost induced by the result set that includes the plurality of corresponding records.

Alternatively or in addition, a summation, average, maximum, or other processing of this plurality of record valuations can be performed to determine the result set valuation of the corresponding result set and/or a subtotal of the query cost induced by the corresponding records. In particular, a result set-based query pricing scheme of FIGS. 11A-11E can indicate the record-based query pricing scheme to be implemented on the individual records in the result set to generate the individual record valuations and/or individual record costs.

As illustrated in FIG. 12A, record-based query pricing scheme data for one or more data providers can be retrieved by the pre-execution query pricing module 810, for example, based on record characteristics determined for records in a result set and/or other records that are involved in the query. The record-based query pricing scheme data can be utilized to generate query cost data as a function of determined characteristics of one or more records accessed in the query and/or returned by the query and/or a subtotal of the query cost induced by each record.

As the pre-execution query pricing module 810 may not have knowledge of the actual records due to being implemented prior to generation of a result set and/or prior to execution of the query, the result set estimator module 1130 of FIG. 11A can be utilized in a same or similar fashion as discussed in conjunction with FIG. 11A to estimate a set of particular records and/or characteristics of particular records that will be included in a result set returned by the query and/or utilized by the query as partial result set. The pre-execution query pricing module 810 can receive the result set estimate data that indicates identifiers of particular records and/or characteristics of particular records estimated to be included in the result set and/or estimated to be otherwise involved in the query. The record-based query pricing scheme can be utilized, given this result set estimate data, to generate query cost data associated with the records that are estimated to be included in the result set and/or that are estimated to be involved in the query. The individual record costs and/or a query cost generated based on all of these record costs can serve as an estimated query cost induced by records that are estimated to be returned by and/or accessed in the query. The query cost data can thus indicate an estimated query cost that will be induced by particular records, a maximum query cost that will be induced by particular records, and/or a minimum query cost that will be induced by particular records.

As illustrated in FIG. 12B, record-based query pricing scheme data for one or more data providers can be retrieved by the runtime query pricing module 825, for example, based on record characteristics of records included in one or more partial result sets and/or the final result set generated in execution of the query. In particular, differing records can have differing valuations, and these differing valuations can dictate differing costs of queries that utilize and/or return different records. The record-based query pricing scheme data can indicate, given characteristics of one or more records in the result set, the total query cost, and/or a subtotal of the query cost induced by each record, charged by the corresponding data provider and/or charged by the analytics system. Differing record valuations can correspond to differing record costs, which introduce improvements to database systems and/or analytics systems by optimizing and/or otherwise improving the efficiency of the database system and/or analytics systems by inducing prices to end users that are determined to automatically limit incoming queries and/or automatically limit database usage to a level that utilizes predetermined and/or achievable levels of recourse consumption and/or processing time of the database system and/or analytics system.

The record valuation for a particular record can be a function of the storage configuration of the records such as: a virtual and/or physical storage location in which the record is stored; an encryption scheme, dispersal scheme, and/or encoding scheme applied to the particular record in storage; the type and/or retrieval efficiency of a storage devices upon which the records are stored; and/or other metrics utilized to determine the amount of time and/or resources required retrieve the particular records from storage for utilization in the query and/or for return to the end user. In some cases, the size of the particular record and/or of particular fields of the particular record being accessed, such as an amount of bytes included in the particular record, a data type of one or more fields of the particular record, and/or other information dictating an amount of storage required for the particular record can be utilized to generate the record valuation.

Some or all of these metrics can be utilized to measure a retrieval efficiency of the record, where the record valuation is a decreasing function of storage efficiency. In such cases, records utilized in queries that are more inefficient and/or difficult to store and/or retrieve induce a higher cost to the end user for these queries and/or a higher cost to the data provider that supplied the record. In such cases, the corresponding record-based query pricing scheme applied to generate retrieval efficiency based costs can be applied by an administrator of the analytics system 110 and can correspond to costs owed to an entity associated with the analytics system 110 and/or an entity that owns storage devices on which the record is stored and/or maintains storage of the record.

As a particular example, a first record that is in a same country, same facility, and/or otherwise same bounded geographic location as the query processing system 114 and/or the user device 140 to which the record is returned in a query result has a first record valuation. A second record that is in a different country, different facility, and/or otherwise different bounded geographic location from the query processing system 114 and/or the user device 140 to which the record is returned in a query result has a second record valuation. The second record valuation can be higher than the first record valuation as a result of the retrieval of the second record from the different bounded geographic location from the query processing system 114 and/or the user device 140 being less efficient than retrieval of the first record from the same bounded geographic location as the query processing system 114 and/or the user device 140.

As another example, a first record can be determined to have less efficient retrieval, and thus a higher record valuation, than a second record as a result of the first record and the second record being returned to a user device 140 in a query result, and the physical distance between the storage device storing the first record and the location of the user device 140 being greater than the physical distance between the storage device storing the second record and the location of the user device 140. As another example, a first record can be determined to have less efficient retrieval, and thus a higher record valuation, than a second record as a result of the first record and the second record being returned to a user device 140 in a query result, and as a result of the transmission resources and/or processing resources required to retrieve the first record from memory and transmit the first record to the user device 140 being greater and/or less efficient than the transmission resources and/or processing resources required to retrieve the second record from memory and to transmit the second record to the user device 140.

As another example, a first record can be determined to have less efficient retrieval, and thus a higher record valuation, than a second record as a result of the first record being dispersed stored on a greater number of storage devices than the second record. As another example, a first record can be determined to have less efficient retrieval, and thus a higher record valuation, than a second record as a result of the first record being dispersed stored on storage devices in a greater number of different countries, facilities, or bounded geographic locations than the second record. As another example, a first record can be determined to have less efficient retrieval, and thus a higher record valuation, than a second record as a result of the first record being dispersed stored on storage devices separated by greater amounts of physical distances the second record. As another example, a first record can be determined to have less efficient retrieval, and thus a higher record valuation, than a second record as a result of the first record being dispersed stored on storage devices separated by greater amounts of physical distances the second record. As another example, a first record can be determined to have less efficient retrieval, and thus a higher record valuation, than a second record as a result of the first record being dispersed stored on storage devices separated by greater amounts of physical distances the second record. As another example, a first record can be determined to have less efficient retrieval, and thus a higher record valuation, than a second record as a result of the first record requiring greater levels of decryption and/or decoding than the second record.

In some cases, the processing resources and/or processing time required for the query processing system 114 to retrieve each particular record from one or more memory devices can be measured or otherwise determined by the analytics system 110. Alternatively or in addition, the processing resources and/or processing time required for each particular record to be processed by the database system 112 and/or the query processing system 114 to generate the final query result can be measured or otherwise determined by the analytics system 110. Alternatively or in addition, the processing resources and/or processing time required for each particular record in final result set to be transmitted to the user device 140 can be measured or otherwise determined by the analytics system 110. Records that require greater processing resources and/or greater processing time for their retrieval from memory, processing to produce the query result, and/or transmission to the end user are assigned a higher valuation than where records that require fewer processing resources and/or shorter processing time.

In some cases, this retrieval efficiency-based record valuation is utilized to determine function valuation for a query function that utilizes a plurality of records, based on a summation, average, or other function of their individual record valuations determined as a function of storage and/or retrieval efficiency. In some cases, this retrieval efficiency-based record valuation is utilized to determine result set-based valuation for a result set that utilizes a plurality of records, based on a summation, average, or other function of their individual record valuations determined as a function of retrieval efficiency.

Record valuation can be a function of demand of the record, which can be dictated based on previous usage of the record in previous queries and/or inclusion of the record in previous result sets. In particular, the query logging system 450 can be utilized to determine usage of different records in previous queries. This can include utilizing entries 455 within a particular time frame corresponding to queries that are at least as recent as a predetermined recency threshold, and/or some or all entries 455 over time. In some cases, the total number of queries within the time window and/or over time that returned and/or utilized a particular record can be determined. In some cases, the total number of result sets within the time window and/or over time that included the particular record can be determined. In some cases, the query pricing module 880 can query the query logging system 450 for such usage data of a set of particular records, denoted by record identifier, determined to be included in the result set of a given query. Alternatively, the query pricing module 880 can otherwise track record usage and/or inclusion of particular records in result sets over time as queries are processed over time. The record valuation for each record can be an increasing function of the corresponding total number of queries and/or results sets that utilized and/or returned the record and/or can otherwise be an increasing function of another metric dictating amount of usage of each record over time. For example, a first record valuation for a first record can indicate a higher valuation that a second record valuation for a second record based on the first record being utilized in a higher number of queries and/or being included in a greater number of result sets than the second record within a recent time window.

Record valuation can be a function of record age. For example, a first record can be deemed more valuable than a second record in response to having a more favorable age than the second record. In some cases, older records are deemed more valuable than younger records. In some embodiments, a first record has a higher record valuation than a second record in response to the first record being older than a predetermined historical age threshold and further in response to the second record being younger than the predetermined historical age threshold. In some cases, younger records, such as very recent records, are deemed more valuable than older records. In some embodiments, a first record has a higher record valuation than a second record in response to the first record being more recent than a predetermined recency threshold and further in response to the second record being older than the predetermined recency threshold.

Record valuation can be a function of data collection means, such as the particular data collection device and/or other information regarding the location, time, and/or means in which the data included in the record was collected. For example, records collected by a first type of data collection device can have higher record valuations than records collected by a second type of data collection device based on data collected by the first type of collection device being deemed more valuable than data collected by the second type of collection device. As another example, records collected within a first geographic boundary can have higher record valuations than records collected within a second geographic boundary based on data collected within a first geographic boundary being deemed more valuable than data collected within a first geographic boundary. As another example, records with timestamps indicating they were collected within a first certain recurring timeframe, such as a particular time of day, particular day of the week, and/or particular time of year, can have higher record valuations than records collected within a second, different recurring timeframe, such as a different particular time of day, different particular day of the week, and/or different particular time of year, based on data collected within the first recurring timeframe being deemed more valuable than data collected within the second recurring timeframe.

Record valuation can be a function of the level of data transformation and/or cleaning applied to the raw data to generate the record. For example, this can be based on the data transformation applied to the raw data by data transformation system 430 to generate the record utilized in the query and/or returned by the query. In some embodiments, the record valuation can be an increasing function of the level of cleaning applied in data transformation. For example, a first record that underwent a greater level of cleaning and/or a greater level of data transformation than a second record can have a higher valuation than the second record. As another example, a first record that is clean and/or standardized as a result of at least one transformation being performed via data transformation system 430 can have a higher valuation than a second record that was not cleaned and/or standardized. In some cases, the record valuation is a decreasing function of the level of derivation and/or aggregation performed on original data to generate the record. For example, a first record that corresponds to original data and/or raw data can have a higher valuation than a second record that corresponds to derived data from the original data, summarized data utilizing the original data and/or aggregated data utilizing the original data.

In some embodiments, the record valuation can be a function of the analytics rigor and/or opacity of data transformation applied by data transformation system 430. In such embodiments, record valuation can be a function of the analytic rigor and/or opacity of functions employed by the data transformation system 430. Thus, the functions applied by data transformation system 430 can be assigned their own function valuations in the same or similar fashion as discussed in conjunction with FIGS. 9A-9E, where record valuation of a record is proportional to, based on and/or derived from the function valuation of the transformation functions applied to the raw data to generate the record.

In some cases, records having particular values for one or more of its fields can dictate and/or influence the value of the record. The record-based query pricing schemes can indicate particular record valuations for records with particular values for a particular field, and/or records with values of the particular field within a particular set and/or range. The query pricing module 880 can determine when a given record has a value of a field meeting such criteria indicated by the record-based query pricing scheme, and the record valuation can be determined as a mapping and/or function of having this particular value of a field meeting the criteria.

Similarly, record-based query pricing scheme can indicate particular plurality of values, plurality of sets of values, and/or plurality of ranges of values. Each value, set of values, and/or range of values in this plurality can correspond to a particular field in a particular field grouping. The query pricing module 880 can determine, for a given record, when each value of each of the fields in this particular field grouping meet and/or compare favorably to the corresponding one of the plurality of values, plurality of sets of values, and/or plurality of ranges of values. When this criteria for values of all fields in the field grouping is determined to be met for a given record, the record valuation can be determined as a mapping and/or function of having values in all fields the field grouping meeting this criteria.

In such embodiments where values of particular and/or sets of values for multiple fields dictate and/or influence the record valuation, the record-based query pricing scheme can be configured to indicate the record valuation and/or record cost for a record having particular values for one or more fields. Thus, the mapping and/or function of field value for one or more fields to record valuation can be entirely configured via user input to GUI 245, for example, based on the known and/or perceived valuation of records having values in the configured ranges for one or more fields determined by the user.

Alternatively, the relationship and/or mappings between record valuation of a record and the record's field values of a particular field and/or field grouping can be determined automatically by the query pricing module 880. For example, the query pricing module 880 can determine valuations associated with particular field values based on information regarding values of records stored in the database system 112 and/or information regarding values of records accessed and/or requested in previous queries based on the query logging system 450.

As one example of automatically determining the relationship and/or mappings between record valuation of a record and the record's field values of a particular field and/or field grouping, the query pricing module 880 can generate record valuations as a function of rarity of values in one or more particular fields. For example, records with values that are particularly rare and/or records that contain outlier information can be of particular value in some cases, as this information may be harder to come by and/or may lead to more insightful analytic conclusions.

In such embodiments, the record-based query pricing scheme configured by and/or determined for a corresponding data provider can indicate a selection to valuate records by rarity, and can further indicate one or more particular fields and/or one or more particular field groupings for which the rarity of their respective values should be utilized. The query pricing module 880 can process records of the particular provider and/or across all providers stored in the database system to a range of values that the configured particular fields, and/or collective values of the configured field groupings, have set in at least one instance in the database. This can include querying the database system 112 for records with these particular values and/or for records meeting particular criteria configured by the user via GUI 245, and receiving a count, aggregation, and/or raw data for the entries in the database system 112 meeting these criteria. The query pricing module 880 can generate a histogram and/or other rarity data by counting number of instances of particular values and/or values within particular ranges for these fields and/or field groupings. The resulting histogram can be utilized by query pricing module 880 to determine which values of a particular field and/or collective group of values of a particular field grouping are particularly rare, based on having a low number of instances across records in the database system and/or based on having less than a predetermined rarity threshold number and/or proportion of instances across records in the database system.

For a record with given values of one or more fields, for example, for particular fields configured by the user via GUI 245, the record valuation for this given field can be a decreasing function of the number and/or proportion of times these given values and/or value ranges corresponding to these given values have appeared in these one or more fields of other records in the database system 112 by the data provider and/or across all data providers. For example, a first record can have a first set of values for a set of one or more fields of a field grouping. A second record can have a second set of values for the set of one or more fields of the field grouping. The first record can have a higher record valuation than the second record in response to the first set of values being rarer than the second set of values. This can be based on a number of instances of the first set of values for the set of one or more fields of the field grouping in records in the database system 112 being lower than the number of appearances of the second set of values for the set of one or more fields of the field grouping in records in the database system 112.

In other embodiments, the record-based query pricing scheme configured by and/or determined for a corresponding data provider can indicate a selection to valuate records by demand for records with their values. This can include evaluating how many previous queries and/or result sets included other records of the database system 112 having the same values and/or same range of values in or more particular fields, for example where the one or more particular fields are fields of interest configured by the user via GUI 245. For example, a first record can have a first set of values for a set of one or more fields of a field grouping. A second record can have a second set of values for the set of one or more fields of the field grouping. The first record can have a higher record valuation than the second record in response to the first set of values being of higher demand than the second set of values. This can be based on a first number of other queries and/or result sets that included records with the first set of values for the set of one or more fields of the field grouping being higher than a second number of other queries and/or result sets that included records with the second set of values for the set of one or more fields of the field grouping. The first number and second number of other queries can be determined based on querying the query logging system 450 for previous queries and/or result sets that included records with the first set of values for the set of one or more fields of the field grouping, and with the second set of values for the set of one or more fields of the field grouping, respectively.

In other embodiments of evaluating demand of particular values, the filtering parameters of previous queries can be evaluated. The filtering parameters can indicate ranges of values of one or more fields required for a record to be included in a final result set and/or intermediate result set. In particular, filtering parameters of previous queries can indicate particular ranges of values of interest for particular fields of interest, can thus indicating the corresponding end user was interested in viewing and/or utilizing only records with the particular fields of interest having these particular values of interest. Determining numbers and/or proportions of queries with particular filtering parameters over time and/or within a time frame more recent than a predetermined recency threshold can thus be indicative of the demand of various records, based on having values comparing favorably to filtering parameters that were utilized frequently or infrequently.

In such embodiments, a histogram and/or other usage data for filtering parameters utilized to generate result sets over time and/or within a recent time window can be generated by the query pricing module 880 based on querying the query logging system 450 for filtering parameters of queries over time and/or within the recent time window. The histogram and/or usage data can indicate a number and/or proportion of queries that utilized each of a set of different filtering parameters utilized over time. This can further be grouped by queries that utilized particular filtering parameters to generate result sets to be returned by the query to the end user and/or that utilized particular filtering parameters to generate result sets to be utilized as input to a particular query function. For a given record in a given result set, the values of the record can be compared to one or more different filtering parameters indicated in the histogram to determine whether the values of the record meet and/or otherwise compare favorably to one or more of the filtering parameters. If a first record compares favorably to filtering parameters indicated by the histogram to have a high proportion of usages in queries, such as a proportion of usages that exceeds a predetermined usage threshold, the first record can be determined to be in high demand. If a second record does not compare favorably to any filtering parameters indicated by the histogram to have a high proportion of usages in queries, such as not comparing to any filtering parameters with proportion of usages that exceeds the predetermined usage threshold, the second record can be determined to be in lower demand than the first record. The first record can have a higher valuation than the second record based on being determined to be in higher demand than the second record.

The tracking of filtering parameter usage overtime can alternatively or additionally be utilized to determine demand of particular query functions based on their filtering parameters. A first query function of a given query can be determined to be in high demand in response to having filtering parameters that match, are stricter than, are similar to, and/or compare favorably to first filtering parameters indicated by the histogram to have a high proportion of usages in queries, such as a proportion of usages that exceeds a predetermined usage threshold. A second query function of the same or different query can be determined to be in lower demand in response to having second filtering parameters that do not compare favorably to any filtering parameters indicated by the histogram to have high proportions of usages in queries, and/or not compare favorably to any filtering parameters having a proportion of usages that exceeds the predetermined usage threshold. The first query function can have a higher valuation than the second query function based on the first query function being determined to be in higher demand than the second query function.

The record-based query pricing scheme can indicate a record-based pricing relationship 1205 between the determined record valuation and a record cost, where the total query cost and/or subtotal of the query cost induced by the records utilized by and/or returned by the query is a summation, average, or other function of the record costs for some or all records determined to be records utilized by and/or returned by the query. Alternatively, this record-based pricing relationship 1205 can be a function or mapping of other characteristics of the record discussed herein to record cost.

In the example of the record-based pricing relationship 1205 illustrated in FIG. 12C, the record-based pricing relationship 1205 dictates that the record cost is a direct function of record valuation. In other embodiments, the record cost can be any monotonically increasing function, and/or can otherwise be any increasing function of record valuation, where records with higher record valuations have higher record costs than records with lower record valuations. In some cases, a non-zero minimum record cost 1210 is induced for records with the lowest possible record valuations and/or otherwise least favorable record valuations, where every record is charged at least the minimum query cost 1210. For example, all records with record valuations that are less than or equal to a first threshold record valuation are assigned the minimum record cost.

The record cost can also be capped at a maximum record cost 1220. In the example of the record-based pricing relationship 1205 illustrated in FIG. 12D, the record cost asymptotically approaches the maximum record cost as record valuation increases, where the maximum record cost is never reached and/or where the record cost is otherwise strictly below this maximum record cost 1120. Alternatively, the record cost can be set equal to the maximum record cost 1220 for any records with record valuations that are greater than or equal to a second threshold record valuation.

FIGS. 12C and 12D depict record cost as a continuous value, where record cost is a continuous function of record valuation. In other embodiments, the record cost can be discretized into a plurality of quantized record cost levels. For example, the plurality of quantized record cost levels can be associated with each of a plurality of subscription levels. An example of such an embodiment of the record-based pricing relationship 1205 is illustrated in FIG. 12E, where the record cost is assigned as one of a plurality of quantized record cost levels 1234, dictated based on a corresponding one of a plurality of record valuation ranges 1232 that the record valuation determined for the record falls within. In some cases, the record valuation is also one of a plurality of discrete values. In such cases, each quantized record level 1234 can correspond to a single one of the plurality of discrete record valuations and/or to a record valuation range 1232 that includes multiple, sequential discrete record valuations.

FIGS. 13A-13E illustrate example embodiments of a query pricing module that utilizes a user-based query pricing scheme to generate costs based on the end user that requested the query. In some cases, a query pricing scheme of a data providers includes and/or utilizes a user-based query pricing scheme, where the total cost and/or a subtotal of the total cost of the query is a function of the user subscription of the end user with the data providers and/or usage history of the end user, such as previous query costs owed to the data provider and/or previous queries involving the data provider, within the subscription period and/or over time.

As illustrated in FIG. 913, user-based query pricing scheme data for one or more data providers can be retrieved by the pre-execution query pricing module 810, for example, based on the user identifier of an end user that sent the query and/or otherwise determined based on the query. The user identifier can be utilized to determine the subscription level and/or database usage level associated with the user, for example, based on querying the user management system 440 for this information and/or the database usage for queries previously requested by the user for usage of data supplied by the same data provider associated with the given query and/or all data providers, for example, within the subscription period or otherwise over time. In such cases, the user-based query pricing scheme data can be specific to a particular subscription level and/or database usage level, and can be retrieved and/or utilized based on this determined subscription level and/or database usage. Similarly as illustrated in FIG. 9B, user-based query pricing scheme data for one or more data providers can be retrieved by the runtime query pricing module 825, for example, based on the user determined to have sent the query executed to produce the result set.

The user-based query pricing scheme data can indicate, given the subscription level and/or database usage level of an end user that requested the given query and/or to whom the results of the query will be transmitted, the total query cost, and/or a subtotal of the query cost induced by the end user's subscription level and/or usage history, charged by the corresponding data provider and/or charged by the analytics system.

The user-based query pricing scheme can indicate a record-based pricing relationship 1205 between the determined record valuation and a query cost that corresponds to the total query cost and/or subtotal of the query cost induced by subscription level or database usage level of the end user. Alternatively, this user-based pricing relationship 1305 can be a function or mapping of other characteristics of the end user discussed herein to query cost, and/or is another function or mapping of other characteristics of the end user discussed herein to a subtotal of the query cost induced by subscription level or database usage level of the end user.

In the example of the user-based pricing relationship 1305 illustrated in FIG. 12C, the user-based pricing relationship 1305 dictates that the query cost is a fixed mapping of user subscription level that decreases with more favorable subscription level. Queries requested by end users with one of plurality of subscription levels 1332 can have a corresponding query cost 1334. Alternatively, queries requested by end users with one of plurality of subscription levels 1332 can have a corresponding query cost range, where the query cost within the query cost range is determined based on other factors such as functions, fields, result sets, or records of the query as discussed previously. The query cost ranges for the plurality of subscription levels 1332 can include overlapping query costs, or alternatively can be mutually exclusive query cost ranges. The query cost can otherwise be any monotonically decreasing function, and/or can otherwise be any discrete or continuous decreasing function of favorability of user subscription, where queries requested from end users with more favorable subscription levels have lower query costs than queries requested from end users with less favorable subscription levels.

In the example of the user-based pricing relationship 1305 illustrated in FIG. 13D, the user-based pricing relationship 1305 dictates that the query cost is a decreasing function of database usage level that decreases with higher and/or otherwise more favorable database usage level. In some cases, a maximum query cost 1320 is induced for end users with the lowest possible database usage level and/or otherwise least favorable database usage level, where every record is charged at most the maximum query cost 1320. In some cases, the query cost asymptotically approaches the maximum query cost as database usage level decreases, where the maximum query cost is never reached and/or where the total query cost and/or subtotal of the query cost induced by end user is otherwise strictly below this maximum query cost 1320. The maximum query cost 1320 can be the same or different from the maximum query cost 920, maximum query cost 1020, or maximum query cost 1120. For example, all queries requested by end users with database usage levels that are less than or equal to a first threshold database usage level are assigned the maximum record cost.

The total query cost and/or subtotal of the query cost induced by end users requesting of the query can have a minimum query cost 1310. In the example of the function-based pricing relationship 1305 illustrated in FIG. 13D, the query cost asymptotically approaches the minimum query cost as database usage level increases, where the minimum query cost is never reached and/or where the total query cost and/or subtotal of the query cost induced by end user is otherwise strictly above this minimum query cost 1310.

Alternatively, the total query cost and/or the subtotal of the query cost induced by requesting end users of the query can be set equal to the minimum query cost 1310 for any queries whose requesting end users have database usage levels that are greater than or equal to a second threshold database usage level.

FIG. 13D depicts query cost as a continuous value, where query cost is a continuous function of database usage level. In other embodiments, the total query cost and/or the subtotal of the query cost induced by database usage level of the requesting end user of the query can be discretized into a plurality of quantized query cost levels. For example, the plurality of quantized query cost levels can be associated with each of the plurality of subscription levels. An example of such an embodiment of the user-based pricing relationship 1305 is illustrated in FIG. 13E, where the total query cost and/or the subtotal of the query cost induced by end user of the query is assigned as one of a plurality of quantized query cost levels 1344, dictated based on a corresponding one of a plurality of database usage level ranges 1342 that the database usage level determined for the query falls within. In some cases, the database usage level is also one of a plurality of discrete values. In such cases, each quantized query cost level 1344 can correspond to a single one of the plurality of discrete database usage levels and/or to a database usage level range 1342 that includes multiple, sequential discrete database usage levels.

In some cases, a user-based query pricing scheme set by a particular data provider and/or by an entity associated with the analytics system indicates its own function-based query pricing scheme, field-based query pricing scheme, result set-query pricing scheme, and/or record-based query pricing scheme. For example, the minimum query costs 910, 1010, and/or 1110; the maximum query costs 920, 1020, and/or 1120; the minimum record cost 1210; and/or the maximum record cost 1220 can be different for users at different subscription levels and/or with different database usage levels. In such cases, the same or different base functions can be utilized for these schemes for different user subscriptions and/or database usage levels, where the base function is shifted with respect to the query cost axis to account for these differing maximum and minimum thresholds. Alternatively or in addition, the user subscription level and/or database usage level can serve as a multiplier that increases query costs for the end user determined by the user for the function-based query pricing scheme, field-based query pricing scheme, result set-query pricing scheme, and/or record-based query pricing scheme. The multiplier can be an inverse function of the user's subscription level and/or database usage level, where users with less favorable subscription levels and/or database usage level have a higher multiplier.

Users with more favorable subscription levels can have their query and/or record costs set in accordance with lower minimum costs and/or lower maximum costs of one or more of these pricing schemes, while users with less favorable subscription levels can have their query and/or record costs set in accordance with higher minimum costs and/or higher maximum costs of one or more of these pricing schemes. Users with greater and/or otherwise more favorable database usage levels can have their query and/or record costs set in accordance with lower minimum costs and/or lower maximum costs of one or more of these pricing schemes, while users smaller and/or otherwise less favorable database usage levels can have their query and/or record costs set in accordance with higher minimum costs and/or higher maximum costs of one or more of these pricing schemes.

Alternatively or in addition, the query cost induced by other query pricing schemes discussed herein can be jointly combined with user subscription level and/or database usage level to otherwise charge lower query costs for particular types of queries in response to the corresponding end user having a more favorable subscription level. A particular query requested by a first end user can be charged a lower total query cost to a particular data provider and/or the analytics system 110 than the same query requested by a second end user based on the first end user having a more favorable subscription level and/or database usage level than the second end user.

The database usage level determined for an end user can indicate a number of queries performed for the end user over time and/or within a predetermined time window such as a time window corresponding to a subscription period. This indicates only a number of queries performed that involved and/or returned records for a particular data provider, such as a data provider determined to have supplied data involved in the given query, and/or can be aggregated over all data providers. The database usage level can correspond to and/or be an increasing function of this number of queries.

The database usage level can indicate a number of records returned to the end user over time and/or within a predetermined time window such as a time window corresponding to a subscription period. Alternatively or in addition, the database usage level can indicate a number of records accessed and/or otherwise utilized in queries performed for the end user over time and/or within the predetermined time window. The number of records can indicate only distinct, unique records, where records that were returned and/or utilized in multiple queries are each only counted once. This can indicate only a number of records returned that were supplied by a particular data provider, such as a data provider determined to have supplied data involved in the given query, and/or can be aggregated over all data providers. The database usage level can correspond to and/or be an increasing function of this number of records.

The database usage level can indicate a running total query cost of queries performed for the user, based on a summation of query cost data for queries performed for the user over time and/or within a predetermined time window such as a time window corresponding to a subscription period. This can indicate only a running total query cost owed to and/or paid to a particular data provider, such as a data provider determined to have supplied data involved in the given query, and/or can be aggregated over all data providers. This can indicate only a running total query cost owed to and/or paid to an entity associated with the analytics system 110. The database usage level can correspond to and/or be an increasing function of this running total query cost.

The user management system can track and/or store such total numbers of queries, records, and/or query costs for one or more end users, specific to one or more data providers. Alternatively or in addition, the query processing system 114 can track and/or store such total numbers of queries, records, and/or query costs, where these totals are updated for a particular end user when the query processing system 114 receives a new query from the end user, executes a new query for the end user, or facilitates transmission of a query response indicating the result set of the query to the end user.

In some cases, the subscription level is selected by the user and/or paid for by the user in recurring subscription periods, where higher and/or otherwise more favorable subscription levels have a higher recurring cost. Alternatively, the subscription level of an end user is determined as a function of their database usage level within the given subscription period and/or across one or more previous subscription periods. For example, each of the plurality of subscriptions levels can have a corresponding database usage level threshold requirement. These database usage level threshold requirements for one or more subscription levels of a particular data provider can be configured by data providers in the billing structure data, for example, via interaction with GUI 245.

Each database usage level threshold requirement for a particular data provider can indicate a required number of queries, number of records, and/or running query cost total of a user's database usage level to be included in the corresponding subscription level. These required number of queries, number of records, and/or running query cost total can correspond to usage specific to the data provider, such as only queries that involved data supplied by the data provider; only record supplied by the data provider; and/or only query costs owed to and/or paid to the data provider in accordance with their query pricing scheme.

For a particular data provider and/or for the analytics system, the end user is automatically elevated to a more favorable subscription level within the same subscription period and/or for the next subscription period in response to their database usage level being determined by the analytics system 110 to compare favorably to the corresponding database usage level threshold requirement for this more favorable subscription level. When a subscription period elapses, the end user can automatically be promoted and/or demoted to the most favorable subscription level in the plurality of subscription levels to which their database usage level for the elapsed subscription period compares favorably.

Alternatively or in addition to a single data provider's configuration of different query pricing schemes for end users with different subscription levels, different data providers can further configure database usage level threshold requirements indicating different total numbers of queries, records, and/or query costs required for each of their subscription levels, which can be the same database usage level threshold requirements for the same or different number of subscription levels than other data providers. In some embodiments, the entity associated with the analytics system can further configure their own one or more subscription levels with database usage level threshold requirements, where these database usage level requirements correspond to total numbers of queries, records, and/or query costs across the whole system, regardless of data provider.

In some embodiments, the subtotal of query cost to a particular provider and/or the analytics system for a given query received by a given end user is a function of at least two of: i different function valuations of the query $a_1$–$a_g$, where g is greater than or equal to one and where the value of g is based on the number of different functions utilized upon data supplied by the particular provider in the query and/or is based on the number of different means of evaluating function valuation discussed herein as configured by the corresponding particular provider; one or more different field valuations of the query $b_1$–$b_h$ where h is greater than or equal to one and where the value of h is based on the number of different fields and/or field grouping of the query for records supplied by the particular provider, and/or is based on the number of different means of evaluating field valuation discussed herein as configured by the corresponding particular provider; one or more different result set valuations of the query $c_1$–$c_i$ where i is greater than or equal to one and where the value of i is based on the number of different final and/or partial result sets of the query that include records supplied by the particular provider, and/or is based on the number of different means of evaluating result sets discussed herein as configured by the corresponding particular provider; one or more different record valuations of the query $d_1$–$d_j$ where j is greater than or equal to one and where the value of j is based on the number of different records supplied by the particular provider that are returned by and/or utilized in of the query, and/or is based on the number of different means of evaluating records discussed herein as configured by the corresponding particular provider; a subscription level of the end user e; and/or a data usage level of the end user f.

In particular, the query cost owed to a particular provider X can be equal to and/or based on a function $Q_X$, dictated by the query pricing scheme for the particular provider X, where the function $Q_X$ is a function of some or all of these parameters:

$$\text{query cost for provider } X = Q_X(\{a_1:a_g\},\{b_1:b_h\},\{c_1:c_i\},\{d_1:d_j\},e,f)$$

As a particular example, the function $Q_X$ can dictate the query cost for provider X can be a weighted sum of some or all of these determined parameters, where the weights applied to each parameter are configured by the corresponding data provider X via GUI 245. Alternatively, the weights applied to each parameter can be applied automatically, for example, to optimize the pricing scheme based on previous prices and/or previous demand and/or usage history of particular queries.

The total query cost can be sum of query costs determined for all data providers 1-N. In particular, the total query cost owed can be equal to and/or based a sum of all query costs owed to each data provider entity 1-N, based on a plurality of respective function $Q_1$–$Q_N$ configured by the corresponding data provider entities 1-N via user input to their respective provider device 230 via GUI 245:

$$\text{total query cost} = \Sigma_{x=1}^{N} Q_X(\{a_1:a_g\},\{b_1:b_h\},\{c_1:c_i\},\{d_1:d_j\},e,f\})$$

In some cases, each provider's pricing scheme can utilize different values for the same and/or different number of parameters $a_1$–$a_g$, $b_1$–$b_h$, $c_1$–$c_i$, $d_1$–$d_j$, e, and/or f, which can be determined as different functions of the same and/or different criteria based on the corresponding provider's query pricing scheme. In some embodiments, one of these functions $Q_X$ corresponds to the function dictated by the entity associated with the analytics system 110 itself.

FIGS. 14A-14E illustrated embodiments where the user device 140 is configured to enable end users to preview the query cost prior to selecting to transmit the query to the analytics system 110 for processing and/or prior to receiving and/or viewing results of the query. Such embodiments improve existing systems as they enable end users to view a queries cost prior to its execution and/or prior to viewing results, allowing the end user to determine whether or not they deem the execution of the query and/or access to the query results valuable enough to warrant paying the quoted and/or final price. Furthermore, such embodiments improve existing systems as they enable end users to edit their proposed queries to lower the total query cost and/or to lower particular subtotals of the query cost, based on their preferences. Finally, such embodiments introduce improvements to database systems and/or analytics systems by improving the efficiency of the database system and/or analytics systems by limiting incoming queries and/or automatically limiting database usage by enabling end users to request only a subset of their requested queries that meet their cost preferences.

Figure 14A:
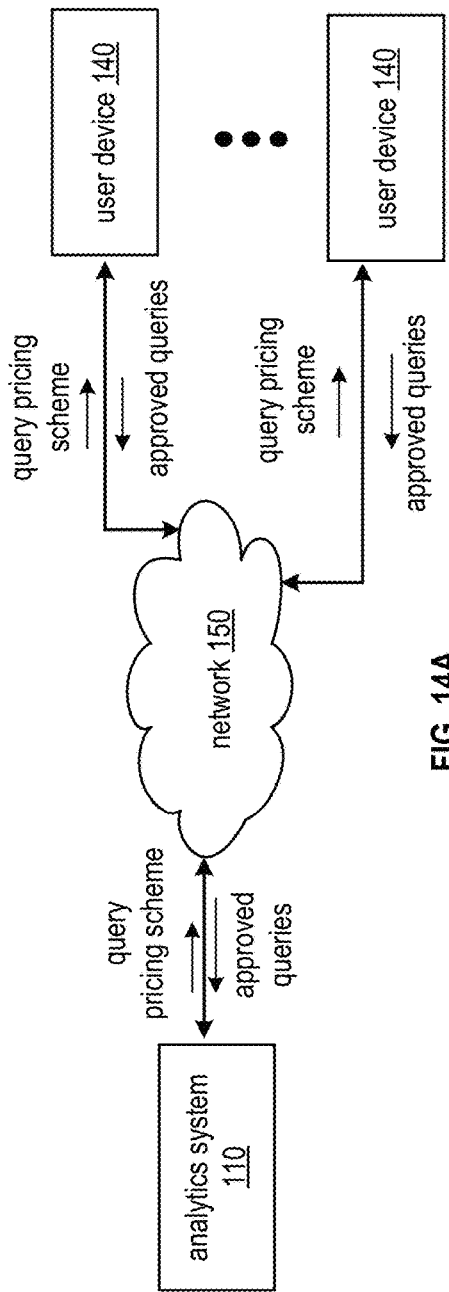
FIG. 14A is a schematic block diagram illustrating communication between an analytics system and a plurality of user devices in accordance with various embodiments of the present invention.

As illustrated in FIG. 14A, a query pricing scheme, such as some or all query pricing schemes 1-N corresponding to query pricing schemes set by data providers 1-N utilized to generate query cost data for a query prior to execution as discussed herein, can be sent to some or all user devices 140. For example, the user application data 325 can include this query pricing scheme query ruleset, as well as instructions to implement the pre-execution query pricing module 810 and/or the result set estimator module 1130. User devices 140 can otherwise be operable to perform some or all of the functionality of the pre-execution query pricing module 810 and/or result set estimator module 1130 discussed herein to generate query cost data by utilizing its processing module 310 and/or memory module 320.

Figure 14B:
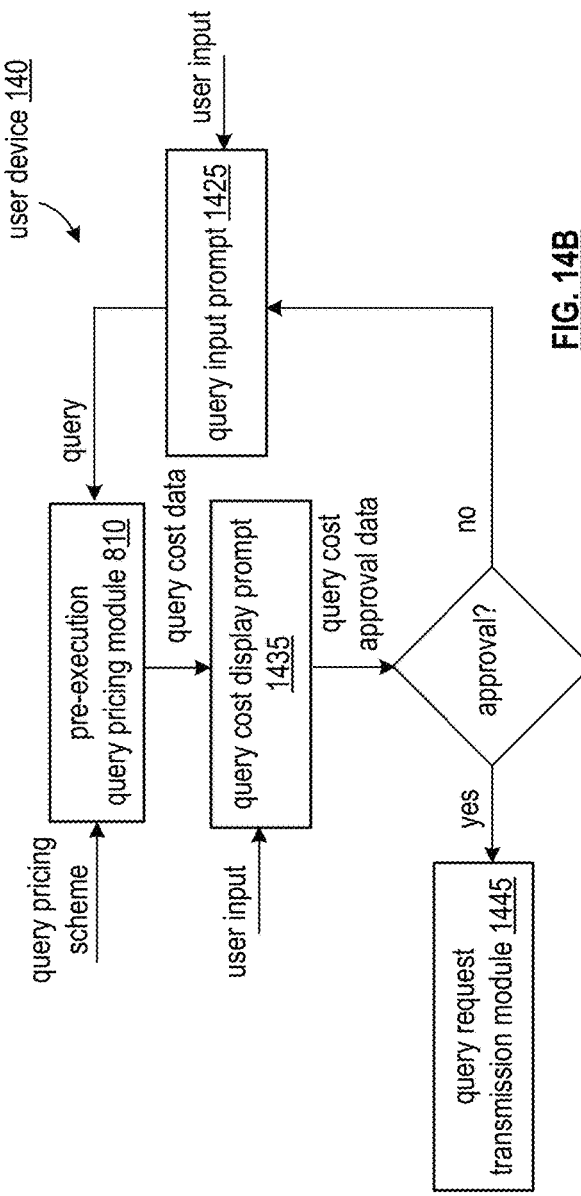
FIG. 14B is a flowchart diagram illustrating functionality of a user device in accordance with various embodiments of the present invention.

FIG. 14B illustrates a flow diagram implemented by user device 140 in conjunction with executing the user application data 325. The GUI 345 can display a query input prompt 1425 that prompts the end user to enter a query. An end user can interact with GUI 345 to enter a query in response to the query input prompt 1425. The user device implements the pre-execution query pricing module 810 and/or result set estimator module 1130 based on the received and/or locally stored query pricing scheme to generate query cost data for this given query. A query cost display prompt 1435 can be displayed via GUI 345 based on the query cost data. For example, an actual and/or estimated cost total indicated in the query cost data generated by the pre-execution query pricing module 810 for the given query can be displayed via GUI 345. Alternatively or in addition, actual and/or estimated subtotals for one or more data providers indicated in the query cost data and/or for one or more types of valuations indicated in the query cost data can be displayed via GUI 345.

The end user can indicate a selection via user input to GUI 345 indicating whether they wish to proceed with the query given these actual and/or estimated costs. The user device can generate query cost approval data based on the user selection or other user input to indicate whether or not the query cost data is approved by the end user. If the query cost approval data indicates approval of the query cost data, the query is transmitted to the analytics system 110, for example, via a query request transmission module 1445 that packages the query for transmission and/or facilitates transmission of the query by the user device 140 to the analytics system 110 for processing. If the query cost approval data indicates the query cost data is not approved, for example, because the total cost or one or more subtotals are deemed by the end user to be too high, the query is not transmitted to the analytics system for processing.

Additionally, if the query cost approval data indicates the query cost data is not approved, the same or different query input prompt 1425 can be displayed by the GUI 345. For example, the query input prompt can present a prompt for the user to amend their query and/or enter a new query. The new and/or amended query can be processed by the pre-execution query pricing module 810 to generate new query cost data for the new query, and the user can indicate whether or not they wish to transmit the new query by indicating whether or not the new query cost data is acceptable. This process can continue over several iterations, for example, until the query cost approval data indicates the end user is satisfied with the query cost for most recently entered query, where this most recently entered query is transmitted by the query request transmission module 1445 in response.

Alternatively, a proposed query entered by the user via GUI 345 can be transmitted to the analytics system 110, and query cost data can be generated by the analytics system 110 by utilizing the pre-execution query pricing module 810. This query cost data can be transmitted to the user device 140 for display as query cost display prompt 1435 via GUI 345. The user can similarly elect whether they approve of these query costs, and the query request transmission module 1445 can similarly be utilized to send a request to execute the proposed query when the user indicates approval. The analytics system 110 can facilitate execution of the query in response to receiving the request, where the query results resulting from the execution are then returned to the user device 140. The analytics system 110 can forego execution of the query in response to receiving an indication that the user does not approve of the query cost data and/or the query is not executed unless the transmission indicating approval and/or payment of the query costs is received from user device 140.

Alternatively or in addition, a proposed query entered by the user via GUI 345 can be transmitted to the analytics system 110, and query cost data can be generated by the analytics system 110 by executing the query and utilizing the runtime query pricing module 825. This query cost data can be transmitted to the user device 140 for display as query cost display prompt 1435 via GUI 345. The user can similarly elect whether they approve of these query costs, and the query request transmission module 1445 can similarly be utilized to send a request to retrieve the query result of the query when the user indicates approval, and the query result can be transmitted by the analytics system 110 in response to receiving the request and/or in response to determining the corresponding query costs were paid by the user. When the user does not indicate approval and/or does not pay the query costs, the query results are not transmitted to the user device 140. In some cases, the user is billed some non-zero costs regardless of whether they elect to pay the full query cost to receive the query results. For example, this can include costs to the analytics system 110, for processing time and/or resource consumption required to execute the query, that are billed regardless of whether the query results are ultimately transmitted to the end user.

FIG. 14C illustrates an example embodiment of a GUI 345 displaying a query cost display prompt 1435 for query cost data generated for a proposed query entered by the user by utilizing the pre-execution query pricing module 810 implemented by the user device 140. The GUI can display an estimated and/or actual total query cost indicated in the query cost data. In the example illustrated in FIG. 14C, the estimated total query cost for the proposed query is $100 USD. The total and/or estimated cost can alternatively be displayed as any currency and/or valuation, for example, where the displayed currency is configurable by the user via GUI 345.

The GUI 345 can display actual and/or expected totals owed to each of a plurality of data providers and/or the analytics system itself. In the example illustrated in FIG. 14C, the estimated total of $100 USD includes an estimated cost of $80 to the entity associated with data provider X, an estimated cost of $5 to the entity associated with data provider Y, and an estimated cost of $15 to the entity associated with the analytics system. Alternatively, the GUI 345 can display ratios and/or percentages of the total cost that will be and/is expected to be owed to each data provider and/or the analytics system. This can be preferable in embodiments where the total query cost is not indicated and/or is not displayed.

The GUI 345 can display actual and/or estimated subtotals for some or all data providers based on different costs induced by the query amounting to the actual and/or estimated total. In the example illustrated in FIG. 14C, the estimated total of $80 to data provider X includes a function-based subtotal of $30 USD, a field-based subtotal of $10 USD, and a result set-based subtotal of $40 USD. The estimated total of $5 to data provider Y includes a function-based subtotal of $1 USD, and a result set-based subtotal of $4 USD. The estimated total of $15 to the analytics system includes a function-based subtotal of $8 USD, and a result set-based subtotal of $7 USD. Alternatively, the GUI 345 can display ratios and/or percentages of the total cost that will be and/is expected to be owed to each data provider and/or the analytics system. This can be preferable in embodiments where the total query cost owed to each data provider is not indicated and/or is not displayed.

In other embodiments, other types of subtotals discussed herein, such as record-based subtotals and/or user-based subtotals, can be displayed via GUI 345. Alternatively, the record-based subtotals may not displayed, for example, as a result of being aggregated and/or otherwise incorporated into the result set-based subtotal.

The GUI 345 can further display a rating of valuations that induced each subtotal. In the example illustrated in FIG. 14C, the function valuation for data provider X is 7.8 out of 10, the function valuation for data provider Y is 6 out of 10, and the function valuation for the analytics system is 4 out of 10. The field valuation for data provider X is 4.2 out of 10. The result set valuation for data provider X is 6.8 out of 10, the result set valuation for data provider Y is 5.5 out of 10, and the result set valuation for the analytics system is 7.7 out of 10. While all of these valuations are displayed on a 10 point scale, the same or different scales of valuation can be displayed for different data providers and/or different subtotals.

In some embodiments, the GUI 345 can display a graphical plot indicating the distribution of valuations and/or costs for a particular subtotal and/or a particular provider, can indicate the mean and/or standard deviation of the valuations and/or costs in the distribution, and/or can indicate that the distribution is in accordance with a uniform distribution, normal distribution, skewed distribution, and/or other type of distribution. These distributions can be determined by the analytics system 110 based on the query cost data generated for users over time and/or within a recent time frame, where updated distributions are periodically transmitted by the analytics system 110 to some or all the user devices 140 for display via GUI 345. These distributions can be determined by the analytics system 110 and/or user device 140 based on the query pricing schemes themselves. In some cases, the GUI can display and/or indicate the pricing relationships 905, 1005, 1105, 1205, and/or 1305, and/or can display and/or indicate particular metrics and/or functions as discussed herein dictating how corresponding valuations are generated. In other embodiments, such information describing the data providers' configuration of their query pricing schemes is private and is not shared to end users.

While not illustrated in FIG. 14C, the valuations can indicate more detailed information regarding one or more metrics dictating the corresponding query cost. For example, the GUI can indicate that the function valuation of 7.8 is based on use of a particular function and/or is based on the query returning raw values of records in the result set. The GUI 345 can indicate one or more highest cost query functions of the proposed query and/or highest contributing factors of query functions in the proposed query that led to the resulting function valuation, for example, based on this information being provided as further subtotals such as subtotals $a_1$–$a_g$ indicated in the query cost data. In some cases, all subtotals $a_1$–$a_g$, the individual costs of some or all query functions, and/or the individual costs of particular function parameters of a single function and/or each of the proposed query can be displayed via GUI 345.

As another example, the GUI 345 can indicate that the field valuation of 4.2 is based on use of and/or returning of a particular field and/or field grouping. The GUI 345 can indicate one or more highest cost fields of the proposed query and/or highest contributing factors of fields in the proposed query that led to the resulting field valuation, for example, based on this information being provided as further subtotals such as subtotals $b_1$–$b_h$ indicated in the query cost data. In some cases, all subtotals $b_1$–$b_h$, and/or the individual costs of usage of and/or returning of some or all fields and/or field groupings of the proposed query can be displayed via GUI 345.

As another example, the GUI 345 can indicate that the result set valuation of 6.8 is based on use of and/or returning of a result set of a particular size, particular age range, particular timestamp frequency, particular record storage distribution, and/or a result set with other particular characteristics. In some cases, the expected and/or actual size of the result set can be displayed instead of or in addition to the result set valuation. The GUI 345 can indicate one or more highest cost characteristics of one or more results sets of the proposed query and/or highest contributing factors of fields in the proposed query that led to the resulting result set valuation, for example, based on this information being provided as further subtotals such as subtotals $c_1$–$c_1$ indicated in the query cost data. In some cases, all subtotals $c_1$–$c_1$ the individual costs of each result set, and/or one or more costs for a particular result set, can be displayed via GUI 345. In some cases, record valuations, individual subtotals $d_1$–$d_j$ for one or more records, and/or an average, minimum and/or maximum record valuation can be displayed.

The GUI 345 can indicate which subtotals correspond to estimates that could change based on the actual result set generated in execution of the query, and/or which subtotals correspond to actual costs that will not change based on the actual result set generated in execution of the query. An estimated cost for a particular subtotal can be determined as indicated by the query pricing scheme based on estimating the corresponding valuation based on the actual valuation determined for previously executed queries, for example, where metrics utilized to determine these valuations are retrieved from the database usage log. In such embodiments, entries and/or aggregated data from the database usage log can be transmitted to the user devices periodically, can be incorporated in the query pricing scheme data sent to the user devices, and/or can be requested by the user device indicating for parameters for a particular, proposed query entered to the user device, where the corresponding entries and/or aggregated data is sent to the user device in response for use to generate estimates for the given proposed query.

In some embodiments, query costs can be tracked over time, for example, where user billing data received over time for the end user of the user device 140 can be utilized by the user device 140 to generate estimated query costs and/or subtotals based on the costs of similar queries previously executed by the same end user, as indicated in the billing data. For example, particular characteristics of the query can be compared to other queries, and the subtotals determined to be induced by this characteristic as indicated in the billing data can be utilized as the estimate and/or can be utilized to bound the estimate. In some cases, particular functions and/or filtering parameters of the proposed query can be utilized to generate a query for a corresponding subset of user's previous queries in the user's billing data with the same and/or similar functions and/or filtering parameters. The subtotals associated with these functions for previous queries identified to have the same and/or similar functions and/or same and/or similar filtering parameters can be averaged to generate the estimate. In some cases, the estimate can be bounded based on a maximum and/or minimum subtotal in this subset of previous queries that are similar to the given proposed query.

In some cases, the billing data across all users can be aggregated by the analytics system and/or can be anonymized and sent to each user device 140, enabling all previous queries across some or all end users to be queried by a particular user device, enabling the user device 140 to generate estimated costs based on a vaster span of previously priced queries.

In the example illustrated in FIG. 14C, the function-based subtotals of data providers X and Y are indicated as actual costs that will not change with execution, for example, as a result of the function-based query pricing scheme for data providers X and Y being based on functions called in the query that are determinable based on the query itself. The function-based subtotal of the analytics system is indicated as an estimated cost, for example, as a result of the function-based query pricing scheme for the analytics system being based on actual resource consumption and/or processing time of execution of the query functions that is not determinable until the query is actually executed. In the example illustrated in FIG. 14C, the field-based subtotal for data provider X is indicated as an actual cost, for example, as a result of the field-based query pricing scheme for data provider X being based on a fixed mapping for fields and/or field groupings returned in the query and/or utilized in the query that are thus determinable based on the query itself. In the example illustrated in FIG. 14C, the result set valuation is estimated for data providers X and Y, and for the analytics system, for example, as a result of their respective result set-based query pricing schemes being based on the size, characteristics, and/or actual records included in the result set that are not determinable and/or not certain until the execution of the query. These result set estimates can correspond to pricing estimates generated based on applying the pre-execution query pricing module 810 to result set estimate data generated by the result set estimator module 1130.

The differentiation between the actual costs and estimate costs can be utilized to determine a total actual cost that is known, and a total estimated remaining query cost. In the example illustrated in FIG. 14C, a first portion of the estimated total query cost attributed to actual query cost is determined based on a summation of all actual query costs, and is indicated to be $41 USD. A second portion of the estimated total query cost attributed to estimated remaining query costs is determined based on a summation of all estimated query costs, and is indicated to be $59 USD. In some cases, the end user is required to pay the actual query cost before the query is executed, for example, where remaining query costs are determined based on the execution and are charged to the end user after the query has been executed.

In some cases, the GUI 345 can further indicate actual and/or expected bounds for the pricing estimate. In the example illustrated in FIG. 14C, the result set-based subtotal for provider X has a cost range of $35-$70 USD; the result set-based subtotal for provider Y has a cost range of $4-$6 USD; the result set-based subtotal for the analytics system has a cost range of $2-$7 USD; and the function-based subtotal for the analytics system has a cost range of $2-$30 USD. These cost ranges correspond known, fixed minimums and maximums, for example, given known characteristics of the query; based on ceiling and floor result sets generated by the result set estimator module; and/or based on the maximum and/or minimum query cost for the corresponding subtotal indicated by the corresponding pricing relationship. In some cases, the cost ranges correspond to confidence intervals, for example, where the probability value and/or threshold level of confidence utilized to generate these confidence intervals are sufficiently high and/or are configured by the end user based on user input to GUI 345. In some cases, the GUI 345 can display a corresponding probability value for some or all cost ranges, indicating the probability that the actual cost will fall within the cost range. For example this probability can correspond to the confidence interval utilized to generate the cost range and/or can be based on another likelihood determined by the pre-execution query pricing module 810 in generating the query cost data.

The cost ranges can be utilized to determine a maximum total query cost and minimum total query cost. In the example illustrated in FIG. 14C, the maximum total query cost is indicated to be $154 USD based on a summation of the upper bound of all cost ranges, in addition to a summation of all actual costs. the maximum total query cost is indicated to be $84 USD based on a summation of the lower bound of all cost ranges, in addition to a summation of all actual costs.

The user can indicate whether they wish to proceed with proposed query at these costs, for example, by interacting with the GUI 345 to select either 'Yes' or 'No'. In other embodiments, the proposed query is displayed and the user can edit the proposed query, where updated query costs data is generated and displayed in response to each edit and/or in response to the user submitting new proposed queries.

FIGS. 14D-14F illustrate example embodiments of GUI 345 that further display cost saving recommendations to the end user based on their proposed query. In such embodiments, the user device 140 and/or analytics system 110 is further operable to generate recommendation data, for example, in conjunction with generating the query cost data and/or included within the query cost data. The recommendation data can be generated to indicate one or more cost-cutting amendments to the proposed query and/or other recommendations based on the proposed query. The recommendation data can be transmitted to the user device 140 from the analytics system 110 and/or can be displayed via GUI 345.

In particular, generating the recommendation data can include identifying at least one high contributing cost. This can include ranking the subtotals indicated in the query cost data identify one or more highest ranked subtotals. The highest ranked subtotals can correspond to subtotals with the highest raw cost in the ranking, for example, where the at least one high contributing cost is identified by selecting a predefined number of highest ranked subtotals. Alternatively, the high contributing cost can be determined by comparing each subtotal to a predefined cost threshold, where a subset of subtotals corresponding to high contributing costs are identified as ones of the plurality of subtotals with raw costs that exceed or compare unfavorably to the predefined cost threshold. The predefined cost threshold can be the same or different for different types of subtotals and/or for different data providers. The predefined cost threshold can be configured by the end user via user input to GUI 345.

For example, if one or more data provider subtotals corresponding to returning of and/or use of field A is determined to be a high contributing cost, the recommendation data can indicate a cost saving recommendation corresponding to exclusion of this field. In the example illustrated in FIG. 14D, the GUI 345 indicates that returning of "marital status" field for records in the result set contributes to 30% of the total cost of the query, for example, based on evaluating the query cost data for the corresponding proposed query and determining the field-based cost induced by the inclusion of the "marital status" field induced 30% of the total query cost. In some cases recommendation data can indicate a recommendation to exclude this provider from the query by advising that the end user include filtering parameters, such as additional parameters of a WHERE clause, that exclude this field from usage. In some cases, the recommendation data can include an amended query that is automatically generated based on the proposed query to include filtering parameters excluding this field from usage and/or from being returned in records of the final result set.

In some cases, the high contributing costs are generated by comparing costs charged by individual data providers. For example, the total costs and/or subtotals of costs of the same type can be compared across all data providers to automatically determine which data providers charge the highest costs and/or charge more than a threshold percentage more than other data providers. This can be utilized to determine which providers charge highest costs and/or that charge higher than a threshold percentage more than all other data providers involved in the query, where a data provider with a highest contributing cost can be recommended in the recommendation data to be excluded from the query. For example, if a particular provider charges substantially more than other providers for a particular subtotal and/or for the query as a whole, the recommendation data can indicate a cost saving recommendation corresponding to exclusion of the data provider.

In the particular example illustrated in FIG. 14E, the recommendation data indicates that the query involves data supplied by 9 providers. Provider X charges 50% of the total query cost. Provider X can be identified as inducing a high contributing cost in response to determining that the 50% is than a next highest contributing cost of, for example, 20%, by at least a threshold percentage, for example, where the threshold percentage is 10%. In some cases, recommendation data can indicate a recommendation to exclude this provider from the query by advising that the end user include filtering parameters, such as additional parameters of a WHERE clause, that exclude records provided by this data provider from result sets based on known domain data for the data provider and/or known tables the data provider contributes to. In some cases, the recommendation data can include an amended query that is automatically generated based on the proposed query to include filtering parameters excluding records supplied by this identified data provider.

In some embodiments, the high contributing costs are determined based on quality-to-cost values determined for some or all subtotals. These quality-to-cost values can be generated based on a ratio and/or other function of a determined raw cost of the subtotal, as well as a corresponding quality value. The metrics utilized to generate quality-to-cost values can be configured by the end user via GUI 345 and/or can be determined based on the query pricing schemes and/or can correspond to metrics utilized to generate the valuations as dictated by the query pricing schemes. For example, a quality-to-cost value for a result set can correspond to a ratio of the raw cost induced by the result set to the size of the result set, where high costs of result sets of a large size are acceptable as these result sets are of a higher quality warranting the higher cost, while high costs of result sets of a small size are unacceptable as these result sets are of a lower quality that do not warrant the higher cost.

For example, the relative proportion of the result set determined to be and/or estimated to be populated by these data providers can further influence the recommendation data. For example, consider a case where the data provider X of FIG. 14E is charging 50% of the query cost, but providing 70% of the records in the result set. Further consider this case where data provider Y is charging 20% of the query cost, but providing only 5% of the records in the result set. In this example, the costs charged by data provider X can be determined to have a more favorable quality-to-cost value than the costs charged by data provider Y as a result of the per-record cost charged by data provider X being cheaper than the per-record cost charged by data provider Y. As a result, the recommendation data in this example can alternatively propose that records of data provider Y be excluded from the result set, while recommending inclusion of record of data provider X.

FIGS. 15A-15F illustrate embodiments of an analytics system 110 that implements a compliance module that evaluates queries requested by an end user to determine whether they comply with a maximum query cost ruleset configured by this end user. Alternatively or additionally to interacting with the query cost display prompt 1435 to manually approve queries for processing based on their estimated or actual query cost data as discussed in conjunction with FIGS. 14A-14E, the end user can configure a maximum query cost ruleset that indicates one or more query cost maximum totals and/or subtotals for one or more types of queries and/or one or more types of features with a corresponding subtotal. This maximum query cost ruleset can be utilized by a query cost compliance module to automatically determine whether the query cost data determined for a given query requested by the end user complies with this end user's maximum query cost ruleset, where queries are only executed and/or where query results are only transmitted to the end user when the query cost data is determined to comply with the maximum query cost ruleset. End users will only be billed for queries that comply with their maximum query cost ruleset, and similarly will only have access to query results for queries that comply with their maximum query cost ruleset. Such embodiments improve existing systems as they further the customization of end user preferences with regards to how much they are willing to pay for various queries, and automatically ensures that only queries that the end user is willing to pay for will be executed and/or returned. Finally, such embodiments introduce improvements to database systems and/or analytics systems improving the efficiency of the database system and/or analytics system by reducing the number of queries that are processed and/or executed based on only executing and/or processing a subset of incoming queries that meet maximum query cost preferences of end users.

Figure 15A:
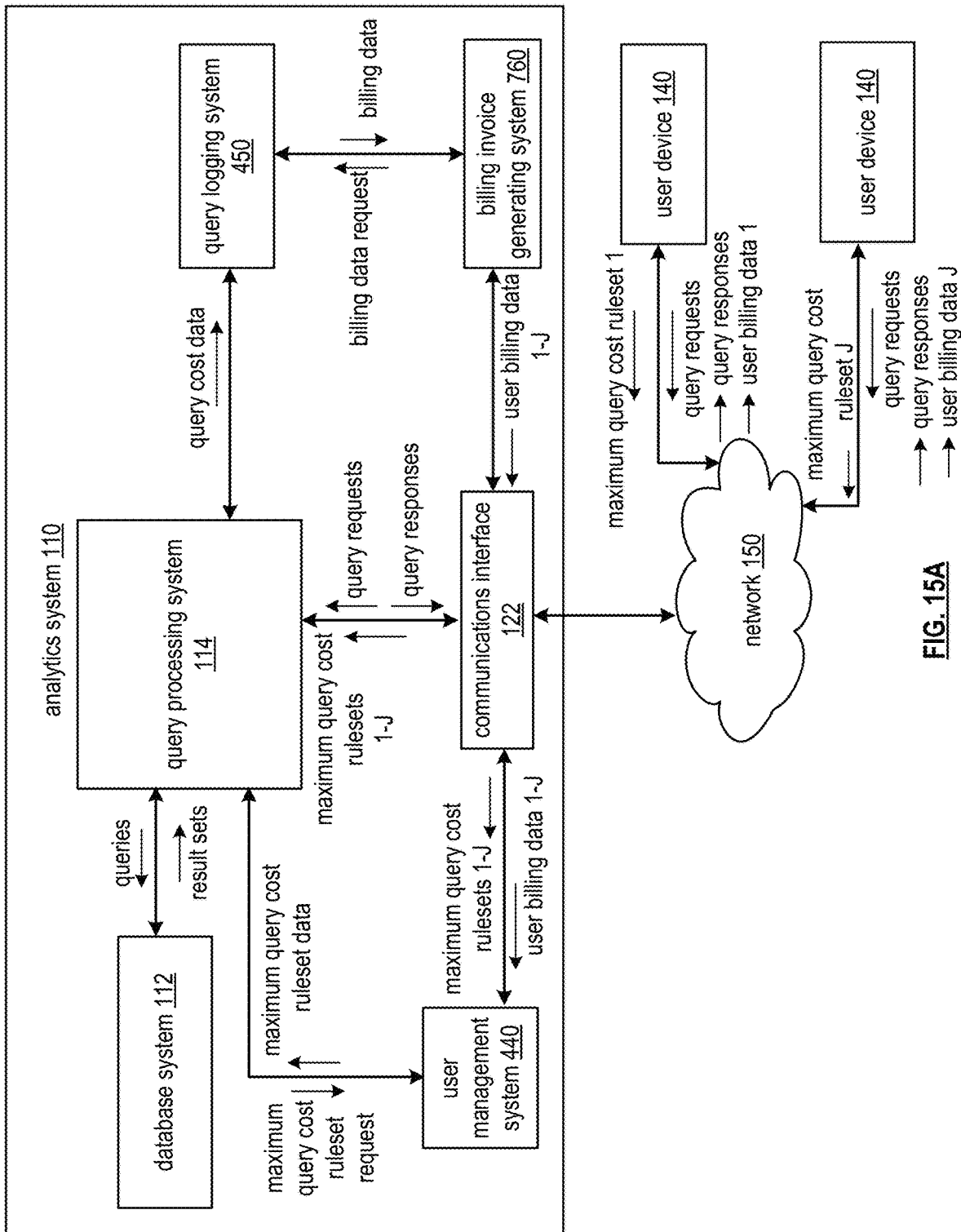
FIG. 15A is a schematic block diagram of an embodiment of an analytics system in accordance with various embodiments of the present invention.

FIG. 15A illustrates an embodiment of the analytics system 110 presented in FIG. 7A that further utilizes maximum query cost rulesets configured by end users. As illustrated in FIG. 15A, the analytics system can receive maximum query cost rulesets 1-J from a set of user devices 1-J. For example, each user device 140 can generate its maximum query cost ruleset based on user input to GUI 345 in response to at least one prompt displayed by GUI 345. The maximum query cost rulesets 1-J can be sent to the query processing system 114 for local storage, where the query processing system 114 accesses the maximum query cost ruleset of a particular end user to generate its compliance data for incoming queries from the end user. Query responses are only sent to the corresponding user device 140 for the end user when the corresponding query cost data is determined comply with the maximum query cost ruleset.

In some embodiments, query cost data is only sent to the query logging system when the compliance data indicates the corresponding query cost data complies with the maximum query cost ruleset, and thus the billing data only indicates query cost data for queries that were returned to the end user. In some embodiments, if execution of at least one partial query was required to generate the query cost data, even when the query cost data compares unfavorably to the maximum query cost ruleset, the end user can still be billed for costs associated with execution of the query, such as costs induced by processing resources and/or processing time owed to the analytics system as discussed herein. In some embodiments, the end user owes no costs to data providers unless their records and/or results derived from their records are returned to the end user.

Figure 15B:
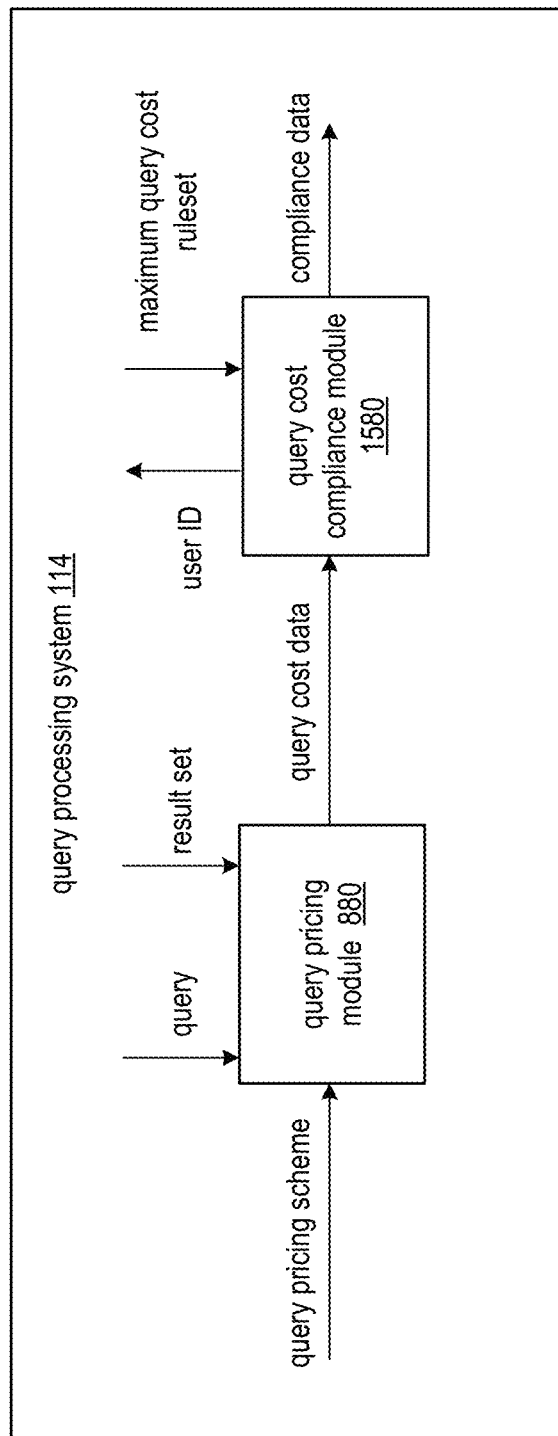
FIG. 15B is a schematic block diagram of an embodiment of an analytics system that implements a query cost compliance module in accordance with various embodiments of the present invention.

FIG. 15B illustrates an embodiment of the query processing system 114 that implement a query cost compliance module 1580. The query pricing module 880 can generate query cost data for a given query and/or result set as discussed previously by utilizing one or more applicable query pricing schemes. The query cost compliance module 1580 can evaluate the query cost data to determine whether it adheres to the maximum query cost ruleset configured by the requesting end user. In such cases, the query cost compliance module can access the particular maximum query cost ruleset for the requesting end user based on the user ID of the end user that requested the query. For example, a request for the maximum query cost ruleset for the end user with the corresponding user ID can be sent to the user management system 440, and/or can be accessed from local memory of the query processing system 114.

In some embodiments, the maximum query cost ruleset is applied in conjunction with other rules of ruleset 550 discussed herein. For example, the rules of the maximum query cost ruleset can be included within the ruleset 550 in addition to query rulesets 1-N received from data providers as discussed in conjunction with FIGS. 5A-5C. In such embodiments, the query cost compliance module 1580 and/or the query pricing module 880 can be implemented utilizing the compliance module 580, where the query compliance module further accesses and/or utilizes the query pricing scheme, query cost data, and/or maximum query cost ruleset for the requesting end user. In such embodiments, compliance data is generated by further determining whether query cost data for a query and/or result set complies with the maximum query cost ruleset. In such embodiments, a given query is only executed and/or results of a given query are only returned to the requesting end user when the given query is determined comply with all applicable rules configured by data providers involved in the query as discussed previously herein, and is further determined to have query cost data that complies with all applicable rules configured by the requesting end user.

For example, a first query is determined by the query processing system 114 to have query cost data that complies with the corresponding end user's maximum query cost ruleset. However, the first query is still determined by the query processing system 114 to be non-compliant overall based on the query processing system 114 determining that at least one applicable rule of at least one data provider's ruleset is not adhered to, despite this compliance of the query cost data. Thus, the result of the first query is not generated and/or is not returned to the end user, and/or the end user is not billed some or all costs for the first query. As another example, a second query is determined by the query processing system 114 to be compliant with all applicable rules configured by all data providers involved in the second query. However, the second query is still determined by the query processing system 114 to be non-compliant overall based on the query processing system 114 determining that the query cost data of the second query does not comply with at least one rule of the requesting end user's maximum query cost ruleset. Thus, the result of the second query is not generated and/or is not returned to the end user, and/or the end user is not billed some or all costs for the second query.

Figure 15D:
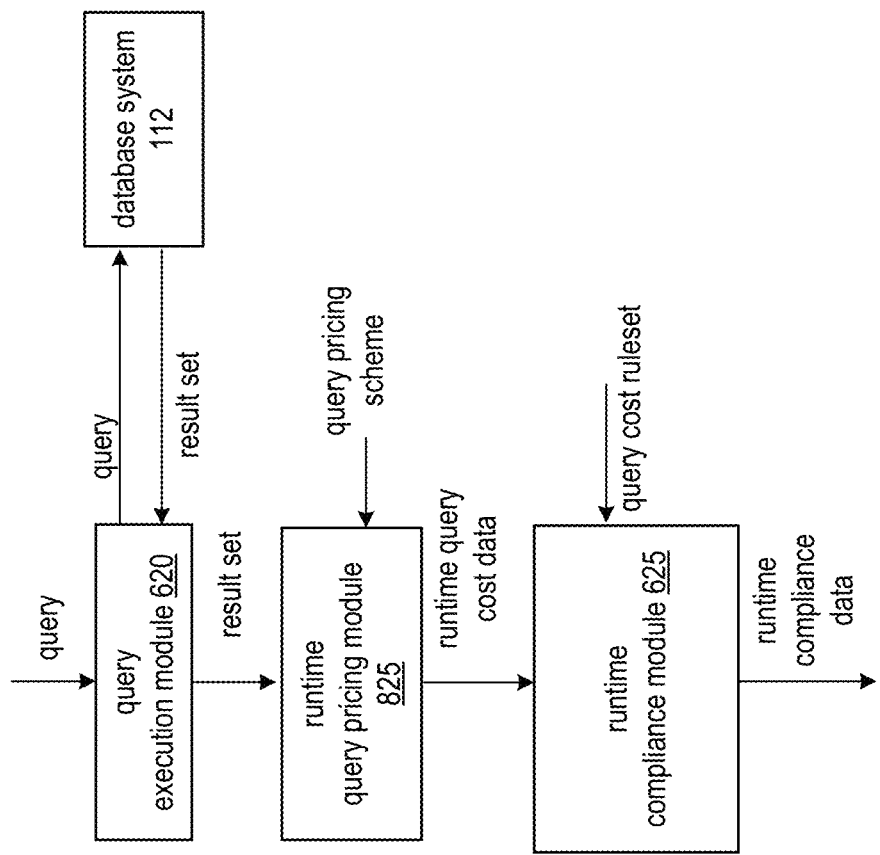
FIG. 15D is a schematic block diagram of a runtime query pricing module and a runtime compliance module in accordance with various embodiments of the present invention.
Figure 15C:
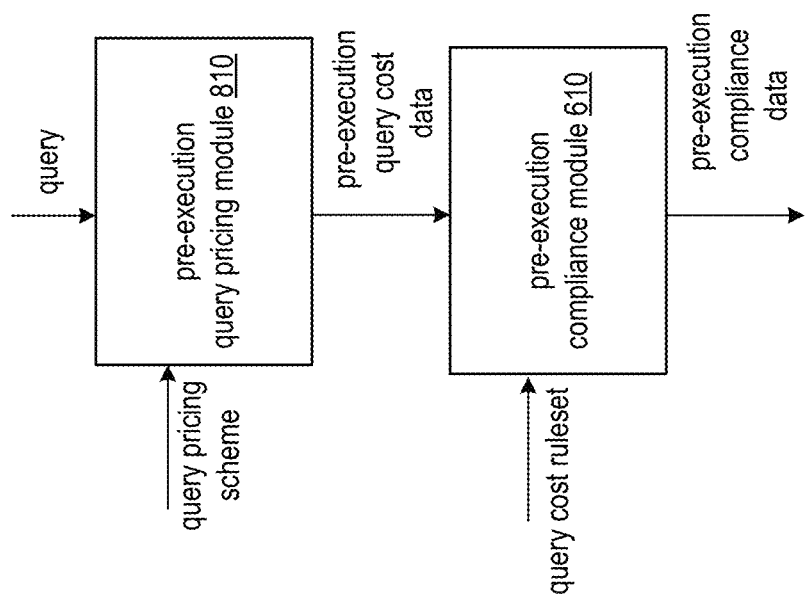
FIG. 15C is a schematic block diagram of a pre-execution query pricing module and a pre-execution compliance module in accordance with various embodiments of the present invention.

FIG. 15C illustrates and embodiments where the maximum query cost ruleset denotes rules that can be checked via a pre-execution compliance module 610 utilized to implement the query cost compliance module 1580. In such embodiments, some or all rules of the maximum query cost ruleset can be evaluated for compliance by the pre-compliance module 610 as discussed in conjunction with FIGS. 6A, 6B, and/or 6D. In particular, the pre-execution query cost data generated by pre-execution query pricing module 810 can be evaluated for compliance with pre-compliance rules of the maximum query cost ruleset via pre-execution compliance module 610 to generate pre-compliance data. The maximum query cost ruleset can be evaluated by pre-execution compliance module 610 instead of or in addition to other pre-execution rules configured by data providers as discussed previously.

Utilizing the pre-execution compliance module 610 can be useful in determining that execution of the query is not necessary based on the ability to determine that the query has costs determinable prior to execution that do not comply with the maximum query cost ruleset of the end user. This can be useful in scenarios where the end user is charged for execution of requested queries, whether or not they ultimately receive the query results. The maximum query cost ruleset can include pre-execution rules that dictate maximum subtotals corresponding to such function-based query costs and/or field-based query costs. For example, as discussed previously, rules regarding maximum subtotals corresponding to field-based query costs and/or function-based query costs can be determined based on the query itself prior to execution.

FIG. 15D illustrates and embodiments where the maximum query cost ruleset denotes rules that are checked via a runtime compliance module 625 utilized to implement the query cost compliance module 1580. In such embodiments, some or all rules of the maximum query cost ruleset can be evaluated for compliance by the runtime compliance module 625 as discussed in conjunction with FIGS. 6A, 6C, 6E, 6F, and/or 6G. In particular, the runtime query cost data generated by pre-execution query pricing module 825 can be evaluated for compliance with runtime rules of the maximum query cost ruleset via runtime compliance module 625 to generate runtime data. The maximum query cost ruleset can be evaluated by runtime compliance module 625 instead of or in addition to other runtime rules configured by data providers as discussed previously.

Utilizing the runtime compliance module 625 can be useful in determining whether final costs of the query, determined based on characteristics and/or records included in the result set, comply with the maximum query cost ruleset. For example, as discussed previously, rules regarding maximum subtotals corresponding to result set-based query costs and/or record-based query costs are determined once execution has commenced and/or completed. The maximum query cost ruleset can include runtime rules that dictate a maximum total cost of the query, and/or maximum subtotals corresponding to result set-based query costs and/or record-based query costs.

Figure 15E:
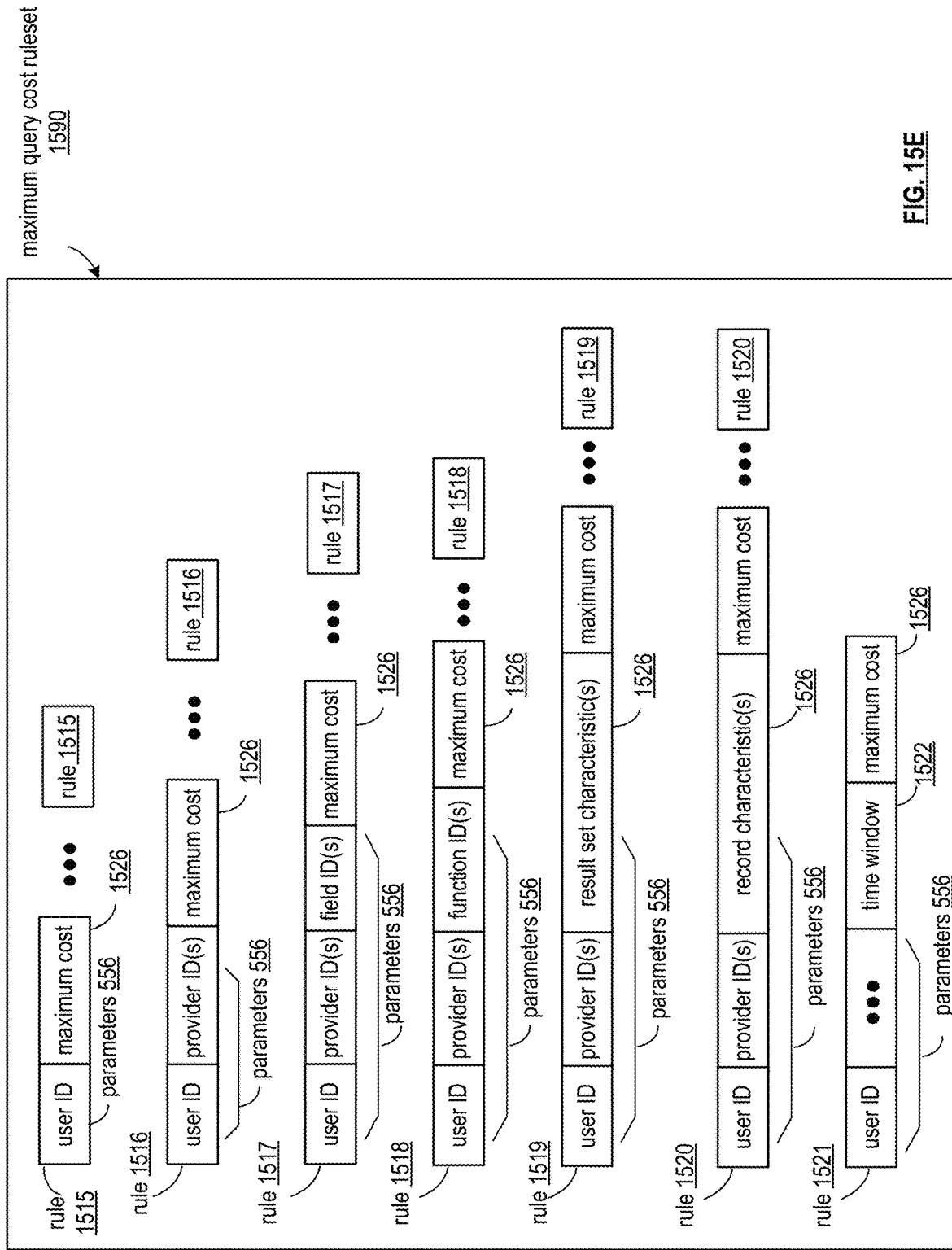
FIG. 15E is a block diagram illustrating an example of a maximum query cost ruleset in accordance with various embodiments of the present invention.

FIG. 15E illustrates a maximum query cost ruleset 1590 that includes one or more rules 1515, 1516, 1517, 1518, 1519, and/or 1520. These rules of the query cost ruleset can correspond to rules 555 of ruleset 550 and/or can be stored in one or more memories local and/or accessible to the query processing system 114, and/or can be received from one or more user devices 140. Each rule can have parameters 556 utilized to determine whether the rule applies to a given query and/or result set based on whether the given query and/or result set has its own determined parameters that match and/or compare favorably to parameters 556.

The maximum query cost ruleset 1590 can include maximum query cost rulesets 1-J set by a corresponding plurality of end users. As illustrated, each rule indicates and/or maps to a user ID included in parameters 556, denoting the rule applies to queries requested by the corresponding end user.

Each rule can further include a maximum cost 1526. This maximum cost 1526 can be a single maximum cost value, indicating the maximum total cost for a query with corresponding parameters 556. The query cost compliance module can determine whether the query cost data for a given query with parameters that compare favorably to parameters 556 indicates a total query cost that exceeds and/or otherwise compares unfavorably to the maximum cost value of maximum cost 1526. If the total query cost exceeds the maximum cost value of maximum cost 1526 of an applicable rule, the query cost data can be determined to be non-compliant with the maximum query cost ruleset. If the total query cost is less than or equal to the maximum cost value of maximum cost 1526 of an applicable rule, the query cost data can be determined to be compliant with the applicable rule.

Alternatively or in addition, the maximum cost 1526 can indicate a subtotal cost value, indicating a maximum subtotal for a query with corresponding parameters 556. In particular, the subtotal cost value can correspond to a portion of the query cost induced by the corresponding parameters 556 as discussed previously. The query cost compliance module can determine whether the query cost data for a given query with parameters that compare favorably to parameters 556 indicates corresponding subtotal query cost that exceeds and/or otherwise compares unfavorably to the maximum subtotal cost value of maximum cost 1526. If this subtotal query cost exceeds the maximum subtotal cost value of maximum cost 1526 of an applicable rule, the query cost data can be determined to be non-compliant with the maximum query cost ruleset. If this subtotal query cost is less than or equal to the maximum subtotal cost value of maximum cost 1526 of an applicable rule, the query cost data can be determined to be compliant with the applicable rule.

Alternatively or in addition, the maximum cost 1526 can indicate a subtotal cost percentage, indicating a maximum percentage of the total cost of a query with corresponding parameters 556 that can be induced by parameters 556. The query cost compliance module can determine whether the query cost data for a given query with parameters that compare favorably to parameters 556 indicates a corresponding subtotal query cost that exceeds and/or otherwise compares unfavorably to the maximum percentage of the total cost. If this subtotal query cost exceeds the maximum subtotal cost percentage of maximum cost 1526 of an applicable rule, the query cost data can be determined to be non-compliant with the maximum query cost ruleset. If the total query cost is less than or equal to the maximum subtotal cost percentage of maximum cost 1526 of an applicable rule, the query cost data can be determined to be compliant with the applicable rule.

Alternatively or in addition, the maximum cost 1526 can indicate a maximum cost relationship, indicating the maximum total and/or subtotal for a query a function of a range and/or set of possible corresponding parameters 556. In particular, the maximum cost relationship can indicate maximum total cost and/or maximum subtotal cost as a continuous and/or discrete function of valuations of one or more parameters 556, where the valuations are determined as discussed previously herein and/or where the valuations are determined as configured by the end user in the maximum query cost ruleset. The query cost compliance module can determine whether the query cost data for a given query with parameters that compare favorably to parameters 556 indicates a total query cost that exceeds and/or otherwise compares unfavorably to the maximum cost value as a function of particular features of the given query and/or result set that fall within the set or range indicated by parameters 556, as dictated by the maximum cost relationship of the maximum cost 1526.

The maximum query cost ruleset 1590 can indicate at least one overall maximum cost rule 1515, dictating an end user's maximum query cost they are willing to pay for any given query, regardless of other parameters associated with the query and/or regardless of subtotals. For example, each end user can configure up to one rule 1515 since this rule applies to every query.

The maximum query cost ruleset 1590 can indicate at least one provider-based rule 1516 for one or more particular providers, denoted by one or more provider IDs in the parameters 556. These rules 1516 can dictate a maximum subtotal of an end user's query cost they are willing to pay to a particular data provider indicated in parameters 556 and/or dictating a maximum total query cost the end user is willing to pay for queries that involves the data provider and/or involves only the one or more data providers indicated parameters 556.

The maximum query cost ruleset 1590 can indicate at least one field-based maximum cost rule 1517 for one or more particular field and/or a grouping of multiple fields, denoted by one or more field IDs in the parameters 556. Alternatively, the field-based maximum cost rule 1517 can indicate field valuations or other field characteristics in the parameters 556 to which the rule applies. These rules 1517 can dictate a maximum subtotal of an end user's query cost they are willing to pay for returning of and/or usage of a particular field and/or particular field grouping. For example, the query cost compliance module can determine whether the total query cost and/or the field-based query cost for a given query with the given one or more fields indicated in parameters 556 exceeds and/or otherwise compares unfavorably to the maximum cost 1526. In such cases, the end user can configure different maximum costs they are willing to pay for queries that involve returning of and/or usage of different fields.

In some cases, the rule 1517 can indicate one or more particular providers. For example, to evaluate a rule 1517 that indicates a particular provider denoted by provider ID in parameters 556, the query cost compliance module can determine whether the total query cost owed to the particular provider and/or the field-based query cost owed to the particular provider for a given query with the given one or more fields indicated in parameters 556 exceeds and/or otherwise compares unfavorably to the maximum cost 1526. In such cases, the end user can configure their query cost ruleset with different maximums for returning and/or usage of the same field grouping for records supplied by corresponding different providers.

The maximum query cost ruleset 1590 can indicate at least one function-based maximum cost rule 1518 for one or more particular query functions, denoted by function IDs, in the parameters 556. Alternatively or in addition, the function-based maximum cost rule 1518 can indicate function valuations, function parameters, or other function characteristics in the parameters 556 to which the rule applies. These rules 1518 can dictate a maximum subtotal of an end user's query cost they are willing to pay for usage of a particular query function and/or particular set of query functions. For example, the query cost compliance module can determine whether the total query cost and/or the function-based query cost for a given query with the given one or more functions indicated in parameters 556 exceeds and/or otherwise compares unfavorably to the maximum cost 1526. In such cases, the end user can configure different maximum costs they are willing to pay for queries that involve usage of different functions.

In some cases, the rule 1518 can indicate one or more particular providers. For example, to evaluate a rule 1518 that indicates a particular provider denoted by provider ID in parameters 556, the query cost compliance module can determine whether the total query cost owed to the particular provider and/or the function-based query cost owed to the particular provider for a given query with the given one or more functions indicated in parameters 556 exceeds and/or otherwise compares unfavorably to the maximum cost 1526. In such cases, the end user can configure their query cost ruleset with different maximums for usage of the same query function upon records supplied by corresponding different providers. In such cases, the end user can configure their query cost ruleset with a first maximum for usage of a query function owed to a data provider, and with a second maximum for usage of a query function owed to the analytics system.

The maximum query cost ruleset 1590 can indicate at least one result set-based maximum cost rule 1519 for one or more particular types of result sets, denoted by corresponding result set characteristics in the parameters 556. For example, the result set characteristics can indicate a range of result set sizes; ranges of distributions of types of records included in the result set; range of age spans of the result set; range of timestamp frequencies of the result set; whether the result set is returned as a final result of the query; a type of function upon which the result set is utilized as input; and/or range of average and/or aggregate record demand or other record characteristics for records included in the result set. Alternatively or in addition, the result set-based maximum cost rule 1519 can indicate result set valuations to which the rule applies. These rules 1519 can dictate a maximum subtotal of an end user's query cost they are willing to pay for usage of and/or returning of a result set with particular characteristics denoted in parameters 556. For example, the query cost compliance module can determine whether the total query cost and/or the result set-based query cost for a given query that returns and/or utilize the given type of result set indicated in parameters 556 exceeds and/or otherwise compares unfavorably to the maximum cost 1526. In such cases, the end user can configure different maximum costs they are willing to pay for queries that return, and/or utilize as an intermediate result, different types of result sets.

In some cases, the rule 1519 can indicate one or more particular providers. For example, to evaluate a rule 1519 that indicates a particular provider denoted by provider ID in parameters 556, the query cost compliance module can determine whether the total query cost owed to the particular provider and/or the result set-based query cost owed to the particular provider for a given query with the given one or more functions indicated in parameters 556 exceeds and/or otherwise compares unfavorably to the maximum cost 1526. In such cases, the end user can configure their query cost ruleset with different maximums for usage of the same query function upon records supplied by corresponding different providers. In such cases, the end user can configure their query cost ruleset with a first maximum for usage of a query function owed to a data provider, and with a second maximum for usage of a query function owed to the analytics system.

The maximum query cost ruleset 1590 can indicate at least one record-based maximum cost rule 1520 for one or more particular types of records, denoted by corresponding record characteristics in the parameters 556. For example, the record characteristics can indicate an age of the record, a size of the record, fields included in the record, a demand of the record, a valuation of the record, a retrieval efficiency of the record, a provider that supplied the record, or other record characteristics discussed herein. Alternatively or in addition, the record-based maximum cost rule 1520 can indicate record valuations to which the rule applies, average record valuations of a result set to which the rule applies, and/or a maximum record valuation in a result set to which the rule applies. These rules 1520 can dictate a maximum subtotal of an end user's query cost they are willing to pay for usage of and/or returning of a particular record with particular characteristics denoted in parameters 556. For example, the query cost compliance module can determine whether the record cost and/or total query cost for a given query that returns and/or utilizes the given type of record indicated in parameters 556 exceeds and/or otherwise compares unfavorably to the maximum cost 1526. In such cases, the end user can configure different maximum costs they are willing to pay for usage of different types of records with different characteristics.

In some cases, the rule 1519 can indicate one or more particular providers. For example, to evaluate a rule 1519 that indicates a particular provider denoted by provider ID in parameters 556, the query cost compliance module can determine whether the record cost and/or total query cost owed to the particular provider for a given query that returns or utilizes the given type of record indicated in parameters 556 exceeds and/or otherwise compares unfavorably to the maximum cost 1526. In such cases, the end user can configure their query cost ruleset with different maximums for usage of the same types of records that are supplied by different providers.

In some cases, one or more rules 1515-1520 can be applied to estimated maximums. In such cases, the maximum cost 1526 can indicate whether the maximum value is to be applied to actual query costs, estimated query costs, estimated minimum query costs, and/or estimated maximum query costs of the query cost data. A corresponding rule can further indicate a confidence interval configured by the end user, where the maximum estimated query cost determined for the query at the given confidence interval is compared to the corresponding maximum cost 1526 to determine whether compliance is achieved. Alternatively, the end user can configure, via GUI 345, a predetermined buffer to be added to and/or subtracted to the estimated query cost, where the selection to add or subtract, and the magnitude of the predetermined buffer are configured based on how conservative the end user wishes corresponding rules of the maximum query cost ruleset to be. Different confidence intervals and/or predefined buffers can be configured by the end user for different rules.

In some cases, one or more rules 1515-1520 can indicate time window data, and can be applied to multiple queries within the indicated time window. These rules with indicated time windows can correspond to temporal-based maximum cost rules 1521 that indicate time windows 1522. In such cases, rather than applying to single query cost data of a single query, the corresponding maximum of a temporal-based maximum cost rules can apply to a total sum across all queries within the time window; can apply to a total sum across all queries within the time window that further meet parameters of the corresponding rule; and/or can apply to a sum of particular subtotals indicated by the corresponding rule across all queries within the time window. The applicable queries and/or applicable subtotals can be indicated by parameters 556 of the rule 1521, which can include any of the parameters discussed in conjunction with rules 1515-1520.

Time window 1522 can indicate a length for a sliding time window, for example, where the rule is invoked within a length of time indicated by the time window ending at the current time, such as within the last 48 hours. Alternatively or in addition, time window 1522 can indicate a recurring period of time that repeats at a fixed time regardless of the current time, for example, where the time window resets at the beginning of each day or each month. This configuration can be favorable in cases where subscriptions are paid and/or are in effect for a corresponding, recurring period. For example, the time window 1522 can indicate the rule is invoked for all queries in the current month, where users are subscribed to a monthly subscription plan with recurring monthly payments. As another example, the time window 1522 can otherwise indicate any start and/or end point for the time window and duration to indicate when and/or for how long the time window is in effect.

In such cases, the query cost compliance module 1580 can generate the compliance data by determining running query cost data for at least one previous query request received from the requesting entity within the time window. The running query cost data can correspond to a summation of total query costs and/or a summation of applicable subtotals of the query cost. The query cost compliance module 1580 can generate potential query cost data based on a summation of the running query cost data with the totals or the applicable subtotals of the query cost data generated for the given query request. Generating the compliance data is based on determining whether the potential query cost data complies with the temporal-based maximum cost rule, for example, by determining if a value of the potential query cost data exceeds a corresponding maximum value of the temporal-based maximum cost rule.

The running query cost data can be generated based on accessing the database usage log, for example, by querying the database usage log for applicable queries for the requesting user within the time window. Alternatively, the running cost data for the time window can be locally-stored and/or can be accessible by the query cost compliance module 1580. This locally-stored running cost data can be stored by query processing system 114 and/or analytics system 110 for use by a query cost compliance module 1580 implemented via query processing system 114 of the analytics system 110. This locally-stored running cost data can be stored on user device 140 for use by a query cost compliance module 1580 implemented via user device 140.

For example, running cost data within the time window for each end user can be stored and can be updated as potential query cost data is generated for these end users in response to receiving queries from these end users. In particular the locally-stored running query cost data can be updated to be set equal to the potential query cost data generated for a given query. In some cases, the locally-stored running query cost is only updated as the potential query cost data when the query cost compliance data indicates the query cost data complies with the maximum query cost ruleset, when the query cost compliance data indicates the query cost data complies with all applicable rules 555, when the result of the is generated and returned to the end user, and/or when the end user is otherwise billed for the query, thus increasing their running query cost for the time window. The locally-stored running query cost can automatically be reduced by the amounts reflected in query cost data for one or more queries that are no longer included in the time window, for example, in response to the time window elapsing or sliding based on the current time. The running query cost can be automatically reset to zero in response to a new time window, such as a new subscription period, beginning. In some cases, the same or different query cache of FIG. 16C can be utilized by the query processing system to track these running query cost totals.

Figure 15F:
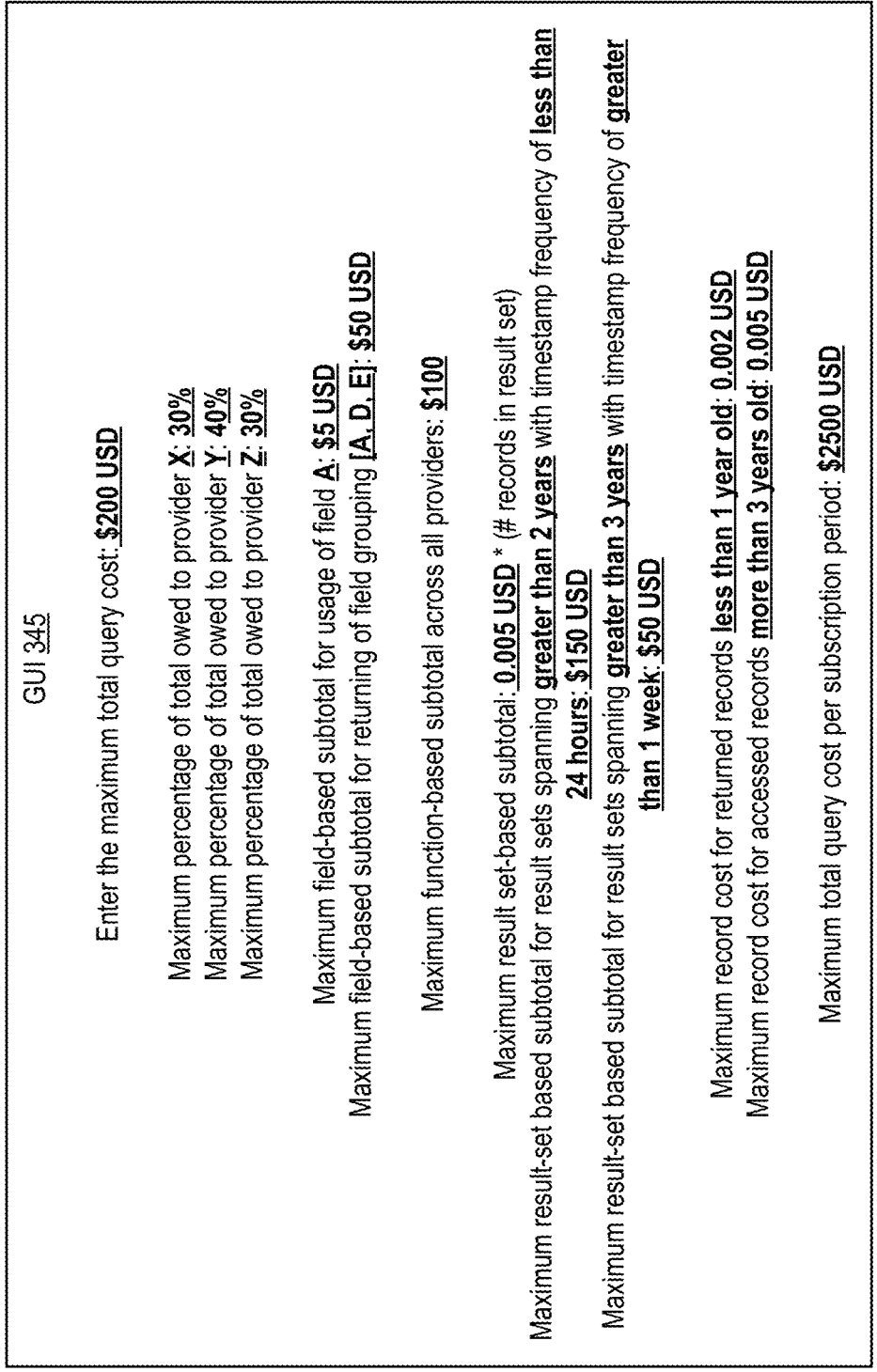
FIG. 15F is a graphical illustration of an example of a graphical user interface displayed by a user device in accordance with various embodiments of the present invention.

Each end user can configure some or all of these rules 1515-1520 based on interacting with GUI 345. FIG. 15F illustrates an example embodiment of a GUI 345. As illustrated in FIG. 15F, underlined and bolded text can denote user input, such as text that was selected and/or entered by the user in response to the displayed prompt. In some cases, the displayed types of rules indicated in FIG. 15F were selected by the end user from a larger set of rules via interaction with GUI 345. The selected types of rules, corresponding parameters, and maximums selected by the user via GUI 345 can be utilized to generate the query cost ruleset for the user, where parameters 556 and/or maximum cost 1526 of each rule is generated based on this user input.

In the example illustrated in FIG. 15F, the user selects a maximum overall query cost of $200 USD, which can be utilized to generate a rule 1515 in the corresponding end user's query cost ruleset. The user further indicates that providers X, Y, and Z can each be owed a maximum of 30%, 40% and 30% of the total query cost, respectively. These configured percentages for each of these providers can be utilized to generate a set of rules 1516 in the corresponding end user's query cost ruleset. The user further indicates that a maximum field-based subtotal for usage of field A is $5 USD, and that a maximum field-based subtotal for returning of the field grouping that includes all of fields A, D, and E is $50 USD. These field-based rule configurations can be utilized to generate a set of rules 1517 in the corresponding end user's query cost ruleset. The user further indicates that a maximum function-based subtotal, corresponding to the aggregation of function-based subtotals across all providers for a given query, is $100. This function-based rule configurations can be utilized to generate a rule 1518 in the corresponding end user's query cost ruleset.

In the example illustrated in FIG. 15F, the user further indicates a maximum cost relationship for the maximum result set-based subtotal as a function of the number of records in the result set by indicating that the maximum result set-based subtotal cannot exceed 0.005 USD times the number of records in the result set. The user further indicates a maximum result-set based subtotal of $150 USD for result sets spanning greater than 2 years with timestamp frequency of less than 24 hours. The user further indicates a maximum result-set based subtotal of $50 USD for result sets spanning greater than 3 years with timestamp frequency of greater than 1 week. These result-set based rule configurations can be utilized to generate a set of rules 1519 in the corresponding end user's query cost ruleset. The user further indicates a maximum record cost of $0.002 USD for each returned record that is less than 1 year old. The user further indicates a maximum record cost of $0.005 USD for each accessed record that is more than 3 years old. These record-based rule configurations can be utilized to generate a set of rules 1520. The user can further configure any other maximum totals, subtotals, and/or relationships as a function and/or mapping of any valuations or characteristics of providers, fields, query functions, result sets, and/or records utilized and/or returned by the query as discussed herein based on other user input to GUI 345.

In the example illustrated in FIG. 15F, the user further indicates a maximum total query cost of $2500 per subscription period. This temporal-based rule configuration can be utilized to generate a rule 1521. In other embodiments, further specifications regarding maximum subtotals across all queries or particular types of queries within the subscription period, or another time window, can be indicated via GUI 345.

In some cases, when a query is determined not to be executed based on non-compliance with a user's query cost ruleset, a message can be generated by the analytics system 110 indicating the non-compliance for transmission to the user device 140. The message can be generated to indicate which particular rules the query cost data did not comply with, and/or can indicate actual query cost data for the query, for example, displayed via query cost display prompt 1435. In some cases, the user can indicate elect whether or not particular rules be overridden for this particular query, and/or can indicate whether they approve of the query cost data for the particular query, despite its non-compliance with the query cost ruleset, by interacting with GUI 345. In some cases, the user can further elect to amend the rule that was not complied with and/or add additional rules via GUI 345 to update their query cost ruleset, where this updated maximum query cost ruleset is transmitted to the analytics system 110 for application on future queries received from this end user by the query cost compliance module 1580.

In some cases, the user device 140 and/or analytics system 110 automatically generates recommendation data, indicating automatically generated suggestions for some or all of these rules. For example, suggested maximums for particular parameters can be generated automatically based on average and/or maximum query costs and/or particular query totals in historical payments made by the user for previous queries. This can be generated based on accessing and/or processing billing data generated for the user within a recent time frame and/or over time. In particular, a suggested maximum for a particular rule can correspond to a maximum query cost the user paid for a query with the same parameters in the past, and/or can be set to a predefined threshold amount greater than a maximum query cost the user paid for a query with the same parameters in the past. The analytics system can transmit this recommendation data to the user device 140 and/or the user device 140 can display the recommendation data via GUI 345.

As another example, suggested maximums for particular parameters can be generated automatically based on previous user interaction with query cost display prompt 1435. In particular, trends in types of queries and corresponding costs that are rejected and/or accepted by the end user can be evaluated over time to determine maximum costs that the user has been historically willing to pay for particular types of queries, and/or to further determine costs that the user has historically been unwilling to pay for particular types of queries. For example, for tracked query cost approval data generated based on user input to query cost display prompt 1435, the user device 140 can determine a maximum cost the end user was willing to pay for one or more particular types of queries with particular parameters 556. A suggested maximum for a particular rule with the same parameters 556 can be set equal to this maximum query cost the user approved of in the past and/or can be set to a threshold amount greater than this maximum query cost the user approved of in past interaction with query cost display prompt 1435 for previous queries. Alternatively, the user device 140 can determine a minimum cost the end user was not willing to pay for one or more particular types of queries with particular parameters 556 based on the tracked query cost approval data. A suggested maximum for a particular rule with the same parameters 556 can be set equal to a threshold amount less than this minimum query cost the user did not approve of in past interaction with query cost display prompt 1435 for previous queries.

The suggested maximum and corresponding parameters 556 can be utilized to generate a suggested rule for the end user's maximum query cost ruleset. In some embodiments, one or more suggested rules can be displayed to the user as initial, suggested rules, for example, as illustrated in FIG. 15F, where the user can edit and/or override some or all of these suggested rules. In some embodiments, one or more suggested rules is automatically implemented, for example, where some or all of the maximum query cost ruleset for the end user is generated automatically to include one or more of these automatically generated suggested rules. In such cases, an automatically generated maximum query cost ruleset for a particular end user can be implemented automatically be the analytics system 110, where little or no user input to GUI 345 is required to generate and/or approve the maximum query cost ruleset. This can be ideal in cases where the user has the opportunity to override rejection of queries with query cost data that is non-compliant with these automatically generated rules via query cost display prompt 1435, for example, where only particularly high costs that are determined to require user approval are sent to the user device and/or displayed by the GUI 345 for approval.

The embodiments discussed herein with regards to the maximum query cost ruleset involve determining of a maximum query cost ruleset to be applied to all of a corresponding end user's future queries, for example, until maximum query cost ruleset for the end user is updated. In other embodiments, the maximum query cost ruleset can be generated on a query-by-query basis, where the user device generates a maximum query cost and/or maximum subtotals for the given query. For example, the end user can interact with GUI 345 to indicate the maximum query cost and/or maximum subtotals for each given query, for example, in conjunction with entering and/or requesting the given query. These one or more particular maximum query rules specific to the given query can be transmitted in conjunction with the given query, and the query cost compliance module 1580 can evaluate the particular maximum query rules for compliance with the query cost data, alternatively or in addition to a previously received maximum query cost ruleset stored for the given user. For example, the particular maximum query rules received with a requested query can override some or all rules of the stored maximum query cost ruleset for the corresponding end user.

In some embodiments, the maximum query cost ruleset discussed herein can be implemented as a default maximum query cost ruleset. The default maximum query ruleset can be stored by the user device 140 alternatively or additionally to being transmitted to the analytics system 110. The user device 140 can automatically generates a maximum query total and/or subtotals by applying the applicable rules of the default maximum query cost ruleset. These automatically generated query maximum rules determined based on the default maximum query cost ruleset can correspond to the particular maximum query rules transmitted in conjunction with the corresponding query request. In some embodiments, these automatically generated query maximum rules can be displayed to the end user prior to the transmission of the given query, where the user can approve or reject these automatically generated query maximum rules and/or can edit the maximum total cost and/or can edit one or more maximum subtotal costs automatically generated for the given query to customize the particular maximum query rules transmitted in conjunction with the corresponding query request that will be evaluated by the query cost compliance module 1580.

Figure 16A:
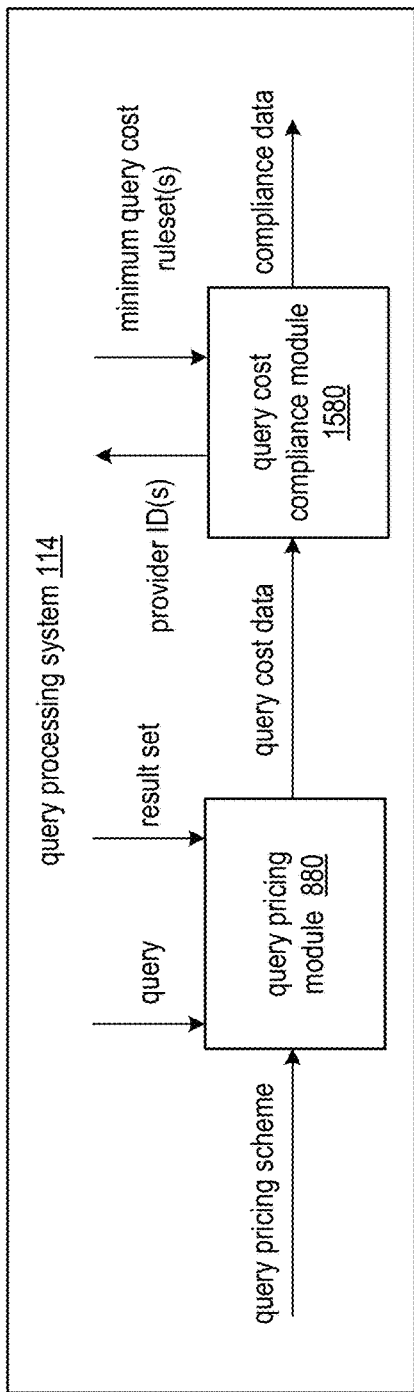
FIG. 16A is a schematic block diagram of an embodiment of an analytics system that implements a query cost compliance module in accordance with various embodiments of the present invention.
Figure 16B:
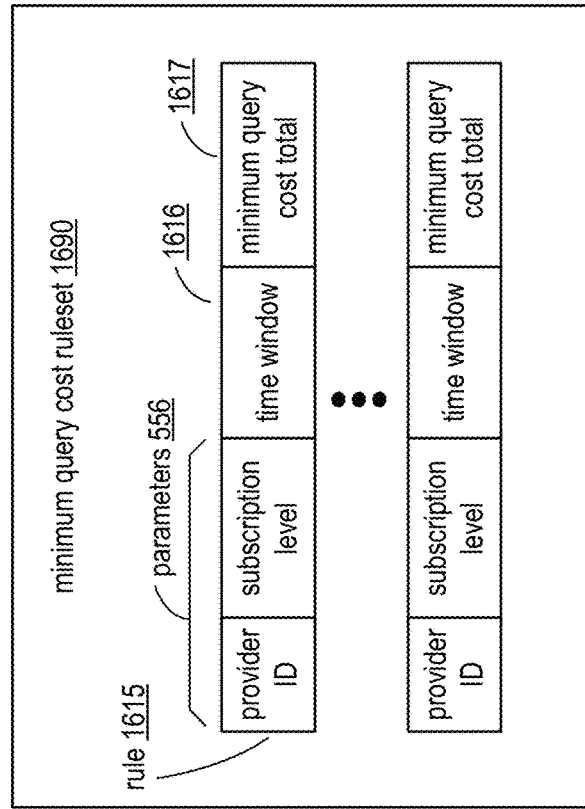
FIG. 16B is a block diagram illustrating an example of a minimum query cost ruleset in accordance with various embodiments of the present invention.
Figure 16C:
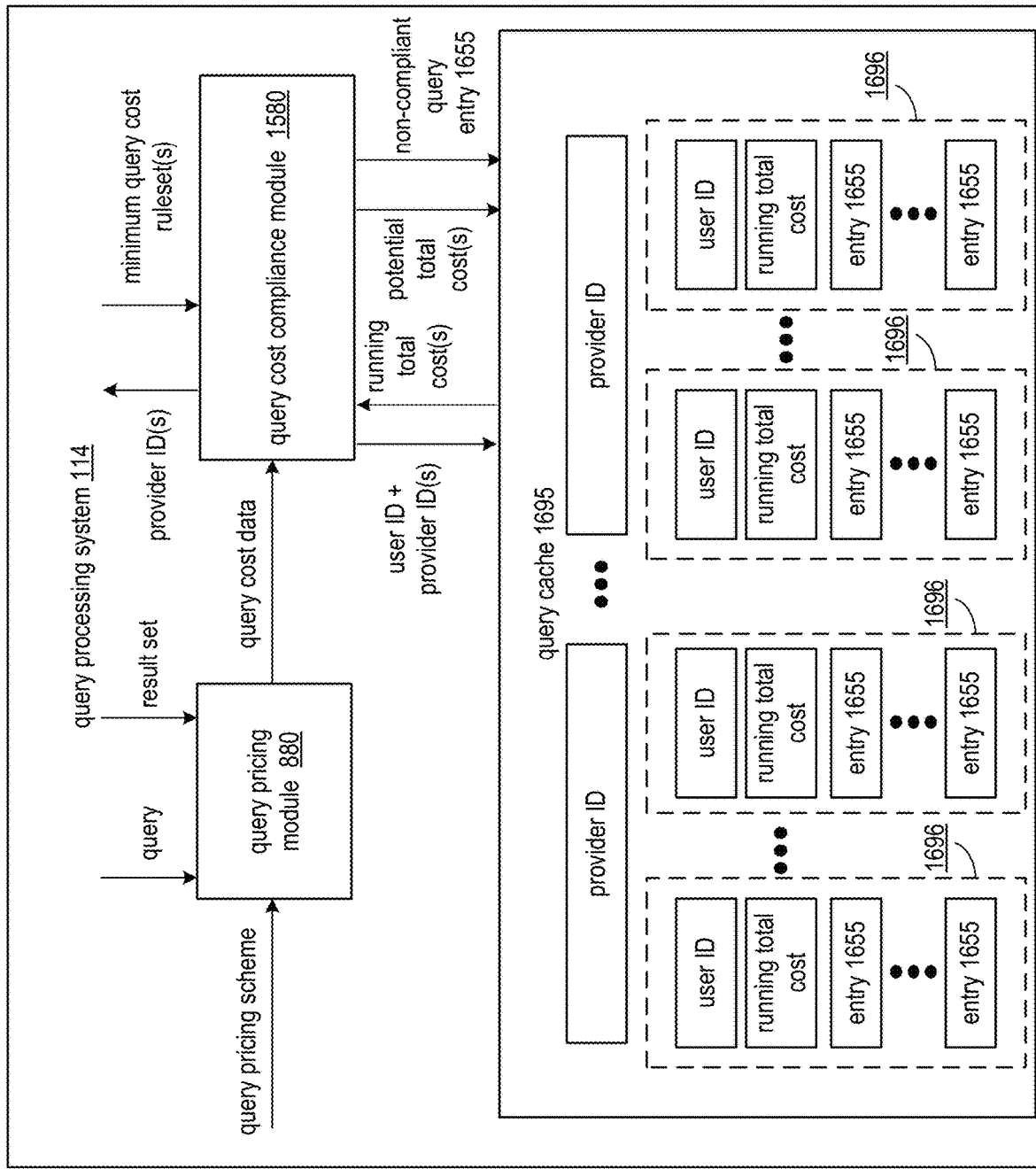
FIG. 16C is a schematic block diagram of an embodiment of an analytics system that implements a query cache in accordance with various embodiments of the present invention.

FIGS. 16A-16C illustrate embodiments of an analytics system 110 that implements a compliance module that evaluates queries to determine whether they comply with a minimum query cost ruleset configured by one or more data providers. Alternatively or additionally to evaluating query cost data to determine whether the query cost data complies with the maximum query cost ruleset configured by the requesting end user, the query cost data can be evaluated to determine whether the query cost data complies with at least one minimum query cost ruleset configured by at least one data provider involved in the query. For example, the minimum query cost ruleset can correspond to some or all of the rules of the provider's query ruleset, where minimum query cost ruleset 1-N are generated, transmitted, and/or evaluated in conjunction with the query rulesets 1-N as discussed in conjunction with FIGS. 5A-5C. The minimum query cost ruleset can alternatively or additionally be indicated in the query pricing scheme itself. The minimum query cost ruleset can otherwise be generated by a corresponding provider device 230 based on user input to GUI 245, for example, in conjunction with generating their query ruleset and/or in conjunction with generating their query pricing scheme. Such embodiments improve existing systems as they further the customization of data provider preferences with regards to how much each end user must pay in for single query and/or over time for access to any of the provider's records. Furthermore, such embodiments introduce improvements to database systems and/or analytics systems improving the efficiency of the database system and/or analytics system by reducing the number of queries that are processed and/or executed based on only executing and/or processing a subset of incoming queries that meet minimum query cost preferences of data providers.

FIG. 16A illustrates an embodiment of the query processing system 114 that implement the same or different query cost compliance module 1580 of FIG. 15B. The query pricing module 880 can generate query cost data for a given query and/or result set as discussed previously by utilizing one or more applicable query pricing schemes. The query cost compliance module 1580 can evaluate the query cost data to determine whether it adheres to the minimum query cost ruleset configured by one or more providers involved in the query. In such cases, the query cost compliance module can access the particular minimum query cost ruleset for one or more providers that supplied records included in the result set and/or whose records were accessed in execution of the query, for example, based on their provider ID. For example, a request for a particular provider's minimum query cost ruleset can be sent to the provider management system 420, and/or can be accessed from local memory of the query processing system 114.

In some embodiments, the minimum query cost ruleset is applied in conjunction with the maximum query cost ruleset of the requesting end user and/or with other rules of ruleset 550 discussed herein. In such embodiments, the query cost compliance module 1580 and/or the query pricing module 880 can be implemented utilizing the compliance module 580, where the compliance module further accesses and/or utilizes the query pricing scheme, query cost data, and/or minimum query cost ruleset. In such embodiments, compliance data is generated by further determining whether query cost data for a query and/or result set complies with the minimum query cost ruleset. In some cases, the query pricing scheme indicates the minimum query cost ruleset, where the query pricing module 880 further generates compliance data based on applying one or more data provider's minimum query cost ruleset indicated in their respective one or more query pricing schemes.

FIG. 16B illustrates an example embodiment of a minimum query cost ruleset 1690 that includes a plurality of rules 1615. Each rule can denote a provider ID indicating which provider configured the rule, and/or indicating that the rule applies only to portions of the total query cost in owed to the corresponding provider, as indicated in the query cost data. The rule can further denote a subscription level, indicating the rule applies to users at the corresponding subscription level. The provider ID and subscription level can be parameters 556 of the rule 1615.

A rule can optionally include a time window 1616. Time window 1616 can indicate a length for a sliding time window, for example, where the rule is invoked within a length of time indicated by the time window ending at the current time, such as within the last 48 hours. Alternatively or in addition, time window 1616 can indicate a recurring period of time that repeats at a fixed time regardless of the current time, for example, where the time window resets at the beginning of each day or each month. This configuration can be favorable in cases where subscriptions are paid and/or are in effect for a corresponding, recurring period. For example, the time window 1616 can indicate the rule is invoked for all queries in the current month, where users are subscribed to a monthly subscription plan with recurring monthly payments. As another example, the time window 1616 can otherwise indicate any start and/or end point for the time window and duration to indicate when and/or for how long the time window is in effect.

A rule 1615 can include a minimum query cost total 1617. In particular, this minimum query cost total 1617 can indicate the required total query cost to the indicated data provider for one or more queries requested by a given user at the given subscription level within time window 1616, including the given query. The total query cost can correspond to a summation of query costs charged by and/or paid to the data provider for queries received by and/or performed for the requesting user within the time window. In some cases, the time window 1616 is an indefinite time window, where the total query cost is summed across all queries received by and/or performed for the requesting user over time. Alternatively, the time window 1616 indicates the time window applies only to the given query, where each individual query received from the end user is required to have query cost data indicating the minimum query cost owed to the data provider.

In some embodiments, for example, if the data provider's query pricing scheme indicates that usage of and/or returning of records has a fixed cost per record for the data provider for users at the given subscription level, the total query cost can alternatively indicate a total number of records that must be accessed and/or returned to the requesting end user. In some embodiments, for example, if the data provider's query pricing scheme indicates that performance of queries upon the provider's data for users at the given subscription level has a fixed cost per query, the total query cost can alternatively indicate a total number of queries that must be requested by and/or performed for the requesting end user.

In some embodiments, a data provider can configure a first minimum query cost total 1617 for end users at a first subscription level, and can configure a second minimum query cost total 1617 for end users at a second subscription level. The first minimum query cost total can be lower and/or more favorable to the end user than the second minimum query cost total in response to the first subscription level being more favorable than the second subscription level, and/or in response to the first subscription level being more expensive to the end user than the second subscription level. In such embodiments, queries received from the end user will not be executed until their respective minimum query cost total is achieved for the data provider across all of their queries received by the analytics system within the time window.

Alternatively or in addition, a data provider can configure a first minimum query cost total 1617 required for end users to advance from a first subscription level to a second subscription level, where the second subscription level is more favorable than the first subscription level. End users do not advance to the second subscription level until they are determined to meet the first minimum query cost total 1617, for example, within the time window. As a result of advancing to the second subscription level, query costs for their queries can be lower, for example, based on a corresponding user-based pricing scheme of the data provider. Additionally, the data provider can configure a second minimum query cost total 1617 required for end users to advance from the second subscription level to a third subscription level, where the third subscription level is more favorable than the second subscription level. End users do not advance to from the second subscription level to the third subscription level until they are determined to meet the first minimum query cost total 1617. This can be an additional minimum query cost total separate from the minimum query cost total required to reach the second subscription level and/or can include the costs already put forth to achieve the minimum query cost total of the second subscription level. As a result of advancing to the third subscription level, query costs for their queries can be furthered lowered from those of the second subscription level, for example, based on a corresponding user-based pricing scheme of the data provider.

The query cost compliance module 1580 can determine whether or not compliance with a rule 1615 is achieved based on comparing a potential query total cost to the minimum query total cost. Compliance data generated by query cost compliance module 1580 indicates compliance with a rule 1615 when the potential query total cost is determined to meet, exceed, or otherwise compare favorably to the minimum query total cost. Compliance data generated by query cost compliance module 1580 indicates non-compliance with a rule 1615 when the potential query total cost is determined to fall below or otherwise compare unfavorably to the minimum query total cost.

The potential query total cost can be determined based on summing a running total query cost with the total query cost indicated to be owed to the particular provider in the query cost data for the given query. The running total query cost can be determined based on determining a summation of query costs owed to the data provider for previous queries received from the end user.

This running total can be determined based on retrieving query cost data for previous queries received from the user. For example, the query processing system 114 can generate a query for transmission to database usage log 454 to retrieve raw and/or aggregated billing data for queries requested by the given requesting user within the time window. Alternatively or in addition, the query processing system 114 can locally store the running total query cost for each user and/or for each provider.

In such embodiments, the running total for queries received from the user can correspond to one or more queries within the time window that were not executed due to being non-compliant with the minimum cost. Rather than altogether foregoing performance of queries that do not comply with the minimum query cost rulesets, the query and/or generated result sets for these non-compliant queries can be queued in a local cache of the analytics system. Once the summation of query cost data of non-complaint queries are queued within the given time window to render at least the minimum query cost, all of these queries can then be executed and billed to the end user, for example, in their original order and/or in any order determined by the query processing module.

FIG. 16C illustrates such an embodiment where non-complaint queries are queued for execution until a corresponding minimum query cost has been achieved. Entries 1655 for non-compliant queries can be generated by the query cost compliance module 1580 and/or can otherwise be generated by the query processing system in response to the query cost compliance module 1580 generating compliance data for a given query that indicates the queries non-compliance with at least one minimum query cost rule. Entries 1655 can include some or all of the fields discussed in conjunction with FIG. 4G and can be the same or different from entries 455 of the database usage log. In particular, an entry 1655 can indicate the original query and/or can include an identifier for the original queries entry 455 in the database usage log. An entry 1655 can include the final result and/or any partial result sets generated in executing the query, for example, where the query was executed via a runtime compliance module 625 to generate compliance data. An entry 1655 can include a timestamp or otherwise indicate an ordering or priority relative to other queries in the same or different queue. An entry 1655 can include the query cost data generated by query pricing module 880. An entry 1655 can indicate the requesting end user, for example, by indicating the corresponding user ID. An entry 1655 can include one or more provider IDs for which the query involves. In some cases, the entry 1655 only indicates provider IDs with which the corresponding query's cost data was not complaint, where all other providers with minimum query cost rulesets which the corresponding query's cost data was complaint are not indicated. A non-compliant query entry 1655 can include other pertinent information necessary to eventually facilitate any remaining execution of the query, to eventually bill the requesting end user appropriately for the query, and/or to eventually transmit the query result to the user.

In some cases, these non-compliant query entries 1655 pending execution are only generated when compliance data generated by compliance module 580 indicates the query's compliance with all other rules in ruleset 550. In particular, queries that are deemed non-compliant due to other irresolvable conflicts with at least one other query rule will not be queued for execution.

In some cases, non-compliant query entries 1655 are a subset of entries 455 sent to the database usage log 454 for storage, along with the other entries 455 for compliant queries whose result sets are returned to end users and discussed in conjunction with FIG. 4G. In such embodiments, the regulatory compliance data of the entry 455 can indicate non-compliance with one or more particular provider's minimum query cost ruleset. The entry 455 can otherwise indicated that the query has not been executed, but is allowed to be executed once the minimum query cost for the corresponding one or more data providers is achieved by the requesting user within the time window.

As illustrated in FIG. 16C, these entries can be locally stored in a query cache 1695. Query cache 1695 can be implemented utilizing memory 412 of the query processing system 114 and/or other memory of the analytics system 110 that is accessible by the query processing system 114. In some embodiments, the query cache 1695 is alternatively implemented by utilizing the database usage log 454. As illustrated in FIG. 16C, for each data provider, denoted in FIG. 6C by provider ID, a plurality of corresponding query queue data 1696 can be stored for each one or a corresponding plurality of end users, denoted in FIG. 16C by user ID. Each query queue data 1696 for a particular provider indicates the queued queries for the denoted user that have not yet been executed due to their total costs to the particular provider not meeting the corresponding minimum query cost, given the user's subscription level, or otherwise not complying with the minimum query cost ruleset. The query queue data can include, or otherwise indicate identifiers mapping to other memory locations that store, at least one queued entry 1655 for the particular end user. The query queue data can alternatively or additionally include the running total cost, which can be equal to the sum of query costs of the entries in the corresponding query queue data that would be charged by the corresponding provider given completion of execution of the query and/or returning of the query result to the corresponding end user.

The illustration of FIG. 16C serves to graphically illustrate separate queues for each combination of provider ID and user ID. However, the query cache 1695 can store some or all of this information in any fashion via any data structure, for example, where each query queue data 1696 can be determined, retrieved, and/or derived automatically based on the information stored in query cache 1695.

In some cases, the query cache 1695 can store query queue data 1696, such as running total cost, for all provider ID/user ID combinations. For example, some query queue data 1696 may indicate no queued entries 1655, and can further indicate a running cost total of zero due to the corresponding end user not having requested queries that include non-zero costs to the corresponding provider within the current subscription period and/or within the time window of the corresponding provider's minimum query cost ruleset. As another example, other query queue data 1696 may also indicate no queued entries 1655, and can further indicate the running cost total exceeds the minimum query cost of the corresponding provider's ruleset, where the absence of entries is due to previously queued queries that were previously indicated in this query queue data 1696 being executed and returned to the end user as a result of the running cost total exceeds the minimum query cost.

Note that some queries, while they may be compliant with one provider's minimum query cost ruleset, can still be pending in the query cache for at least one other provider due to the minimum query not being met by the corresponding user for the at least one other provider. Queries with entries 1655 that are removed from the query cache 1695 are thus only removed when they are determined to be removed from each of a set of query queue data 1696 in which they were initially queued, in response to the running total costs for every one of this set of query queue data 1696 eventually exceeding each corresponding total minimum cost dictated by the query cost ruleset for each corresponding provider.

As illustrated in FIG. 16C, the query cost compliance module 1580 can further receive running total costs from the query cache 1695 to generate compliance data for a given query. For example, the running total cost for the user that requested the query and one or more particular providers whose data is involved in the query, and/or that have minimum query cost rules applicable to the query, can be retrieved and/or determined based on the entries of query cache 1695. In particular, for a given query, the user ID of the requesting end user and the one or more provider IDs with applicable rules being evaluated by the query cost compliance module can be determined and utilized to request and/or fetch the corresponding one or more running total costs. These one or more running total costs can be utilized to generate one or more corresponding potential total costs based on the query cost data of the given query, where the potential total costs are compared to the one or more minimum costs induced by the rules of the one or more data providers to determine whether compliance is achieved.

If the potential total cost for at least one particular provider query falls below or is otherwise is non-compliant with the minimum query cost of the at least one provider's minimum query cost ruleset, the non-compliant query entry 1655 is generated, and the query cache 1695 is updated to add the non-compliant query entry 1655 to query queue data 1696 for the requesting user and for these one or more particular data providers. As illustrated in FIG. 16C, the potential total costs generated in generating the compliance data can sent to the query cache 1695 and/or can otherwise be utilized to update the corresponding running total costs in the query cache 1695, where the running total cost for one or more provider IDs and for the given user ID is replaced with the corresponding potential total cost resulting from the query cost data generated for this most recently requested query by the given end user. In some cases, once a running total cost of the query cache 1695 is updated to a value that exceeds the corresponding minimum cost for the corresponding user and provider, the execution of the queries indicated in the corresponding query queue can be commenced and/or completed if necessary, and the corresponding query results can be transmitted to the end user.

In particular, if the compliance data generated by the query cost compliance module 1580 indicates the potential total cost for every applicable provider is compliant with the minimum query cost of every applicable provider's minimum query cost ruleset, and if the query is compliant with all other rules of ruleset 550, execution of the query can be commenced and/or completed if necessary, and the query result can be transmitted to the end user. Furthermore, if not already completed, the completion of execution and/or transmission of query results of all other queued queries in the requesting end user's query queue data 1696 for each one of these applicable providers can be facilitated automatically based on the compliance data indicating the requesting end user's compliance with each one of these applicable providers.

In some cases, some entries 1655 can be removed from at least one query queue data 1696 of the query cache 1695 due to having timestamps corresponding to the time they were requested by the corresponding end user that falls outside a time window dictated by the corresponding data provider. For example, these queries can be determined to time-out, due to the minimum query cost never being met by the end user's queries for the corresponding provider within an elapsed time window, such as an elapsed subscription period. In such cases, these queries may never be executed, and can thus be removed from all query queues.

In some cases, the initiation and/or completion of removal of a query entry causes the analytics system to automatically transmit a message to the requesting user for display via GUI 345 indicating these queries timed-out due to the minimum cost for the elapsed subscription period and/or otherwise elapsed time window having never been achieved by the end user. The GUI 345 can prompt the user to select some or all of these previously requested queries to be re-requested for the current time window, such as the new subscription period. The user device 140 can generate a message indicating the queries selected by the end user to be re-requested for transmission to the analytics system, and these re-requested queries can automatically be processed by the query processing system 114 for the new time window. In some cases, the entries 1655 automatically remain indicated in the corresponding query queue data 1696 query cache 1695 in response to the user indicating they are re-requested, for example, where their timestamp is updated to indicate the time of re-request and/or to indicate the new time window. In other cases, these re-requested queries have new query cost data and/or compliance data generated, for example, due to determining changes in the corresponding user's subscription level, due to determining changes to other applicable rules 555, and/or due to determining updated pricing scheme data for one or more applicable providers.

In some cases, the query pricing module 880 and/or the query cost compliance module 1580 can be implemented via a user device 140, for example, in conjunction with execution of the user application data. In such embodiments, the query pricing schemes and/or minimum query cost rulesets of one or more data providers can be transmitted to the user device 140 by the analytics system 110. In such embodiments, the pre-execution query cost data can be generated by a pre-execution query pricing module 810, and pre-execution query cost data can be evaluated for compliance with the minimum query cost rulesets via a pre-execution compliance module 610.

In such embodiments, a query generated by the end user via user input is only transmitted to the analytics system when the query is determined to be compliant with the minimum query cost ruleset. For example, query queue data 1696 can be stored locally in a query cache 1695 implemented by the user device 140, for example, in conjunction with execution of the user application data. In particular, a plurality of query queue data 1696 can be stored and/or maintained in the query queue data 1696 for some or all data providers, where all query queue data 1696 corresponds to queries generated by the end user of the user device via user input to the user device that have not yet been transmitted to the analytics system. Non-compliant queries generated by the user can be cached by the user device 140 in one or more query queue data 1696 of the query cache 1695.

When a potential cost total determined by the locally implemented pre-execution compliance module 610 and/or locally implemented pre-execution query pricing module 810 for a given query entered by the end user a is determined to exceed the corresponding minimum query cost ruleset for a particular provider, this query, and all other cached queries for the particular provider in a corresponding query queue data 1696, are transmitted as at least one query request to the analytics system 110. These queries can be evaluated for compliance with the minimum query cost ruleset via the runtime compliance module 625, for example, based on actual costs generated via the runtime query pricing module 825. In such embodiments, some or all of these queries may be cached in a query cache 1695 implemented by the analytics system 110 in response to their actual query cost data for the particular provider falling below the provider's minimum query cost, for example due to the estimated query cost data generated by the pre-execution query pricing module 810 on user device 140 over-estimating the query cost. Some or all of these queries can be executed and/or the query results of some or all of these queries are transmitted to the user device are returned to the user based on determining the some or all of these queries complied with ruleset 550 as discussed herein.

Figure 17:
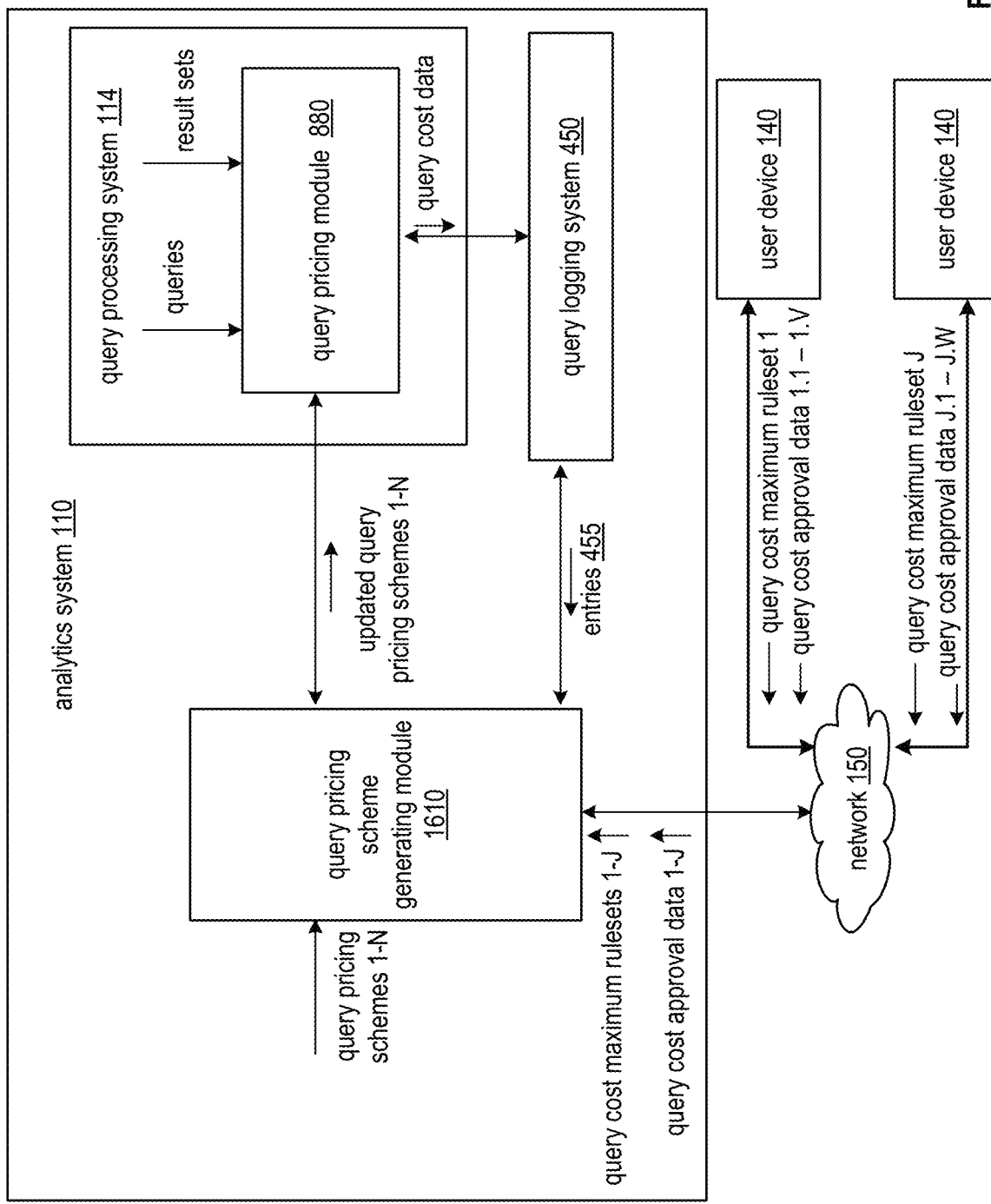
FIG. 17 is a schematic block diagram of an embodiment of an analytics system that implements a query pricing scheme generating module in accordance with various embodiments of the present invention.

FIG. 17 illustrates an embodiment of the analytics system 110 that is operable to automatically generate and/or modify query pricing schemes based on previously received and/or processed queries, and/or based on information supplied from end users. Such embodiments can be favorable as the automatically generated query pricing schemes can optimize total query costs paid to the data providers and/or the analytics systems. Furthermore, such embodiments can improve the performance of the analytics system, introducing improvements to database system and/or analytics systems, by optimizing and/or otherwise improving the efficiency of the database system and/or analytics system by inducing prices to end users that are determined to automatically limit incoming queries and/or automatically limit database usage to a level that utilizes predetermined and/or achievable levels of recourse consumption and/or processing time.

In particular, previously received queries can be tracked, for example, in query logging system 450, as discussed previously. All previous queries, and/or previous queries that compare favorably to a recency threshold and/or fall within the most recent subscription period, can be evaluated to determine metrics such as: tracked demand of various query types based on the number or proportion of the previous queries that correspond to each query type; tracked increases or decreases in usage of each query type from previously evaluated queries in more previous time windows and/or more previous subscription periods; tracked total cost charged for each query types based on summation of query totals of the previous queries that correspond to each query type and/or the summation of query subtotals induced by the query type for the previous queries. These metrics can be utilized to optimize and/or otherwise reconfigure query pricing schemes for one or more data providers and/or for the analytics system. Alternatively or in addition, information generated and/or received from user devices such as the query cost maximum rulesets discussed in conjunction with FIGS. 15A-15F and/or the query cost acceptance data discussed in conjunction with FIGS. 14A-14E can be utilized to optimize and/or otherwise reconfigure query pricing schemes for one or more data providers and/or for the analytics system, based on known maximums that end users are willing to pay for different types of queries and/or based on known rates of acceptance and/or rejection for of various query cost data by end users for various types of queries.

As illustrated in FIG. 17, the analytics system 110 can implement a query pricing scheme generating module 1610. The query pricing scheme generating module 1610 can be implemented as its own analytics subsystem 405, operable to communicate with other subsystems 405, such as the query processing system 114 and/or the query logging system 450, via network 480. The query pricing scheme generating module 1610 can be implemented via one or more other subsystems 405, such as the query processing system 114 and/or the query logging system 450. The query pricing scheme generating module 1610 can generate query pricing schemes utilized by the query processing system 114 to generate query cost data as discussed herein In some embodiments, the same or different query pricing scheme generating module 1610 is implemented via a provider device 230, for example, in conjunction with execution of the provider application data 225. In such cases, a resulting query pricing scheme for a data provider, generated by the query pricing scheme generating module 1610 upon the corresponding provider device 230, can be transmitted to the analytics system 110 for use by the query processing system 114 to generate query cost data for that data provider as discussed herein. In such embodiments, some or all of the information utilized by the query pricing scheme generating module 1610 to automatically generate a query pricing scheme can be transmitted to the provider device 230 by the analytics system 110, for example, in response to a request transmitted by the provider device 230 for this information.

The query pricing schemes generated by the query pricing scheme generating module 1610 of the analytics system 110, and/or received from provider devices 1-N via their own query pricing scheme generating modules 1610, can each correspond to one of a plurality of data providers 1-N, and/or one or more of these query pricing schemes can correspond to an entity associated with the analytics system itself. As illustrated in FIG. 17, these query pricing schemes can correspond to updated query pricing schemes 1-N. Each updated query pricing schemes 1-N can be generated automatically, without utilizing the user input to GUI 245 and/or without utilizing user interaction to dictate these updated query pricing schemes 1-N.

As illustrated in FIG. 17, the updated query pricing schemes 1-N can be generated by modifying an existing and/or previously implemented query pricing scheme 1-N. For example, original query pricing schemes 1-N can be received from provider devices 1-N as discussed previously, and the updated query pricing schemes 1-N can each correspond to a corresponding one of the original query pricing schemes 1-N, for example, where some or all original query pricing schemes 1-N were modified to generate the updated query pricing schemes 1-N. In such cases, while user input to GUI 245 can be utilized to generate the original query pricing scheme, the modifications to the original pricing scheme to generate the updated query pricing scheme can be performed automatically without additional user interaction.

Alternatively or in addition, some or all updated query pricing schemes 1-N can be generated by modifying corresponding, previously generated query pricing schemes 1-N. In such cases, the updated query pricing schemes 1-N can subsequently be modified to generate further updated query pricing schemes 1-N. For examples, query pricing schemes 1-N can be updated in predefined intervals, can be updated for each new subscription period, and/or can be updated based on another determination. Alternatively, some or all updated query pricing schemes 1-N can be generated automatically by the query pricing scheme generating module 1610 from scratch, without modification to an original query pricing scheme or a previous query pricing scheme.

In some embodiments, an automatically generated query pricing scheme, generated by query pricing scheme generating module 1610, can be sent by the analytics system 110 to a corresponding provider device 230 for authorization, where the automatically generated query pricing scheme is displayed via GUI 245. The user can accept this automatically generated query pricing scheme and/or can edit this automatically generated query pricing scheme via user input to GUI 245 in response to a prompt displayed via GUI 245. A message indicating the acceptance of the automatically generated query pricing scheme, and/or indicating any edits to the automatically generated query pricing scheme, can be transmitted to the analytics system 110, where the accepted and/or edited query pricing scheme indicated in the message is implemented for the corresponding data provider by the query processing system 114.

The query pricing scheme generating module 1610 can generate an updated query pricing schemes based on the corresponding previous and/or original query pricing scheme. For example, generating an updated query pricing schemes can include increasing or decreasing one or more query costs and/or query subtotals for one or more particular types of queries from their corresponding values in the corresponding previous and/or original query pricing scheme. In some embodiments, generating an updated query pricing schemes can include automatically determining and/or modifying one or more pricing relationships of the corresponding previous and/or original query pricing scheme. For example, one or more function-based pricing relationships 905; one or more field-based pricing relationships 1005; one or more result set-based pricing relationships 1105; one or more record-based pricing relationships 1205; and/or one or more user-based pricing relationships 1305 can be modified. In some cases, these pricing relationships can be modified by increasing and/or decreasing the corresponding maximum and/or minimum query cost and/or record cost of the pricing relationship; by changing the type of the function, for example, from a linear function to an asymptotic function and/or by otherwise changing the function type; and/or by otherwise making at least one modification to the pricing relationship. In some cases, determining to decrease a particular query cost of a previous query pricing scheme can include modifying a corresponding particular pricing relationship of the previous query pricing scheme by shifting the entire query pricing relationship downwards with respect to the query cost axis, for example, by a determined, fixed amount, to decrease all query costs for corresponding valuations. Similarly, determining to increase a particular query cost a previous query pricing scheme can include modifying a pricing relationship of the previous query pricing scheme by shifting the entire query pricing scheme upwards with respect to the query cost axis, for example, by a determined, fixed amount, to increase all query costs for corresponding valuations.

Alternatively or in addition, generating an updated query pricing schemes can include automatically determining and/or changing the metrics and/or functions utilized to generate query valuations, function valuations, field valuations, result set valuations, record-based valuations, or usage levels. For example, some or all of the automatic determinations discussed previously with regards to the query valuations, function valuations, field valuations, result set valuations, record-based valuations, or usage levels can be implemented by utilizing the query pricing scheme generating module 1610. For example, the query pricing scheme generating module 1610 can be operable to determine one or more of these valuations automatically based on demand data, determined based on tracking amount of previous usage, for example, based on tracking this information in the query logging system 450 for queries and/or based on retrieving this information from the query logging system 450 for previous queries, as discussed previously. As another example, query pricing scheme generating module 1610 can be operable to determine one or more of these valuations automatically based on resource consumption, processing time, and/or record retrieval efficiency tracked and/or aggregated across previous queries, for example, based on tracking this information in the query logging system 450 for queries and/or based on retrieving this information from the query logging system 450 for previous queries, as discussed previously. Any other automatic determinations and/or automatic modifications of query pricing schemes discussed herein can be implemented by the query pricing scheme generating module.

The query pricing scheme generating module 1610 can determine fixed prices and/or pricing relationships for each of a set of query types based on entries 455 received from the query logging system 450. The set of query types can correspond to a set of function types utilized in queries of the entries 455 as discussed in conjunction with FIGS. 9A-9E, for example, determined based on the query data of the entries 455. The set of query types can alternatively or additionally correspond to a set of field types utilized in queries of the entries 455 as discussed in conjunction with FIGS. 10A-10E, for example, determined based on the query data of the entries 455. The set of query types can alternatively or additionally correspond to a set of result set types of result sets generated via execution of the queries of the entries 455 as discussed in conjunction with FIGS. 11A-11E, for example, determined based on the result set data of the entries 455 and/or determined based on filtering parameters such as WHERE clauses of corresponding SQL queries indicated in the query data. The set of query types can alternatively or additionally correspond to a set of record types included in result sets generated via execution of the queries of the entries 455 as discussed in conjunction with FIGS. 12A-12E, for example, determined based on the result set data of the entries 455. The set of query types can alternatively or additionally correspond to a set of user types determined based on user subscription level and/or user usage data as discussed in conjunction with FIGS. 13A-13E, for example, determined based on the user IDs of the entries 455 and/or the corresponding user profile entries 445.

These entries 455 can correspond to queries from one or more previous subscription periods and/or can correspond to queries that compare favorably to a recency threshold, for example, configured via GUI 245. For example, the entries 455 can correspond to queries whose query cost data was generated for the most previous query pricing schemes 1-N of a series of previous query pricing schemes 1-N. The updated query pricing schemes 1-N can be generated based on aggregating and/or otherwise processing information indicated in these entries for one or more query types. For example The updated query pricing schemes 1-N are utilized by the query processing system to process new queries, resulting in new entries to the query logging system for a more recent time window since the previous query pricing schemes 1-N were utilized. Thus, these entries 455 that correspond to queries whose query cost data was generated for the updated query pricing schemes 1-N can be processed by the query pricing scheme generating module 1610, for example, in conjunction with the elapsing of a subsequent subscription period or subsequent time window, to generate further updated query pricing schemes 1-N, where the further updated query pricing schemes 1-N are generated by modifying the updated query pricing schemes 1-N. This process can be repeated for each subsequent time window, such as each subsequent subscription period, where entries corresponding to only the most recent previous query pricing schemes 1-N, and/or multiple previous query pricing schemes 1-N, are processed by the query pricing scheme generating module 1610.

In some cases, processing and/or aggregating these entries 455 can include generating histogram data, indicating an amount, such as number of times, that each query type in the set of query types corresponded to an entry in this plurality of entries. Demand data and/or other usage data can be generated based on proportions and/or amount of usage indicated in this histogram data. The query pricing scheme generating module 1610 can generate pricing relationships and/or fixed prices for these query types as a function of the demand data. For example, the query cost for a particular query type in the updated query pricing scheme can increase from a previous query pricing scheme when the demand data for the particular query type exceeds a predetermined demand threshold, for example, configured via GUI 245, and/or when the demand data indicates the query type's demand is greater than an average demand determined across some or all other query types. Similarly, the query cost for a particular query type in the updated query pricing scheme can decrease from a previous query pricing scheme when the demand data for the particular query type falls below the same or different predetermined demand threshold and/or when the demand data indicates the query type's demand is less than an average demand determined across some or all other query types. The amount of increase of the query type's query cost can be an increasing function of the query type's amount of usage, and the amount of increase of the query type's query cost can be a decreasing function of the query type's amount of usage.

In some cases, the histogram data can be generated across multiple subsequent time windows, such as multiple subsequent subscription periods, where each histogram data is generated based on only entries 455 of the most previous time window. Thus the change in demand over multiple consecutive time windows can be determined for some or all query types based on changes in subsequently generated histogram data. In such cases, if the most recently generated histogram data indicates a decrease in demand of a query type from a consecutive, second most recently generated histogram and/or indicates an amount of decrease that exceeds a demand decrease threshold, for example, configured via GUI 245, the query pricing scheme generating module 1610 can generate the updated query cost scheme by decreasing the query cost for the corresponding query type. The amount of decrease of the query type's query cost can be an increasing function of the query type's decrease in demand over these consecutive time windows. If the most recently generated histogram data indicates an increase in demand of a query type from a second most recently generated histogram and/or indicates an amount of increase that exceeds a demand increase threshold, for example, configured via GUI 245, the query pricing scheme generating module 1610 can generate the updated query cost scheme by increasing the query cost for the corresponding query type. The amount of increase of the query type's query cost can be an increasing function of the query type's increase in demand over these consecutive time windows.

In some cases, to prevent query cost data from alternating between two query costs in consecutive time windows over time, the magnitude of increase and/or decrease applied to query costs for query types in each consecutive time window can automatically decrease over time, for example, in accordance with an asymptotically decreasing function that approaches zero as the number of times the query pricing scheme has been modified increases, to eventually cause the query cost for one or more query types to converge to an equilibrium cost over time. In such cases, only changes in demand over consecutive time windows whose magnitude meets and/or exceeds a demand change threshold, for example, configured via GUI 245, can cause the query cost to change by an amount greater than the amount dictated by the asymptotically decreasing function, for example, in response to large changes in user demand that necessitate major changes in cost, where a new equilibrium cost is approached moving forward as a result of this more drastic shift. In such cases, the number of times the query pricing scheme has been modified can be reset to zero when the change in demand over consecutive time windows has a magnitude that meets and/or exceeds the demand change threshold, causing the magnitude of increase or decrease applied to the corresponding query cost to be set for a query pricing scheme applied for the first time.

In some cases, processing and/or aggregating these entries 455 can include generating cost summation data, indicating an aggregate query cost for each query type based on a summation of total query cost and/or a relevant subtotal query cost overall all query cost data of the entries 455 determined to correspond to the each query type. The query pricing scheme generating module 1610 can generate pricing relationships and/or fixed prices for these query types as a function of the cost summation data. For example, the query cost for a particular query type in the updated query pricing scheme can increase from a previous query pricing scheme when the cost summation data for the particular query type exceeds a predetermined cost summation threshold, for example, configured via GUI 245, and/or when the cost summation data indicates the query type's aggregate query cost is greater than an average aggregate query cost determined across some or all other query types. Similarly, the query cost for a particular query type in the updated query pricing scheme can decrease from a previous query pricing scheme when the cost summation data for the particular query type falls below the same or different predetermined cost summation threshold and/or when the cost summation data indicates the query type's aggregate query cost is less than an average aggregate query cost determined across some or all other query types. The amount of increase of the query type's query cost can be an increasing function of the query type's aggregate query cost, and the amount of increase of the query type's query cost can be a decreasing function of the query type's aggregate query cost.

In some cases, the cost summation data can be generated across multiple subsequent time windows, such as multiple subsequent subscription periods, where each query summation data is generated based on only entries 455 of the most previous time window. Thus the change in aggregate query cost over multiple consecutive time windows can be determined for some or all query types based on changes in subsequently generated cost summation data. In such cases, if the most recently generated cost summation data indicates a decrease in aggregate query cost of a query type from a consecutive, second most recently generated cost summation data and/or indicates an amount of decrease that exceeds an aggregate query cost decrease threshold, for example, configured via GUI 245, the query pricing scheme generating module 1610 can generate the updated query cost scheme by decreasing the query cost for the corresponding query type. The amount of decrease of the query type's query cost can be an increasing function of the query type's decrease in aggregate query cost over these consecutive time windows. If the most recently generated cost summation data indicates an increase in aggregate query cost of a query type from a second most recently generated cost summation data and/or indicates an amount of increase that exceeds an aggregate query cost increase threshold, for example, configured via GUI 245, the query pricing scheme generating module 1610 can generate the updated query cost scheme by increasing the query cost for the corresponding query type. The amount of increase of the query type's query cost can be an increasing function of the query type's increase in demand over these consecutive time windows. The magnitude of increase and/or decrease applied to query costs for query types in each consecutive time window can automatically decrease over time, for example, in accordance with an asymptotically decreasing function that approaches zero as the number of times the query pricing scheme has been modified increases, in a same or similar fashion as discussed in conjunction with evaluating changes in histogram data discussed above.

Alternatively or in addition, a maximum query cost total can be determined for each query type based on cost summation data generated for each of a plurality of previous query pricing schemes can by identifying one of the plurality of on cost summation data with a highest aggregate query cost. In such cases, the query cost for each query type can be set to and/or can be otherwise based on the corresponding query cost for the one of the plurality of previous query pricing schemes whose cost summation data indicated the highest aggregate query cost for the corresponding query type. In such cases, query costs from different previous query pricing schemes can be applied to different query types, based on different ones of the previous query pricing schemes inducing the maximum query cost total for the different query types.

As illustrated in FIG. 17, the query pricing scheme generating module 1610 can receive query cost maximum rulesets from user devices 140. This information can be utilized to automatically generate query pricing schemes, for example, with query costs for one or more query types that will generally and/or will always comply with the query cost maximum ruleset of all users and/or will generally and/or will always comply with the query cost maximum ruleset of a predetermined threshold number of users, for example, configured via GUI 245. For example, the fixed query costs for the query type and/or average, maximum and/or minimum query costs for the query type as indicated in a pricing relationship, as dictated by a current and/or previous query pricing scheme for one or more data providers, can be compared to the corresponding query cost maximums of applicable rules in the each query cost maximum ruleset to determine whether or not these query costs comply with the applicable rules in the each query cost maximum ruleset. In such embodiments, the current and/or previous query pricing scheme for one or more data providers can be modified to decrease a query cost for a query type when the query cost for the query type in the current and/or previous query pricing scheme does not comply with all of the query cost maximum rulesets and/or does not comply with at least the predetermined threshold number of query cost maximum rulesets. The query cost for a query type in the current and/or previous query pricing scheme for one or more data providers can remain the same in the updated query pricing scheme when the when the query cost for the query type in the current and/or previous query pricing scheme complies with all of the query cost maximum rulesets and/or complies with at least the predetermined threshold number of query cost maximum rulesets.

In some embodiments, a lowest maximum query cost and/or average maximum query cost can be determined across all applicable rules for all end users, and/or for a subset of end users that includes the predetermined threshold number of users with lowest maximum query costs across all users. The query cost for the corresponding query type determined in the updated query pricing scheme generated by the query pricing scheme generating module 1610 can be: set to this lowest maximum query cost and/or this average maximum query cost; can be set to a predetermined buffer below and/or above this lowest maximum query cost and/or this average maximum query cost, where this predetermined buffer is configured via GUI 245; and/or can be otherwise determined based on this lowest maximum query cost and/or this average maximum query cost.

As illustrated in FIG. 17, the query pricing scheme generating module 1610 can receive query cost approval data for a plurality of proposed queries generated by each user device 140 via GUI 345. In particular, query cost approval data for each of a plurality of proposed queries 1-V can be generated by a first user device 140 for transmission to the analytics system 110 as query cost approval data 1.1-1.V; query cost approval data for each of a plurality of proposed queries 1-W can be generated by an Jth user device 140 for transmission to the analytics system 110 as query cost approval data J.1-J.W; and query cost approval data for each of a plurality of proposed queries can similarly be generated by some or all other user devices 140 in a set of user devices 1-J. In some cases, the query cost approval data 1-J corresponds to sets of query cost approval data generated for corresponding query cost data that was generated in accordance with a single previous query pricing scheme and/or single set of previous query pricing schemes 1-N, such as most recent query pricing schemes 1-N utilized in a most recently elapsed subscription period and/or time window.

This information can be utilized to automatically generate query pricing schemes. For example, a query pricing scheme can be generated to by determining query costs for one or more query types that generally and/or always are approved in query cost approval data of query cost data that indicates these query costs for these query types and/or indicates higher query costs for these query types. The query pricing schemes can alternatively be generated, for example, with query costs for one or more query types that are approved in query cost approval data of query cost data indicates these query costs for these query types and/or indicates higher query costs for these query types for at least one corresponding query received from each of at least a predetermined threshold number and/or proportion of user devices 140, for example, configured via GUI 245. The query pricing schemes can alternatively be generated, for example, with query costs for one or more query types that are approved in query cost approval data of query cost data indicates these query costs for these query types and/or indicates higher query costs for these query types for at least a predetermined threshold number and/or proportion of corresponding queries, for example, configured via GUI 245, generated by each of at least the predetermined threshold number and/or proportion of user devices 140. The query pricing schemes can alternatively be generated, for example, with query costs for one or more query types that are approved in query cost approval data of query cost data indicates these query costs for these query types and/or indicates higher query costs for these query types for at least a predetermined threshold number and/or proportion of queries, for example, configured via GUI 245, in the total number of queries cost approval data 1-J generated by across all user devices 140.

In some cases, the rate of approval of query costs for a particular query type can be determined, for example, by determining a proportion of all of a set of queries where the query cost data for the particular query type was approved in the corresponding query approval data. Similarly, the rate of approval of query costs for a particular query type by different end users can be determined, for example, by determining a proportion of all user devices 1-J where the query cost data for the particular query type was approved in the at least one query cost approval data and/or in at least a predetermined threshold number and/or proportion of query cost approval data. Either or both of these rates of approval of query cost for a particular query type can be compared to a corresponding predetermined approval rate threshold for the particular query type, for example, configured via GUI 245. The predetermined approval rate threshold can be different for different query types and/or can be different for different providers.

When a rate of approval of a query cost for a particular query type meets, exceeds and/or otherwise compares favorably to the corresponding predetermined approval rate threshold, generating the updated query pricing schemes can include maintaining and/or increasing the query cost of the particular query type from its query cost in the previous query pricing scheme that was utilized to determine this rate of approval of query costs. The magnitude of increase in query cost can be an increasing function of the magnitude of difference between the corresponding determined rate of approval from the corresponding predetermined approval rate threshold.

When a rate of approval of a query cost for a particular query type falls below and/or otherwise compares unfavorably to the corresponding predetermined approval rate threshold, generating the updated query pricing schemes can include maintaining and/or decreasing the query cost of the particular query type from its query cost in the previous query pricing scheme that was utilized to generate the query cost data of the query cost approval data utilized to determine this rate of approval of query costs. The magnitude of decrease in query cost can be an increasing function of the magnitude of difference between the corresponding determined rate of approval from the corresponding predetermined approval rate threshold.

Figure 18:
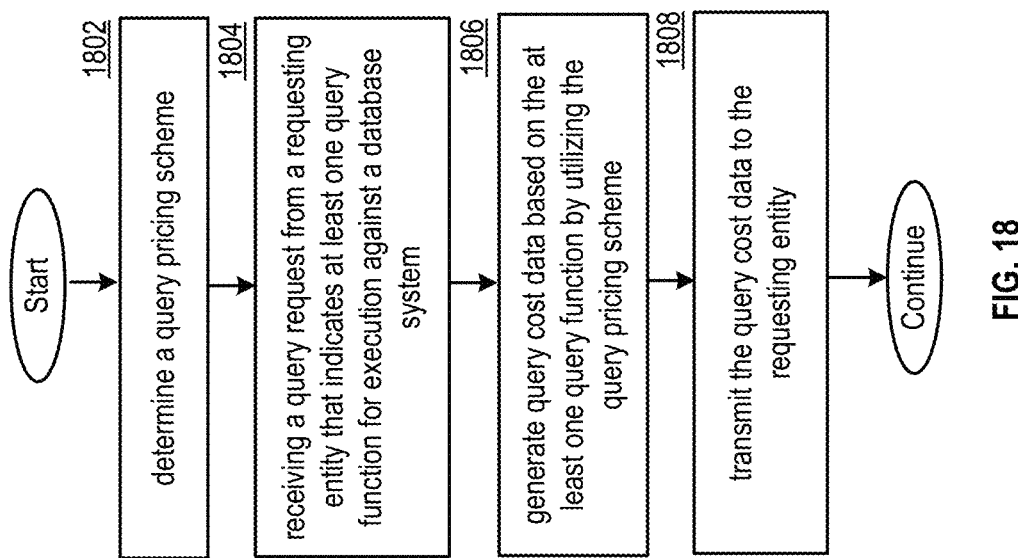
FIG. 18 is a logic diagram illustrating an example of a method of generating query cost data in accordance with various embodiments of the present invention.

FIG. 18 presents a method for execution by a query processing system 114, by a query pricing module 880, by a pre-execution query pricing module 810, by a runtime query pricing module 825, and/or for execution by another processing module of the analytics system 110 that executes executable instructions stored via a memory module. For example, the method of FIG. 18 can be performed by the pre-execution query pricing module 810 and/or by a runtime query pricing module 825 of a query processing system 114 as discussed in conjunction with FIGS. 9A-9E and/or in conjunction with other functionality of the query processing system 114 discussed herein.

Step 1802 includes determining a query pricing scheme. For example the query pricing scheme can be received from a provider device 230, where the provider device 230 generated the query pricing scheme based on user input to a GUI 245. Step 1804 includes receiving a query request from a requesting entity that indicates at least one query function for execution against a database system. Step 1806 includes generating query cost data based on the at least one query function by utilizing the query pricing scheme. Step 1808 includes transmitting the query cost data to the requesting entity.

In various embodiments, the method further includes generating billing data for the requesting entity based on the query cost data. In various embodiments the method further includes facilitating a payment of a query price value of the query cost data by the requesting entity. In various embodiments, the method includes determining whether payment of at least one query cost indicated by the query cost data has been completed by the end user, where the end user completes the payment based on receiving the query cost data.

In various embodiments, the method includes determining a plurality of query pricing schemes, where each of the plurality of query pricing schemes corresponds to one of a plurality of data providers. The method further includes determining the execution of the at least one query function involves access to a first one of the plurality of data providers. Determining the query pricing scheme includes selecting the query pricing scheme based on determining the query pricing scheme corresponds to the first one of the plurality of data providers. In various embodiments, determining the plurality of query pricing schemes includes receiving the plurality of plurality of query pricing schemes from a plurality of provider devices corresponding to the plurality of data providers, where each of the plurality of query pricing schemes was generated based on user input in response to a prompt displayed by a corresponding one of the plurality of provider devices via a graphical user interface.

In various embodiments, the method includes determining an analytics intensity value of the query request based on the at least one query function, where the query cost data is generated by utilizing the query pricing scheme based on the analytics intensity value. In various embodiments, generating the query cost data includes calculating a query price value as an increasing function the analytics intensity value. In various embodiments, generating the query cost data further includes selecting one of a plurality of quantized query price levels based on the query price value.

In various embodiments, the method includes determining a result set opacity value for the query request based on the at least one query function, where the query cost data is generated by utilizing the query pricing scheme based on the result set opacity value. In various embodiments, the method includes facilitating execution of the at least one query function to generate a result set, where the result set opacity value is determined as a decreasing function of the size of the result set. In various embodiments, generating the query cost data includes calculating a query price value as an increasing function of the result set opacity value.

In various embodiments, the method includes determining a resource consumption value based on the at least one query function, where the query cost data is generated by utilizing the query pricing scheme based on the resource consumption value. In various embodiments, generating the query cost data includes calculating a query price value as an increasing function of the resource consumption value.

In various embodiments, a query processing system of an analytics system includes at least one processor and a memory that stores operational instructions. The operational instructions, when executed by the at least one processor, cause the query processing system to: determine a query pricing scheme; receive a query request from a requesting entity that indicates at least one query function for execution against a database system; generate query cost data based on the at least one query function by utilizing the query pricing scheme; and/or transmit the query cost data to the requesting entity.

In various embodiments, a computer readable storage medium includes at least one memory section that stores operational instructions. The operational instructions, when executed by a processing module that includes a processor and a memory, cause the processing module to: determine a query pricing scheme; receive a query request from a requesting entity that indicates at least one query function for execution against a database system; generate query cost data based on the at least one query function by utilizing the query pricing scheme; and/or transmit the query cost data to the requesting entity.

Figure 19:
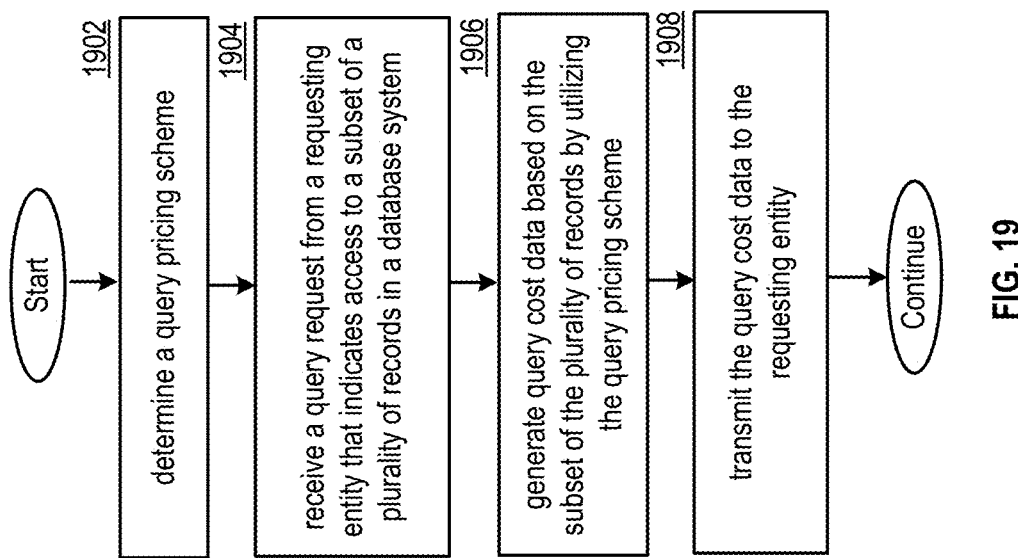
FIG. 19 is a logic diagram illustrating an example of a method of generating query cost data in accordance with various embodiments of the present invention.

FIG. 19 presents a method for execution by a query processing system 114, by a query pricing module 880, by a pre-execution query pricing module 810, by a runtime query pricing module 825, and/or for execution by another processing module of the analytics system 110 that executes executable instructions stored via a memory module. For example, the method of FIG. 19 can be performed by the pre-execution query pricing module 810 and/or by a runtime query pricing module 825 of a query processing system 114 as discussed in conjunction with FIGS. 10A-13E and/or in conjunction with other functionality of the query processing system 114 discussed herein.

Step 1902 includes determining a query pricing scheme. Step 1904 includes receiving a query request from a requesting entity that indicates access to a subset of a plurality of records in a database system. Step 1906 includes generating query cost data based on the subset of the plurality of records by utilizing the query pricing scheme. Step 1908 includes transmitting the query cost data to the requesting entity.

In various embodiments, the method further includes generating billing data for the requesting entity based on the query cost data. In various embodiments the method further includes facilitating a payment of a query price value of the query cost data by the requesting entity. In various embodiments, the method includes determining whether payment of at least one query cost indicated by the query cost data has been completed by the end user, where the end user completes the payment based on receiving the query cost data.

In various embodiments, the method further includes determining a plurality of query pricing schemes, where each of the plurality of query pricing schemes corresponds to one of a plurality of data providers. The method can further include determining the subset of the plurality of records corresponds to a first one of the plurality of data providers, where determining the query pricing scheme includes selecting the query pricing scheme based on determining the query pricing scheme corresponds to the first one of the plurality of data providers. In various embodiments, determining the plurality of query pricing schemes includes receiving the plurality of plurality of query pricing schemes from a plurality of provider devices corresponding to the plurality of data providers, where each of the plurality of query pricing schemes was generated based on user input in response to a prompt displayed by a corresponding one of the plurality of provider devices via a graphical user interface.

In various embodiments, the method further includes determining a field valuation for each one of a set of fields of the database system. The method can further include determining at least one field included in the subset of the plurality of records, where the query cost data is generated based on the field valuation of the at least one field. In various embodiments, the method further includes determining a field grouping valuation for each of a set of field groupings within a set of fields of the database system. The method further includes determining a field grouping included in the subset of the plurality of records. The query cost data is generated based on the field grouping valuation of the field grouping.

In various embodiments, the method further includes determining a temporal-based valuation of the subset of the plurality of records based on age timestamps of a plurality of records included in the subset of the plurality of records. The query cost data is generated based on the temporal-based valuation of the subset of the plurality of records. In various embodiments, determining the temporal-based valuation includes calculating a temporal span across all of the plurality of records, where the temporal-based valuation is an increasing function of the temporal span. In various embodiments, the plurality of records were generated based on being collected by a data collection device. Determining the temporal-based valuation includes calculating a shortest temporal span between any pair of records in the plurality of records, where the temporal-based valuation is a decreasing function of the temporal span.

In various embodiments, the query pricing scheme indicates a record valuation scheme. Determining the query cost data can include calculating plurality of record valuations by calculating a record valuation for each of the plurality of plurality of records in the subset of the plurality of records. Determining the query cost data can include aggregating over the plurality of record valuations to generate a query price total indicated in the query cost data. In various embodiments, the record valuation is based on an age of the record. In various embodiments, where the record valuation is based on a level of data transformation utilized to generate the record.

In various embodiments, the query pricing scheme indicates a storage location-based valuation scheme, where determining the query cost data includes determining at least one location where the subset of the plurality of records is stored, and where the query cost data is generated based on the at least one location. In various embodiments, determining the query cost data included determining a number of geographic boundaries corresponding to the at least one location, where the query cost data is an increasing function of the number of geographic boundaries. In various embodiments, determining the query cost data further includes determining a location of the requesting entity, where the query cost data is generated based on a difference between the location of the requesting entity and the at least one location.

In various embodiments, a query processing system of an analytics system includes at least one processor and a memory that stores operational instructions. The operational instructions, when executed by the at least one processor, cause the query processing system to: determine a query pricing scheme; receive a query request from a requesting entity that indicates access to a subset of a plurality of records in a database system; generate query cost data based on the subset of the plurality of records by utilizing the query pricing scheme; and/or transmit the query cost data to the requesting entity.

In various embodiments, a computer readable storage medium includes at least one memory section that stores operational instructions. The operational instructions, when executed by a processing module that includes a processor and a memory, cause the processing module to: determine a query pricing scheme; receive a query request from a requesting entity that indicates access to a subset of a plurality of records in a database system; generate query cost data based on the subset of the plurality of records by utilizing the query pricing scheme; and/or transmit the query cost data to the requesting entity.

Figure 20A:
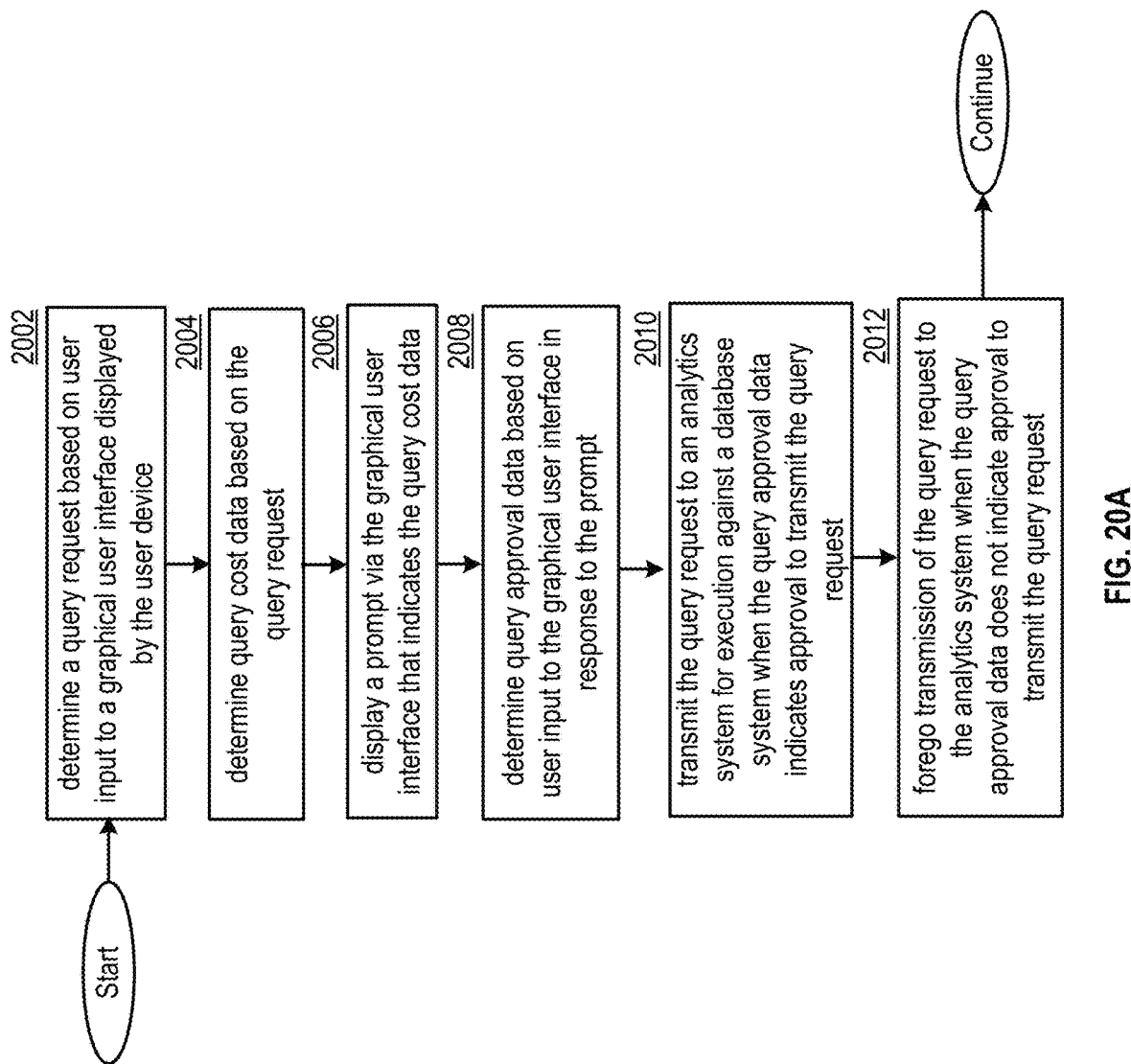
FIG. 20A is a logic diagram illustrating an example of a method of transmitting query requests based on query approval data in accordance with various embodiments of the present invention.

FIG. 20A presents a method for execution by a user device 140, for example, in conjunction with execution of user application data received from analytics system 110. For example, the method of FIG. 20A can be performed by utilizing query pricing module 880, such as pre-execution query pricing module 810 implemented by user device 140, as discussed in conjunction with FIGS. 14A-14E and/or in conjunction with other functionality of the user device 140 and/or in conjunction with other functionality of the query pricing module 880 discussed herein.

Step 2002 includes determining a query request based on user input to a graphical user interface displayed by the user device. For example, the user input can be entered to the graphical user interface in response to a prompt to enter a query request displayed by the graphical user interface. Step 2004 includes determining query cost data based on the query request. Step 2006 includes displaying a prompt via the graphical user interface that indicates the query cost data. Step 2008 includes determining query approval data based on user input to the graphical user interface in response to the prompt.

When the query approval data indicates approval to transmit the query request, the method continues to step 2010, where step 2012 is not performed. Step 2010 includes transmitting the query request to an analytics system for execution against a database system. When the query approval data does not indicate approval to transmit the query request, the method continues from step 2008 to step 2012, where step 2010 is not performed. Step 2012 includes foregoing transmission of the query request to the analytics system.

In various embodiments, the method includes receiving user application data from the analytics system, and further includes executing the user application data. The steps 2002-2012 can be performed by in accordance with the execution of the user application data. In various embodiments, the method includes receiving query pricing scheme data from the analytics system, where determining the query cost data includes calculating the query cost data by utilizing the query pricing scheme data. In various embodiments, the query pricing scheme data was generated by a provider device 230 based on user input to a GUI displayed by the provider device 230. In various embodiments, the method includes receiving a query response from the analytics system based on the execution of the query request against the database system, and further includes displaying the query response via the graphical user interface. In various embodiments, the method further includes facilitating a payment of at least one query cost indicated in query cost data to the analytics system and/or to at least one corresponding data provider when the query approval data indicates approval to transmit the query request and/or based on receiving the query response from the analytics system.

In various embodiments, when the query approval data does not indicate approval to transmit the query request, the method further includes determining an amended query request based on user input to the graphical user interface displayed by the user device in response to a prompt to amend the query request displayed by the graphical user interface. The method can further include determining second query cost data based on the amended query request, and can further include displaying a second prompt via the graphical user interface that indicates the second query cost data. The method can further include determining second query approval data based on user input to the graphical user interface in response to the second prompt. When the second query approval data indicates approval to transmit the amended query request, the method can further include transmitting the amended query request to the analytics system for execution against the database system. When the second query approval data does not indicate approval to transmit the amended query request, the method can further include foregoing transmission of the amended query request to the analytics system, and/or can further include determining at least one subsequently amended query request based on user input to the graphical user interface displayed by the user device in response to a prompt to amend the query request displayed by the graphical user interface. For example, these steps can continue until subsequently generated query approval data indicates approval of a subsequently amended query request, where this subsequently amended query request is transmitted to the analytics system for execution.

In various embodiments, determining the query cost data includes transmitting the query request to the analytics system, where the analytics system generates the query cost data based on the query request by utilizing a query pricing scheme, and where the analytics system transmits the query cost data to the user device. The method further includes receiving the query cost data from the analytics system. In various embodiments, the analytics system generates the query cost data based on executing at least one query function of the query request.

In various embodiments, the query cost data indicates a plurality of provider costs for each of a plurality of data providers that supplied data accessed in the query request, where a summation of the plurality of provider costs yields a total query cost indicated in the query cost data. In various embodiments, the query cost data indicates a plurality of provider cost ratios for each of a plurality of data providers that supplied data accessed in the query request, where each of the plurality of provider cost ratios indicates a ratio and/or percentage of the total query cost owed to the corresponding provider, based on the plurality of provider costs.

In various embodiments, the query cost data indicates a plurality of query function costs for each of a plurality of query functions indicated in the query request. A summation of the plurality of query function costs can yield a total query cost indicated in the query cost data and/or can yield a subtotal of the total query cost induced by query function costs. In various embodiments, the query cost data indicates a plurality of field-based costs for each of a plurality of fields indicated in the query request. A summation of the plurality of field-based costs can yield a total query cost indicated in the query cost data and/or can yield a subtotal of the total query cost induced by field-based costs. In various embodiments, the query cost data indicates a plurality of record-based costs for each of a plurality of record types accessed in the query request. A summation of the plurality of record-based costs can yield a total query cost indicated in the query cost data and/or can yield a subtotal of the total query cost induced by record-based costs.

In various embodiments, a user device includes at least one processor and a memory that stores operational instructions. The operational instructions, when executed by the at least one processor, cause the user device to: determine a query request based on user input to a graphical user interface displayed by the user device, for example, where the user input is entered to the graphical user interface in response to a prompt to enter a query request displayed by the graphical user interface; determine query cost data based on the query request; display a prompt via the graphical user interface that indicates the query cost data; and/or determine query approval data based on user input to the graphical user interface in response to the prompt. When the query approval data indicates approval to transmit the query request, the operational instructions, when executed by the at least one processor, further cause the user device to transmit the query request to an analytics system for execution against a database system. When the query approval data does not indicate approval to transmit the query request, the operational instructions, when executed by the at least one processor, further cause the user device to forego transmission of the query request to the analytics system.

In various embodiments, a computer readable storage medium includes at least one memory section that stores operational instructions. The operational instructions, when executed by a processing module that includes a processor and a memory, cause the processing module to: determine a query request based on user input to a graphical user interface displayed by the user device, for example, where the user input is entered to the graphical user interface in response to a prompt to enter a query request displayed by the graphical user interface; determine query cost data based on the query request; display a prompt via the graphical user interface that indicates the query cost data; and/or determine query approval data based on user input to the graphical user interface in response to the prompt. When the query approval data indicates approval to transmit the query request, the operational instructions, when executed by the processing module, further cause the processing module to transmit the query request to an analytics system for execution against a database system. When the query approval data does not indicate approval to transmit the query request, the operational instructions, when executed by the processing module, further cause the processing module to forego transmission of the query request to the analytics system.

Figure 20B:
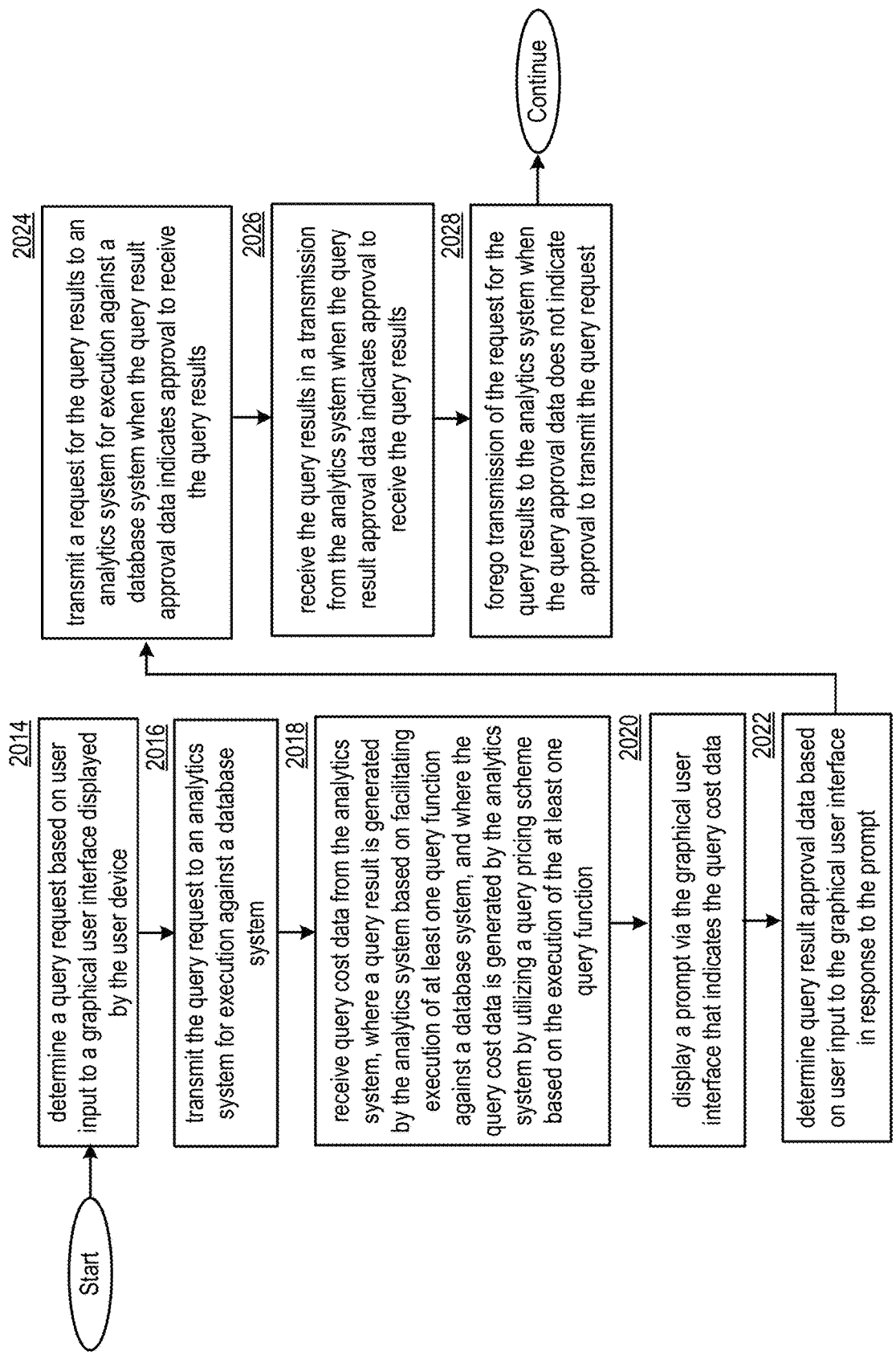
FIG. 20B is a logic diagram illustrating an example of a method of requesting query results based on query approval data in accordance with various embodiments of the present invention.

FIG. 20B presents a method for execution by a user device 140, for example, in conjunction with execution of user application data received from analytics system 110. For example, the method of FIG. 20B can be performed by utilizing query pricing module 880, such as pre-execution query pricing module 810 implemented by user device 140, as discussed in conjunction with FIGS. 14A-14E and/or in conjunction with other functionality of the user device 140 and/or in conjunction with other functionality of the query pricing module 880 discussed herein.

Step 2014 includes determining a query request based on user input to a graphical user interface displayed by the user device. For example the user input is entered in response to a prompt to enter a query request displayed by the graphical user interface. Step 2016 includes transmitting the query request to an analytics system for execution against a database system. Step 2018 includes receiving query cost data from the analytics system, where a query result is generated by the analytics system based on facilitating execution of at least one query function against a database system, and where the query cost data is generated by the analytics system by utilizing a query pricing scheme based on the execution of the at least one query function. Step 2020 includes displaying a prompt via the graphical user interface that indicates the query cost data. Step 2022 includes determining query result approval data based on user input to the graphical user interface in response to the prompt.

When the query result approval data indicates approval to receive the query results, the method performs steps 2024 and/or 20286 where step 2028 is not performed. Step 2024 includes transmitting a request for the query results to an analytics system for execution against a database system. The request for the query results can include a facilitation of payment for the query results based on the query cost data and/or can otherwise indicate a payment has been made or is agreed to be made by an end user associated with the user device. Step 2026 includes receiving the query results in a transmission from the analytics system, where the analytics system transmits the query results to the user device based on receiving the request for the query results.

When the query result approval data does not indicate approval to receive the query results, the method continues from step 2022 to step 2028, where steps 2024 and step 2026 are not performed. Step 2028 includes foregoing transmission of the request for the query results to the analytics system. In various embodiments, the analytics system caches the query result in a query result cache and/or other memory of the analytics system in response to generating the query result. When the query approval data does not indicate approval to transmit the query request, the method can further include transmitting a message to the analytics system indicating the query approval data does not indicate approval to transmit the query request, where the analytics system removes the query result from the query result cache and/or other memory of the analytics system based on receiving the message.

In various embodiments, a user device includes at least one processor and a memory that stores operational instructions. The operational instructions, when executed by the at least one processor, cause the user device to: determine a query request based on user input to a graphical user interface displayed by the user device, for example, in response to a prompt to enter a query request displayed by the graphical user interface; transmit the query request to an analytics system for execution against a database system; receive query cost data from the analytics system, where a query result is generated by the analytics system based on facilitating execution of at least one query function against a database system, and/or where the query cost data is generated by the analytics system by utilizing a query pricing scheme based on the execution of the at least one query function; display a prompt via the graphical user interface that indicates the query cost data; and/or determine query result approval data based on user input to the graphical user interface in response to the prompt. When the query result approval data indicates approval to receive the query results, the operational instructions, when executed by the at least one processor, further cause the user device to transmit a request for the query results to an analytics system for execution against a database system; and/or receiving the query results in a transmission from the analytics system. When the query approval data does not indicate approval to transmit the query request, the operational instructions, when executed by the at least one processor, further cause the user device to forego transmission of the request for the query results to the analytics system.

In various embodiments, a computer readable storage medium includes at least one memory section that stores operational instructions. The operational instructions, when executed by a processing module that includes a processor and a memory, cause the processing module to: determine a query request based on user input to a graphical user interface displayed by the user device, for example, in response to a prompt to enter a query request displayed by the graphical user interface; transmit the query request to an analytics system for execution against a database system; receive query cost data from the analytics system, where a query result is generated by the analytics system based on facilitating execution of at least one query function against a database system, and/or where the query cost data is generated by the analytics system by utilizing a query pricing scheme based on the execution of the at least one query function; display a prompt via the graphical user interface that indicates the query cost data; and/or determine query result approval data based on user input to the graphical user interface in response to the prompt. When the query result approval data indicates approval to receive the query results, the operational instructions, when executed by the processing module, further cause the processing module to transmit a request for the query results to an analytics system for execution against a database system; and/or receiving the query results in a transmission from the analytics system. When the query approval data does not indicate approval to transmit the query request, the operational instructions, when executed by the processing module, further cause the processing module to forego transmission of the request for the query results to the analytics system.

Figure 20C:
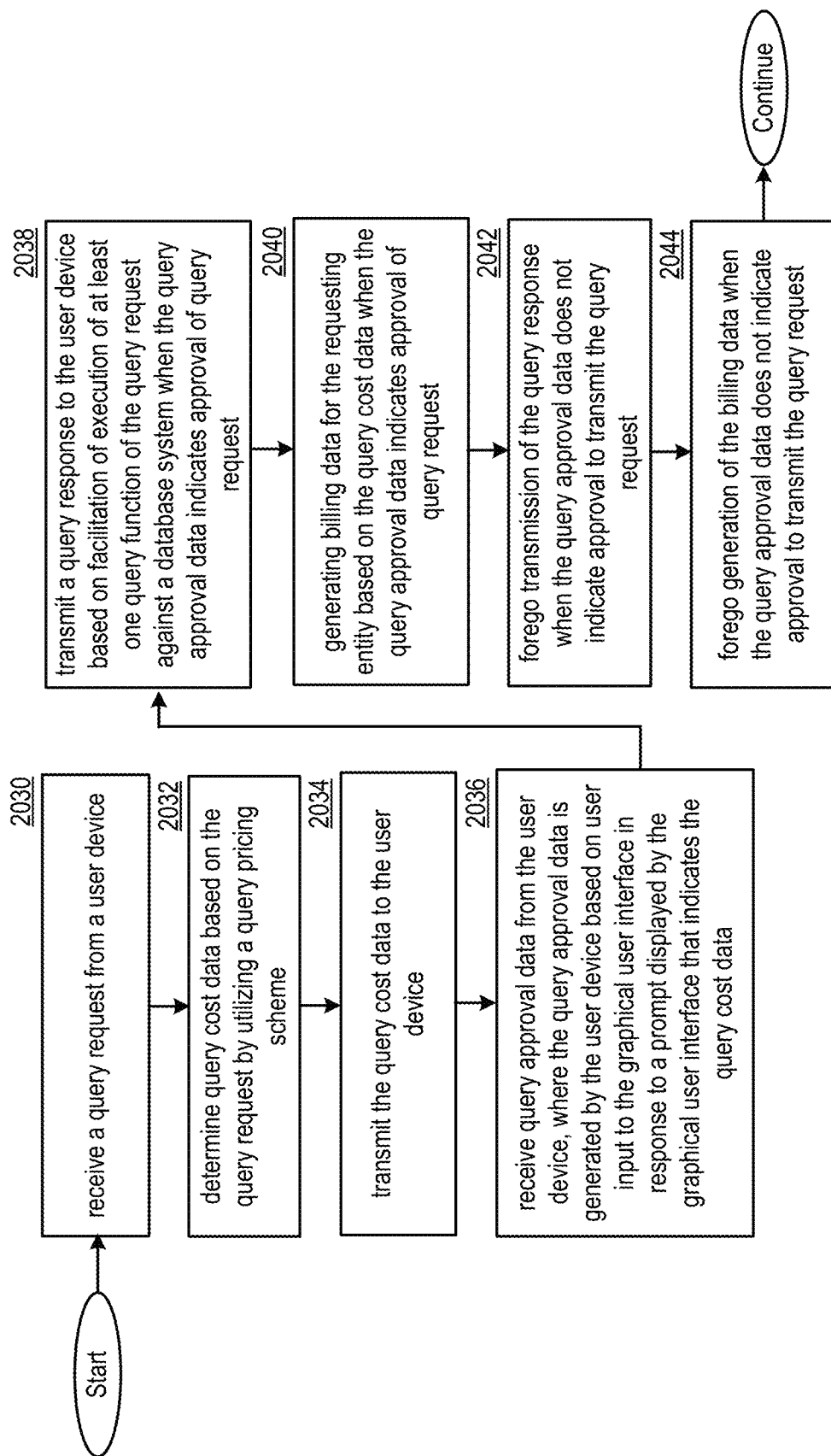
FIG. 20C is a logic diagram illustrating an example of a method of transmitting query results based on query approval data in accordance with various embodiments of the present invention.

FIG. 20C presents a method for execution by a query processing system 114, by a query pricing module 880, by a pre-execution query pricing module 810, by a runtime query pricing module 825, and/or for execution by another processing module of the analytics system 110 that executes executable instructions stored via a memory module. For example, the method of FIG. 20B can be performed by the query pricing module 880 and/or by the runtime query pricing module 825 of a query processing system 114 as discussed in conjunction with FIGS. 14A-14E and/or in conjunction with other functionality of the query processing system 114 discussed herein.

Step 2030 includes receiving a query request from a user device. Step 2032 includes determining query cost data based on the query request by utilizing a query pricing scheme. Step 2034 includes transmitting the query cost data to the user device. Step 2036 includes receiving query approval data from the user device, where the query approval data is generated by the user device based on user input to the graphical user interface in response to a prompt displayed by the graphical user interface that indicates the query cost data.

When the query approval data indicates approval of query request, the method includes performance of steps 2038 and/or 2040, where steps 2042 and 2044 are not performed. Step 2038 includes transmitting a query response to the user device based on facilitation of execution of at least one query function of the query request against a database system. Step 2040 includes generating billing data for the requesting entity based on the query cost data. When the query approval data does not indicate approval to transmit the query request, the method continues from step 2036 to step 2042, where steps 2038 and 2040 are not performed. Step 2042 includes foregoing transmission of the query response to the user device. Step 2044 includes foregoing generation of the billing data.

In various embodiments, determining the query cost data includes facilitating the execution of at least one query function of the query request against a database system. The query cost data is based on a query result generated based on the execution of at least one query function of the query request against a database system, where the query response indicates the query result. In various embodiments, the method includes caching the query result in a query result cache and/or other memory of the analytics system in response to generating the query result. When the query approval data does not indicate approval to transmit the query request, the method can further include removing the query result from the query result cache and/or other memory.

In various embodiments, an analytics system includes at least one processor and a memory that stores operational instructions. The operational instructions, when executed by the at least one processor, cause the analytics system to: receive a query request from a user device; determine query cost data based on the query request by utilizing a query pricing scheme; transmit the query cost data to the user device; and/or receive query approval data from the user device, where the query approval data is generated by the user device based on user input to the graphical user interface in response to a prompt displayed by the graphical user interface that indicates the query cost data. When the query approval data indicates approval of query request, the operational instructions, when executed by the at least one processor, further cause the analytics system to: transmit a query response to the user device based on facilitation of execution of at least one query function of the query request against a database system; and/or generate billing data for the requesting entity based on the query cost data. When the query approval data does not indicate approval to transmit the query request, the operational instructions, when executed by the at least one processor, further cause the analytics system to: forego transmission of the query response to the user device; and/or forego generation of the billing data.

In various embodiments, a computer readable storage medium includes at least one memory section that stores operational instructions. The operational instructions, when executed by a processing module that includes a processor and a memory, cause the processing module to: receive a query request from a user device; determine query cost data based on the query request by utilizing a query pricing scheme; transmit the query cost data to the user device; and/or receive query approval data from the user device, where the query approval data is generated by the user device based on user input to the graphical user interface in response to a prompt displayed by the graphical user interface that indicates the query cost data. When the query approval data indicates approval of query request, the operational instructions, when executed by the processing module, further cause the processing module to: transmit a query response to the user device based on facilitation of execution of at least one query function of the query request against a database system; and/or generate billing data for the requesting entity based on the query cost data. When the query approval data does not indicate approval to transmit the query request, the operational instructions, when executed by processing module, further cause the processing module to: forego transmission of the query response to the user device; and/or forego generation of the billing data.

Figure 21:
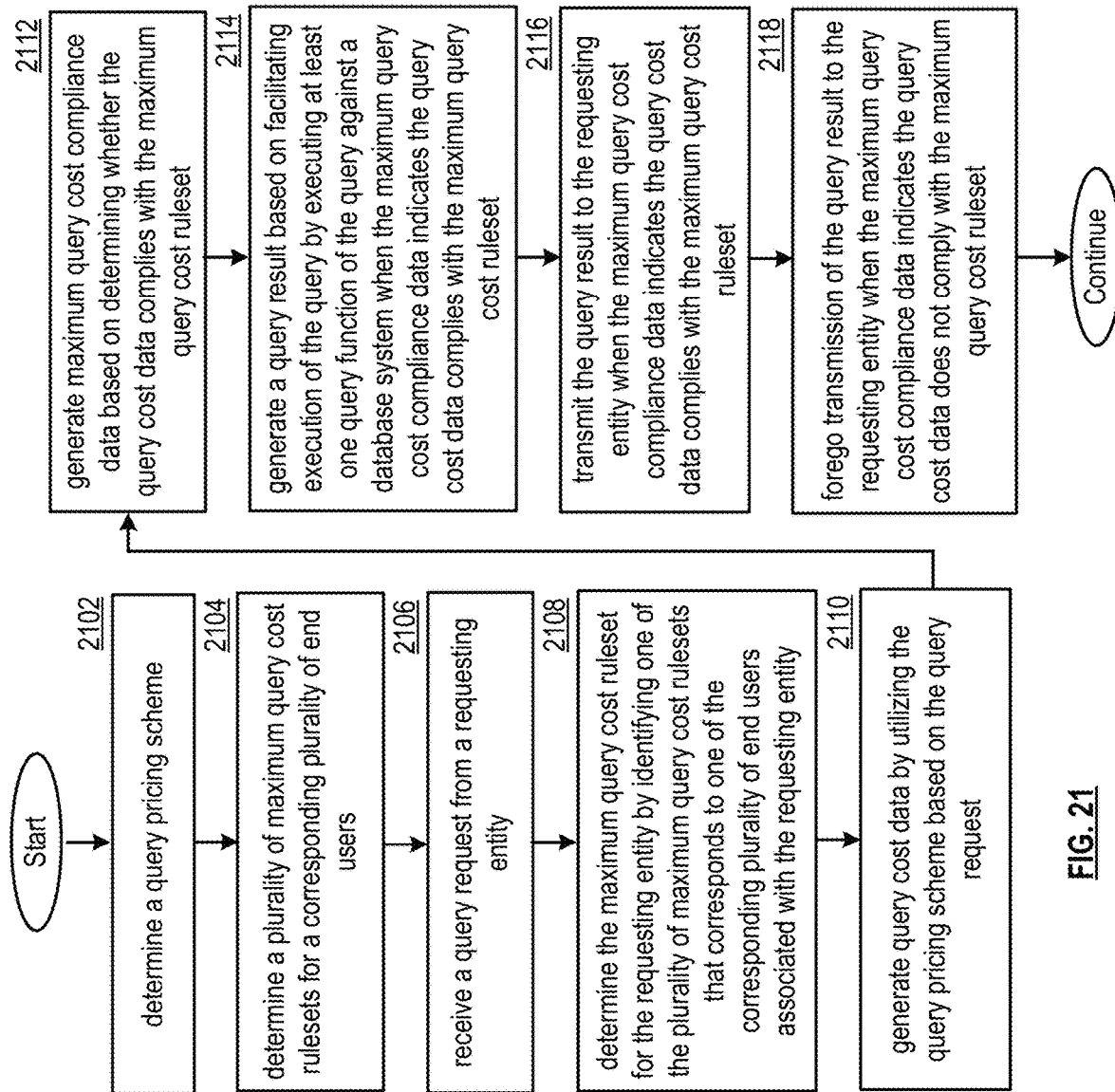
FIG. 21 is a logic diagram illustrating an example of a method of enforcing maximum query cost rulesets in accordance with various embodiments of the present invention.

FIG. 21 presents a method for execution by a query processing system 114, by a query pricing module 880, by a pre-execution query pricing module 810, by a runtime query pricing module 825, by a query cost compliance module 1580, by a pre-execution compliance module 610, by a runtime compliance module 625, and/or for execution by another processing module of the analytics system 110 that executes executable instructions stored via a memory module. For example, the method of FIG. 21 can be performed by the query pricing module 880 and/or by the query cost compliance module 1580 of a query processing system 114 as discussed in conjunction with FIGS. 15A-15F and/or in conjunction with other functionality of the query processing system 114 discussed herein.

Step 2102 includes determining a query pricing scheme. Step 2104 includes determining a plurality of maximum query cost rulesets for a corresponding plurality of end users. Step 2106 includes receiving a query request from a requesting entity. Step 2108 includes determining the maximum query cost ruleset for the requesting entity by identifying one of the plurality of maximum query cost rulesets that corresponds to one of the corresponding plurality of end users associated with the requesting entity. Step 2110 includes generating query cost data by utilizing the query pricing scheme based on the query request. Step 2112 includes generating maximum query cost compliance data based on determining whether the query cost data complies with the maximum query cost ruleset.

When the maximum query cost compliance data indicates the query cost data complies with the maximum query cost ruleset, the method includes performing step 2114 and/or step 2116, where step 2118 is not performed. Step 2114 includes generating a query result based on facilitating execution of the query by executing at least one query function of the query against a database system. Step 2116 includes transmitting the query result to the requesting entity.

When the maximum query cost compliance data indicates the query cost data does not comply with the maximum query cost ruleset, the method proceeds from step 2112 to 2118, where steps 2114 and/or step 2116 are not performed. Step 2118 includes foregoing transmission of the query result to the requesting entity. In some embodiments, when the maximum query cost compliance data indicates the query cost data does not comply with the maximum query cost ruleset, the method includes generating a non-compliance message for transmission for the requesting entity, for example, for display via GUI 345. The non-compliance message can indicate that the query cost data does not comply with the maximum query cost ruleset and/or can indicate that the query was not transmitted due to the query cost data's non-compliance with the maximum query cost ruleset.

In various embodiments, determining the plurality of maximum query cost rulesets includes receiving the plurality of maximum query cost rulesets from a plurality of user devices associated with the plurality of end users, and where each of the plurality of user devices generated a corresponding one of the plurality of maximum query cost rulesets based on user input to a graphical user interface in response to at least one prompt displayed by the graphical user interface.

In various embodiments, at least one of the plurality of user devices displays, via the graphical user interface, recommendation data generated automatically based on previously generated query cost data, where the recommendation data includes at least one suggested query cost maximum rule. The at least one of the plurality of user devices generated the corresponding one of the plurality of maximum query cost rulesets based on an indicating selection of the at least one suggested query cost maximum rule via the user input. The one of the plurality of maximum query cost rulesets includes the at least one suggested query cost maximum rule based on the indicated selection.

In various embodiments, the maximum query cost ruleset for the requesting entity indicates a set of provider-based maximum query cost rulesets corresponding to each of a set of data providers. Generating the maximum query cost compliance data can include identifying one of the set of data providers that supplied records accessed in the execution of the at least one query function of the query against a database system. Generating the maximum query cost compliance data can further include determining whether the query cost data complies with one of the set of provider-based maximum query cost rulesets corresponding to the one of the set of data providers. In various embodiments, the method includes determining a plurality of query pricing schemes, where each of the plurality of query pricing schemes corresponds to one of the set of data providers. In Determining the query pricing scheme can include selecting the query pricing scheme based on determining the query pricing scheme corresponds to the one of the set of data providers that supplied records accessed in the execution of the at least one query function of the query against a database system.

In various embodiments, the maximum query cost ruleset indicates a temporal-based maximum cost and a corresponding time window. Generating the maximum query cost compliance data can include determining running query cost data for at least one previous query request received from the requesting entity within the time window, and can further include calculating potential query cost data based on a summation of the miming query cost data and the query cost data generated for the query request. Generating the maximum cost compliance data can be based on determining whether a potential price total indicated by the potential query cost data exceeds the temporal-based maximum cost. In various embodiments, determining running query cost data includes accessing locally-stored running query cost data for the requesting entity. The method can further include updating the locally-stored running query cost data as the potential query cost data when the maximum query cost compliance data indicates the query cost data complies with the maximum query cost ruleset.

In various embodiments, the maximum query cost ruleset for the requesting entity indicates a set of query function-based query cost rules corresponding to each of a set of query function types. Generating the maximum query cost compliance data can include identifying at least one of the set of query function types corresponding to the at least one query function. Generating the maximum query cost compliance data can include identifying at least one of the set of query function-based query cost rules corresponding to the at least one of the set of query function types. Generating the maximum query cost compliance data can include determining whether the query cost data complies with the at least one of the set of query function-based query cost rules.

In various embodiments, the maximum query cost ruleset for the requesting entity indicates a set of field-based query cost rules corresponding to each of a set of fields of records stored in the database system. Generating the maximum query cost compliance data can include identifying at least one of the set of fields accessed in the execution of the at least one query function of the query against a database system. Generating the maximum query cost compliance data can include identifying at least one of the set of field-based query cost rules corresponding to the at least one of the set of fields. Generating the maximum query cost compliance data can include determining whether the query cost data complies with the at least one of the set of field-based query cost rules.

In various embodiments, the method further includes further generating billing data for the requesting entity based on the query cost data and/or facilitating a payment of a query price value of the query cost data by the requesting entity. In various embodiments, the method includes determining whether payment of at least one query cost indicated by the query cost data has been completed by the end user, where the end user completes the payment based on receiving the query cost data. In various embodiments, the billing data is generated for the requesting entity based on the query cost data and/or the payment of a query price value of the query cost data by the requesting entity is facilitated only when the maximum query cost compliance data indicates the query cost data complies with the maximum query cost rule.

In various embodiments, a query processing system of an analytics system includes at least one processor and a memory that stores operational instructions. The operational instructions, when executed by the at least one processor, cause the query processing system to: determine a query pricing scheme; determine a plurality of maximum query cost rulesets for a corresponding plurality of end users; receive a query request from a requesting entity; determine the maximum query cost ruleset for the requesting entity by identifying one of the plurality of maximum query cost rulesets that corresponds to one of the corresponding plurality of end users associated with the requesting entity; generate query cost data by utilizing the query pricing scheme based on the query request; and/or generate maximum query cost compliance data based on determining whether the query cost data complies with the maximum query cost ruleset. When the maximum query cost compliance data indicates the query cost data complies with the maximum query cost ruleset, the operational instructions, when executed by the at least one processor, further cause the query processing system to generate a query result based on facilitating execution of the query by executing at least one query function of the query against a database system; and/or transmit the query result to the requesting entity. When the maximum query cost compliance data indicates the query cost data does not comply with the maximum query cost ruleset, the operational instructions, when executed by the at least one processor, further cause the query processing system to forego transmission of the query result to the requesting entity.

In various embodiments, a computer readable storage medium includes at least one memory section that stores operational instructions. The operational instructions, when executed by a processing module that includes a processor and a memory, cause the processing module to: determine a query pricing scheme; determine a plurality of maximum query cost rulesets for a corresponding plurality of end users; receive a query request from a requesting entity; determine the maximum query cost ruleset for the requesting entity by identifying one of the plurality of maximum query cost rulesets that corresponds to one of the corresponding plurality of end users associated with the requesting entity; generate query cost data by utilizing the query pricing scheme based on the query request; and/or generate maximum query cost compliance data based on determining whether the query cost data complies with the maximum query cost ruleset. When the maximum query cost compliance data indicates the query cost data complies with the maximum query cost ruleset, the operational instructions, when executed by the processing module, further cause the processing module to generate a query result based on facilitating execution of the query by executing at least one query function of the query against a database system; and/or transmit the query result to the requesting entity. When the maximum query cost compliance data indicates the query cost data does not comply with the maximum query cost ruleset, the operational instructions, when executed by the processing module, further cause the processing module to forego transmission of the query result to the requesting entity.

Figure 22:
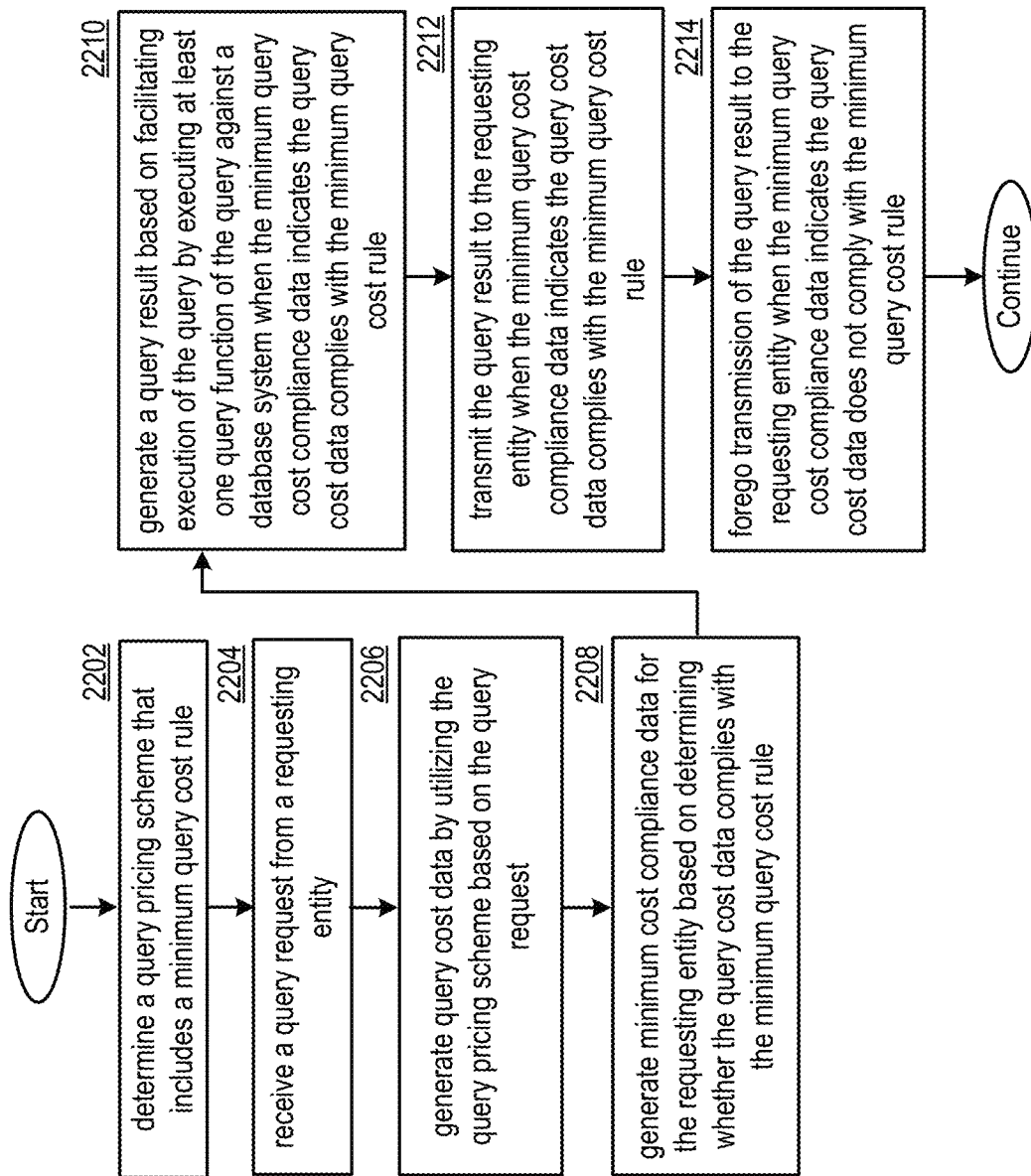
FIG. 22 is a logic diagram illustrating an example of a method of enforcing minimum query cost rules in accordance with various embodiments of the present invention.

FIG. 22 presents a method for execution by a query processing system 114, by a query pricing module 880, by a pre-execution query pricing module 810, by a runtime query pricing module 825, by a query cost compliance module 1580, by a pre-execution compliance module 610, by a runtime compliance module 625, and/or for execution by another processing module of the analytics system 110 that executes executable instructions stored via a memory module. For example, the method of FIG. 22 can be performed by the query pricing module 880 and/or by the query cost compliance module 1580 of a query processing system 114 as discussed in conjunction with FIGS. 16A-16C and/or in conjunction with other functionality of the query processing system 114 discussed herein.

Step 2202 includes determining a query pricing scheme that includes a minimum query cost rule. For example the query pricing scheme and/or the minimum query cost rule can be generated by a provider device 230 based on user input to a GUI 245. Alternatively the minimum query cost rule can be received in a query ruleset, and/or can be received and/or otherwise determined separately from the query pricing scheme. Step 2204 includes receiving a query request from a requesting entity. Step 2206 includes generating query cost data by utilizing the query pricing scheme based on the query request. Step 2208 includes generating minimum query cost compliance data for the requesting entity based on determining whether the query cost data complies with the minimum query cost rule.

When the query cost compliance data indicates the query cost data complies with the minimum query cost rule, the method can perform step 2210 and/or step 2212, where step 2214 is not performed. Step 2210 includes generating a query result based on facilitating execution of the query by executing at least one query function of the query against a database system. Step 2212 includes transmitting the query result to the requesting entity.

When the query cost compliance data indicates the query cost data complies with the minimum query cost rule, the method can proceed from step 2208 to step 2214, where steps 2210 and/or 2212 are not performed. Step 2214 includes foregoing transmission of the query result to the requesting entity. Foregoing transmission of the query result can include waiting to transmit the query result to the requesting entity at a later time, for example, based on later determining that the query cost compliance data indicates the query cost data of the query request, and/or query cost data generated for a subsequent query request received from the same requesting entity, complies with the minimum query cost rule. Alternatively, foregoing transmission of the query result can include not performing this received query at any time.

In some embodiments, the method can further include transmitting a non-compliance message to the requesting entity indicating that the query cost data of the query request did not comply with the minimum query cost rule. The non-compliance message can be transmitted to the requesting entity, for example for display via a GUI 345. In some embodiments, the non-compliance message indicates the minimum cost that was not met by the query cost data of the query request.

In various embodiments, the method further includes further generating billing data for the requesting entity based on the query cost data and/or facilitating a payment of a query price value of the query cost data by the requesting entity. In various embodiments, the method includes determining whether payment of at least one query cost indicated by the query cost data has been completed by the end user, where the end user completes the payment based on receiving the query cost data. In various embodiments, the billing data is generated for the requesting entity based on the query cost data and/or the payment of a query price value of the query cost data by the requesting entity is facilitated only when the query cost compliance data indicates the query cost data complies with the minimum query cost rule.

In various embodiments, generating the minimum query cost compliance data includes determining running query cost data for at least one previous query request received from the requesting entity, and further includes calculating potential query cost data based on a summation of the running query cost data and the query cost data generated for the query request. Generating minimum query cost compliance data can be based on determining whether the potential query cost data complies with the minimum query cost rule. In various embodiments, the running query cost data is locally stored, and the running query cost data is determined based on accessing the running query cost data from local storage. The method can include updating this locally-stored running query cost data as the potential query cost data. In various embodiments, the non-compliance message can indicate the updated running query cost data and/or can indicate remaining cost calculated as a difference between the updated running query cost data and the minimum query cost indicated by the minimum query cost rule.

In various embodiments, when the minimum query cost compliance data indicates the query cost data complies with the minimum query cost rule, the method further includes accessing a query request cache for the requesting entity to determine at least one previous query result. At least one previous query result is generated based on facilitating execution of the at least one previous query by executing at least one query function of the at least one previous query against a database system. In various embodiments, the minimum query cost rule indicates a time window, where the at least one previous query request was received within the time window. In various embodiments, the method can further include transmitting the at least one previous query result to the requesting entity when the minimum query cost compliance data indicates the query cost data complies with the minimum query cost rule. When the minimum query cost compliance data indicates the query cost data does not comply with the minimum query cost rule, the method can further include caching the query request in the query request cache for the requesting entity.

In various embodiments, the method can further include generating at least one previous query cost data for the at least one previous query request by utilizing the query pricing scheme prior to receiving the query request from the requesting entity. The method can further include caching the at least one previous query request in the query request cache for the requesting entity based on determining the at least one previous query cost data does not comply with the minimum query cost rule.

In various embodiments, generating the at least one previous query cost data includes facilitating execution of the at least one previous query request to generate at least one corresponding result set. The at least one previous query cost data can be generated based on a result set-based pricing scheme, and caching the at least one previous query request in the query request cache includes caching the at least one corresponding result set in the query request cache for the requesting entity. Determining the at least one previous query result can include retrieving the at least one corresponding result set from the query request cache. Generating the query cost data can include facilitating execution of at least one query function indicated in the query request to generate a result set, where the query cost data is generated based on a result set-based pricing scheme, and where caching the query request includes caching the result set in the query request cache. In various embodiments, determining the at least one previous query result includes generating the at least one previous query result by facilitating the execution of the at least one previous query request to generate the query result in response to determining the minimum query cost compliance data indicates the minimum query cost data complies with the minimum query cost rule.

In various embodiments, the method further includes determining a ruleset that includes a plurality of other rules; and generating compliance data for each of a set of previous query requests received from the requesting entity, where the compliance data indicates whether the each of a set of previous query requests complies with the plurality of other rules. The running query cost data can be determined based on calculating a summation of query cost data corresponding to only ones of set of previous query requests with compliance data that indicates compliance with the plurality of other rules. For example a proper subset of the set of previous query request can be identified to have compliance data that indicates compliance with the plurality of other rules, where only the proper subset is utilized to determine the running query cost data.

In various embodiments, the at least one previous query request received from the requesting entity includes a plurality of previous query requests. The running cost data is based on a summation of a plurality of previous query costs of the plurality of previous query requests. At least two of the plurality of previous query costs can have differing values based on the query pricing scheme.

In various embodiments, generating the query cost data is based on determining a number of records included in the query result. In various embodiments, generating the query cost data is based on determining a number of query functions indicated in the query request.

In various embodiments, the method includes determining a plurality of query pricing schemes, where each of the plurality of query pricing schemes corresponds to one of a plurality of data providers, and where each of the plurality of query pricing schemes indicates a corresponding one of a plurality of minimum query cost rules. The method can further include determining that the query request involves access to records supplied by a first one of the plurality of data providers, where determining the query pricing scheme includes selecting the query pricing scheme from the plurality of query pricing schemes based on determining the query pricing scheme corresponds to the first one of the plurality of data providers. Generating minimum query cost compliance data for the query request is based on determining whether the minimum query cost data complies with one of the plurality of minimum query cost rules corresponding to the first one of the plurality of data providers. In various embodiments, determining the plurality of query pricing schemes includes receiving the plurality of query pricing schemes from a plurality of provider devices corresponding to the plurality of data providers, where each of the plurality of query pricing schemes was generated based on user input in response to a prompt displayed by a corresponding one of the plurality of provider devices via a graphical user interface.

In various embodiments, a query processing system of an analytics system includes at least one processor and a memory that stores operational instructions. The operational instructions, when executed by the at least one processor, cause the query processing system to: determine a query pricing scheme that includes a minimum query cost rule; receive a query request from a requesting entity; generate query cost data by utilizing the query pricing scheme based on the query request; and/or generate minimum query cost compliance data for the query request based on determining whether the minimum query cost data complies with the minimum query cost rule. When the minimum query cost compliance data indicates the minimum query cost data complies with the minimum query cost rule, the operational instructions, when executed by the at least one processor, further cause the query processing system to: generate a query result based on facilitating execution of the query by executing at least one query function of the query against a database system; and/or transmit the query result to the requesting entity. When the minimum query cost compliance data indicates the query cost data does not comply with the minimum query cost rule, the operational instructions, when executed by the at least one processor, further cause the query processing system to forego transmission of the query result to the requesting entity.

In various embodiments, a computer readable storage medium includes at least one memory section that stores operational instructions. The operational instructions, when executed by a processing module that includes a processor and a memory, cause the processing module to: determine a query pricing scheme that includes a minimum query cost rule; receive a query request from a requesting entity; generate query cost data by utilizing the query pricing scheme based on the query request; and/or generate minimum query cost compliance data for the query request based on determining whether the minimum query cost data complies with the minimum query cost rule. When the minimum query cost compliance data indicates the minimum query cost data complies with the minimum query cost rule, the operational instructions, when executed by the processing module, further cause the processing module to: generate a query result based on facilitating execution of the query by executing at least one query function of the query against a database system; and/or transmit the query result to the requesting entity. When the minimum query cost compliance data indicates the query cost data does not comply with the minimum query cost rule, the operational instructions, when executed by the processing module, further cause the processing module to forego transmission of the query result to the requesting entity.

Figure 23:
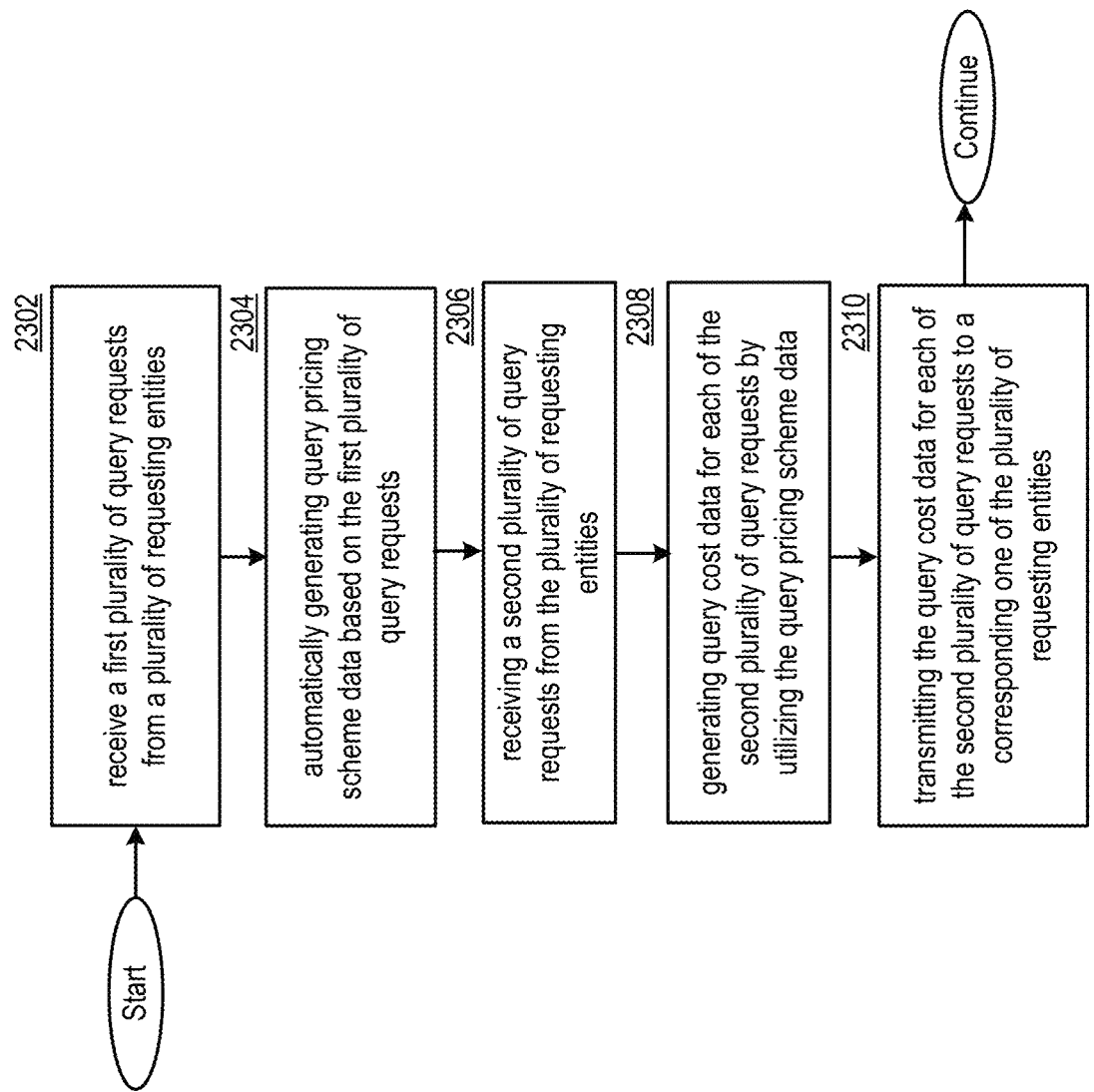
FIG. 23 is a logic diagram illustrating an example of a method of utilizing automatically generated query pricing scheme data in accordance with various embodiments of the present invention.

FIG. 23 presents a method for execution by an analytics system 110, by a query processing system 114, by a query pricing scheme generating module 1610, by a query pricing module 880, by a pre-execution query pricing module 810, by a runtime query pricing module 825, and/or for execution by at least one other processing module of the analytics system 110 that executes executable instructions stored via a memory module. For example, the method of FIG. 23 can be performed by the query pricing scheme generating module 1610 and/or the query processing system 114 of an analytics system 110 as discussed in conjunction with FIG. 17 and/or in conjunction with other functionality of the analytics system 110 discussed herein.

Step 2302 includes receiving a first plurality of query requests from a plurality of requesting entities. For example, the first plurality of query requests can be received from a plurality of user devices 140, where the first plurality of query requests are each generated by a corresponding user device 140 via user interaction with a GUI 345 displayed by user device 140, for example, in conjunction with execution of user application data received by and/or stored on user device 140. In some cases, the first plurality of query requests are processed and/or executed via the query processing system 114 in conjunction with generating query results, compliance data and/or query pricing data. Some or all of the query results can be transmitted back to the requesting entity, for example, in conjunction with payment and/or in conjunction with the query being compliant with ruleset 550.

Step 2304 includes automatically generating query pricing scheme data based on the first plurality of query requests. For example, the query pricing scheme generating module 1610 can generate the query pricing scheme data based on the first plurality of query requests. In some cases, the query pricing scheme generating module 1610 can generate the query pricing scheme data based on the query data of the first plurality of requests, based on intermediate or final result sets of the first plurality of requests via partial or full execution of the first plurality of query requests against the database system 112, and/or based on query cost data generated for the first plurality of requests via the query pricing module 880. In some cases, the query pricing scheme data includes a set of query pricing schemes, where each query pricing scheme is generated for a corresponding one or a set of data providers. In some cases, the query pricing scheme data includes a set of query pricing schemes includes an updated pricing scheme generated based on automatically modifying an existing pricing scheme. In some cases, the existing pricing scheme was generated by a provider device 230 based on user input to a GUI 245, where the existing pricing scheme was transmitted by the provider device 230.

Step 2306 includes receiving a second plurality of query requests from the plurality of requesting entities. For example, the second plurality of query requests can be received from the same or different plurality of user devices 140, where the second plurality of query requests are each generated by a corresponding user device 140 via user interaction with the GUI 345 displayed by user device 140, for example, in conjunction with execution of the user application data received by and/or stored on user device 140. The second plurality of query requests from the plurality of requesting entities after the query pricing scheme data has been generated in step 2304.

Step 2308 includes generating query cost data for each of the second plurality of query requests by utilizing the query pricing scheme data. In some cases, the query cost data is generated by a query pricing module 880 of the query processing system 114, for example, by utilizing pre-execution query pricing module 810 or runtime query pricing module 825 as discussed previously herein. In some cases, one or more of a set of query pricing schemes includes in the query pricing scheme data can be applied to generate the query cost data for each of the second plurality of query requests. For example, for a given one of the second plurality of query requests, a subset of the set of pricing schemes can be identified based on a corresponding subset of the set of data providers determined to be involved in the one of the second plurality of query requests and/or determined to have supplied result sets included in an intermediate and/or final result set of the one of the second plurality of query requests, where only the subset of the set of pricing schemes is utilized to generate the query cost data for this one of the second plurality of query requests.

Step 2310 includes transmitting the query cost data for each of the second plurality of query requests to a corresponding one of the plurality of requesting entities. For example the query processing system 114 can send the query cost data to the query logging system 450 and/or to the billing invoice generating system 760, where user billing data for each of the second plurality of query requests is sent to a corresponding user device 140. In some cases, each query cost data is sent in conjunction with a corresponding query result generated via execution of at least one query function of the corresponding query request.

In various embodiments, the method further includes further generating billing data for each requesting entity based on the query cost data generated for ones of the first plurality of query requests and/or the second plurality of query requests received from the each requesting entity. In some embodiments, the method further includes facilitating a payment of a query price value of the query cost data by each corresponding requesting entity. In various embodiments, the method includes determining whether payment of at least one query cost indicated by the query cost data has been completed by the each end user corresponding to each requesting entity, where some or all end users complete the payment based on receiving their query cost data generated for ones of the first plurality of query requests and/or the second plurality of query requests received from corresponding requesting entity.

In various embodiments, the query pricing scheme data indicates a first function valuation for a first one of a set of query functions, and the query pricing scheme data indicates a second function valuation for a second one of the set of query functions. The first valuation is higher than the second valuation. The query cost data for a first one of the second plurality of query requests includes a first function-based query cost, where the first function-based query cost is calculated as a function of the first function valuation based on determining the first one of the second plurality of query requests utilizes the first one of the set of query functions. The query cost data for a second one of the second plurality of query requests includes a second function-based query cost, where the second function-based query cost is calculated as a function of the second function valuation based on determining the second one of the second plurality of query requests utilizes the second one of the set of query functions. The first function-based query cost is higher than the second function-based query cost based on the first valuation being higher than the second valuation in the query pricing scheme data.

In various embodiments, the method includes determining query function demand data for a set of query functions called in the first plurality of query requests. The query function demand data indicates a first level of demand for the first one of the set of query functions, and the query function demand data indicates a second level of demand for the second one of the set of query functions. The first level of demand is higher than the second level of demand. The query pricing scheme data is generated based on the query function demand data, where the first valuation is higher than the second valuation based on the first level of demand being higher than the second level of demand. In various embodiments, generating the query function demand data includes generating histogram data indicating an amount of function calls of each of the set of query functions in the first plurality of query requests.

In various embodiments, the method includes determining query function resource consumption data for the set of query functions utilized the first plurality of query requests. The query function resource consumption data indicates a first level of resource consumption for a first one of the set of query functions. The query function resource consumption data indicates a second level of resource consumption for the second one of the set of functions. The first level of resource consumption is higher than the second level of resource consumption. The query pricing scheme data is generated based on the query function resource consumption data, and the first valuation is higher than the second valuation based on the first level of resource consumption being higher than the second level of resource consumption.

In various embodiments, the method includes facilitating execution of at least one query function indicated in each of first plurality of query requests against a database system based on receiving the first plurality of query requests. The method further includes generating resource consumption metrics for each of the first plurality of query requests based on an amount of resource consumption utilized to facilitating execution of the at least one query function of the each of the first plurality of query requests. Determining the query function resource consumption data includes averaging or otherwise aggregating and/or generating summary information regarding resource consumption metrics for each of the set of query functions based on the resource consumption metrics for ones of the first plurality of query requests that called the each of the set of query functions.

In various embodiments, the query pricing scheme data indicates a first record valuation for a first one of a set of record types, and the query pricing scheme data indicates a second record valuation for a second one of the set of record types. The first valuation is higher than the second valuation. The query cost data for a first one of the second plurality of query requests includes a first record-based query cost, where the first record-based query cost is calculated as a function of the first record valuation based on determining the first one of the second plurality of query requests accesses at least one record corresponding to the first one of set of record types. The query cost data for a second one of the second plurality of query requests includes a second record-based query cost, where the second record-based query cost is calculated as a function of the second record valuation based on determining the second one of the second plurality of query requests accesses at least one record corresponding to the first one of set of record types. The first record-based query cost is higher than the second record-based query cost based on the first valuation being higher than the second valuation in the query pricing scheme data.

In various embodiments, the method includes determining query record demand data for the set of record types accessed in the first plurality of query requests. The query record demand data indicates a first level of demand for the first one of the set of record types, where the query function demand data indicates a second level of demand for the second one of the set of record types, and where the first level of demand is higher than the second level of demand. The query pricing scheme data is generated based on the query record demand data, where the first valuation is higher than the second valuation based on the first level of demand being higher than the second level of demand. In various embodiments, the set of record types corresponds to a set of record ages. In various embodiments, the set of record types corresponds to a set of record values for at least one field of the plurality of records In various embodiments, generating the query function demand data includes generating histogram data indicating, for each of the set of record types, a number of queries requests in the plurality of query requests indicating filtering data corresponding to the each of the set of record types. In various embodiments, the filtering data is determined based on evaluating WHERE clauses of SQL queries indicated in the query requests. In various embodiments, the method includes generating a plurality of result sets by facilitating execution of each of first plurality of query requests based on receiving the first plurality of query requests, where each of the plurality of result sets includes a proper subset of records of a set of records stored in the database system. In various embodiments, generating the query function demand data includes generating histogram data indicating, for each of the set of record types, a number of result sets in the plurality of result sets that include at least one record of the each of the set of record types. In various embodiments, generating the query function demand data includes generating histogram data indicating, for each of the set of record types, a number of records in each set of records of the plurality of result sets that corresponds to the each of the set of record types.

In various embodiments, the method includes automatically generating updated query pricing scheme data based on the query cost data of the second plurality of query requests, where the updated query pricing scheme data is different from the pricing scheme data. The method can further include receive a third plurality of query requests from the plurality of requesting entities; generating query cost data for each of the third plurality of query requests by utilizing the updated query pricing scheme data; and/or transmitting each query cost data for each of the third plurality of query requests to a corresponding one of the plurality of requesting entities.

In various embodiments, the query pricing scheme data indicates a set of query costs for a set of query types, where ones of the set of query costs are applied to query requests based on determining the query cost corresponds to a corresponding one of the of the set of query types, and where the query pricing scheme data indicates a first query cost for a first one of the set of query types. The updated query pricing scheme data indicates a second query cost for the first one of the set of query types that is higher than or lower than first query cost. In various embodiments, the set of query types corresponds to and/or is based on a set of query functions, a set of fields, a set of result set characteristics, and/or a set of record characteristics. A query type of a given query is determined based on a determined a set of query functions performed in execution of the given query, a determined set of fields accessed in execution of the given query, a determined set of result set characteristics for the result set generated by execution of the given query, and/or a determined set of record characteristics for records utilized by execution of the given query.

In various embodiments, the updated query pricing scheme data indicates a second query cost for the first one of the set of query types that is lower than the first query based on determining a level of usage of the first one of the set of query types in the second plurality of query request is lower than a predetermined usage threshold. In various embodiments, the updated query pricing scheme data indicates a second query cost for the first one of the set of query types that is higher than the first query cost based on to determining a level of usage of the first one of the set of query types in the second plurality of query request is higher than a predetermined usage threshold. The level of usage can be determined based on histogram data indicating a number of queries of each of the set of query types in the first plurality of query requests and/or the second plurality of query requests, where higher levels of usage correspond to higher amounts of queries, and where the level of usage is indicated in the histogram data for the amount of queries in the first plurality of query requests and/or the second plurality of query requests corresponding to the first one of the set of query types. The predetermined usage threshold can be set by a corresponding data provider and/or an administrator of the analytics system via user input to GUI 245.

In various embodiments, the updated query pricing scheme data indicates a second query cost for the first one of the set of query types that is lower than the first query cost in response to determining a summation of query cost data for ones of the second plurality of query requests corresponding to the first one of the set of query types is lower than a predetermined cost threshold. In various embodiments, the updated query pricing scheme data indicates a second query cost for the first one of the set of query types that is higher than the first query cost in response to determining a summation of query cost data for ones of the second plurality of query requests corresponding to the first one of the set of query types is higher than a predetermined cost threshold.

In various embodiments, the method includes determining a first level of usage for the first one of the set of query types in the first plurality of query requests. The method can further includes determining a second level of usage for the second one of the set of query types in the second plurality of query requests. The method can further include determining a usage level change from the first level of usage to the second level of usage, such as a difference between the number of the first one of the set of query types in the first plurality of query requests and the number of the second one of the set of query types in the second plurality of query requests. The updated query pricing scheme data indicates a second query cost for the first one of the set of query types that is higher than the first query cost based on determining the usage level change is positive and/or or the usage level change is higher than a predetermined usage change threshold. The updated query pricing scheme data indicates a second query cost for the first one of the set of query types that is lower than the first query cost based on determining usage level change is negative and/or the usage level change is lower than a predetermined usage change threshold.

The predetermined usage level change threshold can be set by a corresponding data provider and/or an administrator of the analytics system via user input to GUI 245. Alternatively, the predetermined usage level change threshold can be automatically determined as an additional step of the method based on other information, such as a determined average usage change across all of the usage levels for all of the set of query types from the first plurality of query requests to the second plurality of query requests, where the predetermined usage change threshold is automatically set greater than equal to the average usage change.

In various embodiments, the method includes receiving a plurality of query cost maximum rulesets from the plurality of requesting entities, where the query pricing scheme data is further based on the plurality of query cost maximum rulesets. In various embodiments, generating the query pricing scheme data includes determining at least one maximum cost for at least one query type that is less than or equal to a maximum cost of a maximum cost rule of at least one of the query cost maximum rulesets for the at least one query type and/or that is less than or equal to at a maximum cost of a maximum cost rule of at least a threshold number of the plurality of query cost maximum rulesets for at least one query type.

In various embodiments, the method includes receiving a plurality of query cost approval data from the plurality of requesting entities, where the query pricing scheme data is further based on the plurality of query cost approval data. Each of the plurality of query cost approval data can be generated by each user device for a corresponding one of the second plurality of query requests based on user input to GUI 345 indicating whether they approve or reject execution of the query and/or retrieval of the query results based on query cost data displayed for the corresponding query via GUI 345, where the query cost data is generated by the user device and/or the analytics system 110 based on the query request entered via user input to GUI 345. The query cost data for each query in the second plurality of query requests is generated based on the query pricing scheme data.

In various embodiments, the plurality of query cost approval data indicates a set of query cost approval data for queries in the second plurality of queries for each of the plurality of query types. The set of approval data can include a first subset of the set of approval data indicating approval of a subset of corresponding query requests by a corresponding subset of requesting entities based on corresponding query cost data of each of the subset of corresponding query requests, and the set of approval data can include a second subset of the set of approval data indicating rejection of a subset of corresponding query requests by a corresponding subset of requesting entities based on corresponding query cost data of each of the subset of corresponding query requests.

A first subset of queries with query cost approval data indicating of approval of the query type can be determined for each query type. The average query cost and/or maximum query cost for the query type across the query cost data in the first subset of each query type can be determined. The updated query pricing scheme data can be generated based on each average and/or maximum cost determined for each query type in the corresponding first subset. For example, the query cost and/or maximum query cost in a query cost range for a query type in the updated query cost data can be set equal to the average query cost and/or maximum query cost of the corresponding first subset, and/or can be set to a threshold amount higher or lower than the maximum cost, where the threshold amount can be determined based on user input to GUI 245.

Alternatively or in addition, a second subset of queries with query cost approval data indicating rejection of the query type can be determined for each query type, where the first subset and the second subset determined for a query type are mutually exclusive and collectively exhaustive with respect to all queries of the query type in the second plurality of queries. The minimum query cost and/or average query cost for the query type across the query cost data in the second subset of each query type can be determined. The updated query pricing scheme data can be generated based on each minimum and/or average cost determined for each query type in the corresponding second subset. For example, the query cost and/or maximum query cost in a query cost range for a query type in the updated query cost data can be set equal to the average query cost and/or minimum query cost of the corresponding second subset, and/or can be set to a threshold amount higher or lower than the average and/or minimum query cost, where the threshold amount can be determined based on user input to GUI 245.

In some embodiments, for each query type, a minimum threshold can be determined, where the minimum threshold corresponds to: a minimum threshold number of requesting entities that approved at least one query of the each query type; a minimum threshold proportion of requesting entities that approved at least one query of the each query type; a minimum threshold number of queries of the each query type that were approved; and/or a minimum threshold proportion of queries of the each query type that were approved.

The minimum threshold can be determined based on or set by a corresponding data provider and/or an administrator of the analytics system via user input to GUI 245. Alternatively, the predetermined usage level change threshold can be automatically determined as an additional step of the method based on other information, such as a determined average number and/or proportion of approved queries across all of the set of query types in the second plurality of query requests to the second plurality of query requests. In some embodiments, the minimum threshold number of queries and/or minimum threshold number of requesting entities for one or more query types is equal to one, indicating at least one approved query and/or at least one approving requesting entity for the query type meets the minimum threshold. In some embodiments, the minimum threshold proportion of queries and/or minimum threshold proportion of requesting entities for one or more query types is equal to one, indicating all queries of the query type must be approved and/or all requesting entities must have approved at least one query of the query type for the minimum threshold to be met.

The first subset of queries corresponding to the approved queries for each query type can be compared to the minimum threshold to determine whether the minimum threshold was adhered to by the corresponding query type. For example, if a number of queries in the first subset meets or exceeds the minimum threshold number of queries, the minimum threshold can be determined to be adhered to, and is determined to be un-adhered to otherwise. The update query cost data can be generated based on determining whether each minimum threshold was adhered to by the corresponding query type in the query cost approval data. In various embodiments, when the minimum threshold is adhered to for a query type, the query cost for the query type remains the same, or is raised, in the updated query cost data. When the minimum threshold is un-adhered to for a query type, the query cost for the query type is lowered, or remains the same, in the updated query cost data.

In various embodiments, an analytics system includes at least one processor and a memory that stores operational instructions. The operational instructions, when executed by the at least one processor, cause the analytics system to: receive a first plurality of query requests from a plurality of requesting entities; automatically generate query pricing scheme data based on the first plurality of query requests; receive a second plurality of query requests from the plurality of requesting entities; generate query cost data for each of the second plurality of query requests by utilizing the query pricing scheme data; and/or transmit the query cost data for each of the second plurality of query requests to a corresponding one of the plurality of requesting entities.

In various embodiments, a computer readable storage medium includes at least one memory section that stores operational instructions. The operational instructions, when executed by a processing module that includes a processor and a memory, cause the processing module to: receive a first plurality of query requests from a plurality of requesting entities; automatically generate query pricing scheme data based on the first plurality of query requests; receive a second plurality of query requests from the plurality of requesting entities; generate query cost data for each of the second plurality of query requests by utilizing the query pricing scheme data; and/or transmit the query cost data for each of the second plurality of query requests to a corresponding one of the plurality of requesting entities.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an analytics system, the method comprising:
    receiving a query request from a user device;
    determining query cost data based on the query request by utilizing a query pricing scheme, wherein the query cost data indicates a total query cost computed as a function of at least one of:
        a plurality of provider costs for each of a plurality of data providers that supplied data accessed in the query request;
        a plurality of query function costs for each of a plurality of query functions indicated in the query request;
        a plurality of field costs for each of a plurality of fields accessed in the query request; or
        a plurality of record type costs for each of a plurality of record types accessed in the query request:
    transmitting the query cost data to the user device;
    receiving query approval data from the user device, wherein the query approval data is generated by the user device based on user input to a graphical user interface;
    when the query approval data indicates approval of query request:
        transmitting a query response to the user device based on facilitation of execution of the query request against a database system; and
        generating billing data for based on the query cost data; and
    when the query approval data does not indicate approval to transmit the query request:
        foregoing transmission of the query response to the user device; and
        foregoing generation of the billing data.

2. The method of claim 1, wherein determining the query cost data includes facilitating the execution of at least one query function of the query request against the database system, wherein the query cost data is based on a query result generated based on the execution of the at least one query function of the query request against the database system, and wherein the query response is based on the query result.

3. A method for execution by a user device, the method comprising:
    determining a query request based on first user input to a graphical user interface displayed by the user device;
    determining query cost data based on the query request, wherein determining the query cost data is based on:
        transmitting the query request to an analytics system for execution against a database system; and
        receiving query cost data from the analytics system, wherein a query result is generated by the analytics system based on facilitating execution of at least one query function against the database system, and wherein the query cost data is generated by the analytics system by utilizing a query pricing scheme based on the execution of the at least one query function;
    displaying a prompt via the graphical user interface that indicates the query cost data;
    determining query approval data based on second user input to the graphical user interface in response to the prompt;
    when the query approval data indicates approval to receive the query results:
        transmitting a request for the query results to the analytics system for execution against the database system; and
        receiving the query results in a transmission from the analytics system; and
    when the query approval data does not indicate approval to receive the query results:
        foregoing transmission of the request for the query results to the analytics system.

4. The method of claim 3, wherein the analytics system caches the query result in a query result cache in response to generating the query result further comprising:
    when the query approval data does not indicate approval to transmit the query request:
        transmitting a message to the analytics system indicating the query approval data does not indicate approval to transmit the query request;
    wherein the analytics system removes the query result from the query result cache based on receiving the message.

5. The method of claim 3, wherein a result set is generated based on the execution of the at least one query function against the database system, and wherein the query cost data is generated based on a size of the result set.

6. A method for execution by a user device, the method comprising:
    determining a query request based on first user input to a graphical user interface displayed by the user device;
    determining query cost data based on the query request, wherein the query cost data indicates estimated query cost data generated based on the query request;
    displaying a prompt via the graphical user interface that indicates the query cost data;
    determining query approval data based on second user input to the graphical user interface in response to the prompt;
    when the query approval data indicates approval to transmit the query request for execution:
        transmitting the query request to an analytics system for execution against a database system; and
    when the query approval data does not indicate approval to transmit the query request for execution:
        foregoing transmission of the query request to the analytics system.

7. The method of claim 6, further comprising:
receiving user application data from the analytics system; and
executing the user application data, wherein displaying the graphical user interface, determining the query request, determining the query cost data is determined, and determining the query approval data is based on the execution of the user application data.

8. The method of claim 6, further comprising:
when the query approval data does not indicate approval to transmit the query request for execution:
determining an amended query request based on third user input to the graphical user interface displayed by the user device in response to a prompt to amend the query request displayed by the graphical user interface;
determining second query cost data based on the amended query request;
displaying a second prompt via the graphical user interface that indicates the second query cost data;
determining second query approval data based on fourth user input to the graphical user interface in response to the second prompt;
when the second query approval data indicates approval to transmit the amended query request for execution:
transmitting the amended query request to the analytics system for execution against the database system; and
when the second query approval data does not indicate approval to transmit the amended query request for execution:
foregoing transmission of the amended query request to the analytics system.

9. The method of claim 6, further comprising:
receiving query pricing scheme data from the analytics system;
wherein determining the query cost data includes calculating the query cost data by utilizing the query pricing scheme data.

10. The method of claim 6, wherein determining the query cost data includes:
transmitting the query request to the analytics system, wherein the analytics system generates the query cost data based on the query request by utilizing a query pricing scheme, and wherein the analytics system transmits the query cost data to the user device; and
receiving the query cost data from the analytics system.

11. The method of claim 10, wherein the analytics system generates the query cost data based on executing at least one query function of the query request.

12. The method of claim 6, wherein the query cost data indicates a plurality of provider costs for each of a plurality of data providers that supplied data accessed in the query request, and wherein a total query cost indicated in the query cost data is computed as a function of the plurality of provider costs.

13. The method of claim 6, wherein the query cost data indicates a plurality of query function costs for each of a plurality of query functions indicated in the query request, and wherein a total query cost indicated in the query cost data is computed as a function of the plurality of query function costs.

14. The method of claim 6, wherein the query cost data indicates a plurality of field costs for each of a plurality of fields accessed in the query request, and wherein a total query cost indicated in the query cost data is computed as a function of the plurality of field costs.

15. The method of claim 6, wherein the query cost data indicates a plurality of record type costs for each of a plurality of record types accessed in the query request, and wherein a total query cost indicated in the query cost data is computed as a function of the plurality of record type costs.

16. The method of claim 6, wherein at least one of:
the query cost data indicates a plurality of provider cost ratios for each of a plurality of data providers that supplied data accessed in the query request;
the query cost data indicates a plurality of query function cost ratios for each of a plurality of query functions indicated in the query request;
the query cost data indicates a plurality of field cost ratios for each of a plurality of fields accessed in the query request; or
the query cost data indicates a plurality of record type cost ratios for each of a plurality of record types accessed in the query request.

17. The method of claim 6, wherein the estimated query cost data is based on an estimated result set size generated based on at least one of:
a current size of a table indicated in the query request for access;
a recent size of the table indicated in the query request for access;
a current total number of records supplied by a provider supplying data indicated in the query request for access;
a recent total number of records supplied by the provider supplying data indicated in the query request for access;
result set size of a result set generated via execution of at least one previous query queries based on filtering via same filtering parameters indicated in the query request;
a known number of records meeting filtering parameters indicated in the query request; or
an estimate number of records meeting filtering parameters indicated in the query request.

18. The method of claim 6, wherein the estimated query cost data indicates at least one of: an estimated minimum query cost, or an estimated maximum query cost.

19. The method of claim 6, wherein the query approval data indicates approval to transmit the query request for execution, further comprising:
receiving a query response from the analytics system based on the execution of the query request against the database system; and
displaying the query response via the graphical user interface.

* * * * *